(12) United States Patent
Woytowitz

(10) Patent No.: US 11,503,694 B2
(45) Date of Patent: Nov. 15, 2022

(54) SYSTEMS AND METHODS FOR PROVIDING POWER AND DATA TO DEVICES

(71) Applicant: Hunter Industries, Inc., San Marcos, CA (US)

(72) Inventor: Peter John Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 17/098,752

(22) Filed: Nov. 16, 2020

(65) Prior Publication Data

US 2021/0068225 A1    Mar. 4, 2021

Related U.S. Application Data

(63) Continuation of application No. 16/450,566, filed on Jun. 24, 2019, now Pat. No. 10,874,003, which is a
(Continued)

(51) Int. Cl.
*H05B 47/185* (2020.01)
*H05B 45/20* (2020.01)
(Continued)

(52) U.S. Cl.
CPC ........... *H05B 47/185* (2020.01); *H05B 45/20* (2020.01); *H05B 45/375* (2020.01);
(Continued)

(58) Field of Classification Search
CPC ........ H05B 45/20; H05B 45/60; H05B 47/19; H05B 45/325; H05B 45/10; H05B 45/00;
(Continued)

(56) References Cited

U.S. PATENT DOCUMENTS

| | | |
|---|---|---|
| 5,909,429 A | 6/1999 | Satyanarayana et al. |
| 5,947,587 A | 9/1999 | Keuper et al. |

(Continued)

FOREIGN PATENT DOCUMENTS

| | | |
|---|---|---|
| CN | 1832651 A | 9/2006 |
| CN | 101112126 A | 1/2008 |

(Continued)

OTHER PUBLICATIONS

PCT International Search Report and Written Opinion for PCT/US2012/048202, dated Nov. 27, 2012.
(Continued)

*Primary Examiner* — Wei (Victor) Y Chan
(74) *Attorney, Agent, or Firm* — Knobbe, Martens, Olson & Bear, LLP

(57) ABSTRACT

Systems and methods are provided to transmit a data encoded power signal to addressable devices. A data signal includes address and command data that varies between logical states. A controller provides a low loss rectified power signal. The controller further provides data within the power signal by forming a positive polarity rectified power waveform corresponding to data in a first state and a negative polarity rectified waveform signal corresponding to data in a second state using substantially loss-less circuitry.

14 Claims, 66 Drawing Sheets

Related U.S. Application Data continuation of application No. 16/172,438, filed on Oct. 26, 2018, now Pat. No. 10,375,793, which is a continuation of application No. 15/404,825, filed on Jan. 12, 2017, now Pat. No. 10,159,132, which is a continuation of application No. 14/700,961, filed on Apr. 30, 2015, now abandoned, which is a continuation-in-part of application No. 13/750,815, filed on Jan. 25, 2013, now Pat. No. 9,521,725, which is a continuation-in-part of application No. 13/230,665, filed on Sep. 12, 2011, now Pat. No. 8,710,770.

(60) Provisional application No. 61/511,934, filed on Jul. 26, 2011.

(51) Int. Cl.

| | | |
|---|---|---|
| H05B 47/19 | (2020.01) | |
| H05B 45/375 | (2020.01) | |
| H05B 45/382 | (2020.01) | |
| H05B 45/3725 | (2020.01) | |
| H05B 45/56 | (2020.01) | |

(52) U.S. Cl.
CPC ........... *H05B 45/382* (2020.01); *H05B 47/19* (2020.01); *H05B 45/3725* (2020.01); *H05B 45/56* (2020.01); *Y02B 20/30* (2013.01)

(58) Field of Classification Search
CPC .... H05B 47/155; H05B 47/10; H05B 39/085; H05B 45/24; H05B 47/175; H05B 47/00
See application file for complete search history.

(56) References Cited

U.S. PATENT DOCUMENTS

| | | | |
|---|---|---|---|
| 6,013,988 | A | 1/2000 | Bucks et al. |
| 6,016,038 | A | 1/2000 | Mueller et al. |
| 6,069,457 | A | 5/2000 | Bogdan |
| 6,094,014 | A | 7/2000 | Bucks et al. |
| 6,127,783 | A | 10/2000 | Pashley et al. |
| 6,147,458 | A | 11/2000 | Bucks et al. |
| 6,150,774 | A | 11/2000 | Mueller et al. |
| 6,157,093 | A | 12/2000 | Giannopoulos et al. |
| 6,166,496 | A | 12/2000 | Lys et al. |
| 6,194,839 | B1 | 2/2001 | Chang |
| 6,201,353 | B1 | 3/2001 | Chang et al. |
| 6,211,626 | B1 | 4/2001 | Lys et al. |
| 6,225,759 | B1 | 5/2001 | Bogdan et al. |
| 6,234,648 | B1 | 5/2001 | Börner et al. |
| 6,246,594 | B1 | 6/2001 | Matsuda et al. |
| 6,249,088 | B1 | 6/2001 | Chang |
| 6,250,774 | B1 | 6/2001 | Begemann et al. |
| 6,292,901 | B1 | 9/2001 | Lys et al. |
| 6,304,464 | B1 | 10/2001 | Jacobs et al. |
| 6,340,864 | B1 | 1/2002 | Wacyk |
| 6,340,868 | B1 | 1/2002 | Lys et al. |
| 6,384,545 | B1 | 5/2002 | Lau |
| 6,388,399 | B1 | 5/2002 | Eckel et al. |
| 6,411,046 | B1 | 6/2002 | Muthu |
| 6,445,139 | B1 | 9/2002 | Marshall et al. |
| 6,459,919 | B1 | 10/2002 | Lys et al. |
| 6,507,159 | B2 | 1/2003 | Wang |
| 6,510,995 | B2 | 1/2003 | Muthu et al. |
| 6,513,949 | B1 | 2/2003 | Marshall et al. |
| 6,528,954 | B1 | 3/2003 | Lys et al. |
| 6,552,495 | B1 | 4/2003 | Chang |
| 6,577,512 | B2 | 6/2003 | Tripathi et al. |
| 6,580,309 | B2 | 6/2003 | Jacobs et al. |
| 6,586,890 | B2 | 7/2003 | Min et al. |
| 6,596,977 | B2 | 7/2003 | Muthu et al. |
| 6,608,453 | B2 | 8/2003 | Morgan et al. |
| 6,609,813 | B1 | 8/2003 | Showers et al. |
| 6,617,795 | B2 | 9/2003 | Bruning |
| 6,621,235 | B2 | 9/2003 | Chang |
| 6,630,801 | B2 | 10/2003 | Schuurmans |
| 6,636,003 | B2 | 10/2003 | Rahm et al. |
| 6,639,368 | B2 | 10/2003 | Sheoghong |
| 6,676,284 | B1 | 1/2004 | Wynne Willson |
| 6,692,136 | B2 | 2/2004 | Marshall et al. |
| 6,720,745 | B2 | 4/2004 | Lys et al. |
| 6,724,159 | B2 | 4/2004 | Gutta et al. |
| 6,734,639 | B2 | 5/2004 | Chang et al. |
| 6,741,351 | B2 | 5/2004 | Marshall et al. |
| 6,777,891 | B2 | 8/2004 | Lys et al. |
| 6,788,011 | B2 | 9/2004 | Mueller et al. |
| 6,796,680 | B1 | 9/2004 | Showers et al. |
| 6,801,003 | B2 | 10/2004 | Schanberger et al. |
| 6,806,659 | B1 | 10/2004 | Mueller et al. |
| 6,831,569 | B2 | 12/2004 | Wang et al. |
| 6,853,150 | B2 | 2/2005 | Clauberg et al. |
| 6,859,644 | B2 | 2/2005 | Wang |
| 6,922,022 | B2 | 7/2005 | Bucks et al. |
| 6,930,452 | B2 | 8/2005 | De Krijger et al. |
| 6,932,477 | B2 | 8/2005 | Stanton |
| 6,933,685 | B2 | 8/2005 | Gutta et al. |
| 6,965,205 | B2 | 11/2005 | Piepgras et al. |
| 6,969,954 | B2 | 11/2005 | Lys |
| 6,992,803 | B2 | 1/2006 | Chang |
| 6,998,594 | B2 | 2/2006 | Gaines et al. |
| 7,030,572 | B2 | 4/2006 | Nijhof et al. |
| 7,031,920 | B2 | 4/2006 | Dowling et al. |
| 7,038,398 | B1 | 5/2006 | Lys et al. |
| 7,038,399 | B2 | 5/2006 | Lys et al. |
| 7,064,498 | B2 | 6/2006 | Dowling et al. |
| 7,071,762 | B2 | 7/2006 | Xu et al. |
| 7,118,248 | B2 | 10/2006 | Wynne Willson |
| 7,132,804 | B2 | 11/2006 | Lys et al. |
| 7,139,617 | B1 | 11/2006 | Morgan et al. |
| 7,140,752 | B2 | 11/2006 | Ashdown |
| 7,161,311 | B2 | 1/2007 | Mueller et al. |
| 7,161,313 | B2 | 1/2007 | Piepgras et al. |
| 7,161,556 | B2 | 1/2007 | Morgan et al. |
| 7,178,941 | B2 | 2/2007 | Roberge et al. |
| 7,180,252 | B2 | 2/2007 | Lys et al. |
| 7,186,003 | B2 | 3/2007 | Dowling et al. |
| 7,202,608 | B2 | 4/2007 | Robinson et al. |
| 7,202,613 | B2 | 4/2007 | Morgan et al. |
| 7,202,641 | B2 | 4/2007 | Claessens et al. |
| 7,204,622 | B2 | 4/2007 | Dowling et al. |
| 7,221,104 | B2 | 5/2007 | Lys et al. |
| 7,228,190 | B2 | 6/2007 | Dowling et al. |
| 7,231,060 | B2 | 6/2007 | Dowling et al. |
| 7,233,115 | B2 | 6/2007 | Lys |
| 7,233,831 | B2 | 6/2007 | Blackwell |
| 7,242,152 | B2 | 6/2007 | Dowling et al. |
| 7,253,566 | B2 | 8/2007 | Lys et al. |
| 7,255,458 | B2 | 8/2007 | Ashdown |
| 7,256,554 | B2 | 8/2007 | Lys |
| 7,262,559 | B2 | 8/2007 | Tripathi et al. |
| 7,267,461 | B2 | 9/2007 | Kan et al. |
| 7,274,160 | B2 | 9/2007 | Mueller et al. |
| 7,300,192 | B2 | 11/2007 | Mueller et al. |
| 7,308,296 | B2 | 12/2007 | Lys et al. |
| 7,314,289 | B2 | 1/2008 | Montagne |
| 7,319,298 | B2 | 1/2008 | Jungwirth et al. |
| 7,323,676 | B2 | 1/2008 | Duijve |
| 7,329,998 | B2 | 2/2008 | Jungwirth |
| 7,344,279 | B2 | 3/2008 | Mueller et al. |
| 7,350,936 | B2 | 4/2008 | Ducharme et al. |
| 7,352,138 | B2 | 4/2008 | Lys et al. |
| 7,352,339 | B2 | 4/2008 | Morgan et al. |
| 7,353,071 | B2 | 4/2008 | Blackwell et al. |
| 7,354,172 | B2 | 4/2008 | Chemel et al. |
| 7,358,679 | B2 | 4/2008 | Lys et al. |
| 7,358,681 | B2 | 4/2008 | Robinson et al. |
| 7,358,706 | B2 | 4/2008 | Lys |
| 7,358,929 | B2 | 4/2008 | Mueller et al. |
| 7,358,961 | B2 | 4/2008 | Zwanenburg |
| 7,391,168 | B1 | 6/2008 | Dernovsek |
| 7,394,210 | B2 | 7/2008 | Ashdown |
| 7,420,335 | B2 | 9/2008 | Robinson et al. |
| 7,423,387 | B2 | 9/2008 | Robinson et al. |
| 7,432,668 | B2 | 10/2008 | Zwanenburg et al. |

(56) References Cited

U.S. PATENT DOCUMENTS

| | | | |
|---|---|---|---|
| 7,443,209 B2 | 10/2008 | Chang | |
| 7,449,847 B2 | 11/2008 | Schanberger et al. | |
| 7,453,217 B2 | 11/2008 | Lys et al. | |
| 7,459,864 B2 | 12/2008 | Lys | |
| 7,462,997 B2 | 12/2008 | Mueller et al. | |
| 7,463,070 B2 | 12/2008 | Wessels | |
| 7,482,565 B2 | 1/2009 | Morgan et al. | |
| 7,482,760 B2 | 1/2009 | Jungwirth et al. | |
| 7,490,953 B2 | 2/2009 | Holten et al. | |
| 7,495,671 B2 | 2/2009 | Chemel et al. | |
| 7,502,034 B2 | 3/2009 | Chemel et al. | |
| 7,511,436 B2 | 3/2009 | Xu | |
| 7,511,437 B2 | 3/2009 | Lys et al. | |
| 7,520,634 B2 | 4/2009 | Ducharme et al. | |
| 7,521,872 B2 | 4/2009 | Bruning | |
| 7,525,254 B2 | 4/2009 | Lys et al. | |
| 7,538,499 B2 | 5/2009 | Ashdown | |
| 7,542,257 B2 | 6/2009 | McCormick et al. | |
| 7,550,931 B2 | 6/2009 | Lys et al. | |
| 7,550,935 B2 | 6/2009 | Lys et al. | |
| 7,557,521 B2 | 7/2009 | Lys | |
| 7,569,807 B2 | 8/2009 | Matheson | |
| 7,573,209 B2 | 8/2009 | Ashdown et al. | |
| 7,573,210 B2 | 8/2009 | Ashdown et al. | |
| 7,573,729 B2 | 8/2009 | Elferich et al. | |
| 7,589,701 B2 | 9/2009 | Sempel | |
| 7,598,681 B2 | 10/2009 | Lys et al. | |
| 7,598,684 B2 | 10/2009 | Lys et al. | |
| 7,598,686 B2 | 10/2009 | Lys et al. | |
| 7,619,370 B2 | 11/2009 | Chemel et al. | |
| 7,652,236 B2 | 1/2010 | Cortenraad et al. | |
| 7,654,603 B2 | 2/2010 | Kan et al. | |
| 7,656,366 B2 | 2/2010 | Ashdown | |
| 7,658,506 B2 | 2/2010 | Dowling | |
| 7,659,673 B2 | 2/2010 | Lys | |
| 7,665,883 B2 | 2/2010 | Matheson | |
| 7,667,409 B2 | 2/2010 | Geerts et al. | |
| 7,675,238 B2 | 3/2010 | Cortenraad et al. | |
| 7,687,753 B2 | 3/2010 | Ashdown | |
| 7,688,002 B2 | 3/2010 | Ashdown et al. | |
| 7,703,951 B2 | 4/2010 | Piepgras et al. | |
| 7,710,369 B2 | 5/2010 | Dowling | |
| 7,712,926 B2 | 5/2010 | Matheson | |
| 7,714,521 B2 | 5/2010 | Qian | |
| 7,731,387 B2 | 6/2010 | Cortenraad et al. | |
| 7,731,389 B2 | 6/2010 | Draganov et al. | |
| 7,731,390 B2 | 6/2010 | Van Gorkom et al. | |
| 7,737,643 B2 | 6/2010 | Lys | |
| 7,764,026 B2 | 7/2010 | Dowling et al. | |
| 7,766,489 B2 | 8/2010 | Duine et al. | |
| 7,766,518 B2 | 8/2010 | Piepgras et al. | |
| 7,777,427 B2 | 8/2010 | Stalker, III | |
| 7,802,902 B2 | 9/2010 | Moss et al. | |
| 7,806,558 B2 | 10/2010 | Williamson | |
| 7,808,191 B2 | 10/2010 | Wu | |
| 7,809,448 B2 | 10/2010 | Lys et al. | |
| 7,810,974 B2 | 10/2010 | Van Rijswick et al. | |
| 7,828,465 B2 | 11/2010 | Roberge et al. | |
| 7,845,823 B2 | 12/2010 | Mueller et al. | |
| 7,850,347 B2 | 12/2010 | Speier et al. | |
| 8,278,845 B1 | 10/2012 | Woytowitz | |
| 8,578,081 B1 | 11/2013 | Fils | |
| 8,710,770 B2 | 4/2014 | Woytowitz | |
| 8,988,599 B2 | 3/2015 | Debevec | |
| 2003/0090889 A1* | 5/2003 | Wacyk | H05B 47/19 362/85 |
| 2003/0132721 A1 | 7/2003 | Jacobs et al. | |
| 2003/0133292 A1 | 7/2003 | Mueller et al. | |
| 2004/0052076 A1 | 3/2004 | Mueller et al. | |
| 2005/0041161 A1 | 2/2005 | Dowling et al. | |
| 2005/0236998 A1 | 10/2005 | Mueller et al. | |
| 2005/0275626 A1 | 12/2005 | Mueller et al. | |
| 2006/0002110 A1 | 1/2006 | Dowling et al. | |
| 2006/0076908 A1 | 4/2006 | Morgan et al. | |
| 2006/0114201 A1 | 6/2006 | Chang | |
| 2006/0119287 A1 | 6/2006 | Campbell | |
| 2006/0126617 A1 | 6/2006 | Cregg et al. | |
| 2006/0232219 A1 | 10/2006 | Xu | |
| 2006/0262521 A1 | 11/2006 | Piepgras et al. | |
| 2007/0145915 A1 | 6/2007 | Roberge et al. | |
| 2007/0153514 A1 | 7/2007 | Dowling et al. | |
| 2007/0230159 A1 | 10/2007 | Cortenraad et al. | |
| 2008/0140231 A1 | 1/2008 | Blackwell et al. | |
| 2008/0043464 A1 | 2/2008 | Ashdown | |
| 2008/0089060 A1 | 4/2008 | Kondo et al. | |
| 2008/0094005 A1 | 4/2008 | Rabiner et al. | |
| 2008/0136334 A1 | 6/2008 | Robinson et al. | |
| 2008/0136350 A1 | 6/2008 | Tripathi et al. | |
| 2008/0164826 A1 | 7/2008 | Lys | |
| 2008/0164827 A1 | 7/2008 | Lys | |
| 2008/0164854 A1 | 7/2008 | Lys | |
| 2008/0167734 A1 | 7/2008 | Robinson et al. | |
| 2008/0183081 A1 | 7/2008 | Lys et al. | |
| 2008/0203928 A1 | 8/2008 | Frumau et al. | |
| 2008/0211419 A1 | 9/2008 | Garrity | |
| 2008/0239675 A1 | 10/2008 | Speier | |
| 2008/0253119 A1 | 10/2008 | Paulussen et al. | |
| 2008/0265797 A1 | 10/2008 | Van Doorn | |
| 2008/0272743 A1 | 11/2008 | Ackermann et al. | |
| 2008/0278092 A1 | 11/2008 | Lys et al. | |
| 2008/0278941 A1 | 11/2008 | Logan et al. | |
| 2008/0298054 A1 | 12/2008 | Paulussen et al. | |
| 2009/0002981 A1 | 1/2009 | Knibbe | |
| 2009/0021175 A1 | 1/2009 | Wendt et al. | |
| 2009/0021182 A1 | 1/2009 | Sauerlaender | |
| 2009/0072761 A1 | 3/2009 | Wessels | |
| 2009/0128059 A1 | 5/2009 | Joosen et al. | |
| 2009/0134817 A1 | 5/2009 | Jurngwirth et al. | |
| 2009/0168415 A1 | 7/2009 | Franciscus Deurenberg et al. | |
| 2009/0179587 A1 | 7/2009 | Van Der Veen et al. | |
| 2009/0179596 A1 | 7/2009 | Willaert et al. | |
| 2009/0189448 A1 | 7/2009 | Verschueren | |
| 2009/0195063 A1 | 8/2009 | Joseph et al. | |
| 2009/0195064 A1* | 8/2009 | Joseph | H04B 3/546 307/1 |
| 2009/0200967 A1 | 8/2009 | Bergman | |
| 2009/0224695 A1 | 9/2009 | Van Erp et al. | |
| 2009/0230884 A1 | 9/2009 | Van Doorn | |
| 2009/0231878 A1 | 9/2009 | Van Duijneveldt | |
| 2009/0243517 A1 | 10/2009 | Verfuerth et al. | |
| 2009/0278473 A1 | 11/2009 | Van Erp | |
| 2009/0284174 A1 | 11/2009 | Sauerlander et al. | |
| 2009/0303467 A1 | 12/2009 | Ashdown et al. | |
| 2009/0315485 A1 | 12/2009 | Verfuerth et al. | |
| 2009/0321666 A1 | 12/2009 | Hilgers | |
| 2010/0007600 A1 | 1/2010 | Deurenberg et al. | |
| 2010/0014321 A1* | 1/2010 | Won | H02M 3/3376 363/17 |
| 2010/0026191 A1 | 2/2010 | Radermacher et al. | |
| 2010/0045478 A1 | 2/2010 | Schulz et al. | |
| 2010/0053198 A1 | 3/2010 | Vinkenvleugel | |
| 2010/0072901 A1 | 3/2010 | De Rijck et al. | |
| 2010/0072902 A1 | 3/2010 | Wendt et al. | |
| 2010/0079085 A1 | 4/2010 | Wendt et al. | |
| 2010/0084985 A1* | 4/2010 | Woytowitz | H05B 47/185 315/210 |
| 2010/0084986 A1 | 4/2010 | Longhino et al. | |
| 2010/0084995 A1 | 4/2010 | Baaijens et al. | |
| 2010/0091488 A1 | 4/2010 | Ijzerman et al. | |
| 2010/0094439 A1 | 4/2010 | Van De Meulenhof et al. | |
| 2010/0096967 A1 | 4/2010 | Marinus et al. | |
| 2010/0102732 A1 | 4/2010 | Peeters et al. | |
| 2010/0111538 A1* | 5/2010 | Arita | H04B 10/116 398/130 |
| 2010/0117543 A1 | 5/2010 | Van Der Veen et al. | |
| 2010/0117656 A1 | 5/2010 | Snelten | |
| 2010/0118531 A1 | 5/2010 | Montagne | |
| 2010/0127633 A1 | 5/2010 | Geerts et al. | |
| 2010/0134041 A1 | 6/2010 | Radermacher et al. | |
| 2010/0134042 A1 | 6/2010 | Willaert | |
| 2010/0148689 A1 | 6/2010 | Morgan et al. | |
| 2010/0158061 A1 | 6/2010 | Schulz et al. | |
| 2010/0165618 A1 | 7/2010 | Vissenberg et al. | |
| 2010/0171771 A1 | 7/2010 | Otte et al. | |

(56) References Cited

U.S. PATENT DOCUMENTS

| | | |
|---|---|---|
| 2010/0181936 A1 | 7/2010 | Radermacher et al. |
| 2010/0188007 A1 | 7/2010 | Deppe et al. |
| 2010/0194293 A1 | 8/2010 | Deurenberg et al. |
| 2010/0231133 A1 | 9/2010 | Lys |
| 2010/0231363 A1 | 9/2010 | Knibbe |
| 2010/0244707 A1 | 9/2010 | Gaines et al. |
| 2010/0244734 A1 | 9/2010 | Van Herpen et al. |
| 2010/0259931 A1* | 10/2010 | Chemel ............... F21V 29/713 362/249.02 |
| 2010/0264834 A1 | 10/2010 | Gaines et al. |
| 2010/0271843 A1 | 10/2010 | Holten et al. |
| 2010/0289532 A1 | 11/2010 | Wendt et al. |
| 2010/0301780 A1 | 12/2010 | Vinkenvleugel |
| 2010/0308745 A1 | 12/2010 | Delnoij |
| 2011/0025205 A1 | 2/2011 | Van Rijswick et al. |
| 2011/0025230 A1 | 2/2011 | Schulz et al. |
| 2011/0035404 A1 | 2/2011 | Morgan et al. |
| 2011/0133655 A1* | 6/2011 | Recker ............... H05B 47/13 315/159 |
| 2011/0175553 A1 | 7/2011 | Sampsell |
| 2011/0187290 A1 | 8/2011 | Krause |
| 2013/0134891 A1 | 5/2013 | Woytowitz |
| 2013/0249429 A1 | 9/2013 | Woytowitz |
| 2013/0289750 A1* | 10/2013 | Souvay ............... H05B 47/185 700/90 |
| 2019/0313503 A1 | 10/2019 | Woytowitz |
| 2020/0052997 A1* | 2/2020 | Ramanathan ........... H04L 45/32 |

FOREIGN PATENT DOCUMENTS

| | | |
|---|---|---|
| DE | 20 2012 100 843 U1 | 4/2012 |
| WO | WO 99/38363 A1 | 7/1999 |

OTHER PUBLICATIONS

First Office Action and Chinese Search Report for Application No. 2012800347177 dated Sep. 30, 2014, 8 pages.

International Search Report and Written Opinion of the International Searching Authority for Application No. PCT/US2013/075169 dated Nov. 17, 2014, 10 pages.

PCT International Preliminary Reporton Patentability for Application No. PCT/US2013/075169 dated Jul. 28, 2015, 6 pages.

Title: Using Isolated RS-485 in DMX512 Lighting Applications, Date: Nov. 2009, Author Hein Marais, p. 1-3 (Year: 2009).

* cited by examiner

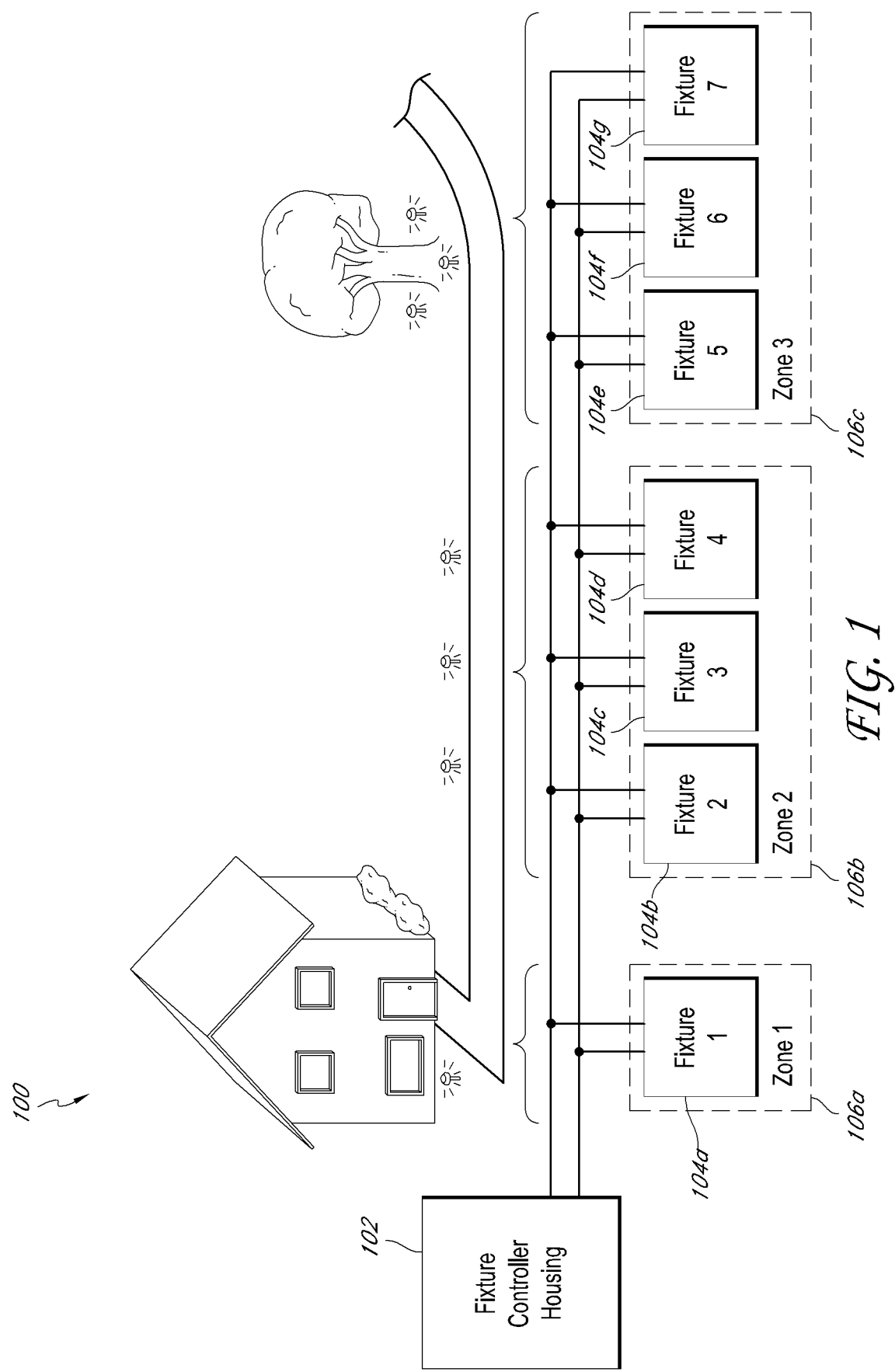

MOSFET Full Wave Rectifier Waveforms

Bridge Waveforms

Bias Circuit for MOSFET Drivers

| FIG. 17A-1 | FIG. 17A-2 |
| --- | --- |
| FIG. 17A-3 | FIG. 17A-4 |

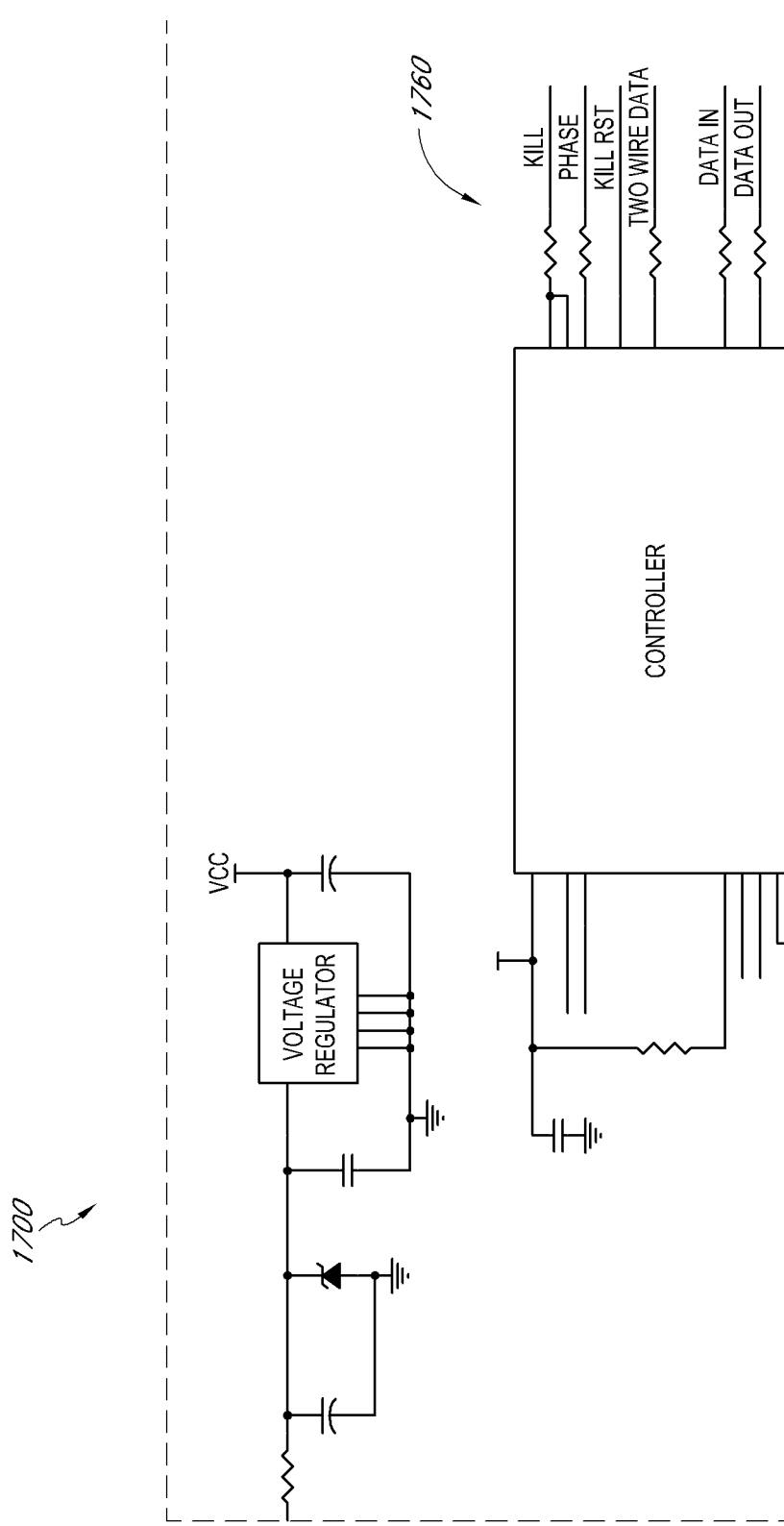

MOSFET Full Wave Rectifier Waveforms

Bridge Waveforms

FRONT VIEW WITH OPERATOR INTERFACE PANEL

BACK VIEW WITH OPERATOR INTERFACE PANEL, PANEL EXTENDER AND EXTENDER POWER MODULE

SYSTEMS AND METHODS FOR PROVIDING POWER AND DATA TO DEVICES

RELATED APPLICATIONS

Any and all applications for which a foreign or domestic priority claim is identified in the Application Data Sheet as filed with the present application are hereby incorporated by reference under 37 CFR 1.57.

BACKGROUND

Traditionally, outdoor lighting systems include a plurality of lamps connected to a transformer. There may be one or more "legs" or sets of wires coming out of the transformer, each connected to at least one light. A timer box connects to the transformer. The user programs the on/off times and all of the lights energize in unison, such that all lights connected to a particular transformer turn ON or OFF together regardless of which leg they are on.

Some manufacturers provide lighting systems with addressable lighting modules. The timer box of the traditional lighting system is replaced with a lighting controller that supplies the lighting modules with a separate power and data signal. Each lighting module has an address and is independently addressable by the lighting controller via the data signal. These networked lighting systems provide the lighting modules with two sets of wires instead of the one or more legs. One set provides a power signal to illuminate the lamps or LEDs and a second set provides the lighting module with a data signal. The user programs the lighting controller to turn-on and turn-off lights at individual addresses such that a single light can turn-on or turn-off independently of the other lights in the network, when, for example, the data signal carries the address of a particular light.

In some instances, the power signal is the output of a low voltage power transformer, which is connected directly to the lighting modules to power the lamps or LEDs. For example, a primary AC to 12 VAC transformer accepts 120 VAC and outputs 12 VAC, where the 12 VAC power signal electrically couples directly to the lighting modules and powers the lamps/LEDs.

In other instances, the power signal is the output of a DC switching power supply. For example, a DC switching power supply accepts 120 VAC and outputs 12 VDC, where the 12 VDC power signal electrically couples directly to the lighting modules and powers the lamps/LEDs.

Other manufacturers of addressable lighting systems send power and data to the lighting modules on the primary power wires. The user programs the lighting controller to turn-on and turn-off lights at individual addresses such that a single light can turn-on or turn-off independently of the other lights in the network. In some instances, these lighting systems use a high frequency carrier, such as 125 kHz, and superimpose this signal on the power line. This approach requires large inductors, or complex Digital Signal Processors (DSPs) to decode the data contained in the carrier. One such commercially available system is the X10 control system originally developed by Pico Electronics of Glenrothes, Scotland.

In other instances, these lighting systems amplify the data signal to the level that can be used to power the lighting modules. For example, a PWM stepper motor driver chip can amplify a 0 volt to 5 volt transistor-transistor logic (TTL) data signal to positive 24 volts to reflect a logical one and negative 24 volts to reflect a logical zero. The amplified data signal electrically couples to the lighting module, where the voltage is sufficient to supply power to the lamps/LEDs while maintaining the logical data values of the data stream.

SUMMARY

Based on the foregoing, each of the present manufacturing solutions suffers from a variety of drawbacks. In the context of individually addressable lighting networks with low voltage power transformers, they often employ special wiring or cabling. In particular, one wire and its return are needed for electrical power, while a second wire path comprising two or more wires is needed for data. For example, using a low voltage power transformer directly coupled to the lamps/LEDs to supply power prevents the data from being carried on the same power lines and, thus requires the two sets of wires. Accordingly, the owner of an existing set of lights must take significant effort to rewire in order to have a digitally controlled lighting environment.

In the context of lighting networks using a single wire for a power and a data signal, problems can occur when using a switching power supply to supply power to the lighting modules. Switching power supplies are inefficient when compared to a well-designed core and coil power transformer. The inefficient transformation of the primary AC power to a power waveform usable by the lighting modules creates heat. The heat, in turn, creates the need for a large enclosure to prevent the lighting controller circuitry from overheating. For example, a 300 watt switching power supply that has an efficiency of 85% wastes 45 watts in heat.

In contrast, in an embodiment of the present disclosure, a full-wave rectifier coupled to a bridge circuit provides a polarity controlled, sinusoidal power signal to power a plurality of lighting modules. The rectifier and bridge circuit include MOSFETs and each MOSFET has an integral body diode. When the full-wave rectifier MOSFETs are enabled at the appropriate point in time, such as when the body diodes would be conducting, they create a very low-loss switch. For example, for a MOSFET having a resistance of approximately 1 milliohm when it is enabled, conducting 25 amperes needed to power the plurality of lighting modules would lose approximately 25 millivolts of the signal. The corresponding power lost to heat is approximately 0.625 watts. In contrast, a standard rectifier would drop approximately 0.7 volts and dissipate approximately 17.5 watts.

In embodiments of the present disclosure using the output of a primary AC to 12 VAC 300 watt transformer to feed the circuitry, preferably the power lost to heat in the circuitry is less than approximately 2.0%. More preferably, the power lost to heat is between approximately 1% and approximately 2%. Even more preferably, the power lost to heat is between approximately 0.2% and approximately 1%, and most preferably, the power lost to heat is less than approximately 0.2%.

In other embodiments, the advantages of the rectifier and bridge of the present disclosure creating a very low-loss switch can be viewed from the drop in voltage across the rectifier. A transformer in the full-wave rectifier receives the primary AC signal and transforms the primary AC signal into a secondary AC power waveform. The full-wave rectifier coupled to a bridge circuit provides a polarity controlled, sinusoidal power signal to power a plurality of lighting modules. Preferably, the power waveform current is more than approximately 4 amperes and the power waveform voltage drop across the rectifier is less than approximately 0.2 volts and at full load the voltage drop across the rectifier, from the output of the transformer to the output of the rectifier, is approximately 25 millivolts. In another embodiment, the voltage drop across the rectifier is more preferably between approximately 0.1 volts and approximately 0.2 volts, yet more preferably between approximately 0 volts and approximately 0.1 volts, and most preferably between approximately 5 millivolts and approximately 30 millivolts. In yet other embodiments, the power waveform current is more preferably more than 10 amperes, yet more preferably more than 50 amperes, and most preferably more than 75 amperes. One basis for the above ratings is the wattage used for outdoor lighting systems. Typical systems are about 60 watts or higher. If such power requirements should be reduced due to technology advances, such as, for example, power requirements for lighting sources, or the like, one of ordinary skill will understand from the disclosure herein that the forgoing ranges may also change accordingly.

The low-loss full-wave rectified power waveform from the full-wave rectifier is communicated to the inputs of the bridge circuit. The bridge circuit outputs the full-wave rectified waveform with either a positive polarity or a negative polarity, thus having the ability to reconstruct the original sinusoidal output of the transformer, or alter its polarity to send data. The control signal from a processor in the lighting controller couples to the MOSFET drivers of the bridge circuit. The control signal enables certain of the gates in the bridge circuit at certain points in time to encode a data signal by varying the polarity of the power waveform.

In one embodiment, the control signal enables certain of the gates in the bridge circuit when the data is a logical 1-bit and others of the gates when the data is a logical 0-bit. This, in turn, causes the bridge circuit to output the positive polarity rectified waveform when the data stream is a 1-bit and causes the bridge circuit to output a negative polarity rectified waveform when the data stream is a 0-bit. In other embodiments, the bridge circuit outputs the negative polarity rectified power signal when the data is a 1-bit and outputs the positive polarity rectified power signal when the data is a 0-bit.

In one embodiment, the lighting system includes a controller having a data signal including data bits. The data bits have a first state and a second state for sending commands and addresses to at least one lighting module.

The lighting system further includes a MOSFET full-wave rectifier circuit for receiving a 12 VAC RMS power signal having first and second power waveforms and rectifying the 12 VAC RMS power signal. The MOSFET full-wave rectifier includes a first MOSFET coupled in series with a second MOSFET and a third MOSFET coupled in series with a fourth MOSFET where the series combination of the first and second MOSFETs electrically couple in parallel with the series combination of the third and fourth MOSFETs. Each MOSFET is associated with a gate signal and the gate signals electrically couple to an output of a comparator comparing the first and second power waveforms, via driver circuitry. The gates associated with the second and third MOSFETs are enabled when the first power waveform is greater than the second power waveform and the gates associated with the first and fourth MOSFETs are enabled when the second power waveform is greater than the first power waveform.

The lighting system further includes a MOSFET bridge circuit for receiving the full-wave rectified waveform and providing a two-wire data/power signal to the at least one lighting module. The MOSFET bridge circuit includes a fifth MOSFET coupled in series with a sixth MOSFET and a seventh MOSFET coupled in series to an eighth MOSFET, where the series combination of the fifth and sixth MOSFETs couple in parallel with the series combination of the seventh and eighth MOSFETs. Each MOSFET is associated with a gate signal and the gate signals electrically coupled to the control signal. The gates associated with the sixth and seventh MOSFETs are enabled when the control signal is in the first state and the gates associated with the fifth and eighth MOSFETs are enabled when the control signal is in the second state, such that the MOSFET bridge circuit outputs the rectified waveform having a positive polarity when the control signal is in the first state and outputs the rectified waveform having a negative polarity when the control signal is in the second state. The two-wire data/power signal includes the positive and negative polarity rectified waveforms corresponding to the state of the control signal.

In another embodiment, a lighting system includes a controller having a data signal including data bits. The data bits have a first state and a second state for sending commands and addresses to at least one lighting module.

The lighting system further includes a MOSFET full-wave/bridge circuit for receiving a 12 VAC RMS power signal having first and second waveforms, rectifying the 12 VAC RMS power signal and providing a two-wire data/power signal to the at least one lighting module. The first and second power waveforms are provided by a transformer having a center tap. The MOSFET full-wave/bridge circuit includes a first MOSFET coupled in series with a second MOSFET and a third MOSFET electrically coupled in series with a fourth MOSFET where the series combination of the first and second MOSFETs electrically couple in parallel with the series combination of the third and fourth MOSFETs. Each MOSFET is associated with a gate signal and the gate signals electrically couple to the control signal. The gates associated with the third and fourth MOSFETs are enabled when the control signal is in the first state and the gates associated with the first and fourth MOSFETs are enabled when the control signal is in the second state, such that the MOSFET full-wave/bridge circuit outputs the rectified waveform having a positive polarity when the control signal is in the first state and outputs the rectified waveform having a negative polarity when the control signal is in the second state. The two-wire data/power signal includes the positive and negative polarity rectified waveforms corresponding to the state of the control signal.

In another aspect, systems and methods directed toward a user interface panel are disclosed. In an embodiment, a lighting controller includes an operator interface panel, which allows operator input to program the timing, dimming/brightness, color, and zones of the lighting system. In one embodiment, the user enters a chronologic schedule including a lighting group, a time, an intensity, a color, and the like. The program queues the user entered events and transmits the commands at the scheduled times.

With respect to color, in an embodiment, the colors are assigned a number and the user enters the number associated with the desired color. In another embodiment, the user designs a custom color by inputting the red, green and blue percentages. In some cases, a percentage of white can also be mixed with the red, green, and blue. Other user interfaces may include a color wheel with pointer sections, a scrollable list or color palette, or the like. The lighting controller then sends commands to the lighting modules with the user specified color percentages to create the custom color. In another embodiment, the lighting controller includes a thin film transistor liquid crystal display (TFT LCD) or the like, to display the color associated with the color number or the custom color. In another embodiment, the light controller may have a small red/green/blue LED, separate from the display that can be driven with the proper percentages to mimic the color emitted by the lighting fixtures.

In one embodiment, the user has the ability through the lighting controller to set on or off times around an event, such as create a lighting event around sunrise or sunset. For example, the user could use dusk as a reference time and have a zone of lights turn on at dusk minus two hours or dusk plus two hours. In one embodiment, the lighting controller includes a photocell and determines events such as dusk or dawn through the input from the photocell. In another embodiment, the user enters latitude and longitude information for his location. The lighting controller looks up or calculates the astronomical events based on the entered location values. In yet another embodiment, the lighting controller displays a map and the user indicates on the map his location. The lighting controller automatically displays the latitude and longitude and determines the astronomical events based on the displayed location values.

In another aspect, systems and methods relating to commanding the lighting modules through a remote device are disclosed. In another embodiment, the lighting system further includes a remote device and a wireless receiver. The remote device permits the user to adjust the lighting while in the illuminated area as an alternative to using the user interface panel in the lighting controller. The remote interacts with the lighting module via an optical or other link and interacts with the lighting controller via the receiver to allow the user to mix the color coefficients, assign lights to zones, control brightness, control on/off, or the like. The lighting controller receives the user requests through a wired or other connection to the receiver and sends commands to the lighting module through the two wire data/power path. For example, from the user's point of view, he points the remote at the desired lighting module and selects the change zone command. After a short time period, the selected lighting module is a member of a different lighting zone.

Certain embodiments relate to a lighting system including a lighting controller and at least one lighting module having an address and including a light emitting diode (LED). The LED is configured to transmit optically the address or other status information of the lighting module by turning on when transmitting a 1-bit and turning off when transmitting a 0-bit in the address. The lighting controller electrically couples to the lighting module through a two-wire path carrying a power/data signal.

The lighting system further includes a remote device including an optical sensor and an RF transmitter. The optical sensor is configured to receive the address from the lighting module, and user request from the user interface of the remote device. The RF transmitter is configured to transmit an RF signal corresponding to the address and the request.

The lighting system further includes a wireless receiver electrically coupled to the lighting controller and configured to receive the RF transmission from the remote device. The wireless receiver down converts the RF transmission to a baseband signal corresponding to the address and request. The wireless receiver is further configured to electrically send the baseband signal corresponding to the address and the request to the lighting controller.

The lighting controller encodes a command corresponding to the user's request for the at least one lighting module associated with the address onto the power/data signal.

Other aspects relate to a method to increase a resolution of intensity control in a lighting module comprising an LED. The method comprises determining, at the lighting module, an intensity level for the LED, generating a first control signal that when coupled to an LED driver results in a first drive signal having a first resolution of intensity control, where the first control signal is based at least in part on the intensity level, generating a second control signal that when coupled to the LED driver results in a second drive signal having a second resolution of intensity control, where the second control signal is based at least in part on the intensity level, combining the first and second control signals to create a hybrid control signal, and coupling the hybrid control signal to the LED driver to produce a third drive signal having a third resolution of intensity control, where the third resolution of intensity control results in a greater resolution of intensity control than the first resolution of intensity control and the second resolution of intensity control.

In an embodiment, the hybrid control signal comprises a PWM signal having an amplitude and a duty cycle. In another embodiment, the amplitude is based at least in part on the first control signal and the duty cycle is based at least in part on the second control signal. In a further embodiment, creating the hybrid control signal comprises converting a digital value that is responsive to the amplitude to an analog signal, and modulating the analog signal according to the duty cycle. In a yet further embodiment, creating the hybrid control signal comprises filtering with a low-pass filter a first PWM waveform, where a duty cycle of the first PWM waveform is based on the amplitude and the filtered first PWM waveform approximates an analog signal having the amplitude, and modulating the analog signal with a second PWM waveform having the duty cycle of the hybrid control signal.

In an embodiment, creating the hybrid control signal comprises generating a digital value for predetermined intervals and converting the digital value to an analog value during the predetermined intervals, where the digital value is based on the amplitude and the predetermined intervals based on the duty cycle. In another embodiment, creating the hybrid control signal comprises averaging a PWM waveform, where a duty cycle of the PWM waveform is based on the amplitude and the averaged PWM waveform approximating an analog signal having the amplitude, and turning the PWM waveform ON and OFF at predetermined times, where the predetermined times is based on the duty cycle of the hybrid control signal. In a further embodiment, averaging the PWM waveform comprises filtering the PWM waveform with a low-pass filter. In a yet further embodiment, components of the low-pass filter are selected so that a frequency of the PWM waveform is outside of the pass band of the low-pass filter and a frequency of the hybrid control signal is within the pass band.

Certain embodiments relate to a lighting module comprising an LED configured to illuminate when driven by an output of an LED driver circuit, a processor configured to determine an intensity level for the LED and to generate a first control signal that when coupled to the LED driver circuit results in a first drive signal having a first resolution of intensity control and to generate a second control signal that when coupled to the LED driver circuit results in a second drive signal having a second resolution of intensity control, where the first and second control signals are based at least in part on the intensity level, and a hybrid control signal generator configured to combine the first and second control signals to create a hybrid control signal. The LED driver circuit is configured to receive the hybrid control signal and to output a third drive signal having a third resolution of intensity control, where the third resolution of intensity control results in a greater resolution of intensity control than the first resolution of intensity control and the second resolution of intensity control.

In an embodiment, the hybrid control signal generator comprises a microcontroller configured to generate a digital value responsive to the amplitude and a PWM waveform responsive to the duty cycle, and a digital to analog converter (DAC) configured to enable a conversion of the digital value to an analog signal according to the PWM waveform. In another embodiment, the hybrid control signal generator comprises a microcontroller configured to generate a digital value responsive to the amplitude and a PWM waveform responsive to the duty cycle, a digital to analog converter (DAC) configured to convert the digital value to an analog signal, and a switch configured to modulate the analog signal according to PWM waveform. In a further embodiment, the hybrid control signal generator comprises a microcontroller configured to generate a first PWM waveform, a low-pass filter configured to average the first PWM waveform to approximate an analog signal having the amplitude, where the microcontroller is further configured to generate a second PWM waveform having the duty cycle, and the hybrid control signal generator further comprises a switch configured to modulate the averaged first PWM waveform with the second PWM waveform. In a yet further embodiment, the hybrid control signal generator comprises a microcontroller configured to generate a digital value for predetermined intervals and a digital to analog converter (DAC) configured to convert the digital value to an analog signal during the predetermined intervals, where the digital value is based on the amplitude and the predetermined intervals based on the duty cycle.

Certain embodiments relate to a method to control color and brightness of a lighting module comprising one or more LEDs. The method comprises receiving at the lighting module a data encoded power signal over a two-wire communication network, where the data encoded power signal comprises data associated with a user-selected color and a user-selected brightness for the lighting module. The method further comprises decoding the data associated with the user-selected color and the user-selected brightness, where the decoded data comprises a color ratio and an intensity level, determining, for each LED of the one or more LEDs, a corresponding amplitude and a corresponding duty cycle of a pulse width modulation (PWM) signal in response to the color ratio at the intensity level, and generating, for each LED of the one or more LEDs, a corresponding hybrid control signal having the corresponding amplitude and the corresponding duty cycle, where each LED of the one or more LEDs is further associated with a corresponding hysteretic LED driver. The method further comprises providing, for each LED of the one or more LEDs, the corresponding hybrid control signal to the corresponding hysteretic LED driver to generate a corresponding output signal based on the corresponding hybrid control signal, and driving each LED of the one or more LEDs with the corresponding output signal to cause the lighting module to illuminate in response to the user-selected color and the user-selected brightness, where the corresponding hybrid control signal comprises an analog component and a digital component, and permits the color ratio at varying intensities to be controlled with a level of resolution that is greater than the level of resolution provided by the analog component alone and the level of resolution provided by the digital component alone.

In an embodiment, the analog component comprises corresponding amplitude and the digital component comprises the corresponding duty cycle. In another embodiment, the data encoded power signal forms a sinusoidal waveform between zero crossings.

In an embodiment, generating the corresponding hybrid control signal comprises converting a digital value that is responsive to the corresponding amplitude to an analog signal, and enabling the conversion of the digital value to the analog signal according to the corresponding duty cycle. In a further embodiment, generating the corresponding hybrid control signal comprises converting a digital value that is responsive to the corresponding amplitude to an analog signal, and modulating the analog signal according to the corresponding duty cycle. In a yet further embodiment, generating the corresponding hybrid control signal comprises filtering with a low-pass filter a first PWM waveform, where a duty cycle of the first PWM waveform is based on the corresponding amplitude and the filtered first PWM waveform approximates an analog signal having the corresponding amplitude, and where generating the corresponding hybrid control signal further comprises modulating the analog signal with a second PWM waveform having the corresponding duty cycle.

In an embodiment, generating the corresponding hybrid control signal comprises generating a digital value for predetermined intervals and converting the digital value to an analog value during the predetermined intervals, where the digital value is based on the corresponding amplitude and the predetermined intervals based on the corresponding duty cycle. In another embodiment, generating the corresponding hybrid control signal comprises averaging a PWM waveform, where a duty cycle of the PWM waveform is based on the corresponding amplitude and the averaged PWM waveform approximates an analog signal having the corresponding amplitude, where generating the corresponding hybrid control signal further comprises turning the PWM waveform ON and OFF at predetermined times, the predetermined times based on the corresponding duty cycle. In a further embodiment, averaging the PWM waveform comprises low-pass filtering the PWM waveform with a low-pass filter. In a yet further embodiment, components of the low-pass filter are selected so that a frequency corresponding of the PWM waveform is outside of the pass band of the low-pass filter and a frequency of the corresponding hybrid control signal is within the pass band.

In another aspect, systems and methods relate to a lighting module comprising a processor configured to receive a data encoded power signal over a two-wire communication network, where the data encoded power signal comprises data associated with a user-selected color and a user-selected brightness. The processor is further configured to decode the data, where the decoded data comprises a color ratio and an intensity level. The processor further is configured to determine an amplitude and a duty cycle of a hybrid control signal in response to the color ratio at the intensity level. The lighting module further comprises a hybrid control signal generator configured to generate the hybrid control signal having the amplitude and the duty cycle, an LED driver configured to receive the hybrid control signal and generate an LED drive signal based at least in part on the hybrid control signal, and one or more LEDs configured to receive the LED drive signal and illuminate in response to the user-selected color and the user-selected brightness, where the hybrid control signal comprises an analog component and a digital component, and permits the color ratio at varying intensities to be controlled with a level of resolution that is greater than the level of resolution provided by an analog control signal alone and the level of resolution provided by a digital control signal alone.

In an embodiment, the hybrid control signal generator comprises a microcontroller configured to generate a digital value responsive to the amplitude and a PWM waveform responsive to the duty cycle, and a digital to analog converter (DAC) configured to enable a conversion of the digital value to an analog signal according to the PWM waveform. In another embodiment, the hybrid control signal generator comprises a microcontroller configured to generate a digital value responsive to the amplitude and a PWM waveform responsive to the duty cycle, a digital to analog converter (DAC) configured to convert the digital value to an analog signal, and a switch configured to modulate the analog signal according to PWM waveform. In a further embodiment, the hybrid control signal generator comprises a microcontroller configured to generate a first PWM waveform, a low-pass filter configured to average the first PWM waveform to approximate an analog signal having the amplitude, where the microcontroller is further configured to generate a second PWM waveform having the duty cycle, and the hybrid control signal generator further comprises a switch configured to modulate the averaged first PWM waveform with the second PWM waveform. In a yet further embodiment, the hybrid control signal generator comprises a microcontroller configured to generate a digital value for predetermined intervals and a digital to analog converter (DAC) configured to convert the digital value to an analog signal during the predetermined intervals, where the digital value is based on the amplitude and the predetermined intervals based on the duty cycle.

Other embodiments relate to a lighting system comprising a plurality of modules, where each module is associated with one or more LEDs and a processor, a two-wire communication network configured to address each of the plurality of modules and provide power to each of the plurality of modules, a user interface configured to acquire user inputs responsive to a user-selected color and a user-selected brightness for the plurality of modules, a power supply including a rectifier circuit and a bridge circuit, where the power supply is configured to modify an input voltage of a power source to produce a data encoded power signal responsive to a polarity of the input voltage and responsive to the acquired user inputs. The power supply outputs the data encoded power signal over the two-wire communication network and the processor of an addressed module is configured to receive the data encoded power signal over the two-wire communication network and decode the data encoded power signal to provide decoded data comprising a color ratio and an intensity level. The processor is further configured to determine a first amplitude and a first duty cycle of a hybrid control signal in response to the color ratio at the intensity level. The lighting system further comprises a hybrid control signal generator configured to generate the hybrid control signal having the first amplitude and the first duty cycle, an LED driver configured to receive the hybrid control signal and generate an LED drive signal based at least in part on the hybrid control signal, where the one or more LEDs of the addressed module are configured to receive the LED drive signal and illuminate responsive to the user-selected color and the user-selected brightness, where the hybrid control signal comprises an analog component and a digital component, and permits the color ratio at varying intensities to be controlled with a level of resolution that is greater than the level of resolution provided by an analog control signal alone and the level of resolution provided by a digital control signal alone.

In an embodiment, the hybrid control signal generator comprises a microcontroller configured to generate a pulse width modulation (PWM) waveform having a second duty cycle based at least in part on the first amplitude, and a low-pass filter configured to average the PWM waveform, the microcontroller further configured to turn the PWM waveform ON and OFF at predetermined intervals that are based at least in part on the first duty cycle. In another embodiment, components of the low-pass filter are selected so that a frequency of the PWM waveform is outside of the pass band of the low-pass filter and a frequency of the hybrid control signal is within the pass band.

For purposes of summarizing the disclosure, certain aspects, advantages and novel features of the embodiments have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments and not to limit the scope of the disclosure.

DETAILED DESCRIPTION OF THE PREFERRED EMBODIMENT

The features of the inventive systems and methods will now be described with reference to the drawings summarized above.

Figures 4, 17A:
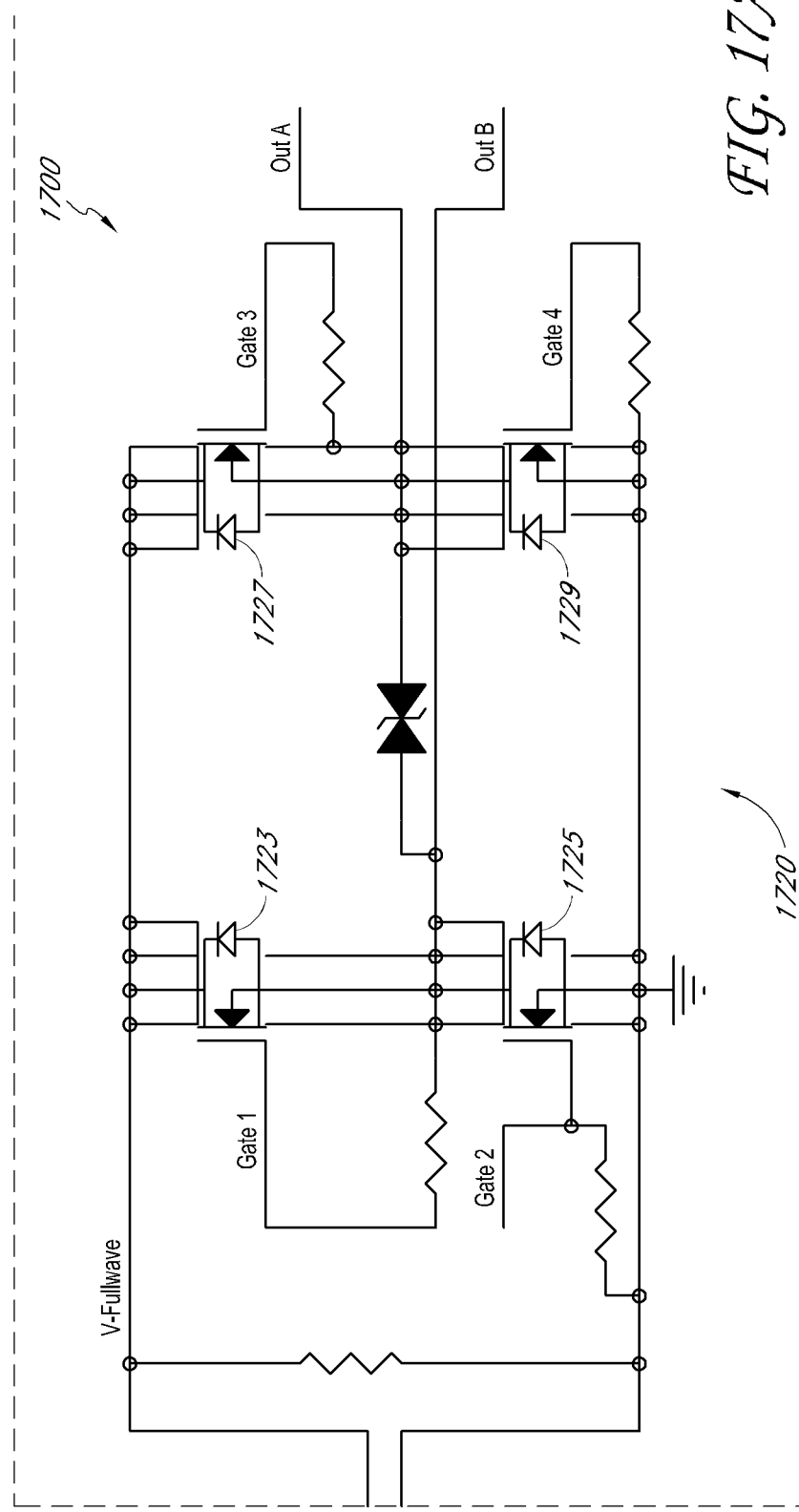
FIG. 17A comprising 17A1-17A4 and 17B comprising 17B1-17B4 are exemplary circuit diagrams for a lighting controller, according to one embodiment.
Figures 1, 17A:
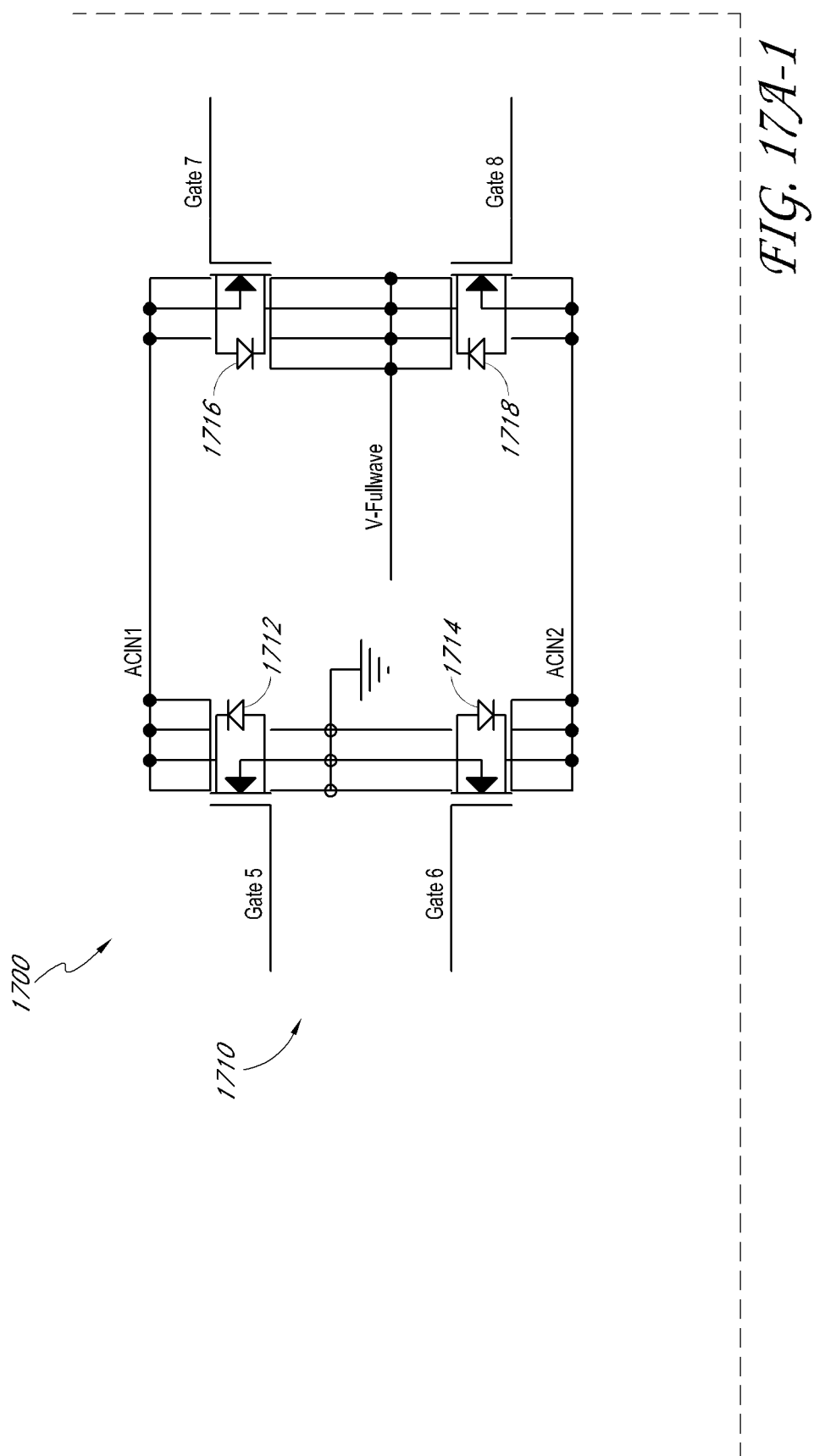
FIG. 1 illustrates an exemplary lighting system, according to certain embodiments.
Figures 2, 17A:
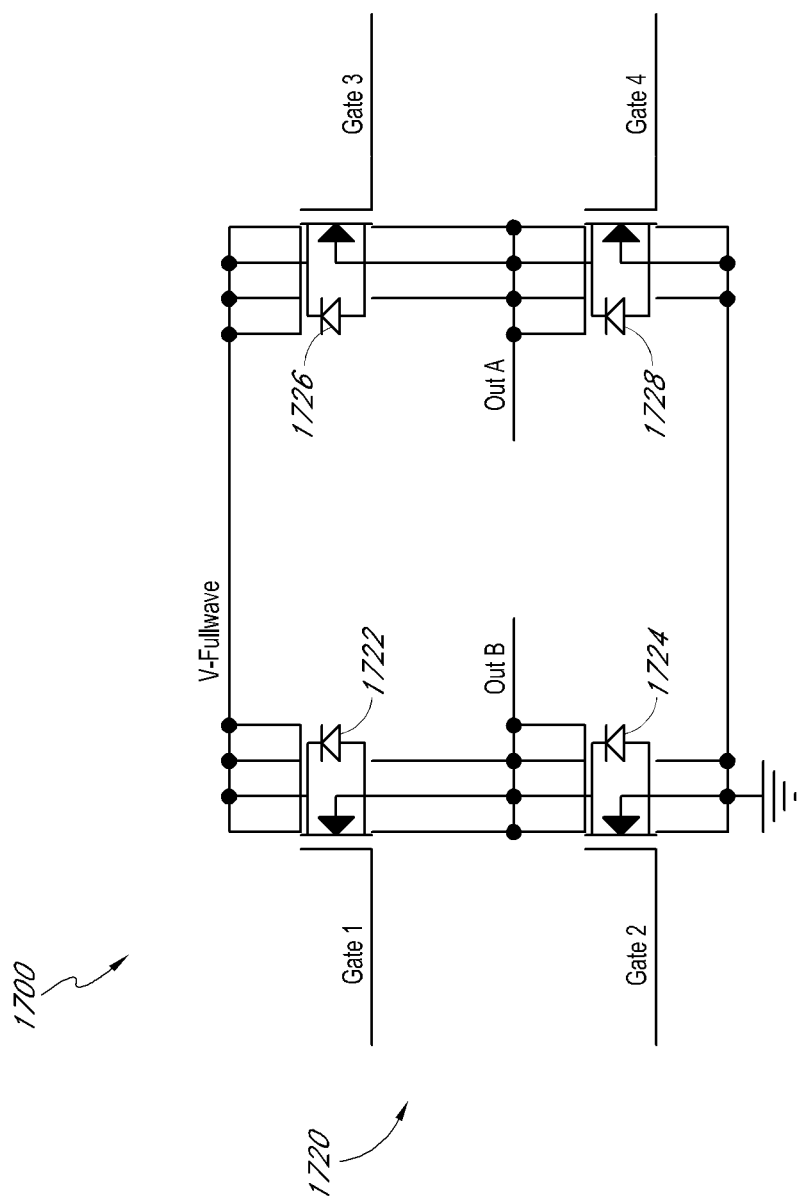
Figures 3, 17A:
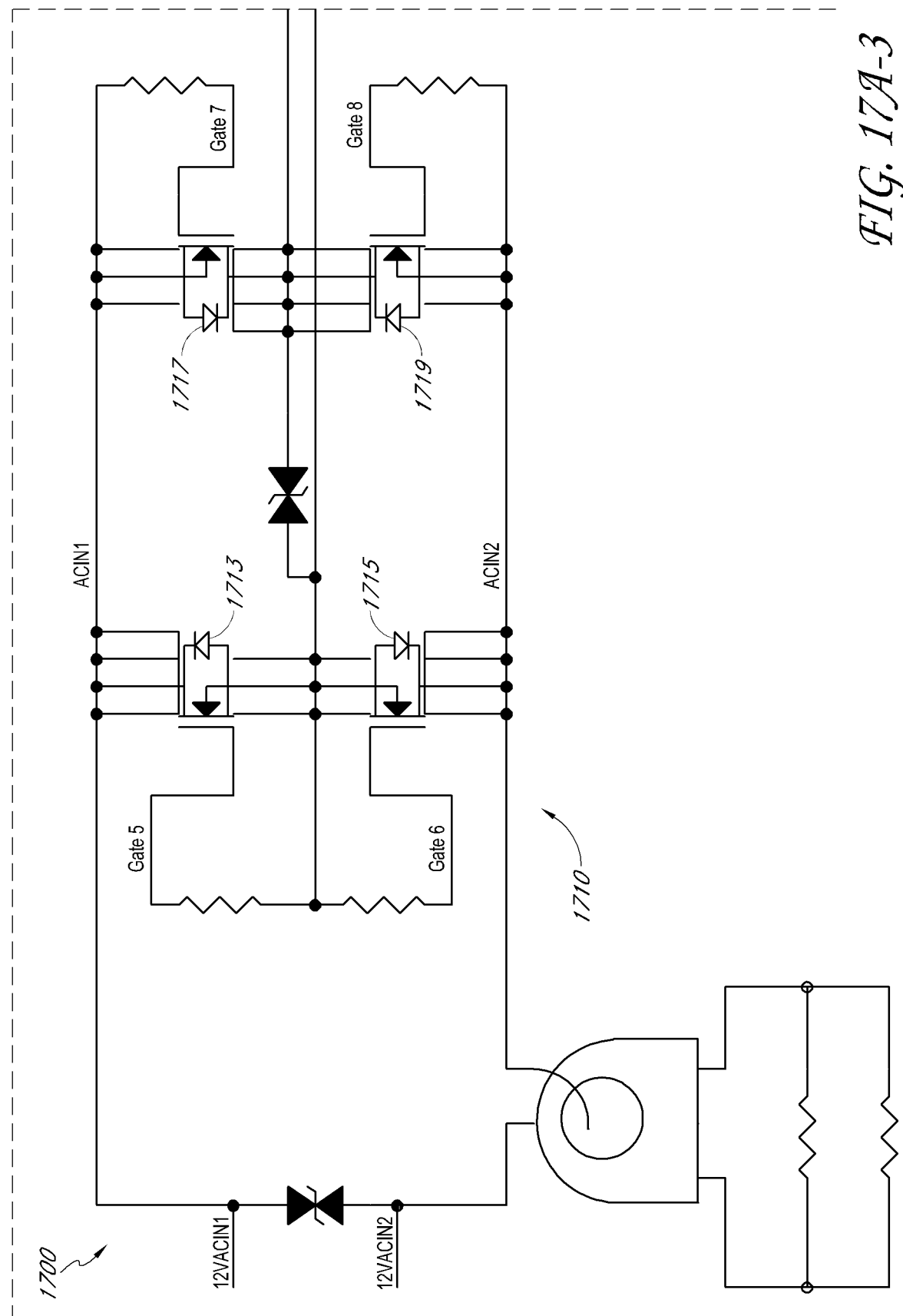

FIG. 1 illustrates an exemplary lighting system 100. The lighting system 100 comprises a lighting controller housing 102 connected to a plurality of lighting fixtures or modules 104 through a two-wire interface. The lighting controller housing 102 houses a lighting controller including a power supply and user interface panel, as described in further detail below. The lighting fixtures 104 are grouped into zones 106.

In the example illustrated in FIG. 1, zone 1 106a comprises lighting fixture 1 104a, which provides illumination to a portion of the house exterior. Zone 2 106b comprises lighting fixtures 2, 3, 4 104b, 104c, 104d, respectively, which illuminate the path, while zone 3 106c comprises lighting fixtures 5, 6, 7 104e, 104f, 104g, respectively, which provide accent lighting for the tree. In other embodiments, the lighting system 100 can be configured with more or less zones 106 and/or with more or less lighting fixtures 104 in each zone 106.

Typically, the lighting fixtures 104 in each zone 106 turn ON or OFF together, but unlike some traditional lighting systems, each zone 106 can be controlled independently of the other zones 106. In one example for the lighting system 100 illustrated in FIG. 1, zone 1 106a turns ON at dusk and turns OFF at dawn to illuminate the front door of the house. Zone 2 106b turns ON at dusk and turns OFF at 9 PM to illuminate the path. Finally, zone 3 turns on at 7 PM and turns OFF at 10 PM to provide accent lighting in the yard.

In one embodiment, the lighting system 200 is a residential outdoor lighting system. In other embodiments, the lighting system 200 is used for outdoor commercial purposes to illuminate the outside of hotels, golf courses, amusement parks, and the like, and for indoor commercial purposes to illuminate hotel interiors, office-building interiors, airport terminals, and the like. In further embodiments, the lighting system 200 is used to illuminate housing developments. In yet further embodiments, the lighting system 200 is used to illuminate artwork in residences, in museums, or the like. Many possibilities exist for the lighting system 200 to one skilled in the art from the disclosure herein. The lighting functions ON/OFF include a plurality of lighting functions, such as, for example, timing control, dimming, brightness, color, hue, zone allocation, intensity, and the like.

Figure 2:
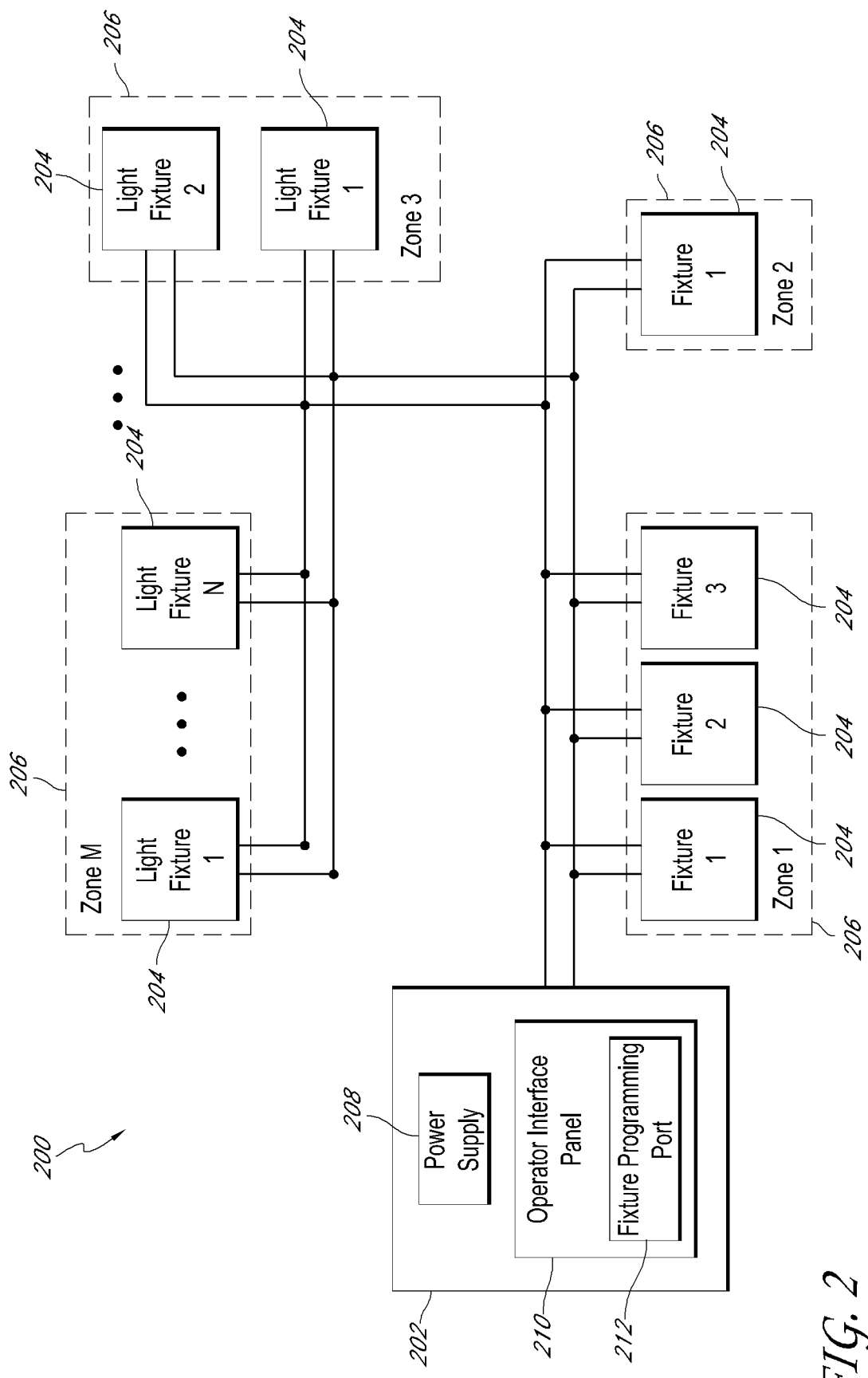
FIG. 2 is a block diagram of an exemplary lighting system, according to certain embodiments.

FIG. 2 is a block diagram of an exemplary lighting system 200 comprising a lighting controller 202 and a plurality of lighting modules 204. The lighting controller 202 comprises a power supply 208 and an operator interface 210, which includes a fixture programming port 212. A lighting controller housing houses the power supply 208 and the operator interface 210. The size of the lighting controller housing depends on the size of the power supply 208 and the operator interface 210 contained within it. In an embodiment, the lighting controller housing has a height that ranges from approximately 11 inches to approximately 15 inches, a width that ranges from approximately 7 inches to approximately 9 inches, and a thickness that ranges from approximately 5 inches to approximately 7 inches. The lighting controller 202 electrically couples to the lighting modules 204 through a two-wire path carrying a power/data signal. The lighting modules 204 electrically connect in parallel to the two-wire path and are grouped into M zones 206. In the illustrated embodiment, zone 1 comprises three lighting modules 204, zone 2 comprises a single lighting module 204, and zone 3 comprises two lighting modules 204. Further, the lighting controller 202 controls up to M zones 206, where in the illustrated embodiment, zone M includes N lighting modules 204. Each zone 206 can be independently energized such that the lighting modules 204 in each zone 206 can turn ON or OFF independently of the lighting modules 204 in the other zones 206.

Controller 202 is shown housing the power supply 208, the operator interface 210, and the fixture programming port 212. In other embodiments, the power supply 208, the operator interface 210, and the fixture programming port 212 may be separate devices or any two of the power supply 208, the operator interface 210, and the fixture programming port 212 may be housed in the same housing.

Figure 3:
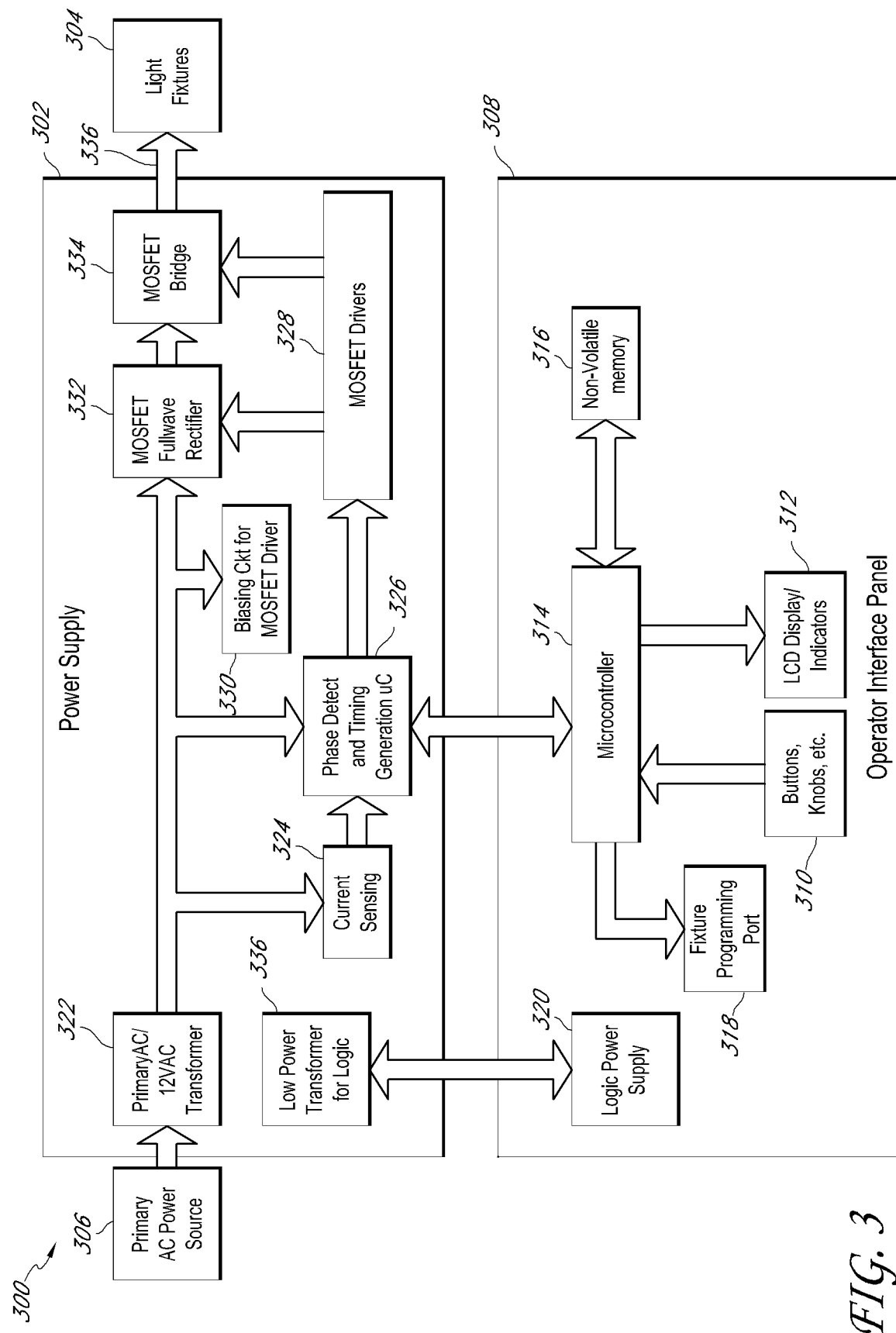
FIG. 3 is a block diagram of an exemplary lighting controller, according to certain embodiments.

FIG. 3 is a block diagram of an exemplary lighting controller 300 comprising a power supply 302 and an operator interface panel 308. The power supply 302 receives AC power from a primary AC power source 306 and addresses/data/commands from the operator interface panel 308 and provides a control signal to a plurality of lighting fixtures 304 through the two-wire path 336.

The operator interface panel 308 comprises operator controls 310, such as selection buttons, knobs, and the like, which the user uses to input the desired lighting effects to the lighting system 200, and displays and indicators 312 to provide feedback to the user. The operator interface panel 308 further comprises a computer 314 and its associated memory 316. The microprocessor 314 interfaces with the operator controls 310 to send the addresses/data/commands to the power supply 302 and interfaces with the displays and indicators 312 to display information received from the power supply 302. The operator interface 308 can be buttons, virtual icons, or buttons on a touch screen, voice controlled, or any user interface recognizable to an artisan from the disclosure herein.

The computer 314 comprises, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers and the like. The memory 316 can comprise one or more logical and/or physical data storage systems for storing data and applications used by the computer 314. The memory 316 comprises, for example, RAM, ROM, EPROM, EEPROM, and the like.

The operator interface panel 308 further comprises a fixture programming port 318 to provide unique addresses, a lighting group, and/or zone number to each of the plurality of lighting fixtures 304, and a logic power supply 320 to provide a low voltage, such as +5 volts, for example, for the digital logic components of the operator interface panel 308.

The power supply 302 comprises a primary AC transformer 322, current sensing circuitry 324, phase detect and timing circuitry 326, driver circuitry 328, a synchronous fullwave rectifier 332, and a bridge 334. The power supply 302 further comprises a low power transformer 346 to provide a low voltage, such as 9 VAC, for example, to a logic power supply which creates a regulated DC voltage for the digital logic components of the power supply 302 and biasing circuitry 330 to provide the proper voltage levels to operate transistors in the rectifier 332 and the bridge 334.

The primary AC transformer 322 receives a primary AC power signal from the primary AC power source 306 and transforms the primary AC signal into lower voltage AC signal. In an embodiment, the primary AC signal is approximately a 120 volt 60 Hz power waveform. In other embodiments, the primary AC signal can be an approximately 110 volts 60 Hz, 220 volt 50 Hz, 220 volt 60 Hz, 230 volts 60 Hz, 240 volts 50 Hz, or the like, power waveform. In an embodiment, the primary AC transformer 322 is a primary AC to 12 VAC transformer 322, and transforms the primary AC signal into an approximately 12 VAC RMS power signal. In other embodiments, the transformer 322 is a primary AC transformer with several taps. In an embodiment, the transformer has taps at approximately 11 VAC up to approximately 14 VAC. In other embodiments, the transformer 322 transforms the AC signal into an approximately 24 VAC.

In an embodiment, the transformer 322 is a high wattage transformer, such as a 300 watt transformer, or the like, for example, in order to supply sufficient power to illuminate the plurality of lighting modules 304. The output of the transformer 322 electrically connects to the current sensing circuitry 324. The current sensing circuitry 324 senses the amount of current in the output of the transformer 322. The phase detect and timing circuitry 326 receives a signal proportional to the sensed current from the current sensing circuitry 324 and shuts off the power supply 302 when the sensed current exceeds a threshold. For example, if there is a short between the wires of the two-wire path 336, a 300 watt transformer can supply a large amount of power in the form of heat in a very short time. When the sensed current exceeds a threshold, the lighting controller 300 shuts off the power before the heat generated causes damage to the lighting system 200.

The phase detect and timing circuitry 326 further receives data and commands from the processor 314 and the power waveform from the transformer 322, and provides timing signals to the driver circuit 328. The timing signals control the driver circuitry 328 to encode a data signal onto the power signal by varying the polarity of the power waveform, as will be further discussed herein.

Further, the output of the transformer 322 electrically connects to the synchronous fullwave rectifier 332, which rectifies the power signal. The fullwave rectifier 332 electrically connects to the bridge 334 and the fullwave rectifier 332 and the bridge 334 electrically connect to the driver circuitry 328. Both the fullwave rectifier 332 and the bridge 334 receive drive signals from the driver circuitry 328. The bridge 334 receives the rectified power signal and outputs a control signal to the lighting fixtures 304. The control signal comprises a data encoded power waveform, which provides power to illuminate the lighting fixtures 304 and address/data/commands to individually control the lighting fixtures 304.

Figure 4:
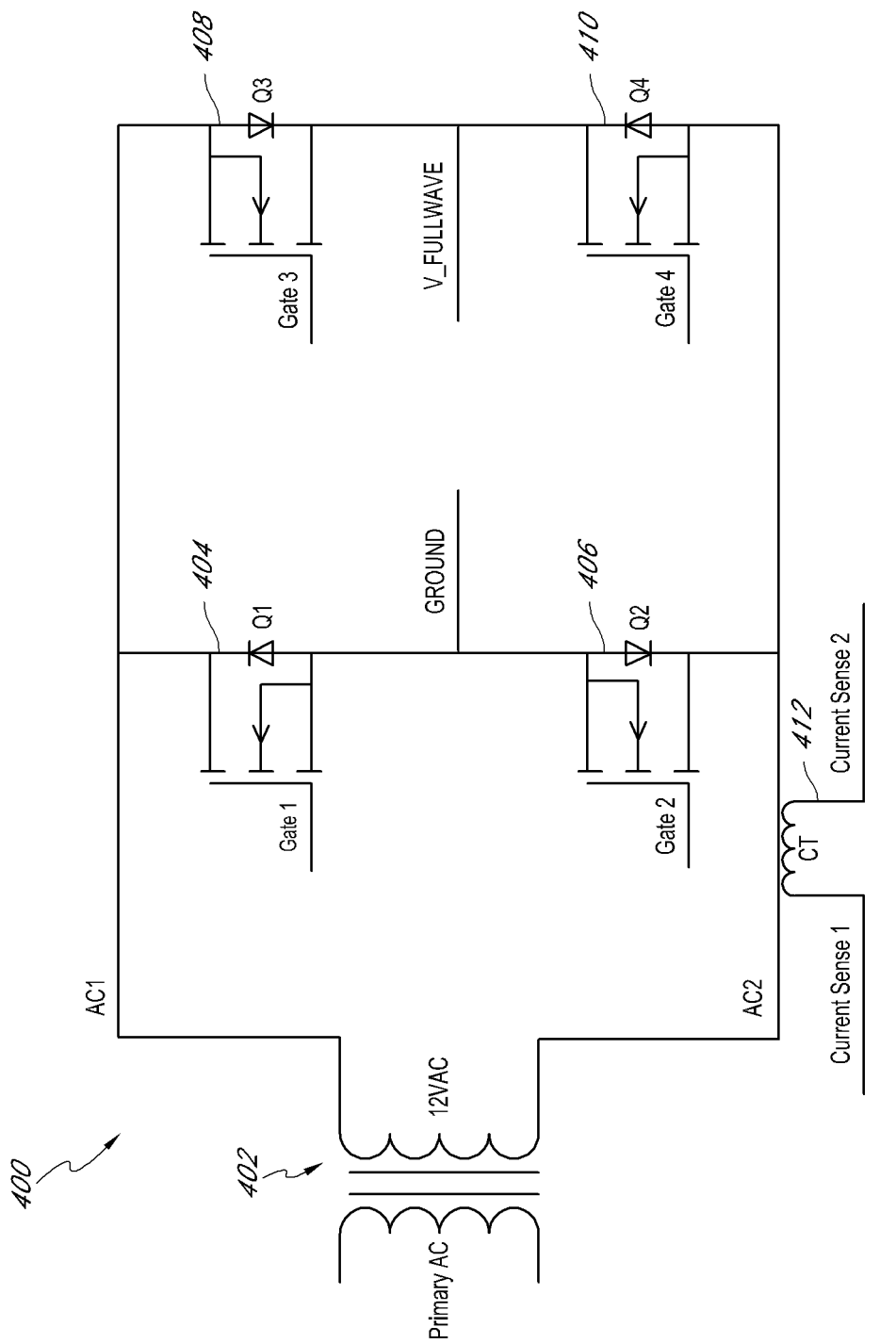
FIG. 4 is an exemplary schematic diagram of a rectifier circuit, according to certain embodiments.
Figure 5:
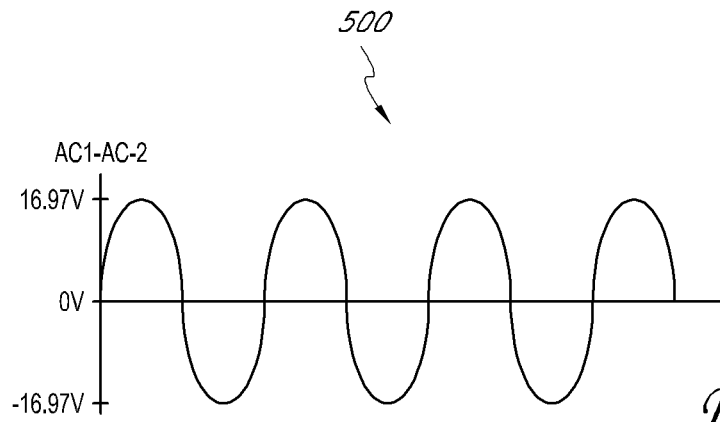
FIG. 5 depicts an exemplary power waveform, according to certain embodiments.

FIG. 4 is an exemplary schematic diagram of a synchronous rectifier circuit 400, according to an embodiment. The rectifier circuit 400 comprises a primary AC to 12 VAC transformer 402, a first transistor Q1 404, a second transistor Q2 406, a third transistor Q3 408, and a fourth transistor Q4 410. The primary AC to 12 VAC transformer 402 receives a primary AC power signal and outputs an approximately 12 VAC RMS power waveform having a first power waveform AC1 and a second power waveform AC2. FIG. 5 illustrates an exemplary 12 VAC RMS power waveform 500 having a peak-to-peak voltage of between approximately +16.97 volts to approximately −16.97 volts.

In an embodiment, the transistors Q1 404, Q2 406, Q3 408, Q4 410 are metal-oxide-semiconductor field-effect transistors (MOSFETs) with an integral body diode. The MOSFETs with the integral body diode advantageously function as a substantially loss-less switch when their gates are enabled at the appropriate point in time when their diodes would be conducting. For example, a MOSFET having a resistance of 1 milliohm conducting a current of 25 amps would attenuate a signal across it by approximately 25 millivolts. The synchronous rectifier 400 selectively turns on the MOSFETs when their body diodes would be conducting to create a highly efficient power supply 302.

In other embodiments, the transistors Q1 404, Q2 406, Q3 408, Q4 410 are P-channel or N-channel MOSFETs with or without an integral body diode. In yet other embodiments, transistors, such as Bipolar Junction Transistors (BJTs), Isolated Gate Bipolar Transistors (IGBTs), or the like, can be used.

In another embodiment, each transistor Q1 404, Q2 406, Q3 408, Q4 410 comprises more than one transistor connected in parallel. In another embodiment, multiple MOSFETs may be packaged in a single module.

The first transistor Q1 404 is coupled in series with the second transistor Q2 406 across AC1 and AC2, such that a drain of the first transistor Q1 404 connects to the first power waveform AC1, and a drain of the second transistor Q2 406 connects to the second power waveform AC2. Further, a source of first transistor Q1 404 connects to a source of the second transistor Q2 406 and forms a third power waveform GROUND.

The third transistor Q3 408 is coupled in series with the fourth transistor Q4 410 across AC1 and AC2, such that a source of the third transistor Q3 408 connects to the first power waveform AC1, and a source of the fourth transistor Q2 410 connects to the second power waveform AC2. Further, a drain of the third transistor Q3 408 connects to a drain of the fourth transistor Q4 410 and forms a fourth power waveform V-FULLWAVE.

The series combination of the first transistor Q1 404 and the second transistor Q2 406 electrically couple in parallel with the series combination of the third transistor Q3 408 and fourth transistor Q4 410, such that the drain of the first transistor Q1 404 electrically couples to the source of the third transistor Q3 408, and the drain of the second transistor Q2 406 electrically couples to the source of the fourth transistor Q4 410.

Figure 6:
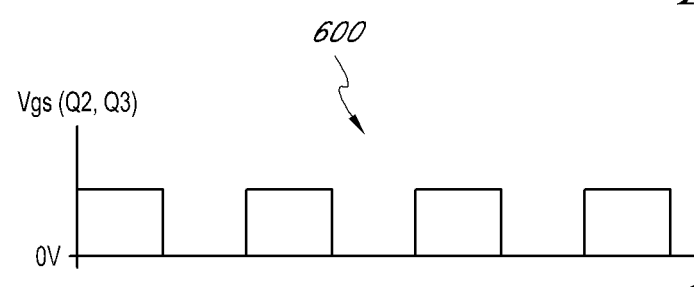
FIG. 6 depicts an exemplary waveform of the transistor gate signal for a rectifier circuit, according to certain embodiments.

Each transistor is associated with a gate signal and the gate signals electrically couple to an output of a comparator comparing the first and second power waveforms, AC1 and AC2, via driver circuitry. The gates of the second transistor Q2 406 and the third transistor Q3 408 enable when the first power waveform AC1 is greater than the second power waveform AC2. FIG. 6 depicts an exemplary waveform 600 of the transistor gate signal for the gates of the second transistor Q2 406 and the third transistor Q3 408, according to an embodiment. Referring to FIGS. 5 and 6, the gate signal Vgs (Q2, Q3) is enabled when AC1 is greater than AC2.

Figure 7:
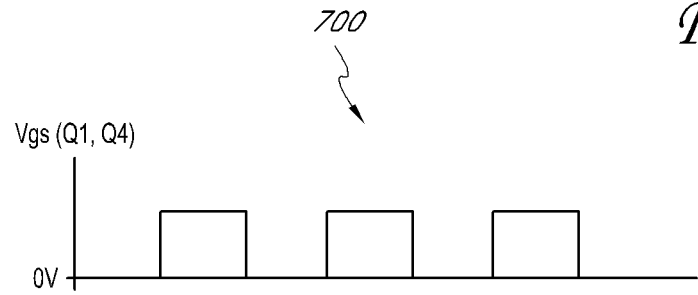
FIG. 7 depicts an exemplary waveform of another transistor gate signal for the rectifier circuit, according to certain embodiments.

Further, the gates of the first transistor Q1 404 and the fourth transistor Q4 410 enable when the second power waveform AC2 is greater than the first power waveform AC1. FIG. 7 depicts an exemplary waveform 700 for the gates of the first transistor Q1 404 and the fourth transistor Q4 410, according to an embodiment. Referring to FIGS. 5 and 7, the gate signal Vgs (Q1, Q4) is enabled when AC2 is greater than AC1.

Figure 8:
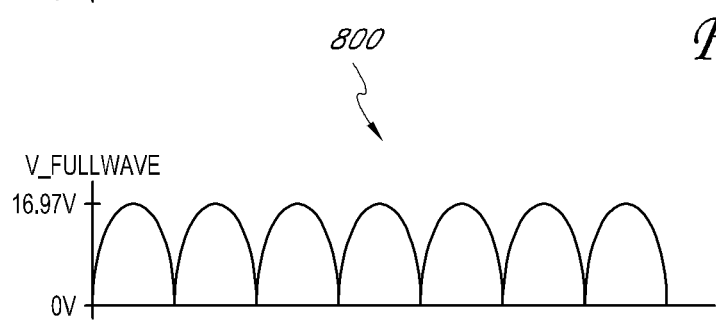
FIG. 8 depicts an exemplary rectified power waveform, according to certain embodiments.

The rectifier 400 full wave rectifies a 12 VAC RSM signal creating the third power waveform GROUND and the fourth power waveform V-FULLWAVE. The rectified 12 VAC RMS signal, V-FULLWAVE, has a peak voltage of approximately 16.97 volts, which is approximately the same as the peak voltage of the power waveform at the output of the transformer 402. The small loss in signal is due to exemplary, but finite conduction of the transistors Q1 404, Q2 406, Q3 408, Q4 410 when their gates are enabled. FIG. 8 depicts an exemplary rectified 12 VAC RMS signal 800, according to an embodiment. As illustrated in FIG. 8, the rectifier 400 outputs a non-inverted 12 VAC RMS power waveform 800 when AC1 is greater than AC2 and outputs an inverted 12 VAC RMS waveform 800 when AC2 is greater than AC1.

Referring to FIG. 4, a current sensing element 412, such as a current transformer, magnetically couples to the wire/trace carrying the 12 VAC RMS power waveform. In one embodiment, the current transformer 412 magnetically couples to the wire/trace carrying the power waveform AC2. In another embodiment, the current transformer 412 magnetically couples to the wire/trace carrying the power waveform AC1. Current flowing through wire/trace carrying AC2, in the illustrated embodiment, produces a magnetic field in the core of the current transformer 412, which in turn induces a current in the winding wound around the core of the current transformer 412. The induced current is proportional to the current of the power waveform AC2, in the illustrated embodiment, or to the current of the power waveform AC1, in another embodiment. The current transformer 412 outputs signals, Current Sense1 and Current Sense2, proportional to current flowing through the power waveforms AC1 or AC2. The signals Current Sense1 and Current Sense2 are used to determine when the current flowing in the power waveforms AC1 or AC2 is greater than a threshold value, such that power supply 302 can be disabled before damage to the circuitry occurs. Accordingly, the rectifier 400 of FIG. 4 advantageously produces the V-FULLWAVE waveform 800 of FIG. 8 with minimal power loss and correspondingly, minimal heat generation.

Figure 9:
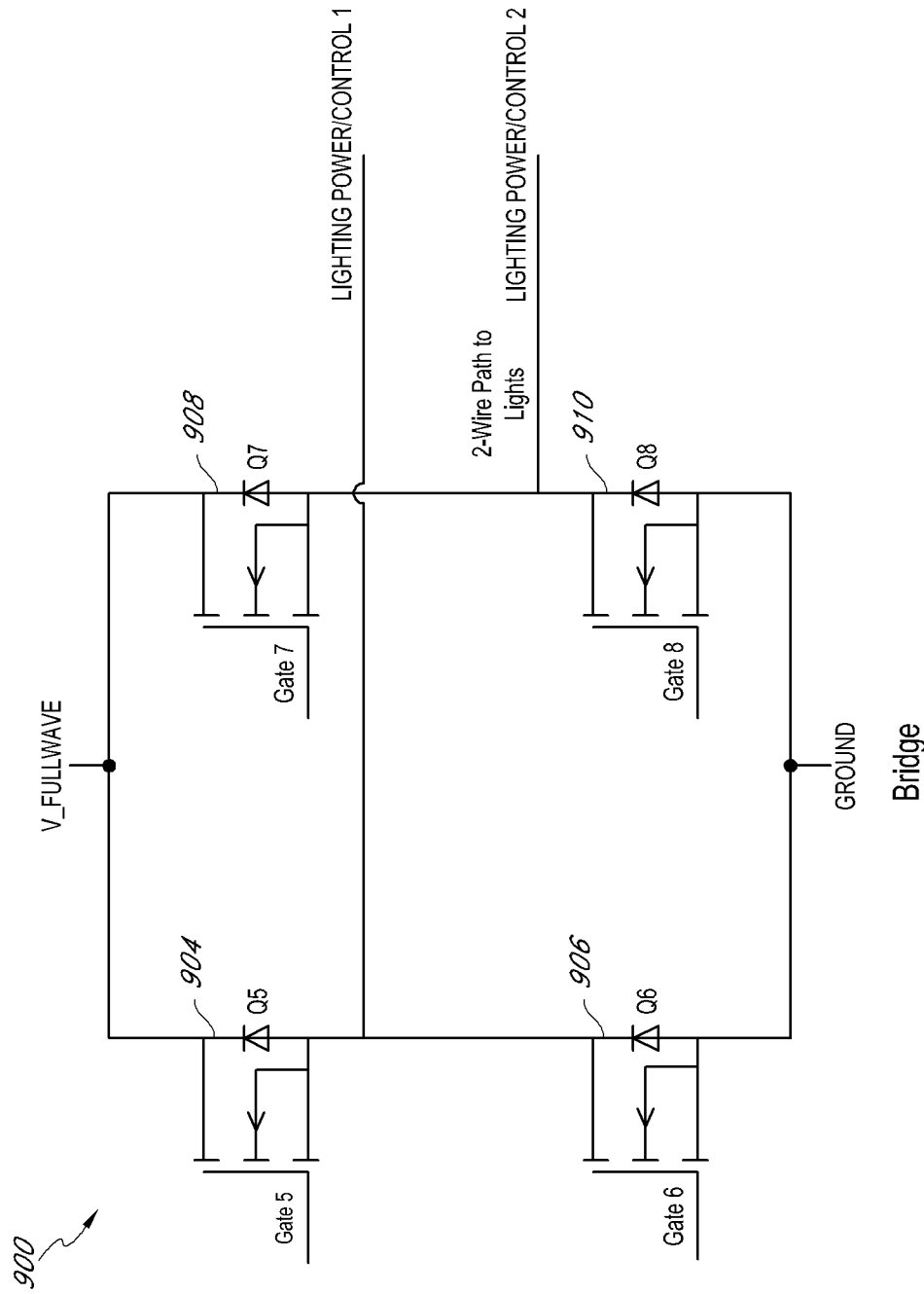
FIG. 9 is an exemplary schematic diagram of a bridge circuit, according to certain embodiments.

FIG. 9 is an exemplary schematic diagram of a bridge circuit 900, according to an embodiment. The bridge 900 comprises a fifth transistor Q5 904, a sixth transistor Q6 906, a seventh transistor Q7 908, and an eighth transistor Q8 910. The bridge 900 receives the rectified power waveforms V-FULLWAVE and GROUND from the rectifier 400. In the illustrated embodiment, V-FULLWAVE is an exemplary rectified 12 VAC RMS signal as shown in FIG. 8. Advantageously, in a disclosed embodiment, the bridge 900 selectively outputs the rectified power waveforms V-FULLWAVE, GROUND with either a positive polarity or a negative polarity. By doing so, data or intelligence can be added to the presently described power signal. Thus, the rectifier 400 and the bridge 900 combine to produce a power signal with embedded data or logic.

The positive or negative polarity of V-FULLWAVE is, for example, the control signals, LIGHTING CONTROL1, LIGHTING CONTROL2 on the two-wire path to the lighting modules 304. LIGHTING CONTROL1 and LIGHTING CONTROL2 comprise addresses/data/commands encoded within the power waveform V-FULLWAVE, to provide addresses/data/commands and power to the lighting modules 304.

In an embodiment, the transistors Q5 904, Q6 906, Q7 908, Q8 910 are metal-oxide-semiconductor field-effect transistors (MOSFETs) with an integral body diode. As described above, the MOSFETs with the integral body diode advantageously function as an almost or substantially lossless switch when their gates are enabled at the appropriate point in time when their diodes would be conducting.

In other embodiments, the transistors Q5 904, Q6 906, Q7 908, Q8 910 are either P-channel or N-channel MOSFETs with or without an integral body diode. In yet other embodiments, transistors, such as Bipolar Junction Transistors (BJTs), Isolated Gate Bipolar Transistors (IGBTs), or the like, can be used.

In another embodiment, each transistor Q5 904, Q6 906, Q7 908, Q8 910 comprises more than one transistor connected in parallel. In another embodiment, multiple MOSFETs may be packaged in a single module.

The fifth transistor Q5 904 is coupled in series with the sixth transistor Q6 906 across V-FULLWAVE and GROUND, such that a drain of the fifth transistor Q5 904 connects to the power waveform V-FULLWAVE, and a source of the sixth transistor Q6 906 connects to the power waveform GROUND. Further, a source of the fifth transistor Q5 904 connects to a drain of the sixth transistor Q6 906 and forms the first control signal, LIGHTING POWER/CONTROL1.

The seventh transistor Q7 908 is coupled in series with the eighth transistor Q8 910 across V-FULLWAVE and GROUND, such that a drain of the seventh transistor Q7 908 connects to the power waveform V-FULLWAVE, and a source of the eighth transistor Q8 910 connects to the power waveform GROUND. Further, a source of the seventh transistor Q7 908 connects to a drain of the eighth transistor Q8 910 and forms the second control signal, LIGHTING POWER/CONTROL2.

The series combination of the fifth transistor Q5 904 and the sixth transistor Q6 906 electrically couple in parallel with the series combination of the seventh transistor Q7 908 and eighth transistor Q8 910, such that the drain of the fifth transistor Q5 904 electrically couples to the drain of the seventh transistor Q7 908, and the source of the sixth transistor Q6 906 electrically couples to the source of the eighth transistor Q8 910.

Each transistor Q5 904, Q6 906, Q7 908, Q8 910 is associated with a gate signal. The gate signals electrically couple, via driver circuitry, to a control signal comprising data from the processor 314 associated with the operator interface panel 308 and the output of the comparator comparing the power waveforms AC1, AC2. The gates of the fifth transistor Q5 904 and the eighth transistor Q8 910 are enabled when the control signal is in a first state. When the gates of the fifth transistor Q5 904 and the eighth transistor Q8 910 are enabled, the bridge 900 outputs the power waveforms V-FULLWAVE and GROUND having a first polarity on the two-wire path as signals LIGHTING POWER/CONTROL1 and LIGHTING POWER/CONTROL2. The gates of the sixth transistor Q6 906 and the seventh transistor Q7 908 are enabled when the control signal is in a second state. When the gates of the sixth transistor Q6 906 and the seventh transistor Q7 908 are enabled, the bridge 900 outputs the power waveforms V-FULLWAVE and GROUND having a second polarity on the two-wire path as signals LIGHTING POWER/CONTROL1 and LIGHTING POWER/CONTROL2.

For example, in one embodiment, when the gates of the fifth transistor Q5 904 and the eighth transistor Q8 910 are enabled, the signals LIGHTING POWER/CONTROL1 and LIGHTING POWER/CONTROL2 comprise the power waveforms V-FULLWAVE and GROUND having a positive polarity. Further, when the gates of the sixth transistor Q6 906 and the seventh transistor Q7 908 are enabled, signals LIGHTING POWER/CONTROL1 and LIGHTING POWER/CONTROL2 comprise the power waveforms V-FULLWAVE and GROUND having a negative polarity.

In another embodiment, the polarities can be reversed, such that the signals LIGHTING POWER/CONTROL1 and LIGHTING POWER/CONTROL2 comprise power waveforms V-FULLWAVE and GROUND having a negative polarity when gates of the fifth transistor Q5 904 and the eighth transistor Q8 910 are enabled and comprise power waveforms V-FULLWAVE and GROUND having a positive polarity when the gates of the sixth transistor Q6 906 and the seventh transistor Q7 908 are enabled.

As discussed above, the gate signals electrically couple, via driver circuitry, to a control signal comprising data from the processor 314 associated with the operator interface panel 308 and the output of the comparator comparing the power waveforms AC1, AC2. When there is no data present, the control signal follows the output of the comparator comparing the power waveforms AC1, AC2.

Figure 10:
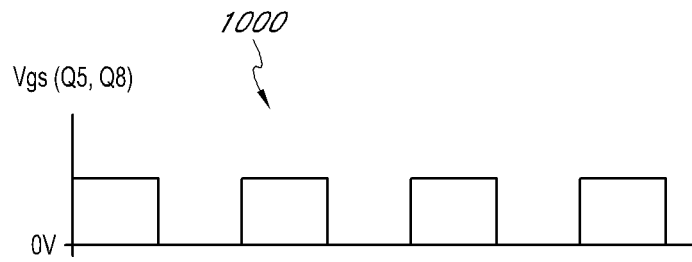
FIG. 10 depicts an exemplary waveform of the transistor gate signal for a bridge circuit, according to certain embodiments.

FIG. 10 depicts an exemplary waveform 1000 of the transistor gate signal for the gates of the fifth transistor Q5 904 and the eighth transistor Q8 910 with no data present. As shown in FIGS. 5 and 10, the gate signal Vgs (Q5, Q8) is enabled when AC1 is greater than AC2.

Figure 11:
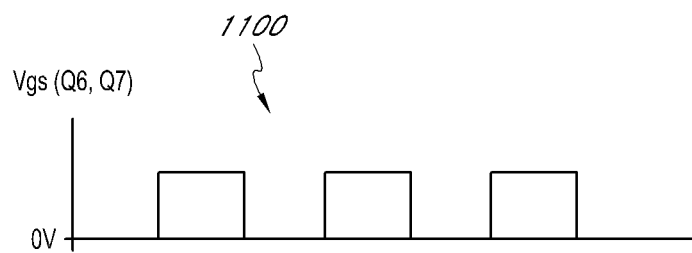
FIG. 11 depicts an exemplary waveform of another transistor gate signal for the bridge circuit, according to certain embodiments.

FIG. 11 depicts an exemplary waveform 1100 of the transistor gate signal for the gates of the sixth transistor Q6 906 and the seventh transistor Q7 908 with no data present. As shown in FIGS. 5 and 11, the gate signal Vgs (Q5, Q8) is enabled when AC2 is greater than AC1.

Figure 12:
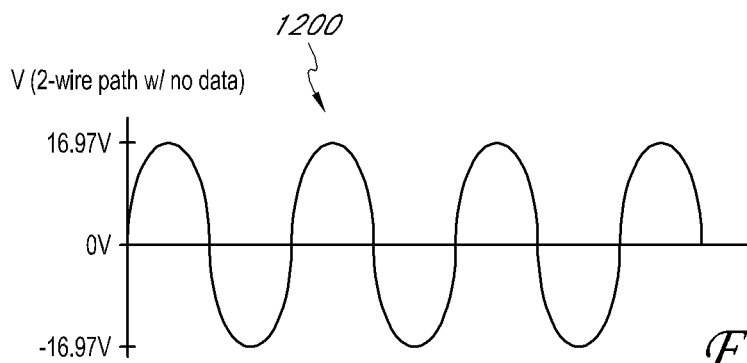
FIG. 12 depicts an exemplary power/data waveform without data, according to certain embodiments.

FIG. 12 depicts an exemplary bridge output waveform 1200 when there is no data present from the processor 314, in one embodiment. As illustrated in FIGS. 10, 11, and 12, the bridge 900 outputs V-FULLWAVE with a positive polarity when the gates of the fifth transistor Q5 904 and the eighth transistor Q8 910 are enabled and outputs V-FULLWAVE with a negative polarity when the gates of the sixth transistor Q6 906 and the seventh transistor Q7 908 are enabled, generating approximately a sine wave. As shown, without data on the power signal for the lights, the rectifier 400 and the bridge 900 take the 12 VAC RMS output of the transformer 402, which is illustrated as its 16.97 VAC peak-to-peak waveforms AC1 and AC2 in FIG. 5, fullwave rectify it, and change it back to its original form using substantially or almost loss-less circuitry. However, as described herein, the same rectifier 400 and bridge 900 accept control signals from the processor 314 according to user programming to selectively control one or more fixtures 104, 204, 304 in one or more zones 106, 206. The control signals activate the gates with the same or substantially similar almost loss-less process in a manner that embeds logic or data on the power signal 1200 of FIG. 12.

Figure 13:
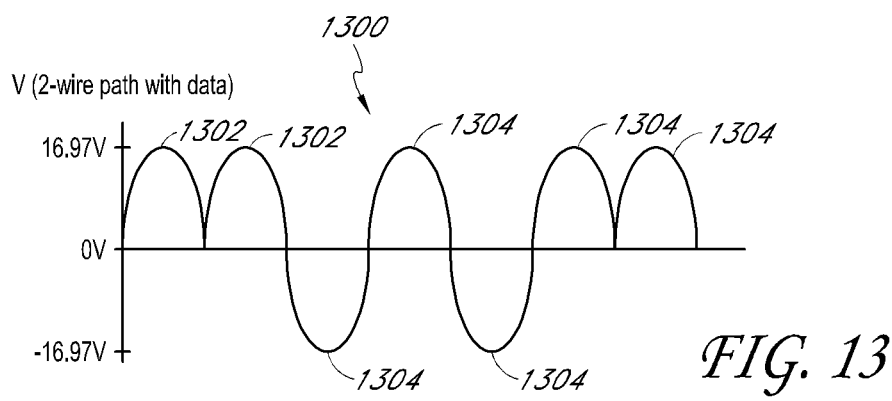
FIG. 13 depicts an exemplary power/data waveform with data, according to certain embodiments.

For example, when the control signal controlling the transistor gates comprises data from the processor 314 associated with the operator interface panel 308, the bridge 900 encodes the data onto the signals LIGHTING POWER/CONTROL1 and LIGHTING POWER/CONTROL2 such that the bridge 900 outputs V-FULLWAVE having one polarity when the control signal is in a first state and outputs V-FULLWAVE having the opposite polarity when the control signal is in the second state. FIG. 13 depicts an exemplary power/data waveform 1300 with data, according to an embodiment. FIG. 13 illustrates start bits 1302 comprising 1, 1, followed by data bits 1304 comprising 0, 1, 0, 1, 1. In other embodiments, other configurations of start bits can be used and opposite polarities can be used to represent the 0 and 1 data bits. For instance, the control signal may change state at the peaks or any point of V-FULLWAVE as opposed to at the point V-FULLWAVE is zero. In summary, the bridge 900 is used synchronously with the VAC power waveform from the transformer 302 to select either a positive or a negative peak or half-cycle of the power waveform and apply the selected half-cycle to the output signals, LIGHTING POWER/CONTROL1 and LIGHTING POWER/CONTROL2 to encode data within the power waveform for transmission to the lighting modules 304.

In an embodiment where the transformer 402 produces approximately a 12 VAC 60 hertz power waveform, the data rate is approximately 120 bits per second. In another embodiment, the lighting modules 304 comprise a comparator comparing the signals LIGHTING POWER/CONTROL1, LIGHTING POWER/CONTROL2 to detect the data and a full wave rectifier to rectify the signals LIGHTING POWER/CONTROL1, LIGHTING POWER/CONTROL2 to provide power to the lighting elements.

In an embodiment, the transistors Q5 904, Q6 906, Q7 908, Q8 910 are turned on at the zero crossing of the controls signal because advantageously, the lighting modules 304 draw less power. At that time, there is less voltage or current flowing and less EMI noise is generated. In other embodiments, the transistors Q5 904, Q6 906, Q7 908, Q8 910 are turned on and off at other than the zero crossing of the control signal and/or more frequently than every half cycle of the incoming power.

Another advantage of sending the data as either a positive polarity or a negative polarity rectified power wave form is that there is no DC bias on the two-wire data/power path. If a DC bias is present, moisture seeping through the wires can produce unwanted galvanic corrosion.

Figure 14:
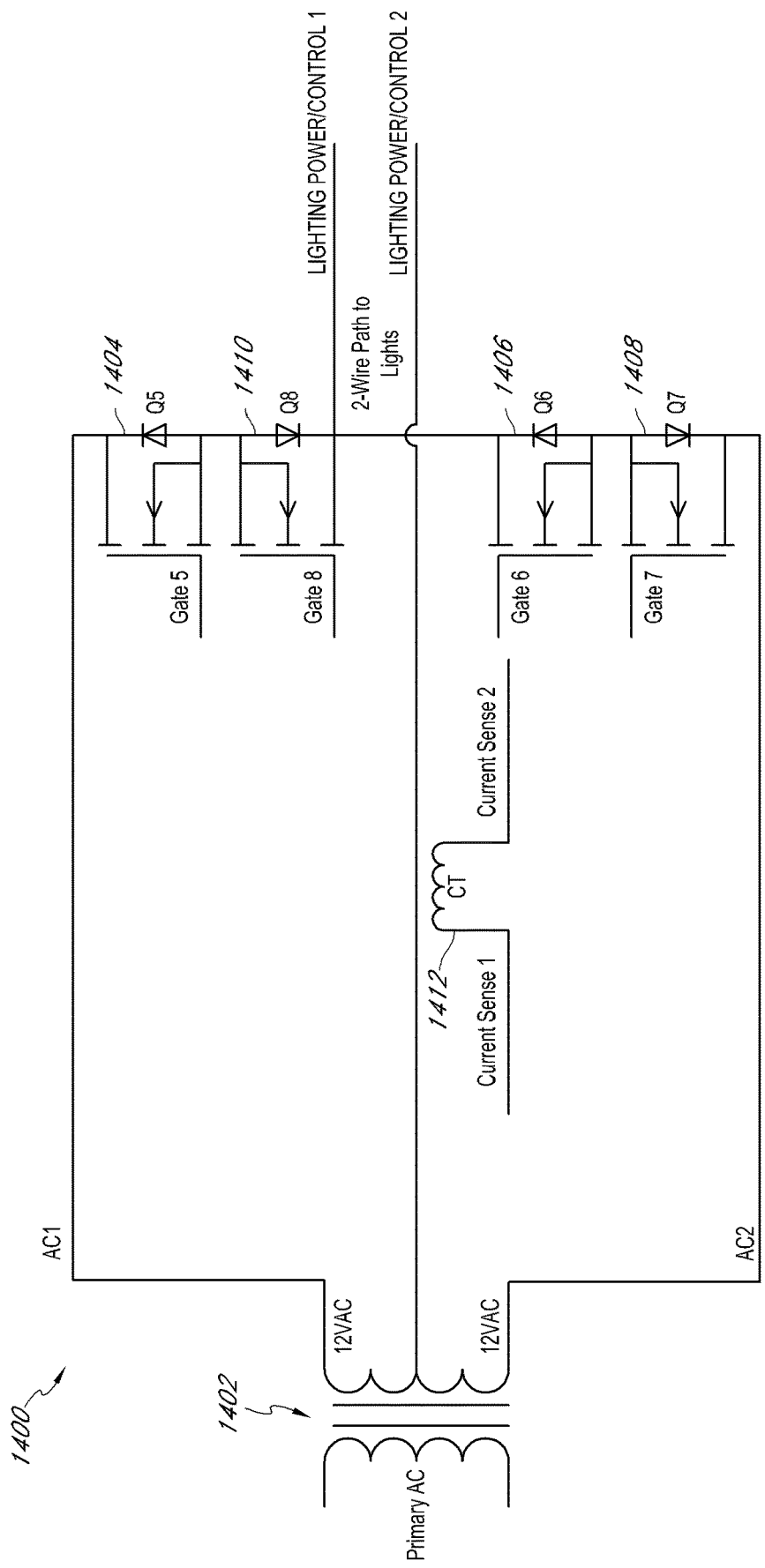
FIG. 14 is an exemplary schematic diagram of a rectifier/bridge circuit, according to certain embodiments.

FIG. 14 is an exemplary schematic diagram of a rectifier/bridge circuit 1400, according to an embodiment, which is also capable of producing a power signal with embedded data the same or similar to those disclosed above. The rectifier/bridge circuit 1400 comprises a primary AC to 24 VAC center-tapped transformer 1402, a current transformer 1412, a fifth transistor Q5 1404, a sixth transistor Q6 1406, a seventh transistor Q7 1408, and an eighth transistor Q8 1410. The current transformer 1412 senses the current in the center tap of the transformer 1402 as described above with respect to FIG. 4.

The primary AC to 24 VAC transformer 1402 receives a primary AC power signal and outputs an approximately 12 VAC RMS between each end tap and the center tap. This waveform comprises a power waveform having the first power waveform AC1 and the second power waveform AC2. Referring to FIG. 5, the exemplary 12 VAC RMS power waveform 500 has a peak-to-peak voltage of between approximately +16.97 volts to approximately −16.97 volts. Further, the center tap of transformer 1402 electrically couples to one wire of the two-wire path and forms the signal LIGHTING POWER/CONTROL2.

In an embodiment, the transistors Q5 1404, Q6 1406, Q7 1408, Q8 1410 are metal-oxide-semiconductor field-effect transistors (MOSFETs) with an integral body diode. In other embodiments, the transistors Q5 1404, Q6 1406, Q7 1408, Q8 1410 are either P-channel or N-channel MOSFETs with or without an integral body diode. In another embodiment, each transistor Q5 1404, Q6 1406, Q7 1408, Q8 1410 comprises more than one transistor connected in parallel. In another embodiment, multiple MOSFETs may be packaged in a single module.

The transistors Q5 1404, Q6 1406, Q7 1408, Q8 1410 are coupled in series such that a source of the fifth transistor Q5 1404 connects to a source of the eighth transistor Q8 1410, a drain of the eighth transistor Q8 1410 connects to a drain of the sixth transistor Q6 1406 and couples to the other wire of the two-wire path and forms the signal LIGHTING POWER/CONTROL1, and a source of the sixth transistor Q6 1406 connects to a source of the seventh transistor Q7 1408. The series combination of the transistors Q5 1404, Q8 1410, Q6 1406, Q7 1408 connects to the power waveforms AC1, AC2 such that a drain of the fifth transistor Q5 1404 electrically connects to AC1 and a drain of the seventh transistor Q7 1408 electrically connects to AC2.

Each transistor Q5 1404, Q6 1406, Q7 1408, Q8 1410 is associated with a gate signal. The gate signals electrically couple, via driver circuitry, to the control signal comprising data from the processor 314 associated with the operator interface panel 308 and the output of the comparator comparing the power waveforms AC1, AC2, as described above with respect to FIG. 9.

As shown in FIG. 14, one of the wires in the two-wire path to the lighting modules is the center tap of the transformer 1402. Depending on whether the gates of transistors Q5 1404 and Q8 1410 or Q6 1406 and Q7 1408 are enabled, the positive half-cycle or the negative half-cycle of the power waveform AC1, AC2 is sent on the other wire of the two-wire path to the lighting modules 304. In this manner, the data from the controller 314 can be encoded within the power waveform sent to the lighting modules 304. The rectifier/bridge 1400 can transmit the same data and power to the lighting modules 304 as the combination of the rectifier 400 and the bridge 900, but advantageously with fewer MOSFETs.

Figure 15:
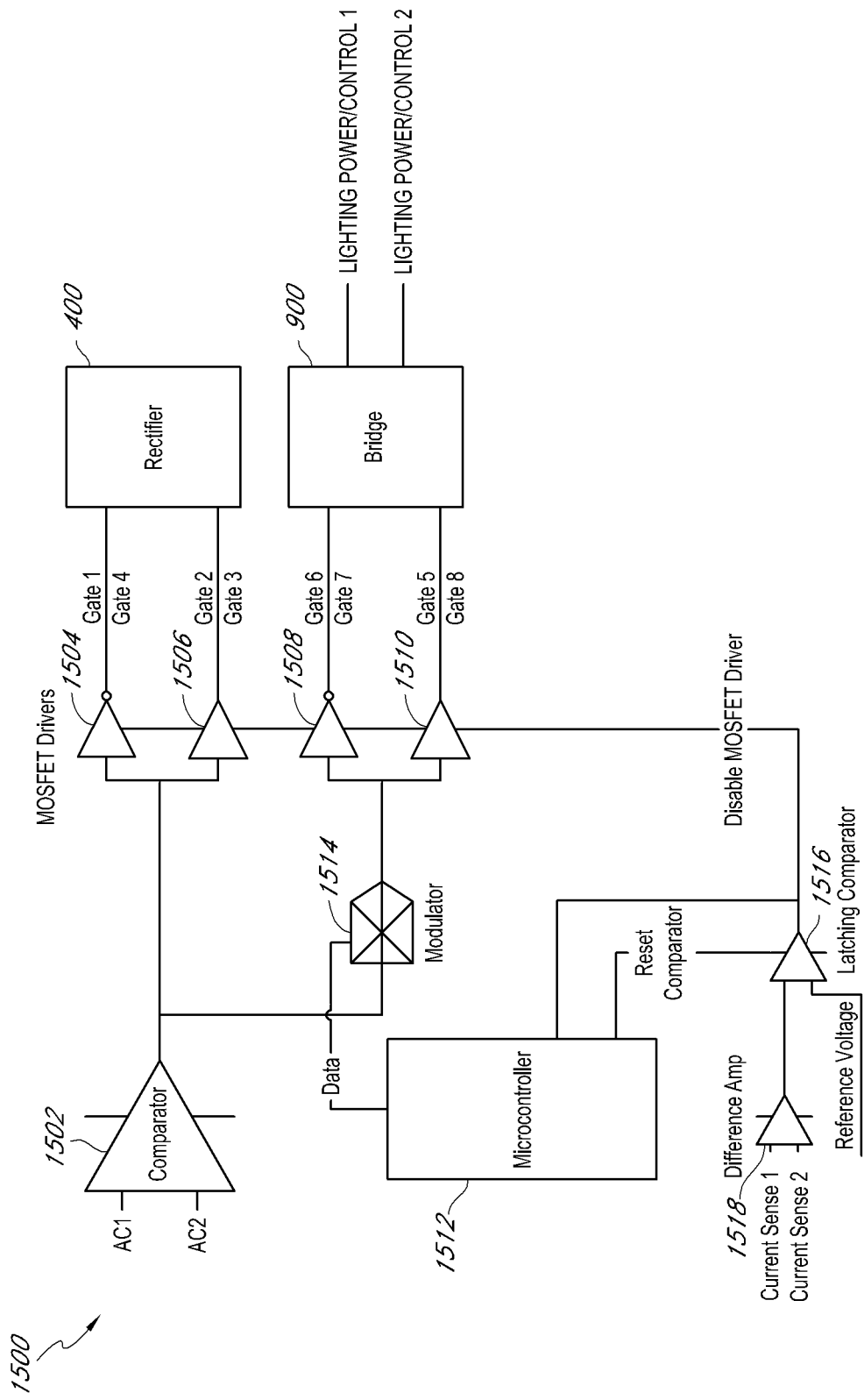
FIG. 15 is an exemplary schematic diagram of circuitry for phase detect, timing generation and drivers, according to certain embodiments.

FIG. 15 is an exemplary schematic diagram of circuitry 1500 comprising phase detect circuitry, timing generation circuitry, driver circuitry, and over current protection circuitry, according to certain embodiments. The circuitry 1500 comprises a comparator 1502, MOSFET drivers 1504, 1506, 1508, 1510, a computer 1512, a modulator 1514, a difference amplifier 1518, and a latching comparator 1516.

The comparator 1502 receives the power waveforms AC1, AC2 and electrically couples an output to the gates of the transistors Q1 404, Q2 406, Q3 408, Q4 410 in the rectifier 400 via the drivers 1504, 1506. The power waveforms AC1, AC2 received by the comparator 1502 have been preconditioned as is known to one of skill in the art to be within the acceptable input voltage range for the comparator 1502. The comparator 1502 compares AC1 and AC2 and, in one embodiment, outputs a positive pulse when AC1 is greater than AC2 and outputs a ground or negative pulse when AC2 is greater than AC1. While the input to the comparator is a sine wave, as shown in FIG. 5, the output is a square wave. The output of the comparator 1502 couples to the input of the inverting driver 1504, and the input of the non-inverting driver 1506.

The output of the non-inverting driver 1506 couples to the gates of transistors Q2 406 and Q3 408 on the rectifier 400. The waveform 600, in FIG. 6, illustrates an example of the transistor gate signal for the gates of the second transistor Q2 406 and the third transistor Q3 408. Referring to FIGS. 5 and 6, the output of the comparator, which is the input to the driver 1506, is positive and the gate signal Vgs (Q2, Q3) is enabled when AC1 is greater than AC2. Further, the output of driver 1504 is low and the transistors Q1 404 and Q4 410 are off when AC1 is greater than AC2.

The output of the inverting driver 1504 couples to the gates of transistors Q1 404 and Q4 410 on the rectifier 400. The waveform 700, in FIG. 7, illustrates an example of the transistor gate signal for the gates of the first transistor Q1 404 and the fourth transistor Q4 410. Referring to FIGS. 5 and 7, the output of the comparator 1502, which is the input to the inverting driver 1504, is negative or ground, and the gate signal Vgs (Q1, Q4) is enabled when AC2 is greater than AC1. Further, the output of driver 1506 is low and the transistors Q2 406 and Q3 408 are off when AC2 is greater than AC1.

The modulator 1514 receives the output of the comparator 1502 and receives a data signal from the computer 1512. The data signal comprises addresses/data/commands from the operator interface panel 308. In an embodiment, computer 1512 is computer 314. In another embodiment, computer 314 and computer 1512 are different computers. The computer 1512 comprises, by way of example, those devices or structures similar to computer 314.

An output of the modulator 1514 connects to the input of inverting driver 1508 and to the input of non-inverting driver 1510. The modulator 1514 passes the output of the comparator 1502 to the drivers 1508, 1510 when no data is present. The signal on the two-wire path to the lighting modules 304 is the sine wave 1200, shown in FIG. 12, when no data is present.

The output of the non-inverting driver 1510 couples to the gates of transistors Q5 904, 1404 and Q8 910, 1410 on the bridge 900 or the rectifier/bridge 1400. The waveform 1000, in FIG. 10, illustrates an example of the transistor gate signal for the gates of the fifth transistor Q5 904, 1404 and the eighth transistor Q8 910, 1410. Referring to FIGS. 5 and 10, the gate signal Vgs (Q5, Q8) is enabled when AC1 is greater than AC2 and data is absent.

The output of the inverting driver 1508 couples to the gates of transistors Q6 906, 1406 and Q7 908, 1408 on the bridge 900 or the rectifier/bridge 1400. The waveform 1100, in FIG. 11, illustrates an example of the transistor gate signal for the gates of the sixth transistor Q6 906, 1406 and the seventh transistor Q7 908, 1408. Referring to FIGS. 5 and 11, the gate signal Vgs (Q6, Q7) is enabled when AC2 is greater than AC1 and data is absent.

As shown, without data on the power signal for the lights, the rectifier/bridge 1400 takes the center tap of the transformer 1402, as one wire of the two-wire path to the lighting fixtures 104, 204. Depending on whether Q5 1404 and Q8 1410, or Q6 1406 and Q7 1408 are enabled, the rectifier/bridge 1400 sends the positive half-cycle or the negative half-cycle of the 12 VAC RMS output of the transformer 1402, which is illustrated as its 16.97 VAC peak-to-peak waveforms AC1 and AC2 in FIG. 5 on the other wire of the two-wire path, using substantially or almost loss-less circuitry. However, as described herein, the same rectifier/bridge 1400 accepts control signals from the processor 314 according to user programming to selectively control one or more fixtures 104, 204 in one or more zones 106, 206. The control signals activate the gates with the same or substantially similar almost loss-less process in a manner that embeds logic or data on the power signal 1200 of FIG. 12.

When data is present the modulator 1514 functions as a selective inverter, in an embodiment. The data signal inverts the signal between the comparator 1502 and the drivers 1508, 1510. For example, when the data is high, the modulator 1514 acts as an inverter and inverts the signal from the comparator 1502 before the signal is received by the drivers 1508, 1510. When the data is low, the modulator 1514 passes the output of the comparator 1502 to the drivers 1508, 1510. This permits the phase of the signals LIGHTING POWER/CONTROL1, LIGHTING POWER/CONTROL2 output from the bridge 900 or rectifier/bridge 1400 on the two-wire path to the lighting modules 304 to be adjusted on a half-cycle basis to encode the data within the power waveform. Referring to FIG. 13, the waveform 1300 illustrates an example of a data encoded power waveform comprising start bits 1302 comprising 1, 1, followed by data bits 1304 comprising 0, 1, 0, 1, 1.

Referring to FIG. 15, the difference amplifier 1518 receives the signals, CURRENT SENSE1, CURRENT SENSE2, from the current transformer 412, 1412, which are proportional to the current flowing out of the transformer 402. The difference amplifier 1518 subtracts CURRENT SENSE1, CURRENT SENSE2 to create a single ended current protection signal. The latching comparator 1516 receives the output of the difference amplifier 1518 and compares the current protection signal to a reference voltage or threshold. The output of the latching comparator 1516 couples to an enable signal common to the drivers 1504, 1506, 1508, 1510. When the peak voltage of the current protection signal exceeds the threshold, the output of the latching comparator 1516 disables the drivers 1504, 1506, 1508, 1510 to prevent an overcurrent event from damaging the circuitry.

Further, processor 1512 receives the latched output of the latching comparator 1516 and the latching comparator 1516 receives a reset signal from the processor 1512. In an embodiment, the processor 1512 can reset the latching comparator 1516. In another embodiment, the processor 1512 can alert the user to the overcurrent event through communication with the processor 314. The processor 314 could then display the information on the display 312.

Figure 16:
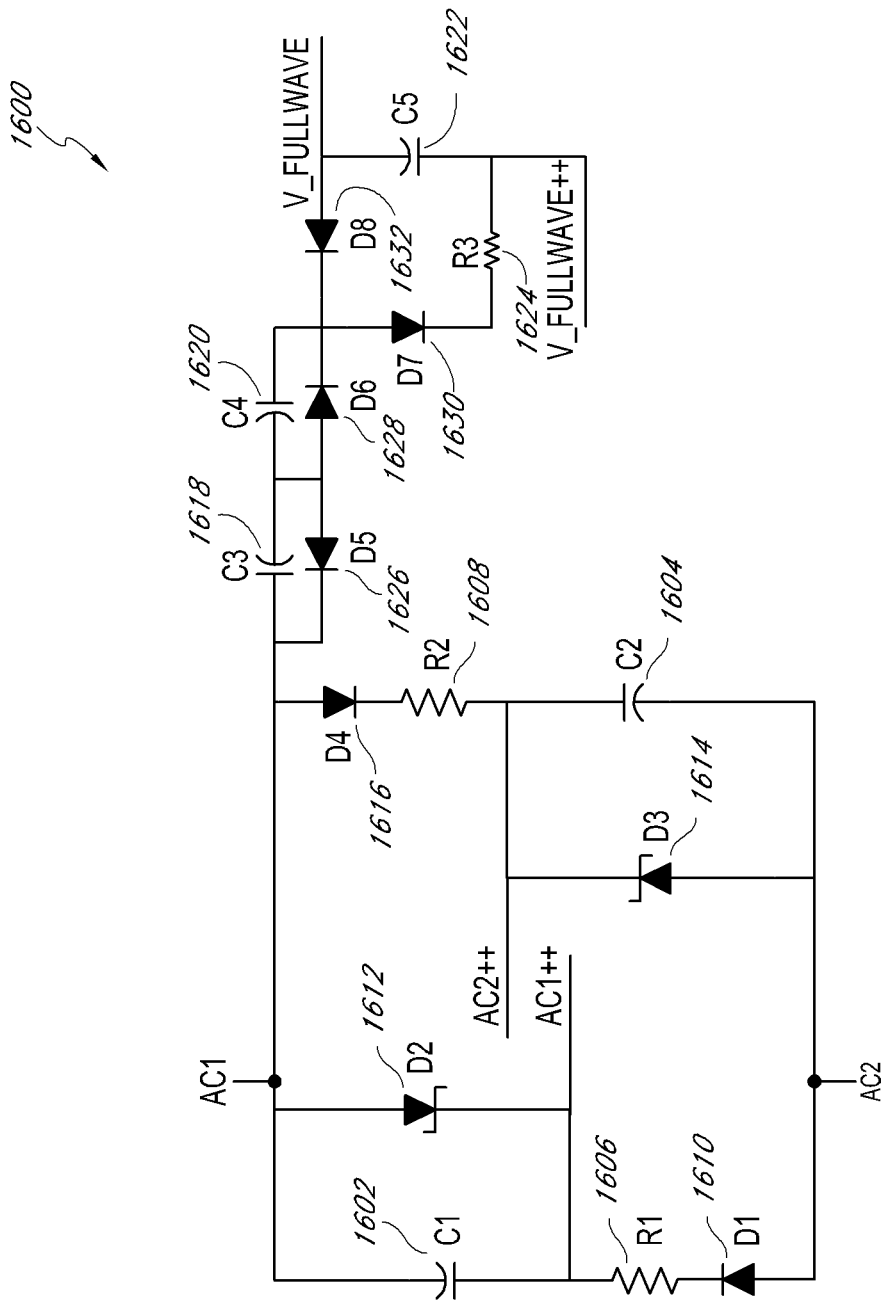
FIG. 16 is an exemplary schematic diagram of a bias circuit, according to certain embodiments.

FIG. 16 is an exemplary schematic diagram of a bias circuit 1600, according to an embodiment. In embodiments of the rectifier 400, the bridge 900, and the rectifier/bridge 1400, the sources of some of the transistors Q1-Q8 are electrically connected to one of the two AC outputs, AC1, AC2, of the transformer 402, 1402 or to the rectified power waveform V-FULLWAVE. When the transistor or MOSFET is turned on, nominally the gate voltage should be approximately 5 volts+/− about 4 volts to approximately 10 volts+/− about 5 volts more positive than the source voltage, for proper operation, as is known to one of skill in the art from the disclosure herein. However, this is a higher voltage than is present at the output of the transformer 402, 1402. The bias circuitry 1600 functions to provide the transistors Q1-Q8 in the rectifier 400, the bridge 900 and the rectifier/bridge 1400 with the higher gate voltage.

The bias circuit 1600 receives the power waveforms AC1, AC2 from the transformer 402, 1402 and generates the power waveforms AC1++, AC2++ that are at a higher DC level than AC1, AC2, but follow the AC1, AC2 waveforms, respectively. For example, AC1++ and AC2++ may have a DC offset of about 10 volts to about 20 volts above AC1, AC2, as they move up and down with AC1, AC2. AC1++, AC2++ power the MOSFET driver integrated circuits 1508, 1510 that provide the gate signals for the MOSFETs Q5 904, Q6 406, Q7 908, Q8 910 in the bridge 900 and the MOSFETs Q5 1404, Q6 1406, Q7 1408, Q8 1410 in rectifier/bridge 1400.

The bias circuit 1600 comprises capacitors C1 1602, C2 1604, resistors R1 1606, R2 1608, and diodes D1 1610, D2 1612, D3 1614, D4 1616. AC2 electrically couples to an anode of diode D1 1610 and the series combination of diode D1 1610 and resistor R1 1602 half-wave rectify AC2 with respect to AC1 and capacitor C1 1602 stores the voltage. An anode of diode D2 1612 couples to an end of capacitor C1 1602. Diode D2 1612 is a zener or clamping diode and clamps the voltage at the clamping value. In an embodiment, diode D2 1616 is a +18 volt zener diode. A cathode of diode D2 1612 provides the power waveform AC1++.

Similarly, AC1 electrically couples to an anode of diode D4 1616 and the series combination of diode D4 1616 and resistor R2 1608 half-wave rectify AC1 with respect to AC2 and capacitor C2 1604 stores the voltage. An anode of diode D3 1614 couples to an end of capacitor C2 1604. Diode D3 1614 is a zener or clamping diode and clamps the voltage at the clamping value. In an embodiment, diode D3 1614 is a +18 volt zener diode. A cathode of diode D3 1614 provides the power waveform AC2++. In other embodiments, diodes D2 1612, D3 1614 can have clamping values at other than +18 volts.

The bias circuit 1600 further receives the power waveform AC1 from the transformer 402 and V-FULLWAVE from the rectifier 400 and generates the power waveform V-FULLWAVE++. V-FULLWAVE++ is approximately AC1 half-wave rectified and at a DC level that is no lower than approximately one diode drop below V-FULLWAVE. V-FULLWAVE powers the MOSFET driver integrated circuits 1504, 1506 that provide the gate signals for the MOSFETs Q1 404, Q2 406, Q3 408 Q4 410 in the synchronous rectifier 400.

The bias circuit further comprises capacitors C3 1618, C4 1620, C5 1622, resistor R3 1624, and diodes D5 1626, D6 1628, D7 1630, D8 1632. AC1 electrically couples to a first end of capacitor C3 1618 and a cathode of diode D5 1626. A second end of capacitor C3 1618 connects to a first end of capacitor C4 1620, an anode of diode D5 1626 and an anode of diode D6 1628. A second end of capacitor C4 1620 and a cathode of diode D6 1628 couple to an anode of diode D7 1630 and a cathode of diode D8 1632. Capacitors C3 1618, C4 1620, diode D5 1626, and diode D6 1628 form a charge pump circuit using the power waveform AC1. An anode of diode D8 1632 electrically couples to V-FULLWAVE and clamps the AC signal passing through the capacitors C3

1618, C4 1620 at approximately one diode drop below V-FULLWAVE at the cathode of diode D8 1632. The series combination of diode D7 1630 and resistor R3 1624 half-wave rectifies the clamped V-FULLWAVE signal with respect to V-FULLWAVE and capacitor C5 1622 stores the voltage. An end of capacitor C5 1622 couples to an end of resistor R3 1624 and provides the power waveform V-FULLWAVE++.

Figures 1, 17B:
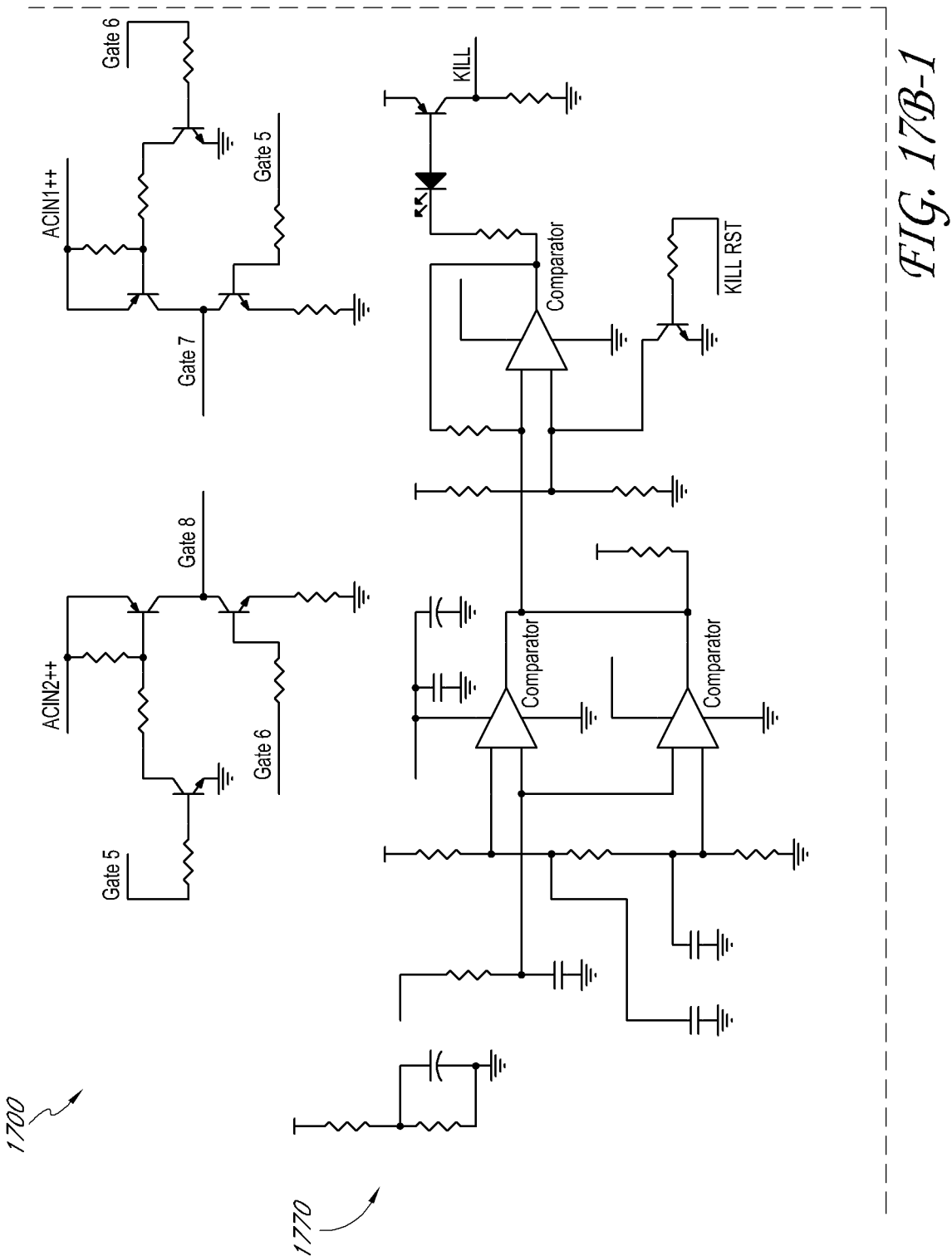
Figures 2, 17B:
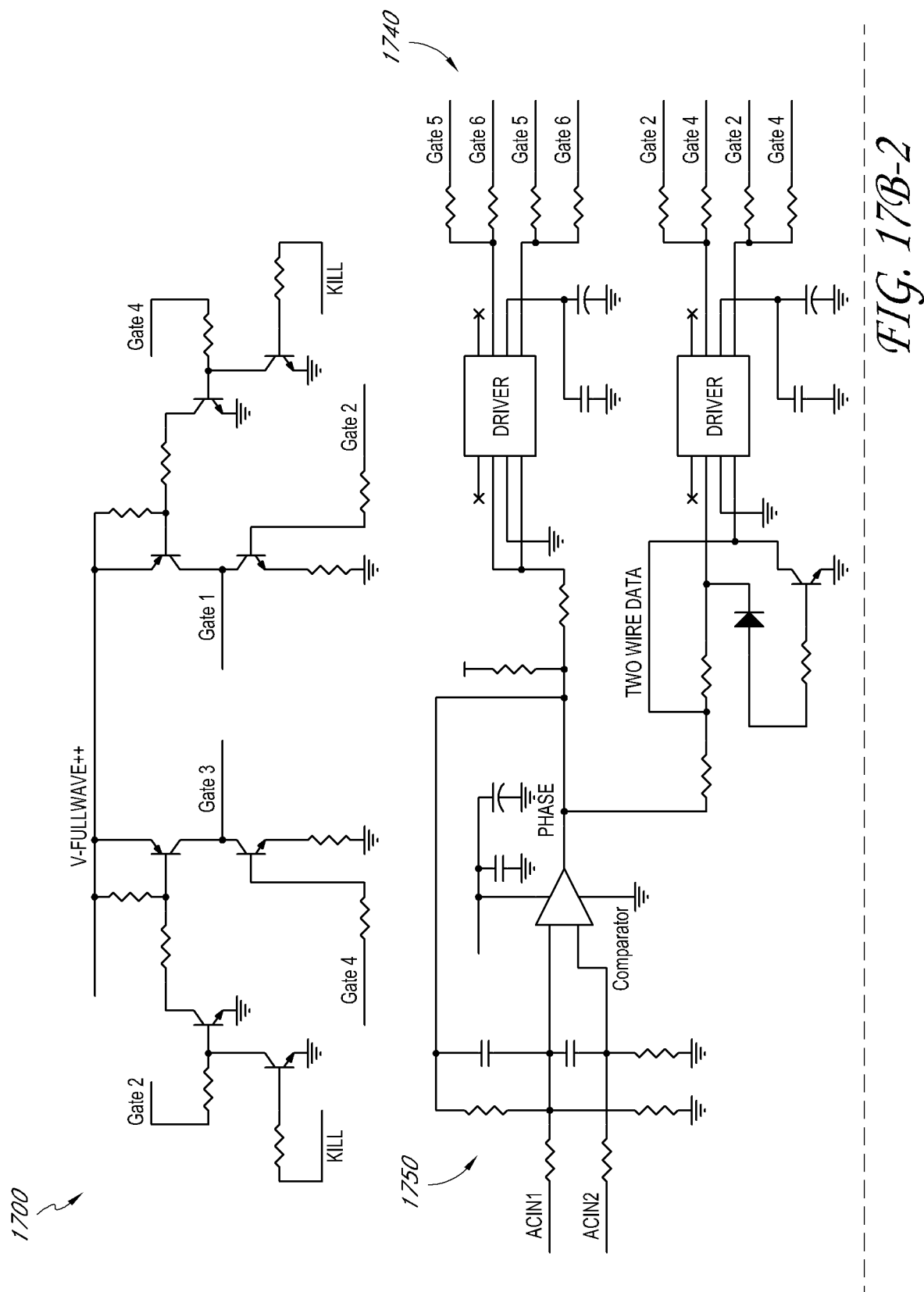
Figures 3, 17B:
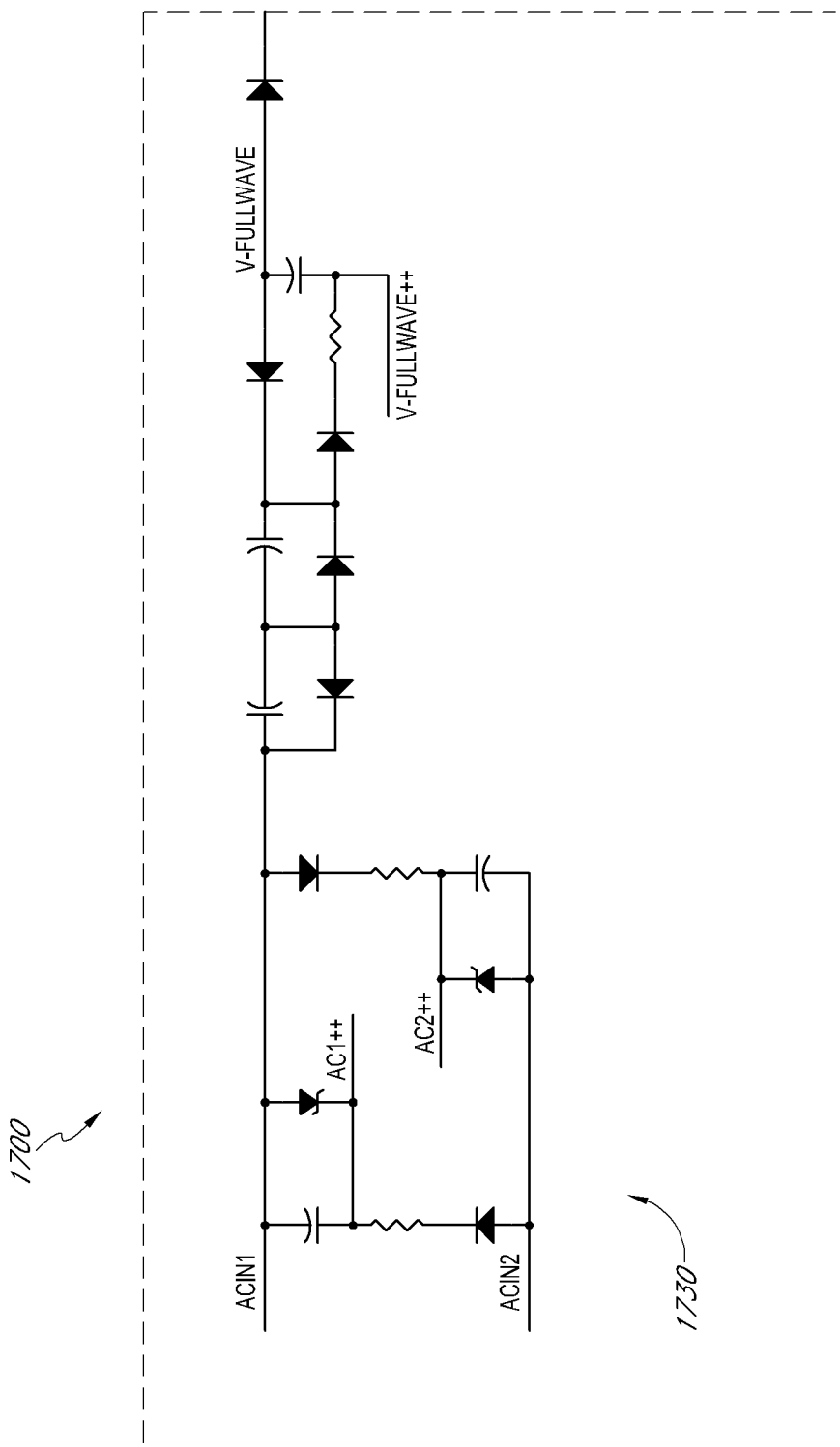

FIGS. 17A1-17A4 and 17B1-17B4 are exemplary circuit diagrams for a lighting controller 1700, according to one embodiment. FIGS. 17A1 and 17A3 are an example of a rectifier circuit 1710 where the MOSFETs 1712, 1714, 1716, 1718 of FIG. 17A1 electrically couple in parallel with the MOSFETs 1713, 1715, 717, 1719 having the corresponding gate signals Gate5, Gate6, Gate7, Gate8 of FIG. 17A3 for increased current drive. FIGS. 17A2 and 17A4 are an example of a bridge circuit 1720 where the MOSFETs 1722, 1724, 1726, 1728 of FIG. 17A2 electrically couple in parallel with the MOSFETs 1723, 1725, 1727, 1729 having the corresponding gate signals Gate1, Gate2, Gate3, Gate4 of FIG. 17A4 for increased current drive. FIGS. 17B1-17B4 are examples of a bias circuit 1730, driver circuit 1740, phase detection circuit 1750, timing generation circuit 1760, and a current protection circuit 1770.

Figure 18:
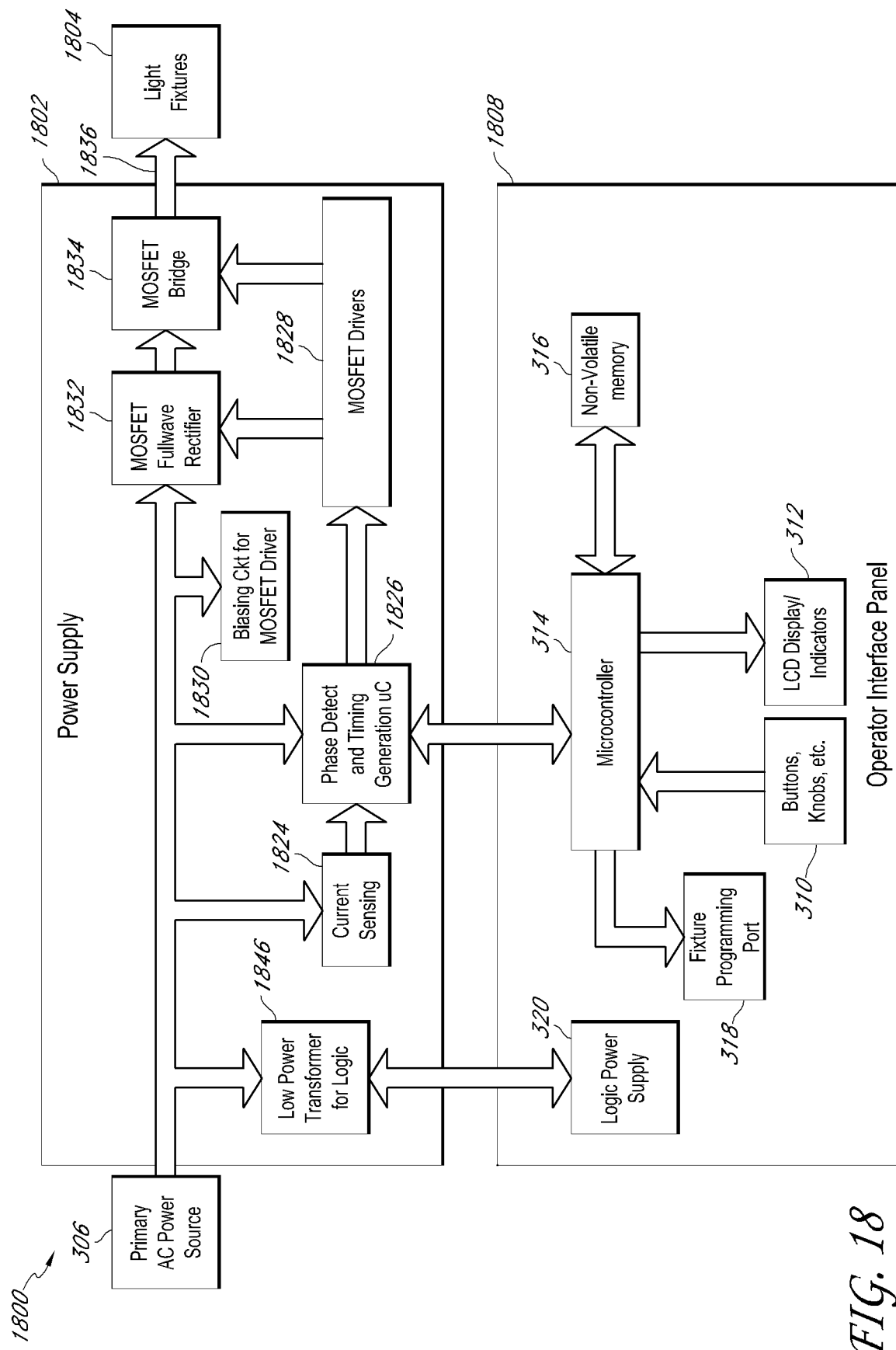
FIG. 18 is a block diagram of an exemplary lighting controller, according to other embodiments.

FIG. 18 is a block diagram of another exemplary lighting controller 1800 controlling lighting devices 1804 and comprising a power supply 1802 and the operator interface panel 308. The operator interface panel 308 comprises the operator controls 310, the displays and indicators 312, the computer 314, the memory 316, the fixture programming port 318, and the logic power supply 320 and operates as described above with respect to FIG. 3 to provide addresses/data/commands to the power supply 1802. The architecture of the power supply 1802 is similar to the architecture of the power supply 302 except that the power supply 1802 does not have the transformer 322 to transform the primary line voltage to a secondary AC voltage. Instead, the power supply 1802 drives the bridge and encoding circuitry from the primary line voltage. Further, the lighting devices 1804, described further herein, are powered by the primary line voltage.

The power supply 1802 comprises current sensing circuitry 1824, phase detect and timing circuitry 1826, driver circuitry 1828, a synchronous fullwave rectifier 1832, and a bridge 1834. The power supply 1802 further comprises a low power transformer 1846 to provide a low voltage, such as 9 VAC, for example, to a logic power supply which creates a regulated DC voltage for the digital logic components of the power supply 1802, and biasing circuitry 1830 to provide the proper voltage levels to operate transistors in the rectifier 1832 and the bridge 1834.

Similar to the power supply 302 illustrated in FIG. 3, the power supply 1802 receives AC power from the primary power source 306 and addresses/data/commands from the operator interface panel 308 and provides a control signal to a plurality of lighting fixtures 1804 through a two-wire path 1836. However, unlike the power supply 302, the primary power source 306 is electrically coupled to the power supply circuitry without being transformed to a lower voltage by the primary AC to 12 VAC transformer 322. In addition, while the lighting modules 304 operate at a low voltage signal, such as 12 VAC, for example, the lighting modules 1804 operate at approximately the primary AC power level, such as 120 VAC, for example.

In an embodiment, the primary AC signal is approximately a 120 volt 60 Hz power waveform. In other embodiments, the primary AC signal can be an approximately 110 volts 60 Hz, 220 volt 50 Hz, 220 volt 60 Hz, 230 volts 60 or 50 Hz, 240 volts 60 or 50 Hz, or the like, power waveform.

The primary AC power source 306 electrically connects to the current sensing circuitry 1824. The current sensing circuitry 1824 senses the amount of current in the output of the primary AC power source 306. The phase detect and timing circuitry 1826 receives a signal proportional to the sensed current from the current sensing circuitry 1824 and shuts off the power supply 1802 when the sensed current exceeds a threshold, as described above.

The phase detect and timing circuitry 1826 further receives data and commands from the processor 314 and the power waveform from the primary AC power source 306, and provides timing signals to the driver circuit 1828. The timing signals control the driver circuitry 1828 to encode a data signal onto the power signal by varying the polarity of the power waveform, as will be further discussed herein.

Further, the primary AC power source 306 electrically connects to the synchronous fullwave rectifier 1832, which rectifies the power signal. The fullwave rectifier 1832 electrically connects to the bridge 1834 and the fullwave rectifier 1832 and the bridge 1834 electrically connect to the driver circuitry 1828. Both the fullwave rectifier 1832 and the bridge 1834 receive drive signals from the driver circuitry 1828. The bridge 1834 receives the rectified power signal and outputs a control signal to the lighting fixtures 1804. The control signal comprises a data encoded power waveform, which provides power to illuminate the lighting fixtures 1804 and address/data/commands to individually control the lighting fixtures 1804.

Figure 19:
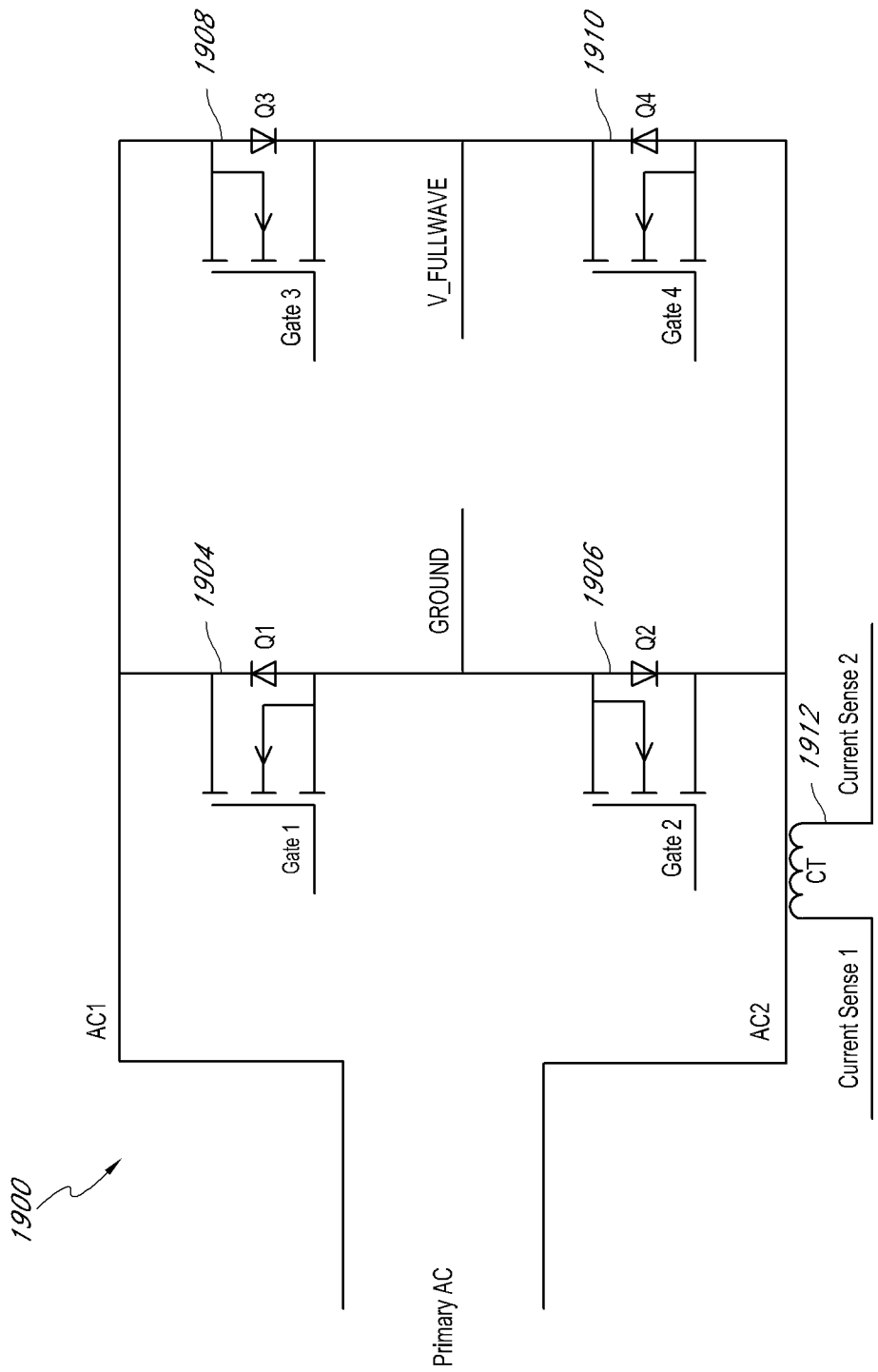
FIG. 19 is an exemplary schematic diagram of a rectifier circuit, according to other embodiments.

FIG. 19 is a schematic diagram of an exemplary synchronous rectifier circuit 1900 configured to operate in the power supply 1802. The rectifier circuit 1900 comprises a first switching device Q1 1904, a second switching device Q2 1906, a third switching device Q3 1908, and a fourth switching device Q4 1910. The rectifier circuit 1900 is similar to the rectifier circuit 400 in FIG. 4, but without the primary AC to 12 VAC transformer 402.

Figure 21:
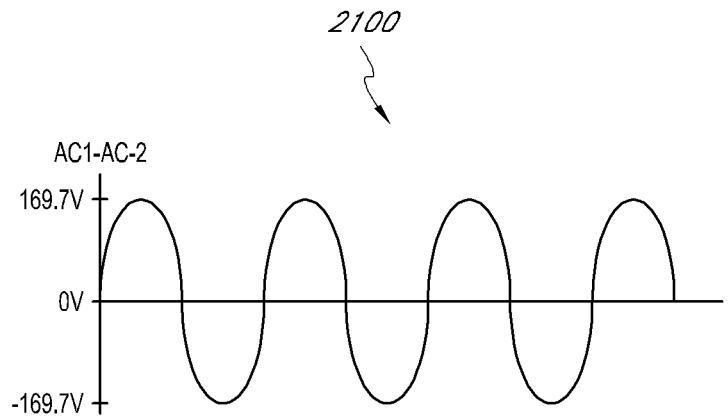
FIG. 21 depicts an exemplary power waveform, according to other embodiments.

The rectifier circuit 1900 receives the primary AC power signal having a first power waveform AC1 and a second power waveform AC2. In one embodiment, the primary AC power signal is approximately 120 VAC and FIG. 21 illustrates an exemplary 120 VAC RMS power waveform 2100 having a peak-to-peak voltage of between approximately +169.7 volts to approximately −169.7 volts.

In an embodiment, the switching devices Q1 1904, Q2 1906, Q3 1908, Q4 1910 are metal-oxide-semiconductor field-effect transistors (MOSFETs) with an integral body diode, as described above with respect to FIG. 4. The synchronous rectifier 1900 selectively turns on the MOSFETs when their body diodes would be conducting to create a highly efficient power supply 1802.

In other embodiments, the switching devices Q1 1904, Q2 1906, Q3 1908, Q4 1910 are P-channel or N-channel MOSFETs with or without an integral body diode. In yet other embodiments, transistors, such as Bipolar Junction Transistors (BJTs), Isolated Gate Bipolar Transistors (IGBTs), or the like, can be used. In further embodiments, switching devices such as triode for alternating current devices (triacs), silicon-controlled rectifiers (SCRs), and the like can be used. In another embodiment, each switching device Q1 1904, Q2 1906, Q3 1908, Q4 1910 comprises more than one transistor connected in parallel. In another embodiment, multiple MOSFETs may be packaged in a single module.

The first switching device Q1 1904 is coupled in series with the second switching device Q2 1906 across AC1 and AC2 to form a third power waveform GROUND and the third switching device Q3 1908 is coupled in series with the fourth switching device Q4 1910 across AC1 and AC2, to form a fourth power waveform V-FULLWAVE, as described above with respect to FIG. 4. Also, as described above with respect to FIG. 4, the series combination of the first switching device Q1 1904 and the second switching device Q2 1906 electrically couple in parallel with the series combination of the third switching device Q3 1908 and fourth switching device Q4 1910.

Figure 22:
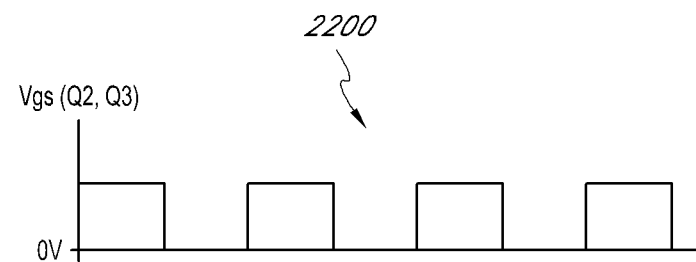
FIG. 22 depicts an exemplary waveform of the transistor gate signal for a rectifier circuit, according to other embodiments.

Each switching device Q1 1904, Q2 1906, Q3 1908, Q4 1910 is associated with a gate signal and the gate signals electrically couple to an output of a comparator comparing the first and second power waveforms, AC1 and AC2, via driver circuitry as described herein. The gates of the second switching device Q2 1906 and the third switching device Q3 1908 enable when the first power waveform AC1 is greater than the second power waveform AC2. FIG. 22 depicts an exemplary waveform 2200 of the gate signal for the gates of the second switching device Q2 1906 and the third switching device Q3 1908, according to an embodiment. Referring to FIGS. 21 and 22, the gate signal Vgs (Q2, Q3) is enabled when AC1 is greater than AC2.

Figure 23:
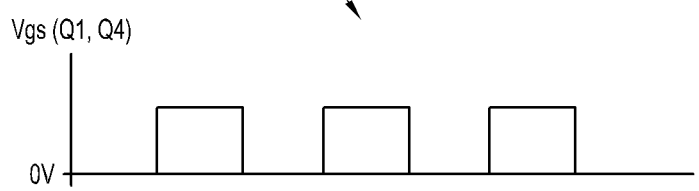
FIG. 23 depicts an exemplary waveform of transistor gate signal for the rectifier circuit, according to yet other embodiments.

Further, the gates of the first switching device Q1 1904 and the fourth switching device Q4 1910 enable when the second power waveform AC2 is greater than the first power waveform AC1. FIG. 23 depicts an exemplary waveform 2300 for the gates of the first switching device Q1 1904 and the fourth switching device Q4 1910, according to an embodiment. Referring to FIGS. 21 and 23, the gate signal Vgs (Q1, Q4) is enabled when AC2 is greater than AC1.

Figure 24:
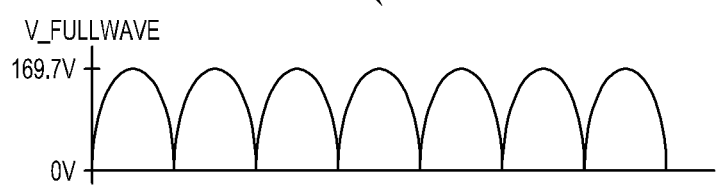
FIG. 24 depicts an exemplary rectified power waveform, according to other embodiments.

The rectifier 1900 full wave rectifies the primary AC signal, such as, for example, a 120 VAC RMS signal, creating a third power waveform GROUND and the fourth power waveform V-FULLWAVE. The rectified 120 VAC RMS signal, V-FULLWAVE, has a peak voltage of approximately 169.7 volts, which is approximately the same as the peak voltage of the power waveforms AC1 and AC2 at the input of the rectifier 1900. The small loss in signal is due to exemplary, but finite conduction of the switching devices Q1 1904, Q2 1906, Q3 1908, Q4 1910 when their gates are enabled. FIG. 24 depicts an exemplary rectified 120 VAC RMS signal 2400, according to an embodiment. As illustrated in FIG. 24, the rectifier 1900 outputs a non-inverted 120 VAC RMS power waveform 2400 when AC1 is greater than AC2 and outputs an inverted 120 VAC RMS waveform 2400 when AC2 is greater than AC1.

The waveforms illustrated in FIGS. 21-24 illustrate embodiments where the primary AC power source 306 is approximately 120 VAC. In other embodiments, the primary AC power signal can be an approximately 110 volts 60 Hz, 220 volt 50 Hz, 220 volt 60 Hz, 230 volts 50 or 60 Hz, 240 volts 50 or 60 Hz, or the like, power waveform, and the RMS and peak-to-peak voltages will vary correspondingly.

Referring to FIG. 19, a current sensing element 1912, such as a current transformer, magnetically couples to the wire/trace carrying the primary AC power waveform. In one embodiment, the current transformer 1912 magnetically couples to the wire/trace carrying the power waveform AC2. In another embodiment, the current transformer 1912 magnetically couples to the wire/trace carrying the power waveform AC1. As described above with respect to FIG. 4, the current induced in the current transformer 1912 is proportional to the current of the power waveform AC2, in the illustrated embodiment, or to the current of the power waveform AC1, in another embodiment. The current transformer 1912 outputs signals, Current Sense1 and Current Sense2, which are proportional to current flowing through the power waveforms AC1 or AC2. The signals Current Sense1 and Current Sense2 are used to determine when the current flowing in the power waveforms AC1 or AC2 is greater than a threshold value, such that power supply 1802 can be disabled before damage to the circuitry occurs. Accordingly, the rectifier 1900 of FIG. 19 advantageously produces the V-FULLWAVE waveform 2400 of FIG. 24 with minimal power loss and correspondingly, minimal heat generation. In other embodiments, the current flowing in AC1 or AC2 can be sensed with Hall-Effect based current sensors, which sense the magnet field produced by the current. In yet another embodiment, current can be sensed by a current sense resistor.

Figure 20:
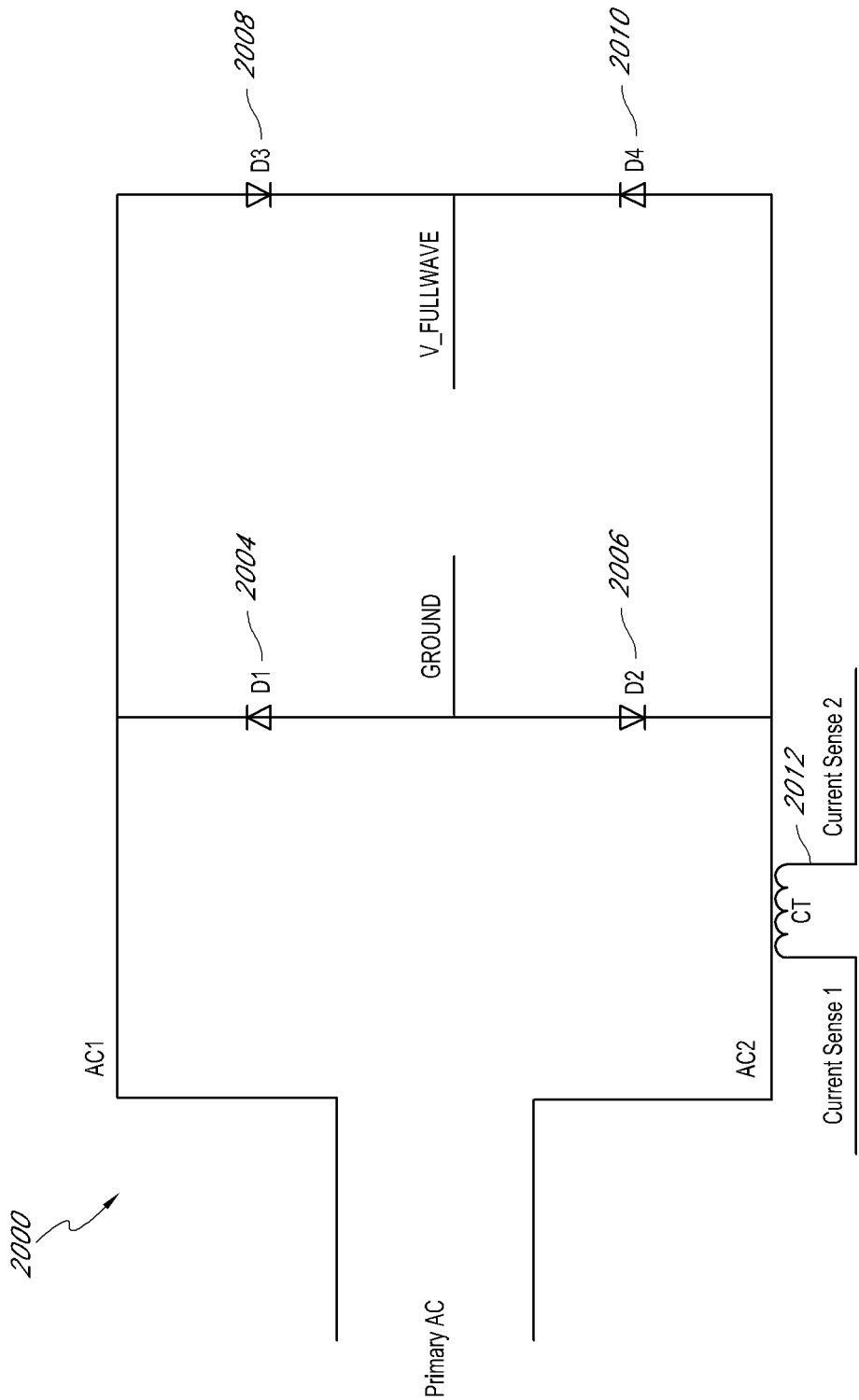
FIG. 20 is exemplary schematic diagram of a rectifier circuit, according to yet other embodiments.

FIG. 20 is a schematic diagram of another exemplary rectifier circuit 2000 configured to operate in the power supply 1802. In the embodiment illustrated in FIG. 20, the rectifier 2000 is a diode-based rectifier comprising diodes D1 2004, D2 2006, D3 2008, and D4 2010. Because the current drawn at 120 VAC is approximately one tenth of the current drawn at 12 VAC for the same amount of power delivered, the diode-based rectifier 2000 provides acceptable efficiency. The rectifier circuit 2000 rectifies the primary AC power signal to produce similar gate and V-FULLWAVE waveforms as illustrated in FIGS. 22-24. Because of the drop in voltage (diode drop) associated with the diodes D1 2004, D2 2006, D3 2008, D4 2010, the peak voltages may be approximately two diode drops or approximately 1.4 V less that the peak voltages illustrated in FIGS. 22-24.

Referring to FIG. 18, the bridge circuit 1834 receives the rectified power waveforms V-FULLWAVE and GROUND from the rectifier 1900. In an embodiment, the bridge circuit 1834 is similar to the bridge circuit 900 described herein with respect to FIG. 9. The switching devices in the bridge circuit 1834 can be P-channel or N-channel MOSFETs with or without integral body diodes, BJT's, IGBTs, as described with respect to FIG. 9 and bridge circuit 900. Because of the lower current, the switching devices in the bridge circuit 1834 can also be triacs, SCRs, and the like.

In an embodiment where the primary AC power signal is a 120 VAC signal, V-FULLWAVE is an exemplary rectified 120 VAC RMS signal depicted in FIG. 24. Advantageously, the bridge 1834 selectively outputs a control signal comprising the rectified power waveforms V-FULLWAVE, GROUND with either a positive polarity or a negative polarity. By doing so, data or intelligence can be added to the presently described power signal. Thus, the rectifier 1900 and the bridge 1834 combine to produce a 120 VAC power signal with embedded data, which provides power to illuminate the lighting fixtures 1804 and address/data/commands to individually control the lighting fixtures 1804.

Figure 25:
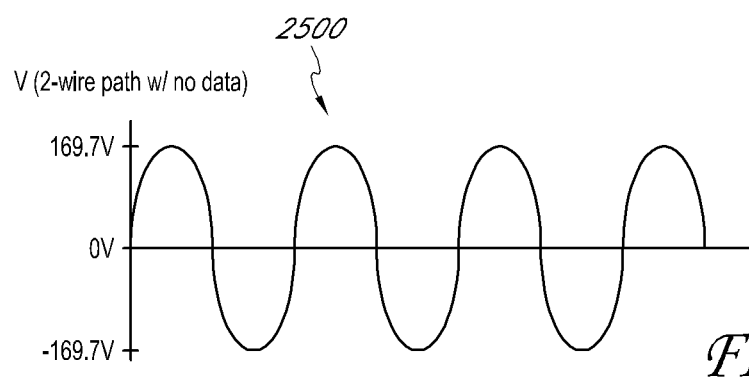
FIG. 25 depicts an exemplary power/data waveform without data, according to other embodiments.

FIG. 25 depicts an exemplary bridge output waveform 2500 when there is no data present from the processor 314. As shown, without data on the power signal for the lights 1804, the rectifier 1900 and the bridge 1834 take the 120 VAC RMS input signal, which is illustrated as its 169.7 VAC peak-to-peak waveforms AC1 and AC2 in FIG. 21, fullwave rectify it, and change it back to its original form. However, as described above with respect to rectifier 400 and bridge 900, the rectifier 1900 and bridge 1834 accept control signals from the processor 314 according to user programming to selectively control one or more fixtures 1804 in one or more zones. The control signals activate the gates of the rectifier 1900 and bridge 1834 with the same or substantially similar process as described above to embed logic or data on the power signal 2500 of FIG. 25.

Figure 26:
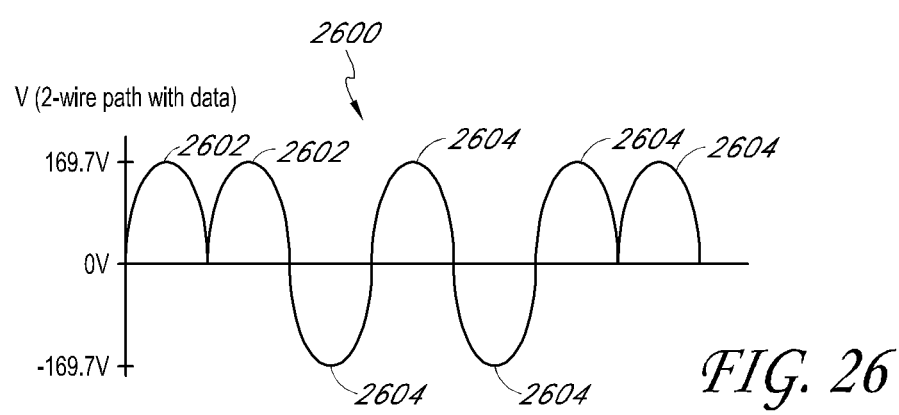
FIG. 26 depicts an exemplary power/data waveform with data, according to other embodiments.

For example, when the control signal controlling the gates of the switching devices comprises data from the processor 314 associated with the operator interface panel 308, the bridge 1834 encodes the data onto the signals LIGHTING POWER/CONTROL1 and LIGHTING POWER/CONTROL2 by outputting V-FULLWAVE having one polarity when the control signal is in a first state and outputting V-FULLWAVE having the opposite polarity when the control signal is in the second state. FIG. 26 depicts an exemplary power/data waveform 2600 with data, according to an embodiment. FIG. 26 illustrates a start bit sequence 2602 comprising 1, 1, followed by data bits 2604 comprising 0, 1, 0, 1, 1. This is similar to the exemplary power/data waveform depicted in FIG. 13 except that the positive peak waveform is approximately +169.7 V and the negative peak waveform is approximately −169.7 V. In summary, the bridge 1834 is used synchronously with the 120 VAC power waveform to select either a positive or a negative peak or half-cycle of the 120 VAC power waveform and apply the selected half-cycle to the output signals, LIGHTING POWER/CONTROL1 and LIGHTING POWER/CONTROL2 to encode data within the power waveform for transmission to the lighting modules 1804 over the two-wire path 1836. It should be noted that in FIG. 26, the control signals are switched at the zero crossing of the incoming line voltage waveform. It is also possible to encode data by switching at a point other than the zero crossing, or more frequently than once per half cycle of the incoming line voltage.

Figure 27:
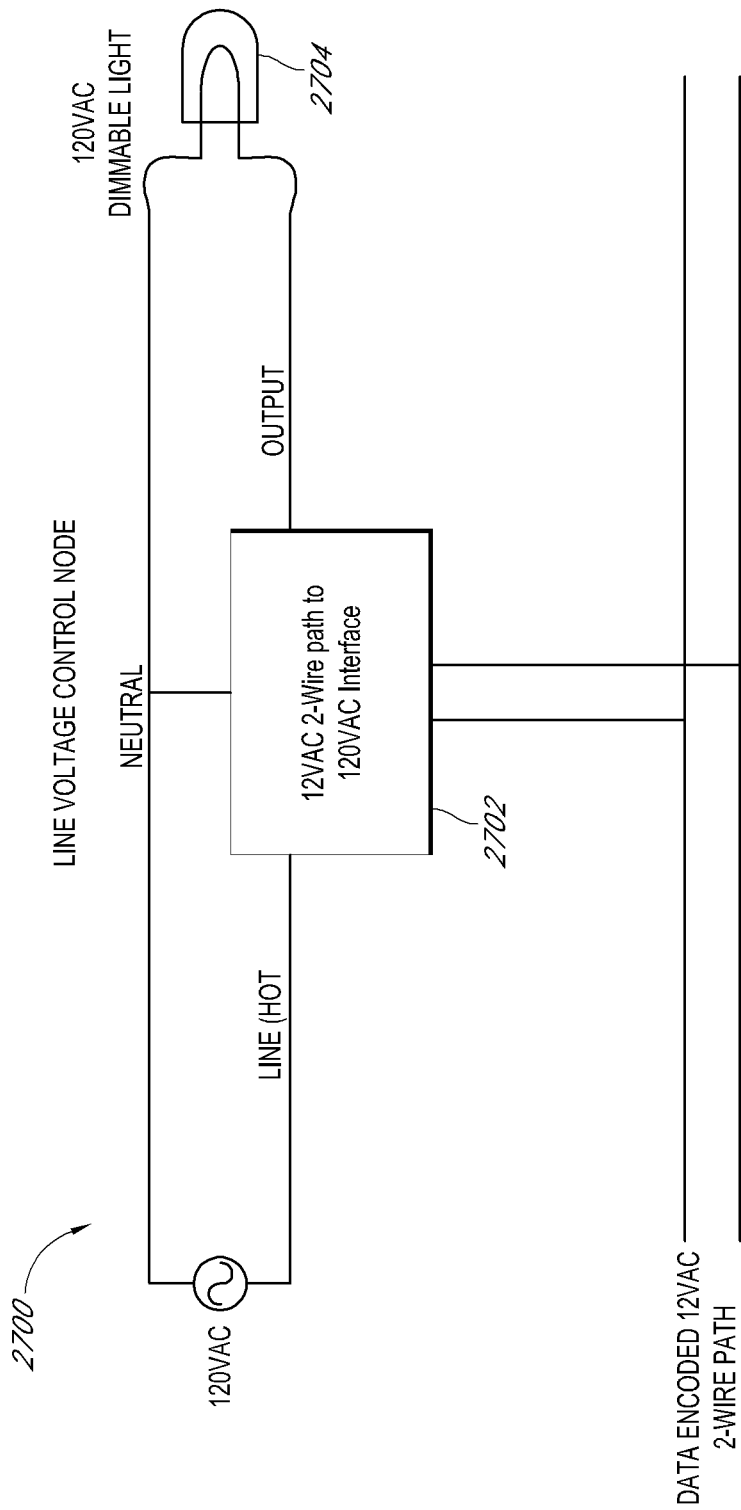
FIG. 27 is an exemplary schematic diagram of a line voltage control node, according to certain embodiments.

FIG. 27 is an exemplary schematic diagram of a line voltage control node system 2700. The line voltage control node 2702 receives the data encoded low voltage power signals LIGHTING POWER/CONTROL1 and LIGHTING POWER/CONTROL2 from the two-wire path 336. In an embodiment, the low voltage power signals are approximately 12 VAC. In other embodiments, the low voltage power signals are approximately 11 VAC, approximately 14 VAC, and the like.

The line voltage control node 2702 is assigned a lighting zone via the operator interface panel 308 as described above. Based on the information contained on the two-wire path 336 addressed to the line voltage control node 2702, the line voltage control node 2702 controls line/high voltage lighting devices 2704. In an embodiment, the devices 2704 are 120 VAC dimmable lighting devices.

Figure 28:
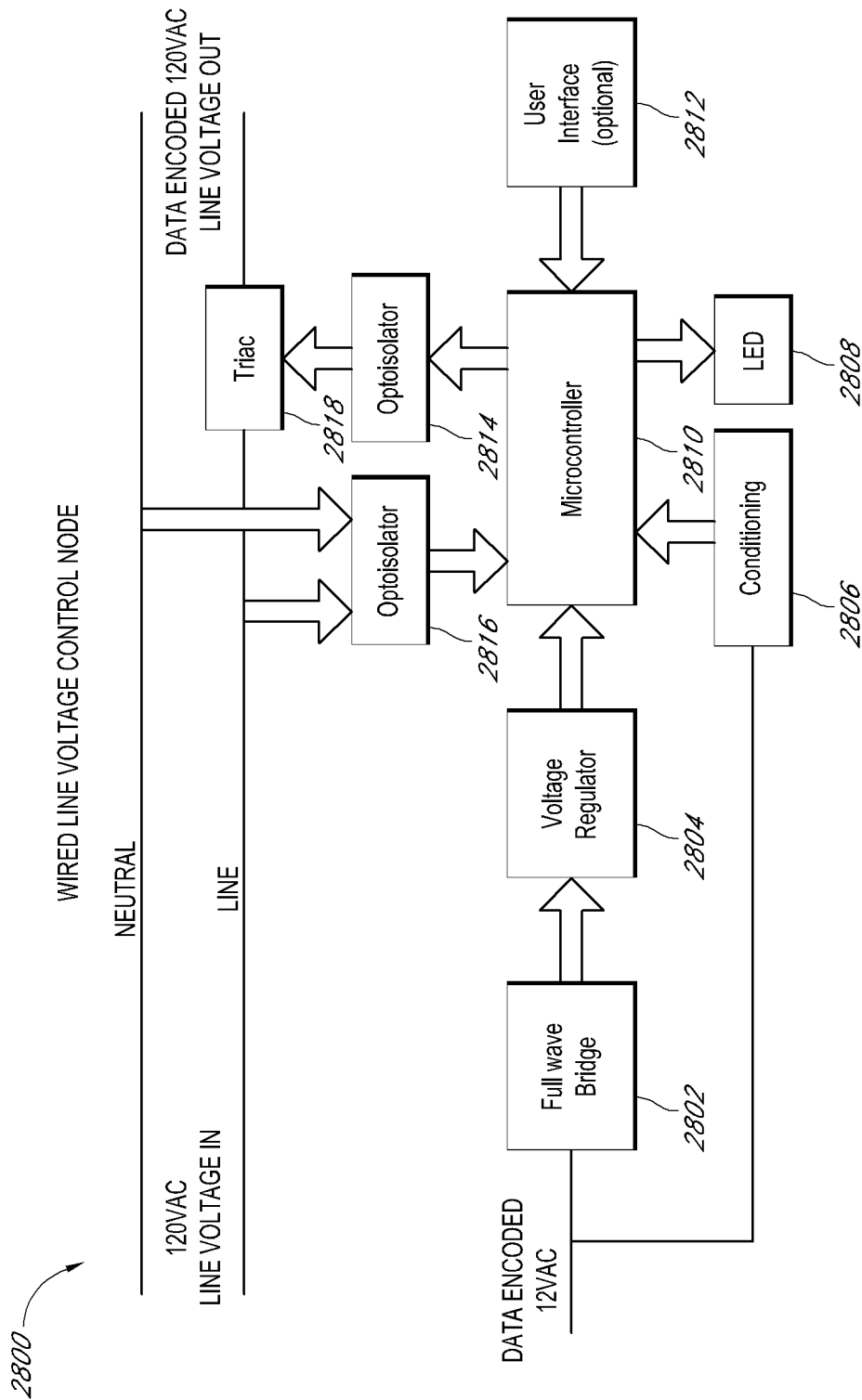
FIG. 28 is a block diagram of an exemplary line voltage control node, according to certain embodiments.

FIG. 28 is a block diagram of an exemplary line voltage control node 2800 configured to dim the lighting device 2704. The line voltage control node 2800 comprises a full wave rectifier 2802, a voltage regulator 2804, a conditioning circuit 2806, a microcontroller 2810, a triggering optoisolator 2814, a detection optoisolator 2816, and a triac 2818. The full wave rectifier 2802, the voltage regulator 2804, the conditioning circuit 2806, the microcontroller 2810 are the same or substantially similar to the circuitry described herein with respect to FIGS. 61-64 for single and multi-channel lighting modules 6100, 6200, 6300, 6400. In the lighting modules 6100, 6200, 6300, 6400, the microcontroller controls the LED driver to vary the brightness of the LED, whereas in the line voltage control node 2800, the line voltage, and thus the dimming function, is controlled via the conduction angle of the triac 2818.

For safety, the 120 VAC line voltage signals are galvanically isolated from the 12 VAC low voltage signals by the triggering optoisolator 2814. The detection optoisolator 2816 senses the phase of the incoming line voltage signal so that the triac 2818 can be triggered at the appropriate point in time. In most embodiments the zero crossings of the 120 VAC line voltage signal occurs at substantially the same time as the zero crossing of the 12 VAC low voltage signal. However, in other embodiments, the zero crossings of the high and low voltage signals may not substantially coincide. For instance if a generator generates either of the 12 VAC low voltage signal or the 120 VAC line voltage signal, then the zero crossings would not substantially correspond to those of the utility grid. Because of this, the detection optoisolator 2816 is used to sense the actual zero crossing of the line voltage signal and to send this information to the microcontroller 2810. The triggering optoisolator 2814 can be, for example, an MOC3021 available from Fairchild Optoelectronics Group and the like. The detection optoisolator 2816 can be, for example, a TLP620 from Toshiba and the like. The triac 2818 can be, for example, a BTA208-800 from NXP Semiconductor and the like.

Figure 29:
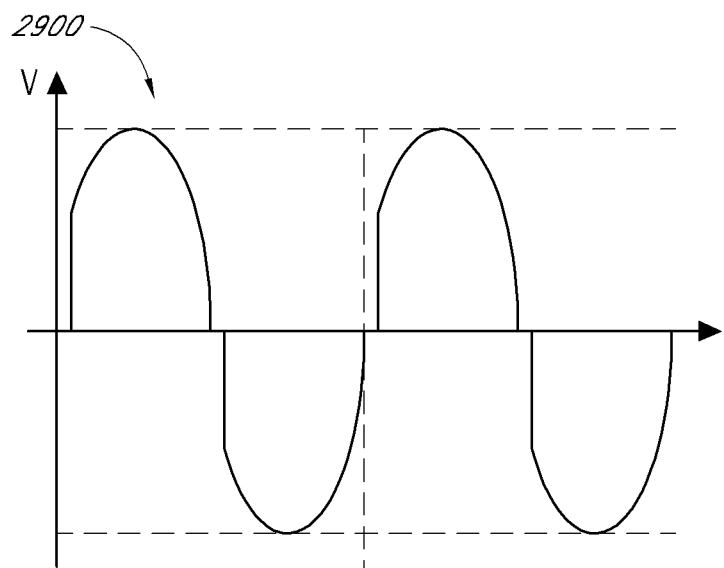
FIG. 29 depicts a first exemplary output waveform to control dimming of a Line Voltage device, according to certain embodiments.
Figure 30:
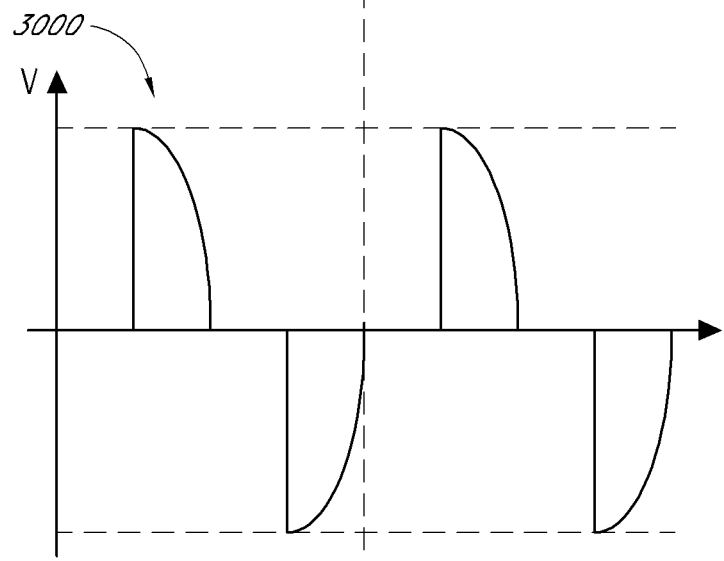
FIG. 30 depicts a second exemplary output waveform to control dimming of a Line Voltage device, according to certain embodiments.
Figure 31:
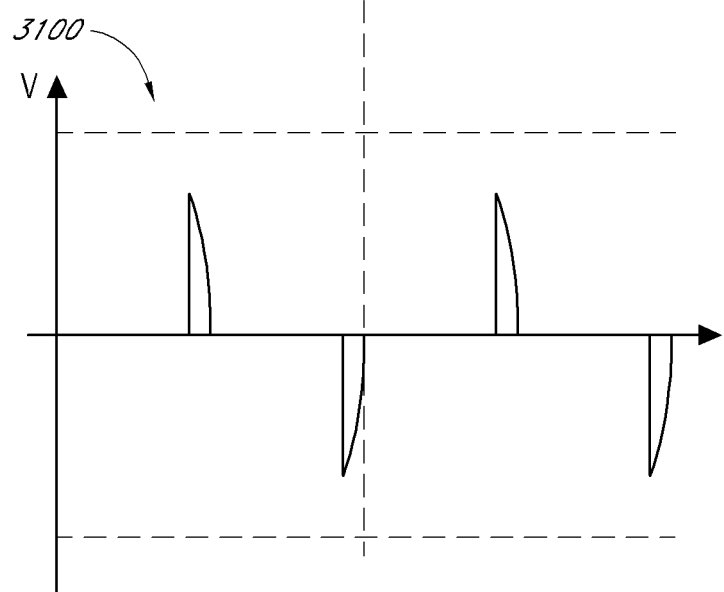
FIG. 31 depicts a third exemplary output waveform to control dimming of a Line Voltage device, according to certain embodiments.

Once the zero crossing of the line voltage is known, the microcontroller 2810 triggers the triac 2818 with a delay time based at least in part on the desired output intensity of the 120 VAC lighting device 2704. FIGS. 29-31 are exemplary waveforms depicting various output voltages usable to dim the lighting device 2704. The microcontroller 2810 creates output voltages approximately equal to or less than the input line voltage by delaying the triac trigger.

FIG. 29 depicts an output waveform 2900 having a very short delay between the zero crossing and the trigger. Therefore, the output waveform 2900 is almost equal to the input waveform. FIG. 30 depicts an output waveform 3000 having a trigger delay such that the output waveform 3000 is approximately half of the input voltage. FIG. 31 depicts an output waveform 3100 that is a small percentage of the input voltage due to a larger delay of the trigger signal.

The above embodiment has been described with respect to dimming functionality for the lighting devices 2704. In other embodiments of the line voltage control node 2800, a Z-wave device and/or a relay device could be used for non-dimming applications. For example, the line voltage control node 2800 could control ON/OFF for a zone comprising a fountain or the like.

Referring to FIG. 28, the line voltage control node 2800 further comprises an optional user interface 2812 having buttons, slide switches, or other forms of user controls to permit the user to manually control the lighting device 2704, in addition to the commands originating from the user interface panel 308.

The line voltage control node 2800 further comprises an LED 2808. In an embodiment, the LED 2808 is a low power LED not intended for illumination. The LED 2808 has the ability to "flash out" its serial number in a manner the same as or substantially similar to that of lighting modules 4004 described in further detail herein with respect to FIGS. 40-42.

FIGS. 27 and 28 illustrate embodiments of the line voltage control node 2700, 2800 that is electrically connected (via wires) to the data encoded 12 VAC two-wire path 336. FIGS. 32-36 illustrate embodiments of a wireless line voltage control node. The wireless line voltage control node is substantially similar to the wired line voltage control node 2700, 2800 except that the connection from the 120 VAC node to the 12 VAC control signal 336 is wireless. This may be particularly useful to control an existing lighting device to which there is no 12 VAC wiring run.

Figure 32:
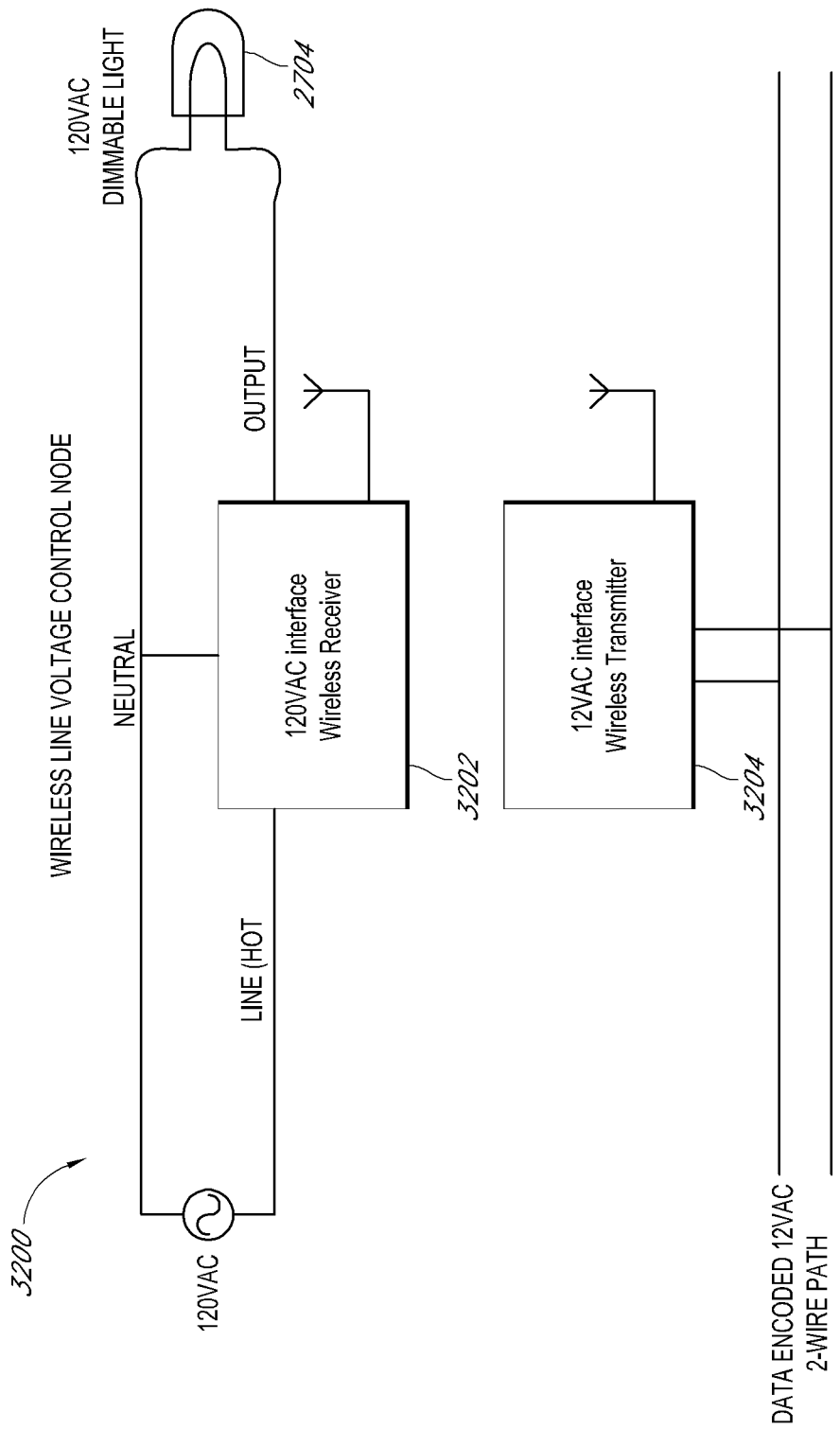
FIG. 32 is an exemplary schematic diagram of a wireless line voltage control node, according to certain embodiments.

FIG. 32 is an exemplary schematic diagram of a wireless line voltage control node 3200 comprising a 120 VAC interface wireless receiver 3202 and a 12 VAC interface wireless transmitter 3204 communicating over a radio frequency (RF) wireless link. The 12 VAC interface wireless transmitter 3204 is electrically connected to the data encoded 12 VAC two-wire path 336 and receives control data from the signals LIGHTING POWER/CONTROL 1 and LIGHTING POWER/CONTROL2 via the two-wire path 336. The 12 VAC interface wireless transmitter 3204 sends over the wireless link the control commands to the 120 VAC interface receiver 3202. The 120 VAC interface receiver 3202 is electrically connected to the 120 VAC line voltage and the 120 VAC lighting device 2704, and receives the control data over the wireless link from the 12 VAC interface transmitter 3204. The 120 VAC interface receiver 3202 controls the dimming level of the lighting device 2704 base at least in part on the control data received from the 12 VAC interface transmitter 3204.

In other embodiments, the 12 VAC interface transmitter 3204 and the 120 VAC interface receiver 3202 can be replaced with transceivers. This may be useful to facilitate acknowledgment and retry algorithms to create a more robust link. For instance, the transceiver 3204 attached to the 12 VAC two-wire path would decode the signal on the 12 VAC line, and transmit its contents (if appropriate) to the transceiver 3202 attached to the 120 VAC line. The transceiver 3202, would in turn respond with an acknowledge transmission, indicating that the signal was received and the checksum was good. If the transceiver 3204 attached to the 12 VAC line does not receive the acknowledge signal, it would again transmit the command. This process could continue for a specified number of retries.

Figure 33:
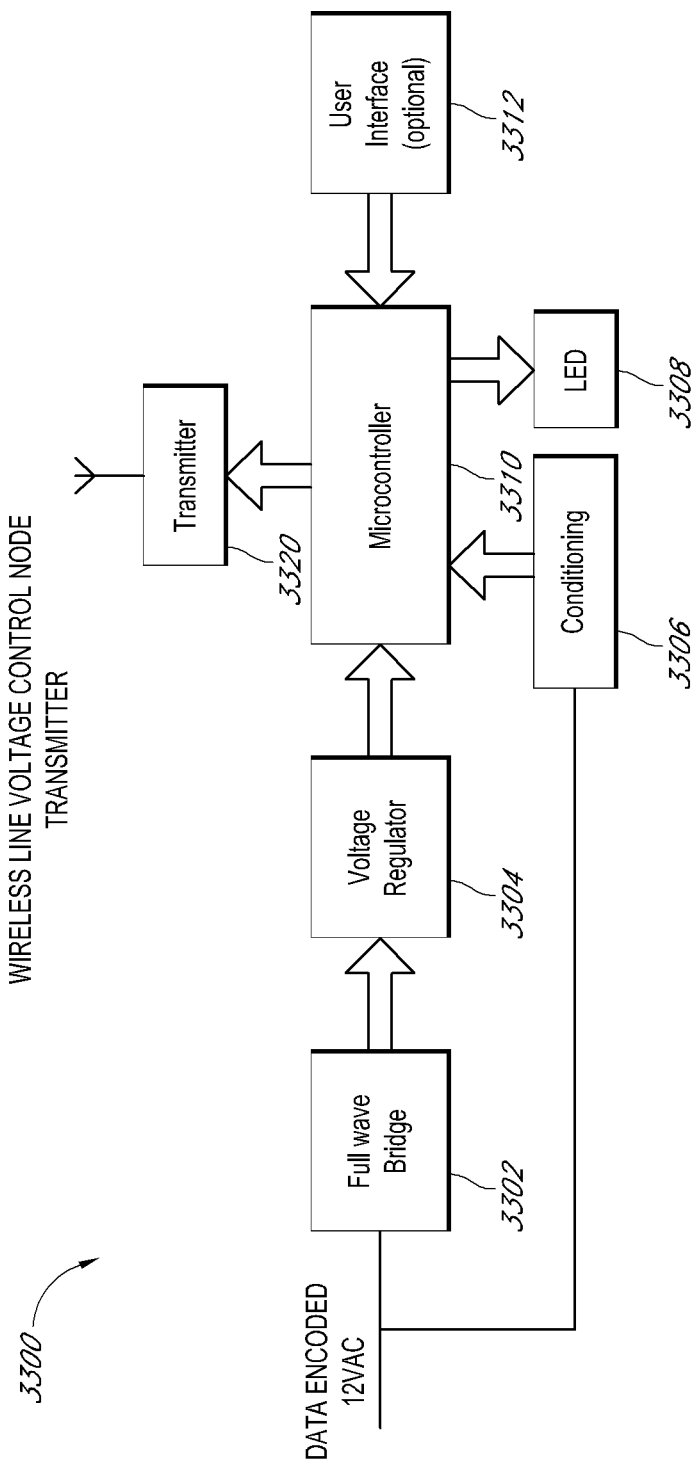
FIG. 33 is a block diagram of an exemplary transmitter for a wireless line voltage control node, according to certain embodiments.

FIG. 33 is a block diagram of an exemplary wireless control node transmitter 3300 for the wireless line voltage control node 3200. The control node transmitter 3300 is assigned a lighting zone via the operator interface panel 308 as described herein. In the illustrated embodiment, the control node transmitter 3300 comprises a full wave rectifier 3302, a voltage regulator 3304, a conditioning circuit 3306, a microcontroller 3310, and a radio frequency (RF) transmitter or transceiver 3320. The full wave rectifier 3302, the voltage regulator 3304, the conditioning circuit 3306, and the microcontroller 3310 are the same or substantially similar to the circuitry described herein with respect to FIGS. 61-64 for single and multi-channel lighting modules 6100, 6200, 6300, 6400. In the lighting modules 6100, 6200, 6300, 6400, the microcontroller controls the LED driver to vary the brightness of the LED, whereas the control node transmitter 3300 controls the RF transmitter or transceiver 3320.

The control node transmitter 3300 further comprises an optional user interface 3312, which permits the user to manually adjust the lighting devices 2704 from the location of the transmitter 3300. Further, the user interface 3312 can also be used to determine whether the RF link is operational.

The control node transmitter 3300 further comprises a low power LED 3308, not intended for illumination. The LED 3308 has the ability to "flash out" its serial number in a manner the same as or substantially similar to that of lighting modules 4004 described in further detail herein with respect to FIGS. 40-42.

Figure 34:
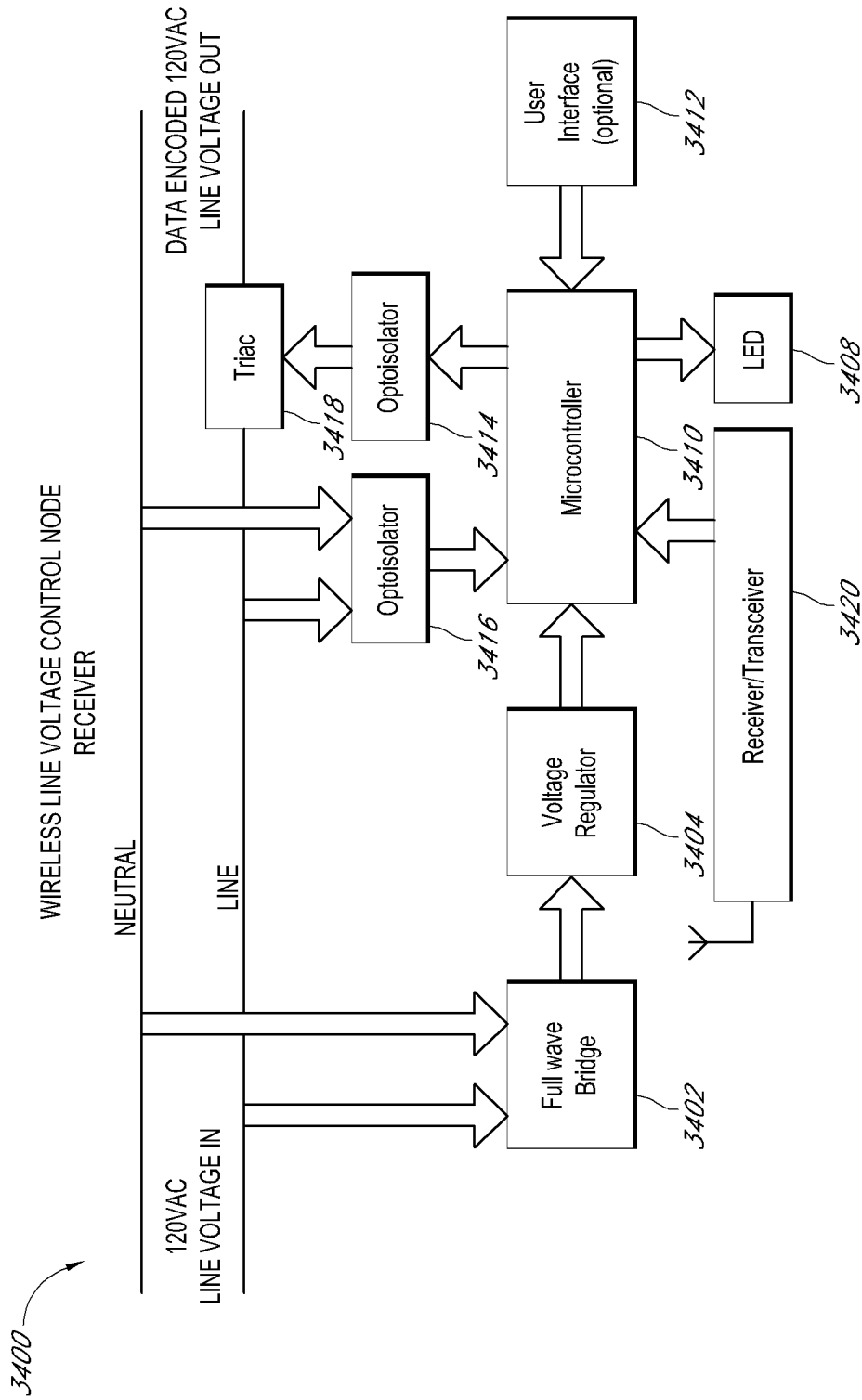
FIG. 34 is a block diagram of an exemplary receiver for a wireless line voltage control node, according to certain embodiments.

FIG. 34 is a block diagram of an exemplary wireless control node receiver 3400 for the wireless line voltage control node 3200. In the illustrated embodiment, the control node receiver 3400 comprises a full wave rectifier 3402, a voltage regulator 3404, a microcontroller 3410, a triggering optoisolator 3414, a detection optoisolator 3416, a triac 3418, and a radio frequency (RF) receiver or transceiver 3420. The full wave rectifier 3402, the voltage regulator 3404, the microcontroller 3410, the triggering optoisolator 3414, the detection optoisolator 3416, and the triac 3418 are the same or substantially similar to the circuitry described herein for the wired line voltage control node 2700, 2800 with respect to FIGS. 27 and 28. The wired control nodes 2700, 2800 comprise circuitry to decode the data from the data encoded 12 VAC two-wire path 336, whereas the wireless control node receiver 3400 receives the control information over the RF link through the RF receiver or transceiver 3420. In addition, power for the microcontroller 3410 and RF receiver 3420 is derived from the 120 VAC line voltage. A simple linear regulation approach is shown. However, it should be noted that this is just one method to step down the rectified line voltage, which is well over 100 V, to a voltage acceptable to the microcontroller 3410. Other methods and devices such as switching converters, for example, can also be used as would be known to one of skill in the art from the disclosure herein.

Whereas the optoisolators 2814, 2816 in the wired line voltage control node 2800 were used for safety considerations, galvanic isolation is optional for the control node receiver 3400 because there is no low voltage input. Therefore, in an embodiment, the optoisolators 3414, 3416 are optional. Due to line voltage surges and other disturbances, the optoisolators 3414, 3416 may be useful to protect circuitry in the control node receiver 3400. The dimming method of controlling the output voltage via the conduction angle of the triac 2818 as described in the wired control node 2700, 2800 is the same as or substantially similar to the approach used with the control node receiver 3400. In the control node receiver 3400, the microcontroller 3410 delays the trigger signal to the triac 3418 to control the output voltage used to dim the lighting devices 2704.

The control node receiver 3400 further comprises an optional user interface 3412 which permits the user to manually adjust the lighting devices 2704 from the location of the control node receiver 3400. Further, the user interface 3412 can also be used to determine whether the RF link is operational.

The control node receiver 3400 further comprises a low power LED 3408, not intended for illumination. The LED 3408 has the ability to "flash out" its serial number in a manner the same as or substantially similar to that of lighting modules 4004 described in further detail herein with respect to FIGS. 40-42.

The above embodiment has been described with respect to dimming functionality for the lighting devices 2704. In other embodiments of the control node receiver 3400, a Z-wave device and/or a relay device could be used for non-dimming applications, such as zone control. For example, the wireless line voltage control node 3200 could control ON/OFF for a zone comprising a fountain or the like.

The wireless line voltage control node 3200 is assigned a zone number so that it can be controlled by the signals LIGHTING POWER/CONTROL 1 and LIGHTING POWER/CONTROL2 via the two-wire path 336. Because the wireless line voltage control node 3200 comprises the receiver 3400 and the transmitter 3300, it is possible to have multiple control architectures.

Figure 35:
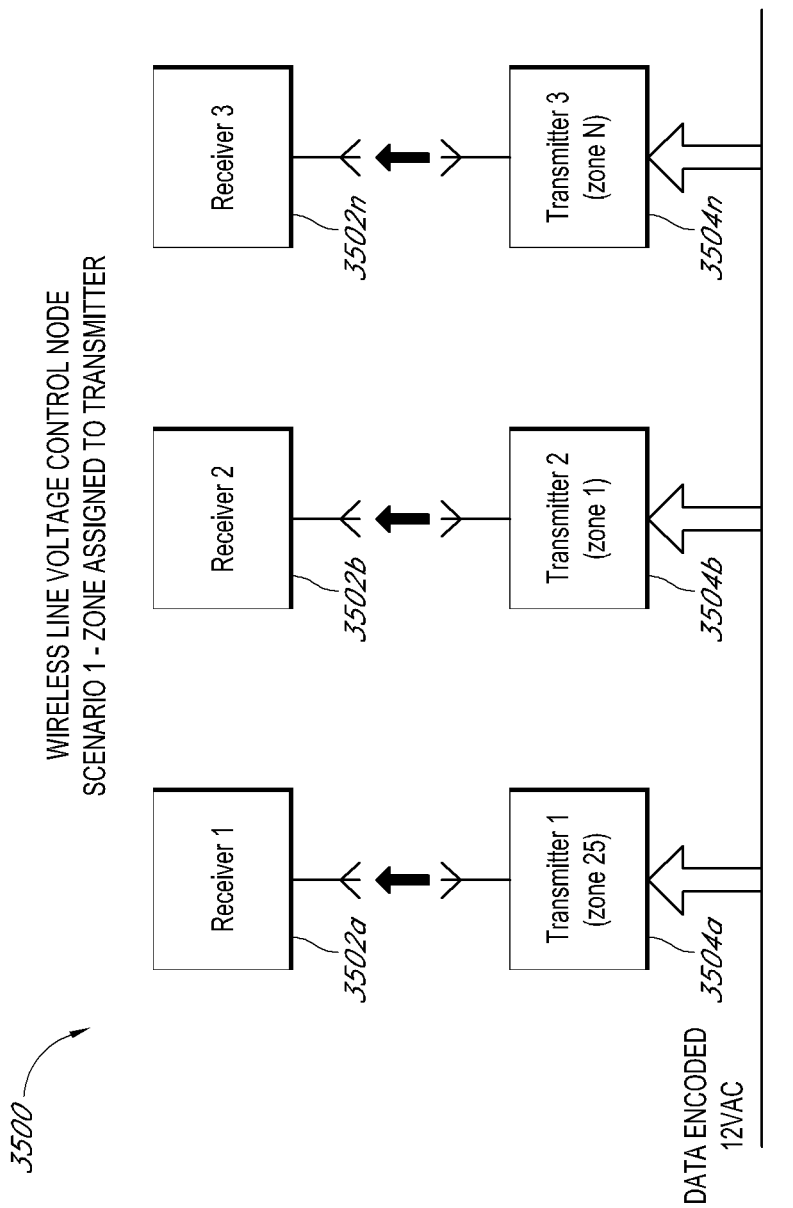
FIG. 35 is a block diagram of an exemplary lighting system for a wireless line voltage control node, according to certain embodiments.

FIG. 35 is a block diagram of a first exemplary lighting system 3500 for the wireless line voltage control node 3200. The lighting system 3500 comprises a plurality of transmitters 3504*a*, 3504*b* . . . 3504*n* and a corresponding plurality receivers 3502*a*, 3502*b* . . . 3502*n*. Each receiver 3502 is paired to a corresponding transmitter 3504 to avoid crosstalk with other receivers. Each transmitter in the plurality of transmitters 3504 is assigned a zone number. Since the transmitters 3504 electrically couple to the 12 VAC data encoded two-wire path 336, each transmitter 3504 can "filter" the commands from the incoming data by determining the zone associated with the command and send only those meant for its corresponding receiver 3502 over the RF link.

Figure 36:
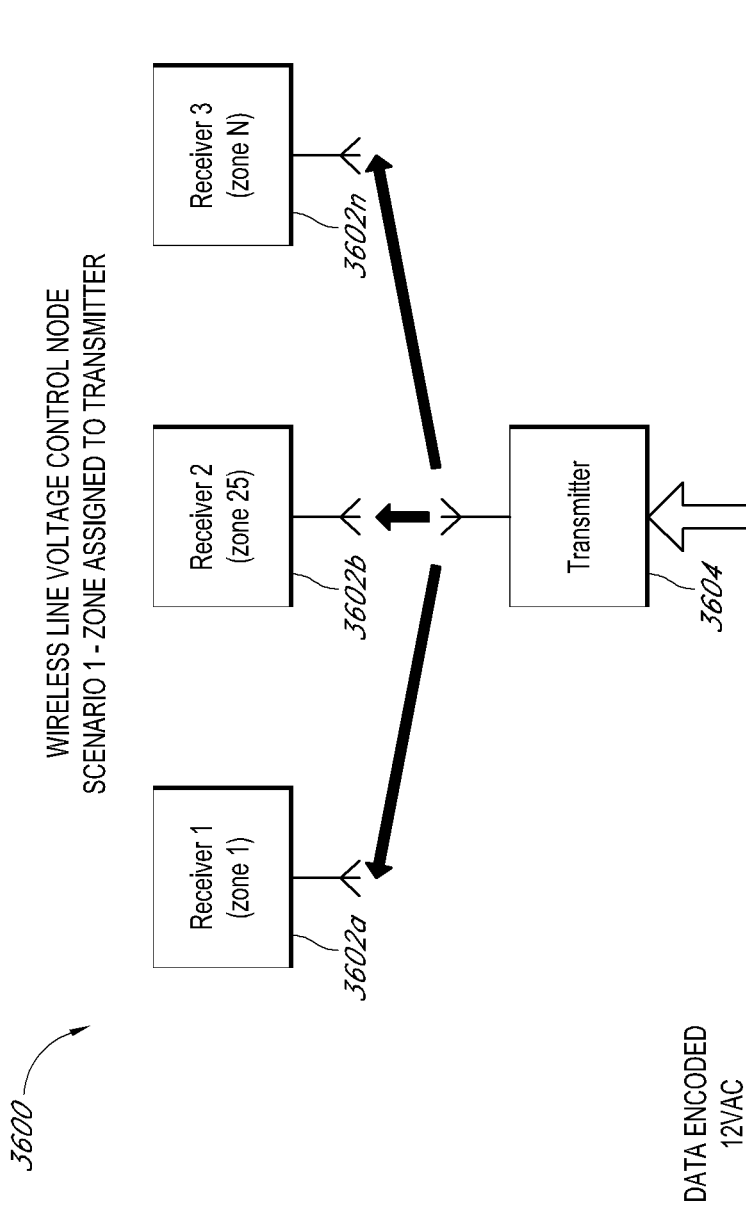
FIG. 36 is a block diagram of an exemplary lighting system for a wireless line voltage control node, according to other embodiments.

FIG. 36 is a block diagram of a second exemplary lighting system 3600 for the wireless line voltage control node 3200. The lighting system 3600 comprises a transmitter 3604 and a plurality receivers 3602a, 3602b . . . 3602n. Each receiver 3602a, 3602b . . . 3602n is assigned a zone. The transmitter 3604 transmits all commands it receives, without filtering them, because it does not know which zone has been assigned to the receivers 3602. If different zone numbers are assigned to the receivers 3602, then a single transmitter 3604 could service multiple receivers 3602 by sending every command it receives over the RF link. The "filtering" would be done at each receiver 3602. Advantageously, the star architecture embodiment illustrated in FIG. 36 avoids the user having to purchase transmitters 3604 for each receiver 3602 deployed.

To utilize the star architecture approach illustrated in FIG. 36, the user would assign a zone number to each receiver 3602 by entering the zone number into the receiver 3602. In a first embodiment, the user could enter the zone number using the optional user interface 3412 and LED 3408. In a second embodiment, the receiver 3602 has a low voltage input provided to program the zone number using the same or substantially similar method as is used to program zone numbers in the single and multi-channel lighting modules 6100, 6200, 6300, 6400 described herein with respect to FIGS. 61-64. In a third embodiment, the receiver 3602 further comprises dip switches and the user selects the settings on the dip switches to program the receiver's zone number. In a fourth embodiment, the receiver 3602 learns the zone number contained in any command it receives as long as a "learn" button is selected on the receiver 3602. In a fifth embodiment, the receiver 3602 receives a "teach zone" RF command that would be accepted for a short time after power up. Other approaches can be thought of by those skilled in the art from the disclosure herein.

In embodiment illustrated in FIG. 35, the zone number is stored in each transmitter 3504 and the user would assign a zone number to each transmitter 3504 by entering the zone number into the transmitter 3504. One approach is to provide the transmitter 3504 with the low voltage input to program the zone number using the same or substantially similar method as is used to program zone numbers in the single and multi-channel lighting modules 6100, 6200, 6300, 6400 described herein with respect to FIGS. 61-64. In other embodiments, any of the methods described above with respect to programming the zone number in the receiver 3602 can be used for the transmitter 3504.

Frequency of operation—In embodiments in the US, the most common frequencies for the RF link communications would be the ISM bands of 902-928 MHZ, 2.4 GHZ and 5.8 GHZ. Transmission in the 260-470 MHZ band is allowed but at a much lower power level. In most of Europe, the bands would be 433 MHZ, 868 MHZ, and 2.4 GHZ. In other embodiments, other frequency bands may be allowed depending on the country.

Standards—In some embodiments, wireless standards such as the various parts of 802.11 could be used. These can include, for example, Zigbee®, Bluetooth®, and the like.

Pairing—As described herein, the embodiment illustrated in FIG. 35 comprises at least a first transmitter 3504 and a first receiver 3502 that are paired forming a first pair to reduce crosstalk between the other receivers 3502 and transmitters 3504 not in the first pair. In an embodiment, pairing can be achieved by embedding an address in the RF data that must match the address of a particular receiver 3502 in order for the receiver 3502 to accept the data. In another embodiment, each receiver/transmitter pair 3504/3502 may operate at a different frequency in the band. In an embodiment comprising a direct sequence spread spectrum device, each receiver/transmitter pair 3504/3502 may use a different correlation key. In an embodiment comprising a frequency hopping spread spectrum system, each receiver/transmitter pair 3504/3502 may use a different hopping sequence, speed, or set of frequencies. In the embodiment illustrated in FIG. 36, pairing between the transmitter 3604 and the plurality of receivers 3602a, 3602b . . . 3602n can be used to reduce crosstalk between the lighting system 3600 and another nearby lighting system.

The lighting controller 300 described with respect to FIGS. 3-17 transforms the line voltage, such as 120 VAC to a low voltage, such as 12 VAC, to control low voltage devices 304. The lighting controller 1800 described with respect to FIGS. 18-26 uses the line voltage, such as 120 VAC, to control 120 VAC devices 1804, 2704. The control nodes 2700, 2800, 3200 described with respect to FIGS. 27-36 permit the low voltage controller, such as the lighting controller 300, to control 120 VAC devices 1804, 2704. In other embodiments, a low voltage control node permits a high voltage system, such as the lighting controller 1800 to control low voltage devices 304, such as 12 VAC lighting devices 304. Both wired and wireless embodiments of a low voltage control node are described below with respect to FIGS. 37 and 38.

Figure 37:
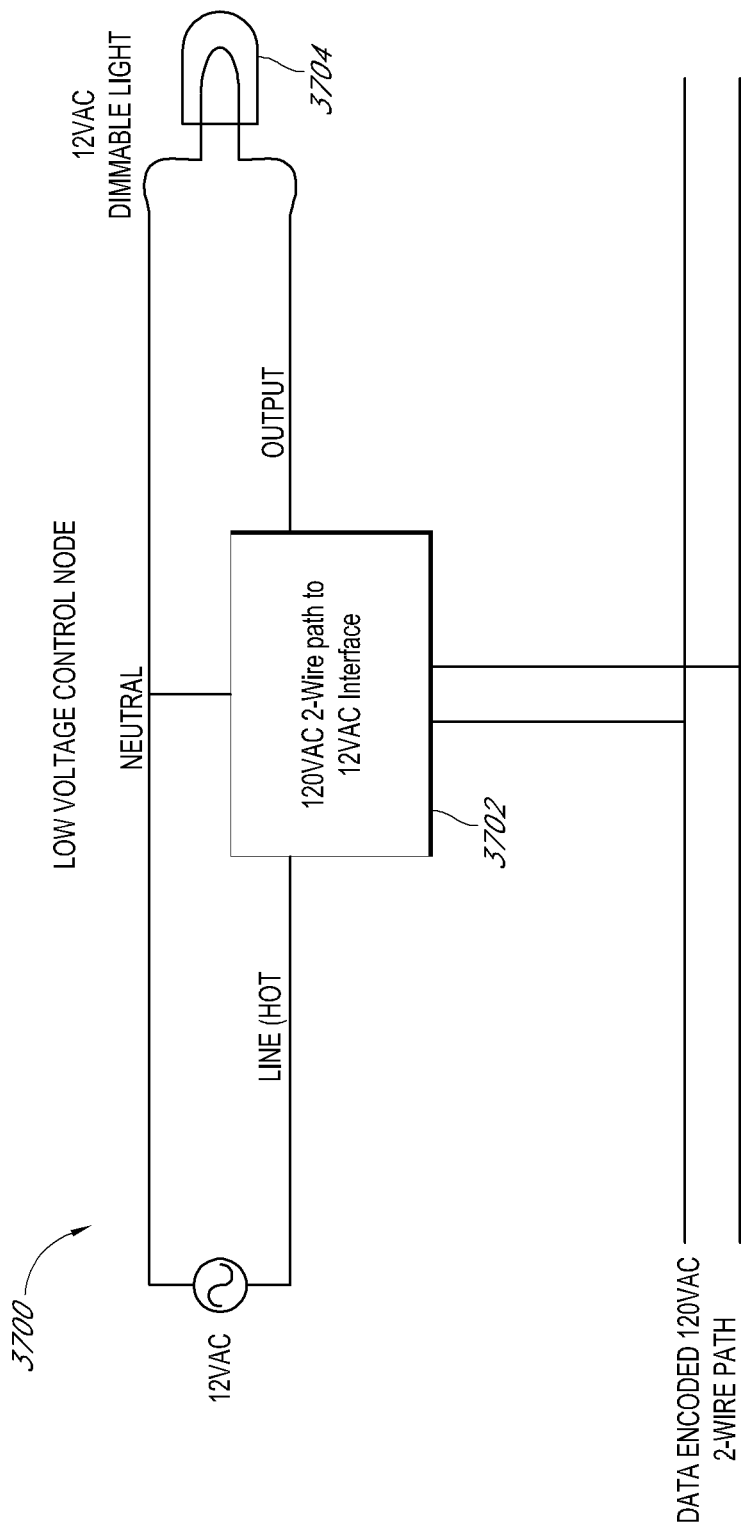
FIG. 37 is a block diagram of an exemplary wired low voltage control node, according to certain embodiments.

FIG. 37 is a block diagram of an exemplary wired low voltage control node 3700. The low voltage control node 3700 electrically couples to the two-wire path 1836 and receives the data encoded line voltage power signals from the two-wire path 1836. In an embodiment, the line voltage power signals are approximately 120 VAC 60 Hz. In other embodiments, the data encoded line voltage power signals can be an approximately 110 VAC 60 Hz, 220 VAC 50 or 60 Hz, 230 VAC 50 or 60 Hz, 240 VAC 50 or 60 Hz, or the like.

The wired line voltage control node 3700 is assigned a lighting zone via the operator interface panel 308 as described herein. Based on the information contained on the two-wire path 1836 addressed to the low voltage control node 3700, the line voltage control node 3700 controls 12 VAC devices 304. In an embodiment, the 12 VAC devices 304 are dimmable lighting devices.

The architecture of the wired low voltage control node 3700 is similar to the architecture of the wired line voltage control node 2800 described in FIG. 28. The wired line voltage control node 2800 receives commands from the data encoded 12 VAC two-wire path 336 and provides lighting control over the 120 VAC line voltage signals to 120 VAC devices 1804, 2704, whereas the wired low voltage control node 3700 receives commands from the data encoded 120 VAC two-wire path 1836 and provides lighting control over the 12 VAC power lines to 12 VAC lighting devices 304. The triac 2818 in the line voltage control node 2800 receives the 120 VAC line voltage, whereas a corresponding triac in the low voltage control node 2700 receives the 12 VAC low voltage.

Figure 38:
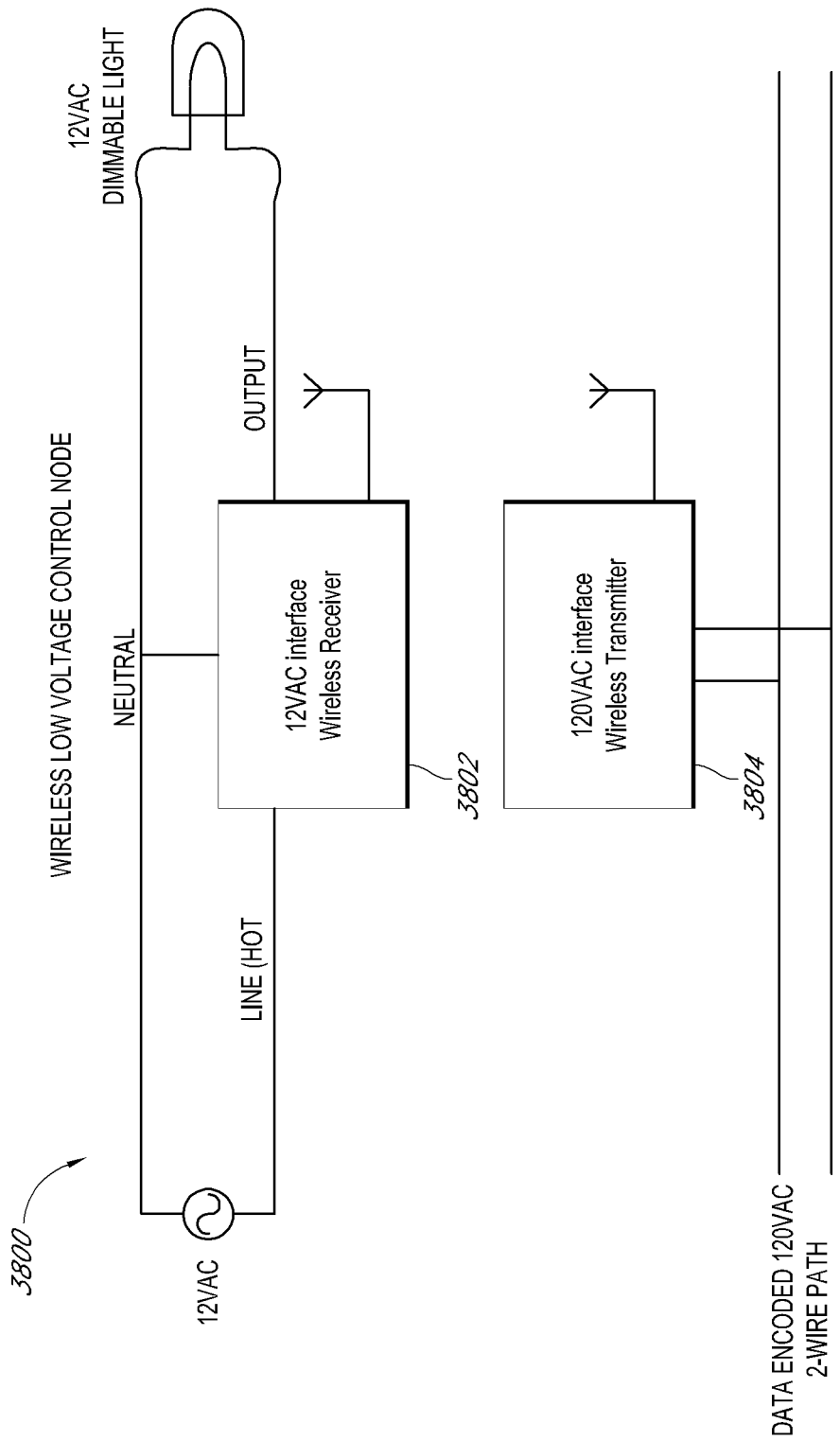
FIG. 38 is a block diagram of an exemplary wireless low voltage control node, according to certain embodiments.

FIG. 38 is a block diagram of an exemplary wireless low voltage control node 3800 comprising a 12 VAC interface wireless receiver 3802 and a 120 VAC interface wireless transmitter 3804 communicating over an RF link. The 120 VAC interface wireless transmitter 3804 electrically connects to the data encoded 120 VAC two-wire path 1836 and receives control data via the two-wire path 1836. The 120

VAC interface wireless transmitter 3804 sends over the wireless link the control commands to the 12 VAC interface wireless receiver 3802. The 12 VAC interface wireless receiver 3802 electrically connects to the 12 VAC line voltage and the 12 VAC lighting device 304, and receives the control data over the wireless link from the 120 VAC interface wireless transmitter 3804. The 12 VAC interface wireless receiver 3802 controls the dimming level of the lighting device 304 based at least in part on the control data received from the 120 VAC interface wireless transmitter 3804.

In an embodiment, the architecture of the 12 VAC interface wireless receiver 3802 is similar to the architecture of the wireless line voltage control node receiver 3400, and the architecture of the 120 VAC interface wireless transmitter 3804 is similar to the architecture of the wireless line voltage control node transmitter 3300. The wireless line voltage control node transmitter 3300 receives the control commands from the 12 VAC two-wire path 336 and transmits over the RF link an RF signal based at least in part on the control commands. The wireless line voltage control node receiver 3400 receives the RF signal over the RF link and provides power control over the 120 VAC lines based on the received commands to the 120 VAC lighting devices 2704. In a complementary manner, the 120 VAC interface wireless transmitter 3804 receives the control commands from the 120 VAC two-wire path 1836 and transmits over the RF link an RF signal based at least in part on the control commands. The 12 VAC interface wireless receiver 3802 receives the RF signal over the RF link and provides power control over the 12 VAC lines to 12 VAC lighting devices 304.

In other embodiments, the 120 VAC interface transmitter 3804 and the 12 VAC interface wireless receiver 3802 can be replaced with transceivers, as described herein with respect to FIGS. 32-34. In other embodiments, each 12 VAC interface wireless receiver 3802 can be paired with a corresponding 120 VAC interface wireless transmitter 3804, as described herein with respect to FIG. 35. In further embodiments, a plurality of 12 VAC interface wireless receivers 3802 can be paired with one 120 VAC interface wireless transmitter 3804 in a star architecture as described herein with respect to FIG. 36.

Figure 39:
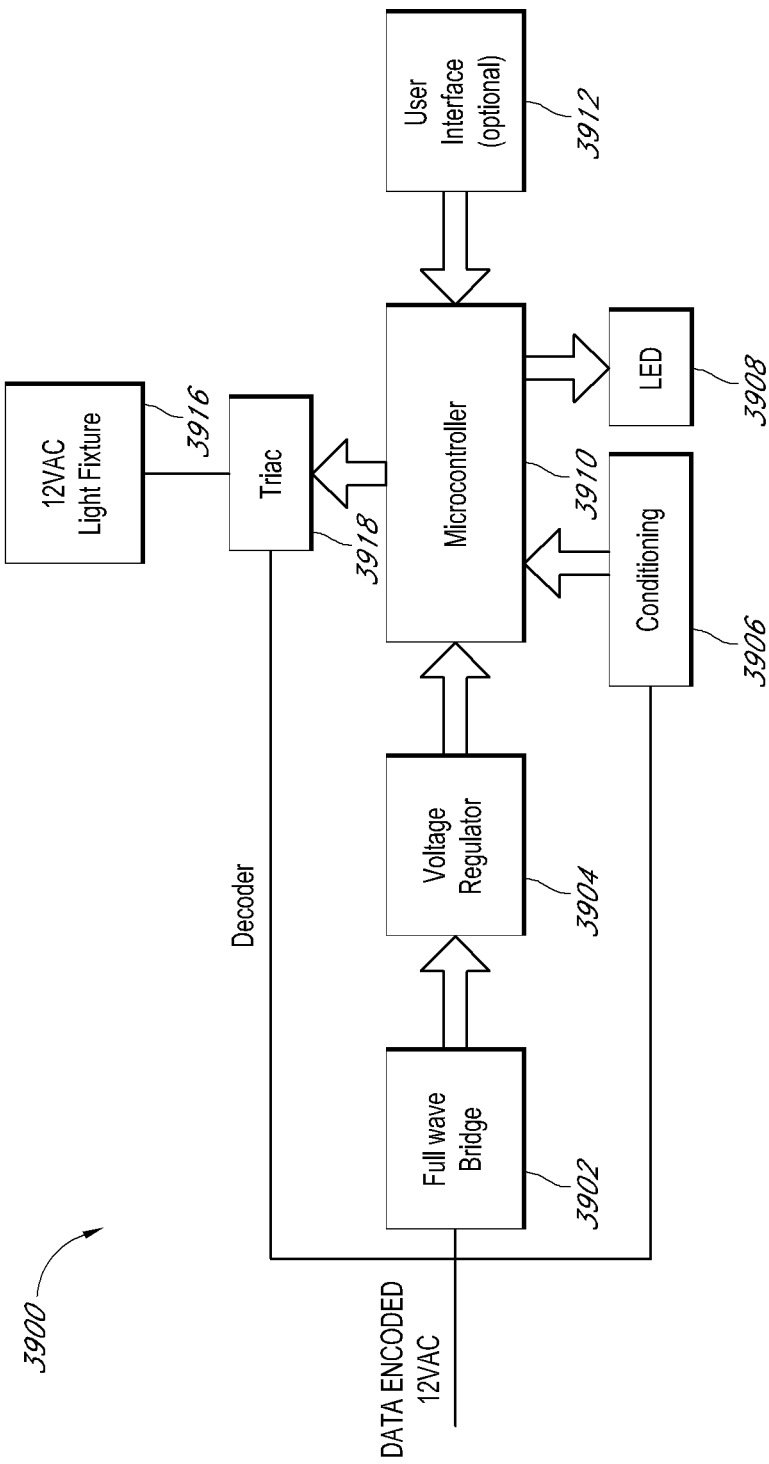
FIG. 39 is a block diagram of a low voltage decoder, according to certain embodiments.

FIG. 39 is a block diagram of an exemplary low voltage decoder 3900 configured to permit the lighting controller 300 to dim a lighting device 3916. In an embodiment, the lighting device 3916 comprises a wide variety of 12 VAC lighting devices, such as incandescent lights, fluorescent lights, LEDs, and the like. The low voltage controller 3900 comprises a full wave rectifier 3902, a voltage regulator 3904, a conditioning circuit 3906, a microcontroller 3910, and a triac 3918.

The full wave rectifier 3902, the voltage regulator 3904, the conditioning circuit 3906, the microcontroller 3910 are the same as or substantially similar to the circuitry described herein with respect to FIG. 28 for the wired line voltage control node 2800 and as described herein with respect to FIGS. 61-64 for single and multi-channel lighting modules 6100, 6200, 6300, 6400. In the lighting modules 6100, 6200, 6300, 6400, the microcontroller controls the LED driver to vary the brightness of the LED. Both the line voltage control node 2800 and the low voltage controller 3900 control the triac conduction angle to control dimming. In the line voltage control node 2800, the triac 2818 receives the 120 VAC line voltage, whereas in the low voltage controller 3900 the triac 3918 receives the data encoded 12 VAC low voltage signals from the two-wire path 336. Because the triac 3918 receives the low voltage signal as opposed to a high voltage signal, no optical isolation is used.

In a manner similar to that described in FIGS. 28-31, the microcontroller 3910 triggers the triac 3918 with a delay time based at least in part on the desired output intensity of the 12 VAC lighting device 3916. The microcontroller 3910 creates output voltages approximately equal to or less than the input line voltage by delaying the triac trigger.

In the embodiment illustrated in FIG. 39, the triac 3918 is used as the dimming device. The triac 3918 can be, for example, a BTA208-800 from NXP Semiconductor and the like. In other embodiments, the dimming device can be, for example, MOSFETs, Bipolar Junction Transistors (BJTs), and Insulated Bipolar Transistors (IGBTs), and the like. In yet other embodiments, the triac 3918 could be replaced with a relay to provide simple ON/OFF control for a zone comprising a fountain, or the like.

The low voltage decoder 3900 further comprises an optional user interface 3912 having buttons, slide switches, or other forms of user controls to permit the user to manually control the lighting device 3916, in addition to the commands originating from the user interface panel 308.

The low voltage decoder 3900 further comprises an LED 3908. In an embodiment, the LED 3908 is a low power LED not intended for illumination. The LED 3908 has the ability to "flash out" its serial number in a manner the same as or substantially similar to that of lighting modules 4004 described in further detail herein with respect to FIGS. 40-42.

Figure 40:
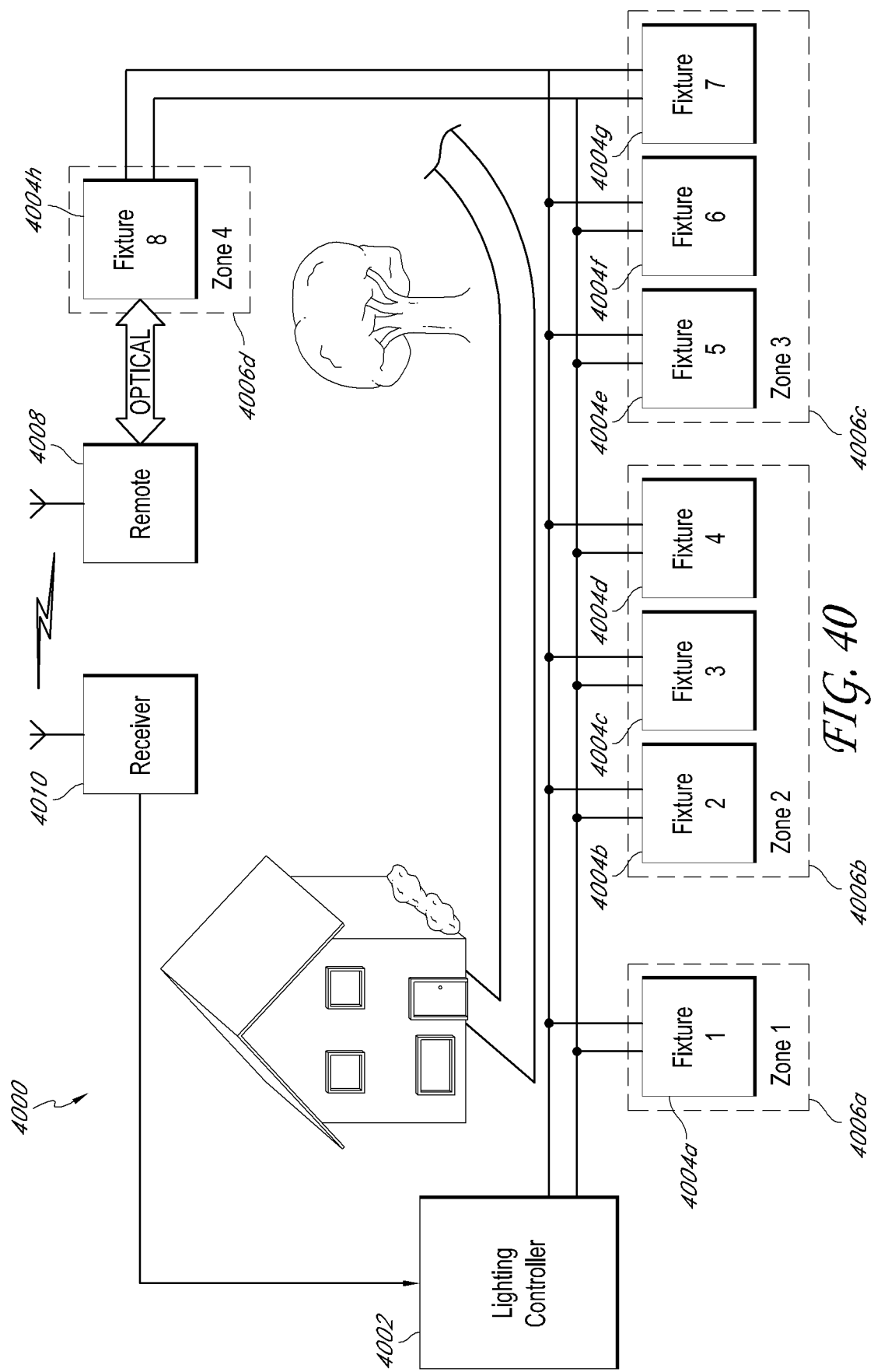
FIG. 40 illustrates an exemplary lighting system for controlling and reassigning lighting zones using a remote device, according to certain embodiments.

FIG. 40 illustrates an exemplary lighting system 4000. The lighting system 4000 comprises a lighting controller 4002 connected to a plurality of lighting modules 4004 through a two-wire interface. The lighting controller 4002 comprises the power supply 302 and the user interface panel 308, which is the same or similar to that as described herein with respect to FIG. 3. The lighting fixtures 4004 are grouped into zones 4006.

In the example illustrated in FIG. 40, zone 1 4006a comprises lighting fixture 4004a, zone 2 4006b comprises lighting fixtures 4004b, 4004c, 4004d, zone 3 4006c comprises lighting fixtures 4004e, 4004f, 4004g, and zone 4 4006d comprises lighting fixture 4004h. In other embodiments, the lighting system 4000 can be configured with more or less zones 4006 and/or with more or less lighting fixtures 4004 in each zone 4006. Additional fixtures need not be wired to the end of the line. Instead, the user may elect to "branch" or "T" connect another leg of lights anywhere along the 2-wire path.

The lighting system 4000 further comprises a remote device 4008 and a wireless receiver 4010 to send addresses/data/commands to the lighting modules 4004. In an embodiment, the remote 4008 can be a digital device, a smart phone, an iPhone, an application for a smartphone, an application for an iPhone, or the like. The wireless receiver 4010 wirelessly connects to the remote 4008 through radio frequency (RF) transmissions and electrically connects through a wire to the lighting controller 4002.

In an embodiment, the remote 4008 sends addresses/data/commands to the receiver 4010 using a standard wireless protocol, such as, for example, Zigbee® or Bluetooth®. The receiver 4010, in an embodiment, operates in a license or a license-free band of frequencies. Examples of license-free bands in the United States are 270 MHz to 460 MHz; and the Industrial, Scientific, and Medical Band, 902 MHz to 928 MHz, and 2.4 GHz. The receiver 4010 can be a single or a dual-conversion receiver disclosed with reference to wireless technology as is known to one of skill in the art recognized from the disclosure herein. Other communication possibilities, like cell phone, applications for a cell phone or personal digital assistant (PDA) or other personal computing device, optical, wired, satellite or the like, can be used to communicate with the remote 4008.

The receiver 4010 receives the addresses/data/commands from the remote 4008 and transmits them to the lighting controller 300 via wire or other communication medium. The lighting controller 300 receives the addresses/data/commands from the receiver 4010, processes the commands and sends data and commands on the two-wire path to the addressed lighting modules 4004, where the commands are decoded and performed by the addressed lighting modules 4004.

For example, an operator can be standing in front of a lighting module 4004 or a zone 4006 can turn the lighting modules 4004 ON or OFF, adjust the brightness, determine what hue from the lights looks best, and the like. As the operator enters commands, the commands are translated to allow the program at the lighting controller 4002 to be responsive. The lighting controller 4002 then sends data embedded in the power signal to the fixtures 4004 or the zones 4006. Thus, the remote 4008 works interactively with the power supply 302, for example, via the receiver 4010, to mix the red, green, and blue coefficients of any particular lighting module 4004 or group of lighting modules 4006.

In another embodiment, the homeowner talks on the phone to a remote programmer who enters the information in a computing device, such as a browser or application, which through known Internet or other communication protocols, updates the lighting module behavior. Although disclosed with reference to several embodiments, a skilled artisan would know from the disclosure herein many possible interactive methods of using remote computing devices to program module behavior.

Figure 41:
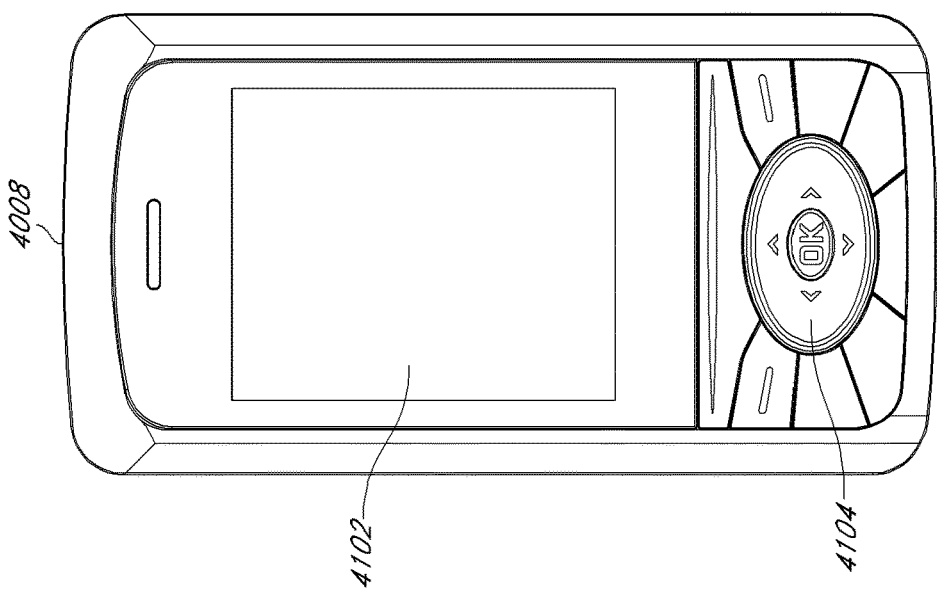
FIG. 41 depicts a remote device, according to certain embodiments.

FIG. 41 depicts an embodiment of the remote device 4008. In one embodiment, the remote 4008 is a key fob type device. In another embodiment, the remote 4008 is a larger hand-held device. The remote 4008 comprises a display 4102 to provide operator feedback and input buttons 4104 to receive operator input.

Figure 42:
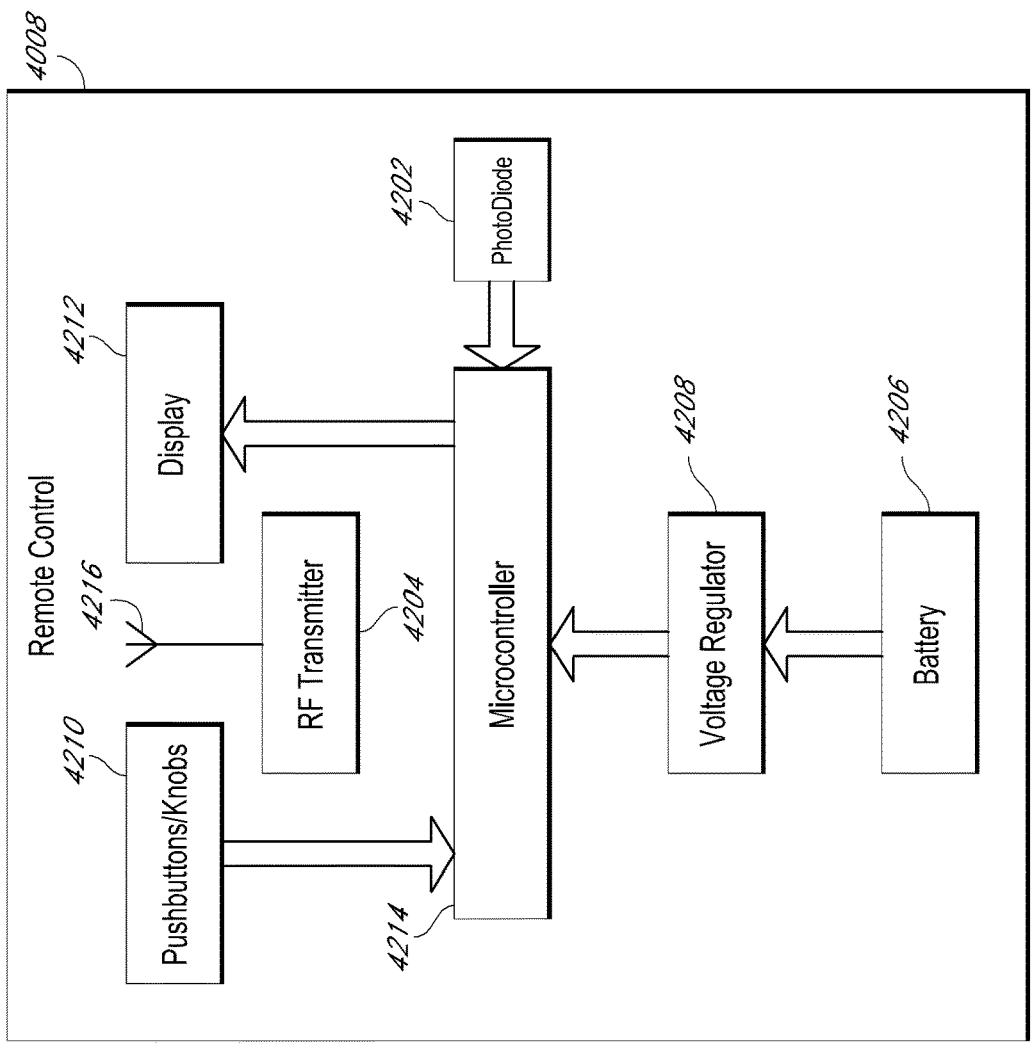
FIG. 42 is a block diagram of an exemplary remote device, according to certain embodiments.

FIG. 42 is a block diagram of an exemplary remote device 4008, according to an embodiment. The remote 4008 comprises a photo diode 4202, an RF transmitter 4204, a battery 4206, a voltage regulator 4208, an operator interface 4210, a display 4212, and a computer 4214 with associated memory (not shown). In an embodiment, the operator interface 4210 comprises buttons, knobs, and the like, although touch screen, voice or other user interaction could be implemented. The photo diode 4202 optically couples to the lighting module 4004 and electrically communicates to the processor 4214. The processor 4214 also electrically communicates with the operator interface 4210, the display 4212 and the RF transmitter 4204.

In an embodiment, the photo diode is a PDB-C134 available from Advanced Photonix Inc., or the like. A phototransistor could also be used, but would have a slower response time. The RF transmitter 2004 can be a CC1050 available from Texas Instruments, or the like.

The computer 4214 comprises devices similar to those disclosed in the foregoing.

The battery 4206 provides a power signal to the voltage regulator 4208, which provides the proper power waveform to power the circuitry within the remote 4008, as is known to one of skill in the art from the disclosure herein.

Often, the lighting fixtures 4004 are assigned their address or their lighting zone 4006 before they are placed in a location. The fixture programming port 318 on the operator interface panel 308 can be used to program an address and/or zone 4006 into the lighting module 4004. Once the fixtures are located, such as in the ground, mounted to a wall, or the like, it can be cumbersome to disconnect or uninstall the fixture 4004 to bring it proximate to the fixture programming port 318 for zone reallocation. In an embodiment, the optical interface between the lighting modules 4004 and the remote 4008 can advantageously be used to change the lighting group 4006 of the fixtures 4004 without disconnecting or uninstalling it.

In an embodiment, the lighting modules 4004 comprise at least one light emitting diode (LED). The user sends a command to the lighting controller 300 to instruct every lighting module 4004 to flash or strobe its address using its at least one LED by selecting the appropriate button or knob on the remote's operator interface 4210.

Each lighting module 4004 comprises a unique address in addition to a group or zone number. In one embodiment, the lighting module address comprises a 16-bit address, having approximately 65,000 unique values. Other embodiments of the lighting module address can have more or less bits. Commands from the remote 4008 can target a specific lighting module 4004 using the unique address or a group of lighting modules 4004 using a zone address to turn the module 4004 ON/OFF, dim, brighten, adjust the color, adjust the hue, adjust the intensity, or the like.

As described above, the remote 4008 transmits the command to the wireless receiver 4010 using the wireless protocol. The wireless receiver 4010 receives the command and electrically converts the signal, which is then electrically sent to the power supply 302. In an embodiment, the receiver 4010 converts the RF signal to a baseband signal. The power supply 302 receives and interprets the command, and electrically sends a command to the lighting modules 4004 over the two-wire path to flash their addresses. For example, the LED could turn ON to represent a 1 address bit and turn OFF to represent a 0 address bit.

The user selects a lighting module 4004 to assign to a different zone 4006 by pointing the remote 4008 at the selected lighting module 4004 such that the photo diode 4202 receives the optical address from the flashing LED. The photo diode 4202 converts the optical address into an electrical signal and sends the address to the processor 4214.

In an embodiment where the remote 4008 is a smart phone comprising a camera, an iPhone comprising a camera, an application for a smartphone comprising a camera, an application for an iPhone comprising a camera, or the like, the camera receives the optical address from the flashing LED. The smartphone or iPhone and associated circuitry known to one of skill in the art from the disclosure herein converts the optical address into an electrical signal and sends the address to the processor 4214.

The processor 4214 sends the address to the RF transmitter 4204, where it is up converted and transmitted via an antenna 4216 on the remote 4008 to the wireless receiver 4010. The wireless receiver 4010 receives the RF transmission, down converts it, and transmits the address to the lighting controller 300. The power supply 302 in the lighting controller 300 receives the address and transmits a command to the selected lighting module 4004 to change its zone 4006. When the selected lighting module 4004 receives and executes the command, the lighting modules 4004 stop flashing their addresses.

Alternatively, in another embodiment, the module 4004 is numbered and the operator manually enters the number into the remote 4008. In yet another embodiment, where the remote 4008 is a smart phone comprising a camera, an iPhone comprising a camera, an application for a smartphone comprising a camera, an application for an iPhone comprising a camera, or the like, the address of the module 4004 is bar coded and the smartphone or iPhone camera reads the bar code from the module 4004.

In another embodiment, the lighting modules 4004 comprise a photo diode and the remote 4008 comprises an LED in addition to the RF transmitter 4204, the operator interface 4210, the display 4212, the processor 4214, the voltage regulator 4208 and the battery 4206. The remote 4008 optically sends commands and data by flashing or strobing its LED, which are received by the photo diode in the lighting module 4004, similar to the way a TV receives a signal from a handheld TV remote. The flashing would typically be so rapid, that it would not be perceived by the human eye. The remote 4008 also transmits data and commands to the RF receiver 4010 using the wireless protocol, which in turn sends the messages via wire to the lighting controller 300, as described above.

Figure 43:
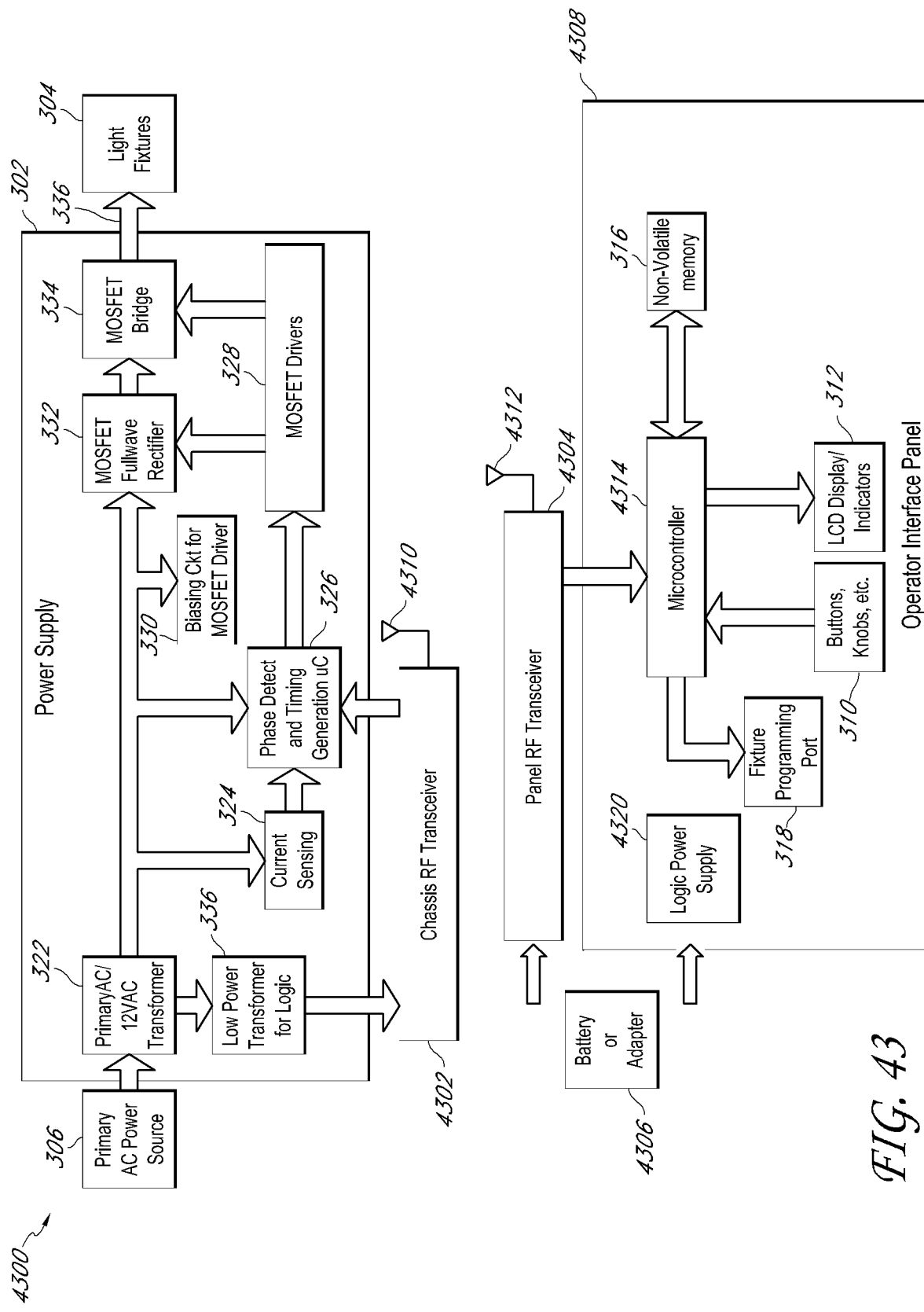
FIG. 43 is a block diagram of an exemplary lighting controller comprising a remote operator interface panel, according to certain embodiments.

Referring to FIG. 3, the lighting controller 300 comprises the user interface panel 308 electrically coupled to the power supply 302 and mechanically attached to the chassis. In other embodiments, the user interface panel 308 can be remoted wirelessly. FIG. 43 is a block diagram of an exemplary lighting controller 4300 comprising a remote operator interface panel 4308, a power supply 302, and a pair of RF transceivers 4302, 4304 providing an RF communication link between the remote panel 4308 and the power supply 302. In an embodiment, the RF communication protocol is implemented so that the remote user interface panel 4308 functions the same as the integral user interface panel 308. The panel RF transceiver 4304 electrically connects to the panel 4308 and the chassis RF transceiver 4302 electrically connects to the power supply 302 in the chassis.

In an embodiment, the panel transceiver 4304 comprises an integrated battery 4306 to power the user interface panel 4308, permitting the user interface panel 4308 to be carried around for remote operation. In another embodiment, the user interface panel 4308 can be powered by a power supply at the remote location, via an adapter 4306, such as if it is permanently mounted indoors, remote from the power supply 302.

As illustrated in FIG. 43, the user interface panel 4308 is separated from the chassis/power supply 302, and the two are linked via an RF link between the panel RF transceiver 4304 and the chassis RF transceiver 4302. In an embodiment, the protocol used by the chassis RF transceiver 4302 emulates the user interface panel 4308 and the protocol used by the panel RF transceiver 4304 emulates the power supply 302. Thus, the communication between the remote user interface 4308 and the chassis/power supply 302 is the same or substantially similar to the communication between the integral user interface panel 308 and the chassis/power supply 302. This allows retrofitting into lighting controllers that were previous hardwired.

Figure 44:
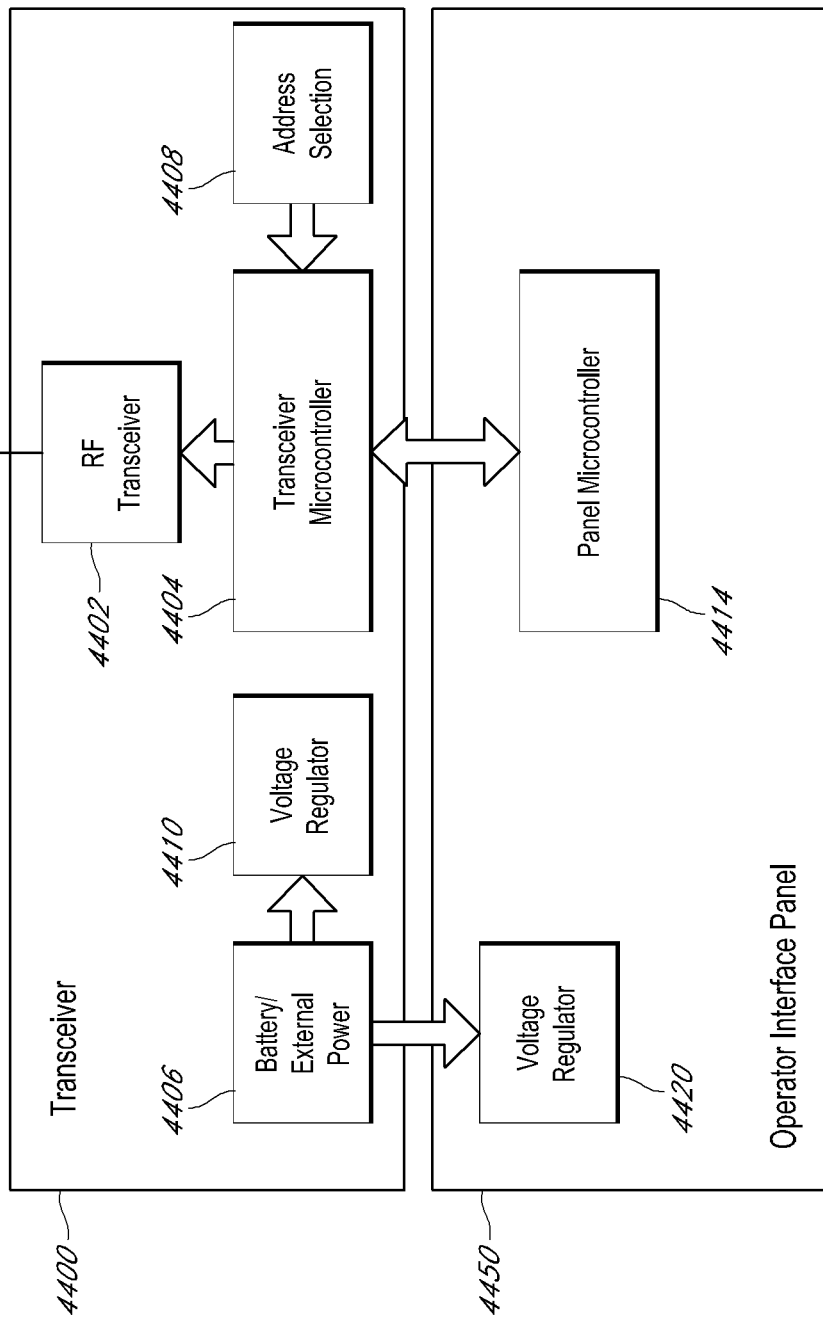
FIG. 44 is a block diagram of an exemplary transceiver for a lighting controller with a remote operator interface panel, according to certain embodiments.
Figure 45:
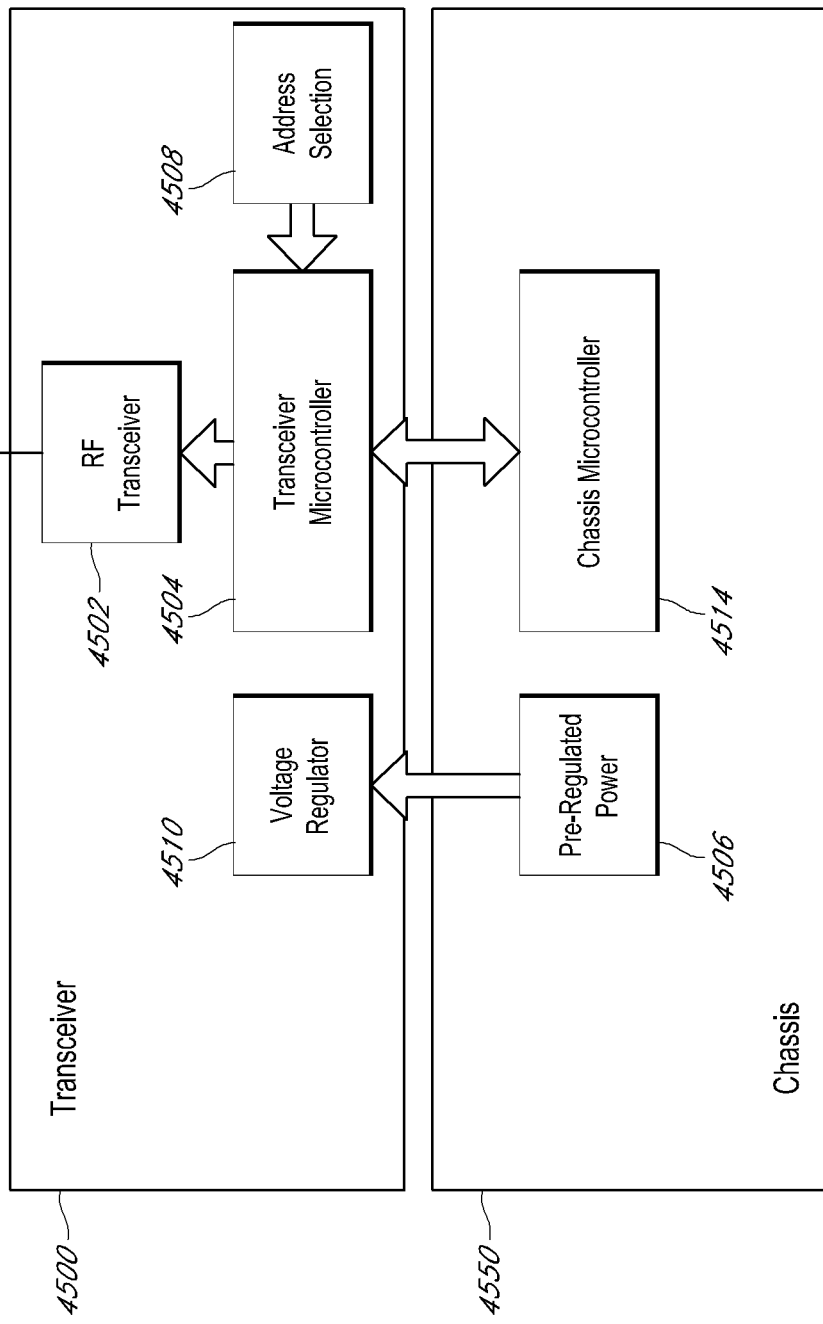
FIG. 45 is a block diagram of an exemplary transceiver for a remote operator interface panel, according to certain embodiments.

In addition to the RF circuitry, the transceivers 4302, 4304 also comprise processors. FIG. 44 is a block diagram of an exemplary panel transceiver 4400 for a remote operator interface panel 4450 and FIG. 45 is a block diagram of an exemplary chassis transceiver 4500 for a lighting system chassis 4550.

The panel RF transceiver 4400 comprises an RF transceiver 4402, a microcontroller 4404, address selection circuitry 4408, a battery/adapter 4406, and a voltage regulator 4410. The microcontroller 4404 electrically couples to the address selection circuitry 4408 and the RF transceiver 4402, and the battery/adapter 4406 electrically couples to the voltage regulator 4410. The operator interface panel 4450 comprises a microcontroller 4414 and a voltage regulator 4420. The microcontroller 4414 communicates with the microcontroller 4404 in the panel transceiver 4400 and the voltage regulator 4420 electrically couples to the battery/adapter 4406.

Similarly, the chassis RF transceiver 4500 comprises an RF transceiver 4502, a microcontroller 4504, address selection circuitry 4508, and a voltage regulator 4510. The microcontroller 4504 electrically couples to the address selection circuitry 4508 and the RF transceiver 4502. The chassis 4550 comprises a microcontroller 4514 and pre-regulated power circuitry 4506. The chassis microcontroller 4514 communicates with the microcontroller 4504 in the chassis transceiver 4500 and the pre-regulated power circuitry 4506 electrically couples to the voltage regulator 4510.

In an embodiment, a common hardware platform for the microcontrollers 4404, 4414, 4504, 4514 is used. In other embodiments, RF circuitry with no intelligence interfaces with the microcontrollers 4414, 4514.

The address selection circuitry 4408, 4508 provides an address selection input to the respective transceivers 4404, 4504. The address selection circuitry 4408, 4508 allows the transceivers 4404, 4504 to communicate with each other while rejecting any RF information meant for others. In a first embodiment, the address selection circuitry 4408, 4508 is a dial or one or more DIP switches, which are settable by the user. In a second embodiment, the address of the user interface panel transceiver 4404 is set using a display on the panel 4450 for user interface panel firmware that is aware of the RF transceiver 4404. Once the address is set in the panel RF transceiver 4404, it could be "taught" to the chassis RF transceiver 4504. In a further embodiment, the chassis RF transceiver 4504 further comprises a "learn button", and while the learn button is in a first state, the chassis RF transceiver 4504 learns the address of any valid message received. In yet other embodiments, one of the transceivers 4404, 4504 enters the learn mode for a time period after power up. Other addressing scheme embodiments may be possible by those skilled in the art from the disclosure herein.

There are considerations of frequency of operation, wireless standards, and pairing to avoid crosstalk for the RF communication link between the transceivers 4400, 4500 which are the same as or similar to those discussed herein with respect to FIGS. 32-36 for the RF communications for the wireless line voltage control node 3200.

Figure 46:
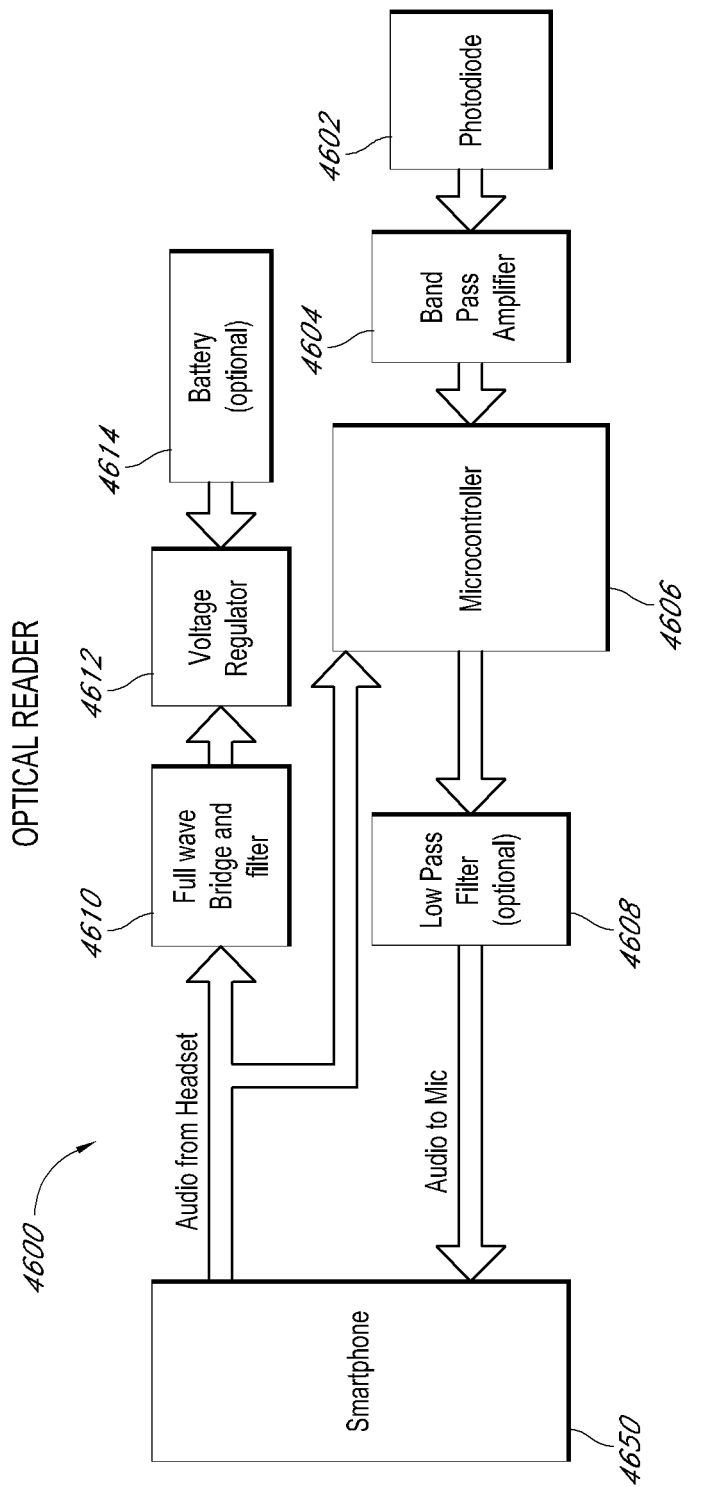
FIG. 46 is a block diagram of an exemplary optical reader, according to certain embodiments.

FIG. 46 is a block diagram of an exemplary optical reader 4600 configured to read the flashing address of the selected lighting device 4004 in order to change the zone number of an installed lighting device without wiring modifications to previously installed lighting. The method of changing the zone number of an installed lighting device is the same as or similar to the method described herein with respect to FIGS. 40-42 in the lighting system 4000 using the remote 4008. The remote 4008, in one embodiment as previously described, comprises the optical reception circuitry 4202 and RF transmitter circuitry 4204 and wirelessly transmits the optically received address to the receiver 4010, which electrically couples to the lighting controller 4002. The remote 4008, in another embodiment as previously described, comprises a smartphone or other intelligent device with a camera where the camera is used to capture the flashing address, which is transmitted to the lighting controller 4002 via the receiver 4010.

Whereas, in an embodiment, the optical reader 4600 electrically connects to an intelligent electronic device 4650, such as a smartphone, tablet PC, or the like, through its headset jack, and sends the received address to an application running in the intelligent electronic device 4650. The intelligent electronic device 4650 then sends the address to the lighting controller via a router and WiFi module, such as lighting controller 4702, router 4708, and WiFi® module 4710 as described herein with respect to FIG. 47. The application resides in the intelligent electronic device/smartphone 4650 and is configured to change the zone number of a previously installed light 4004, 4704 without wiring modifications. In an embodiment, the application is a proprietary application. In another embodiment, the intelligent electronic device/smartphone 4650 may communicate to the controller 4002, 4702 via ad hoc or other peer to peer communication protocol.

Referring to FIG. 46, the optical reader 4600 comprises a photodiode 4602, a band pass amplifier 4604, a microcontroller 4606, an optional low pass filter 4608, a full wave rectifier and filter 4610, a voltage regulator 4612, and an optional battery 4614. The full wave rectifier and filter 4610, the voltage regulator 4612, and the battery 4614 comprise power supply options for the optical reader 4600. Power can be derived from either rectifying, filtering, and regulating an audio signal from the intelligent electronic device/smartphone headset circuitry, or from the battery 4614. For instance, prior to reading the data, the application could power the optical reader 4600 by sending a constant tone, such as 1 kHz or the like, for example, of high volume audio to the headset jack. The optical reader 4600 rectifies, filters, boosts if needed, and regulates the audio signal into a power source for the rest of the optical reader circuitry. In situations where the user has disabled the headset volume, the battery 4614 can supply power to the optical reader circuitry. Examples of the battery 4614 are a CR2032 lithium coin cell and the like.

Once powered, the optical reader 4600 would look for a valid optical transmission signal, verify the checksum, and then send the information to the application via the microphone input of the headset jack. The flashing light from the lighting module 4004 is incident upon the photodiode 4602, which outputs a current in response to the light. The band pass amplifier 4604 amplifies the current, converts the amplified current into a voltage signal, and filters the voltage signal to pass only the frequencies of interest.

In one embodiment, the amplifier 4604 has sufficient gain to "square up" the filtered voltage signal so that it can be input directly into a digital input of the microcontroller 4606. In another embodiment, filtered voltage signal is input into a comparator input of the microcontroller 4606, which squares the signal. In a further embodiment, the filtered voltage signal is input into an analog input of the microcontroller 4606, read by an on-board A/D converter, and processed. The microcontroller 4606 receives the optical data as a digital signal and verifies its validity via a checksum. Once a valid message is received, the optical reader 4600 sends an audio frequency signal based on the valid message to the microphone input of the intelligent electronic device/smartphone 4650.

The audio frequency signal can be modulated using AM, FM, FSK, OOK or any other modulation technique. In one embodiment, the optical reader 4600 frequency shift keys (FSK) an audio frequency signal into the microphone of the intelligent electronic device/smartphone 4650. A logic zero comprises 1000 Hz signal and a logic one comprises 1500 Hz signal, for example. In another embodiment, ON-OFF key modulation (OOK) can be used. A logic one comprises a tone of 1 kHz and a logic zero comprises silence, for example. In another embodiment, the microcontroller 4606 sends each received bit to the intelligent electronic device/smartphone 4650 without validating the message and application validates the message.

Figure 47:
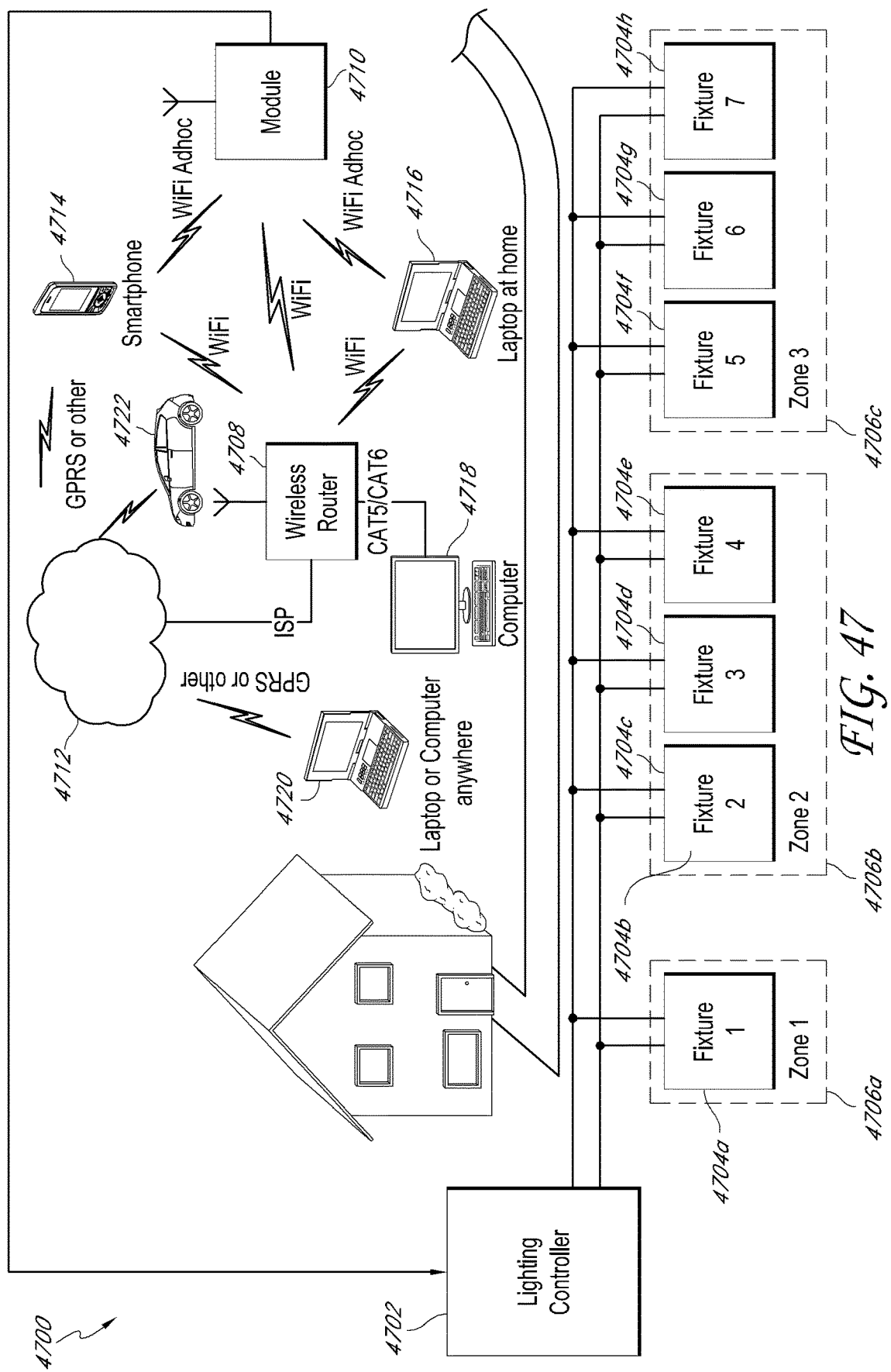
FIG. 47 illustrates an exemplary lighting system controlled remotely, according to certain embodiments.

FIG. 47 illustrates an exemplary lighting system 4700 controlled remotely, according to an embodiment. The lighting system 4700 comprises a lighting controller 4702, and a plurality of lighting modules 4704 configured into a plurality of zones 4706. In the illustrated embodiment, zone 1 4706*a* comprises one lighting fixture 4704*a*; zone 2 4706*b* comprises three lighting fixtures 4704*b*, 4704*c*, 4704*d*, and zone 3 4706*c* comprises three lighting fixtures 4704*f*, 4704*g*, 4704*h*. The lighting controller 4702 comprises the power supply 302 and the operator interface 308. The lighting controller 4702 sends the data encoded power waveform to the plurality of lighting modules 4704 on the two-wire path, as described above.

The lighting system 4700 further comprises a wireless module 4710, which electrically couples, via wire or other mediums, to the lighting controller 4702. The wireless module 4710 communicates wirelessly to devices, such as a smartphone 4714, a laptop computer 4716, and other devices that have WiFi™ connection capability using a peer to peer communication mode such as ad hoc. In this communication mode, custom software, firmware, applications, programs, or the like, are written for both the wireless module 4710 and the communicating device 4714, 4716. In an embodiment, this proprietary communication approach is not constrained by conventional standards, such as the 802.11 standard and its versions, for example.

The user can send commands from the smart phone 4714, the laptop computer 4716, or other communicating devices within the range of the wireless module 4710 to remotely control the lighting system 4700. For example, the user can send commands to turn ON/OFF, adjust the brightness, adjust the color, adjust the hue, and the like for the lighting system 4700, a zone 4706, or a specific lighting module 4704 from the remote device 4714, 4716. In an embodiment, the user views the web page being served by the wireless module 4710 by, for example, opening up the Internet Explorer® or other web browser on the smartphone 4714 or the laptop 4716. The user then interacts with the web page to control the lighting system 4700. In another embodiment, the web page is served from the computer in the lighting controller 4702, and the wireless module 4710 provides the RF connectivity.

The wireless module 4710 wirelessly receives the commands using the ad hoc or other peer to peer protocol, electrically converts the signal and sends the lighting commands, via wire, to the lighting controller 4702. In an embodiment, the module 4710 converts the signal to base band. The lighting controller 4702 receives the commands and sends the message to the addressed lighting modules 4704 or the lighting modules 4704 in the specified zones 4706 via the two-wire path.

In another embodiment, the lighting system further comprises a wireless router 4708 and the wireless module 4710 is a WiFi™ enabled device. WiFi™ enabled wireless devices, such as laptops or computers 4716, 4720, smartphones 4714, WiFi™ enabled automobiles 4722, or the like, communicate with the router 4708 using a standard communication protocol, such as 802.11. In other embodiments, a device, such as a computer 4718 is electrically connected, via wire or a cable, to the router 4708. The user uses the devices 4714, 4716, 4718, 4720, 4722 to send commands to the lighting system 4700. The devices 4714, 4716, 4718, 4720, 4722 send the commands through the router 4708 using a standard router protocol. The router 4708 connects to the World Wide Web 4712 using an Internet Service Provider (ISP) and an Internet connection. In another embodiment, the smartphone 4714 communicates through the Internet using a general packet radio service (GPRS) protocol.

In one embodiment, the wireless module 4710 comprises the router 4708. In another embodiment, the lighting controller 4702 comprises the router 4708.

The devices 4714, 4716, 4718, 4720, 4722 access the WiFi™ enabled wireless module 4710 through its Internet Protocol (IP) address. The module 4710 sends the commands to the lighting controller 4702, where the lighting controller sends the command to the lighting modules 4704 through the two-wire path. In this manner, a user can access the lighting system 4700 from anywhere there is an Internet connection.

In a further embodiment, the module 4710 comprises an Ethernet module for communication using an Ethernet protocol via an Ethernet cable between the controller 4702 and the router 4708 and/or between two controllers 4702. Examples of Ethernet modules are model MDL-2CE available from Texas Instruments or the like.

Figure 48:
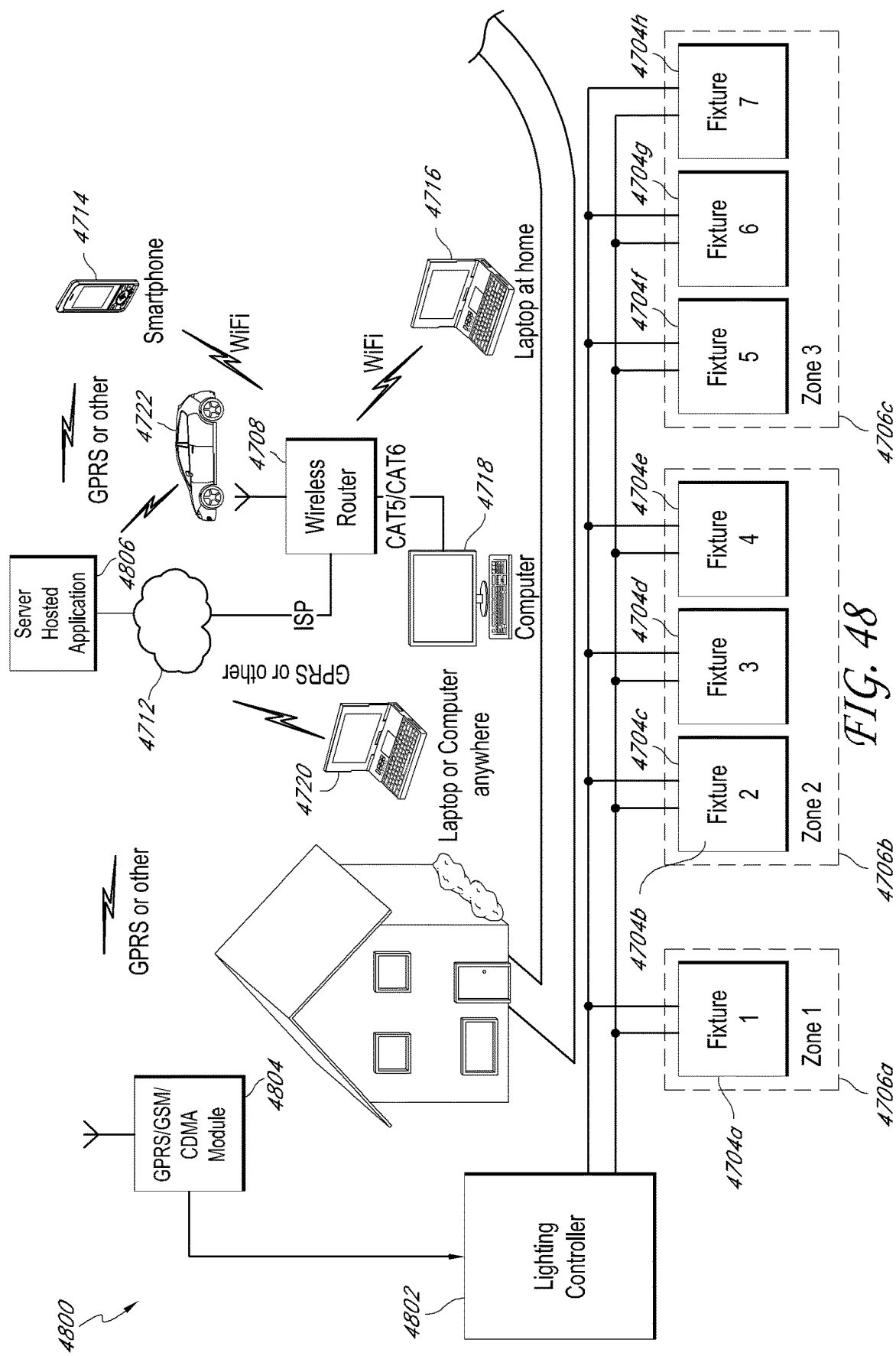
FIG. 48 illustrates another exemplary lighting system controlled remotely, according to certain embodiments.

FIG. 48 illustrates another exemplary lighting system 4800 controlled remotely. The lighting system 4800 comprises the plurality of lighting fixtures 4704 configured in the one or more zones 4706 and the lighting controller 4802. The lighting controller 4802 sends the data encoded power waveform to the plurality of lighting devices 4704 over the two-wire path, as described herein.

The lighting system 4800 further comprises a mobile carrier network module 4804, which electrically couples, via wire or other mediums, to the lighting controller 4802. The module 4804 communicates to the World Wide Web (WWW) 4712 via a mobile carrier's network. Depending on the location and carrier, various standards, such as GPRS, GSM, and CDMA, and the like may apply. A suitable GPRS and GSM module, for example, is model number MTSMC-G-F4 available from Multitech Systems Inc. and the like. A suitable CDMA module, for example, is model MTSMC-C1-IP-N3 available from Multitech Systems Inc.

The lighting controller 4802 can be accessed by devices, such as laptops or computers 4720, smartphones 4714, web-enabled automobiles 4722, or the like, in communication with the WWW 4712 from any location. Further, the lighting controller 4802 can be accessed by a wireless router 4708 in communication with the WWW 4712 via an Internet service provider (ISP). Local devices, such as laptops or computers 4716, typically in proximity to the wireless router 4708 and typically communicating with the router 2708 using a standard communication protocol, such as 802.11 can also access the lighting controller 4802. In other embodiments, a device, such as the computer 4718 is electrically connected, via wire or a cable, to the router 4708. In one embodiment, the lighting controller 4802 comprises the router 4708.

The user uses the devices 4714, 4716, 4718, 4720, 4722 to send commands to the lighting system 4800. In a first embodiment, firmware either inside the lighting controller 4802 or in the module 4804 serves up a webpage. As long as the module 4804 can be found on the World Wide Web 4712, that webpage could be accessed by devices with a web browser, thus allowing control of the lighting controller 4802. This is similar to the control provided by the WI-FI module 4710 discussed herein with respect to FIG. 47.

In a second embodiment, an application is provided for application-enabled devices, such as the control devices 4714, 4716, 4718, 4720, 4722. The user interacts with the application, and the application communications with the module 4804 via the World Wide Web 4712. In an embodiment, the application is written for various platforms, such as iPhone, Android, or the like.

In a third embodiment, a web based application 4806 is hosted on a server on the World Wide Web 4712. In an embodiment, this application 4806 is larger/more complex than could be stored in the lighting controller 4802 or the module 4804. The user interacts with this webpage 4806 using devices comprising a web browser and the application 4806 communicates with the lighting controller 4802.

There are some practical considerations when using mobile carrier networks. Most mobile carriers actually have far fewer IP addresses than they do subscribers. This is because at any given point in time, only a fraction of the subscribers is interacting with the web. Therefore, after some time of inactivity, a mobile device will typically lose its IP address. If the mobile device goes online again, the network will issue a new (different) IP address. Furthermore, many times the IP addresses used by mobile carriers are private, not public, meaning they cannot be reached using the World Wide Web 4712. The significance of this is that if a user wants to connect with a device on a carrier's network, they must know the IP address of that device.

Understanding that people want to use their networks to communicate with, and control devices, most carriers have workarounds for this problem. For instance, they often allow companies to set up special servers that have access to the private IP address of the devices they sell. This sort of "proxy" server would itself have a fixed IP address and would be easily accessible from anyone on the WWW 4712. The server would use an authentication technique or password to allow a user in communication with it, to access only those remote (private IP) nodes associated with the users account. In a sense, the server is a "conduit" to reach the private IP device.

This approach may be combined with any of the three embodiments described above. For the third embodiment, the server may be the same device that hosts the application 4806.

Figure 49:
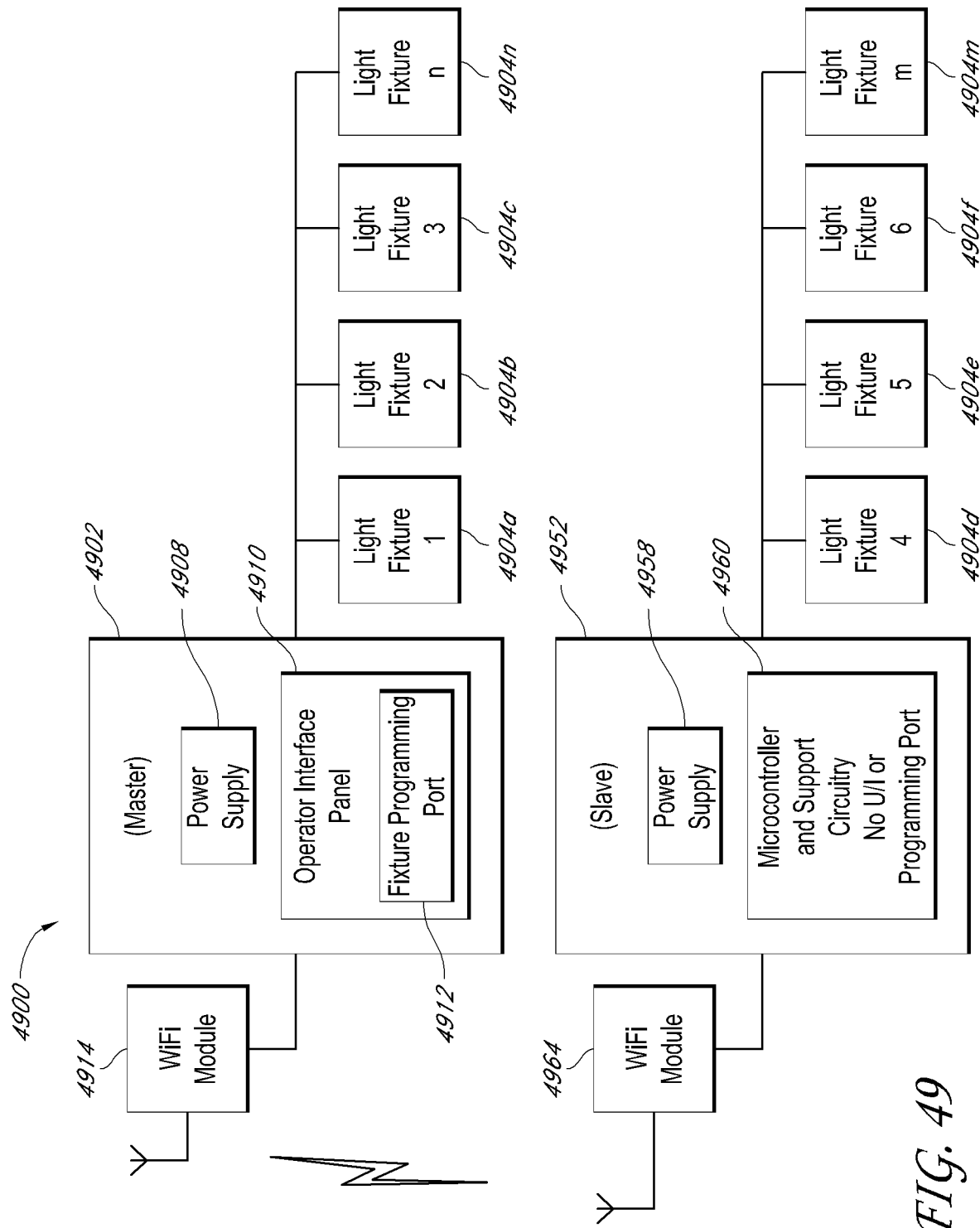
FIG. 49 illustrates an exemplary lighting system with a master/slave configuration, according to certain embodiments.

FIG. 49 is a block diagram of an exemplary lighting system 4900 with a master/slave configuration, according to an embodiment. The lighting system 4900 comprises a first lighting controller 4902 and at least a second lighting controller 4952. Lighting Controller 4902 operates as a master controller and comprises a power supply 4908, an operator interface 4910, and a fixture programming port 4912. Lighting Controller 4952 operates as a slave to the master controller 4902 and comprises a power supply 4958 and a slave control panel 4960. The slave control panel 4960 comprises the processor 314 and support circuitry, such as the memory 316, the logic power supply 320, and the display and indicators 312. In an embodiment, the slave control panel 4960 may not have the fixture programming port 4912 and the operator interface devices, such as the buttons and knobs 310. In other embodiments, the slave controller 4952 is electrically the same as or similar to the master controller 4902.

Each lighting controller 4902, 4952 electrically connects to a plurality of lighting modules 4904 and to a WiFi™ enabled module 4914, 4964, respectively. In the illustrated embodiment, master controller 4902 electrically connects to lighting modules 4904*a*, 4904*b*, 4904*c*, and up to 4904*n*, and electrically connects to module 4914. Slave controller 4952 electrically connects to lighting modules 4904*d*, 4904*e*, 4904*f*, and up to 4904*m*, and electrically connects to module 4964.

In one embodiment, the WiFi™ enabled modules 4914, 4964 communicate with each other through an ad hoc or other peer to peer protocol, as described above with respect to FIG. 47. In another embodiment, the WiFi™ enabled modules 4914, 4964 can communicate with each other through a router 4708, also as described above with respect to FIG. 47.

For example, a user may have a lighting system 4900 that uses more than one lighting controller 4902 to control the lighting modules 4904. This may be caused by the transformer 322, 402 not being able to supply enough power to illuminate the plurality of lighting modules 4904. In this case, the user would connect some of the lighting modules to a first controller 4902 and others to a second controller 4952. In one embodiment, the first and second controllers 4902, 4952 each control the lighting modules 4904 associated with it, independent of the other controller 4902, 4952.

However, in another embodiment, the program to control all of the lighting modules 4904 executes in one lighting controller 4902, which acts as the master controller and communicates with the slave controller 4952. The master controller 4902 sends commands for the slave controller 4952 to the module 4914. Module 4914 communicates wirelessly with the module 4964 and module 4964 receives the commands from the module 4914 and sends the commands to the slave controller 4952. The slave controller 4952 receives the commands and sends the commands to the addressed lighting modules 4904 associated with it. Advantageously, the user can access all of the lighting modules 4904 by entering commands from the operator interface 4910 on the master controller 4902 or by communicating to the IP address of only the master controller 4902 instead of having to access two lighting controllers 4902, 4952. Another advantage is the reduced cost of the slave controller 4952, which does not include the buttons and knobs 310, the fixture programming port 4912, and other features not being used in the slave controller 4952.

In another embodiment, the lighting system 4000, 4700, 4900 further comprises a motion detector. The motion detector may be battery powered and communicate with the receiver/modules 4010, 4710, 4914. When the motion detector senses motion, it could send a message to the lighting controller 4002, 4702, 4902, which then turns ON the appropriate lighting modules 4004, 4704, 4904, as programmed by the user. In one embodiment, the motion detector receives power over the two-wire path connecting the plurality of lighting modules 4004, 4704, 4904.

In another embodiment, the data sent to the lighting controllers 300, 4002, 4702, 4902 is encrypted. In one embodiment, a proprietary encryption scheme is used. In another embodiment, a standard encryption protocol, such as TCP/IP, IPX/SPX, OSI, DLC, SNAP, exclusive or, and the like, is used to encode the data and commands.

Figure 50:
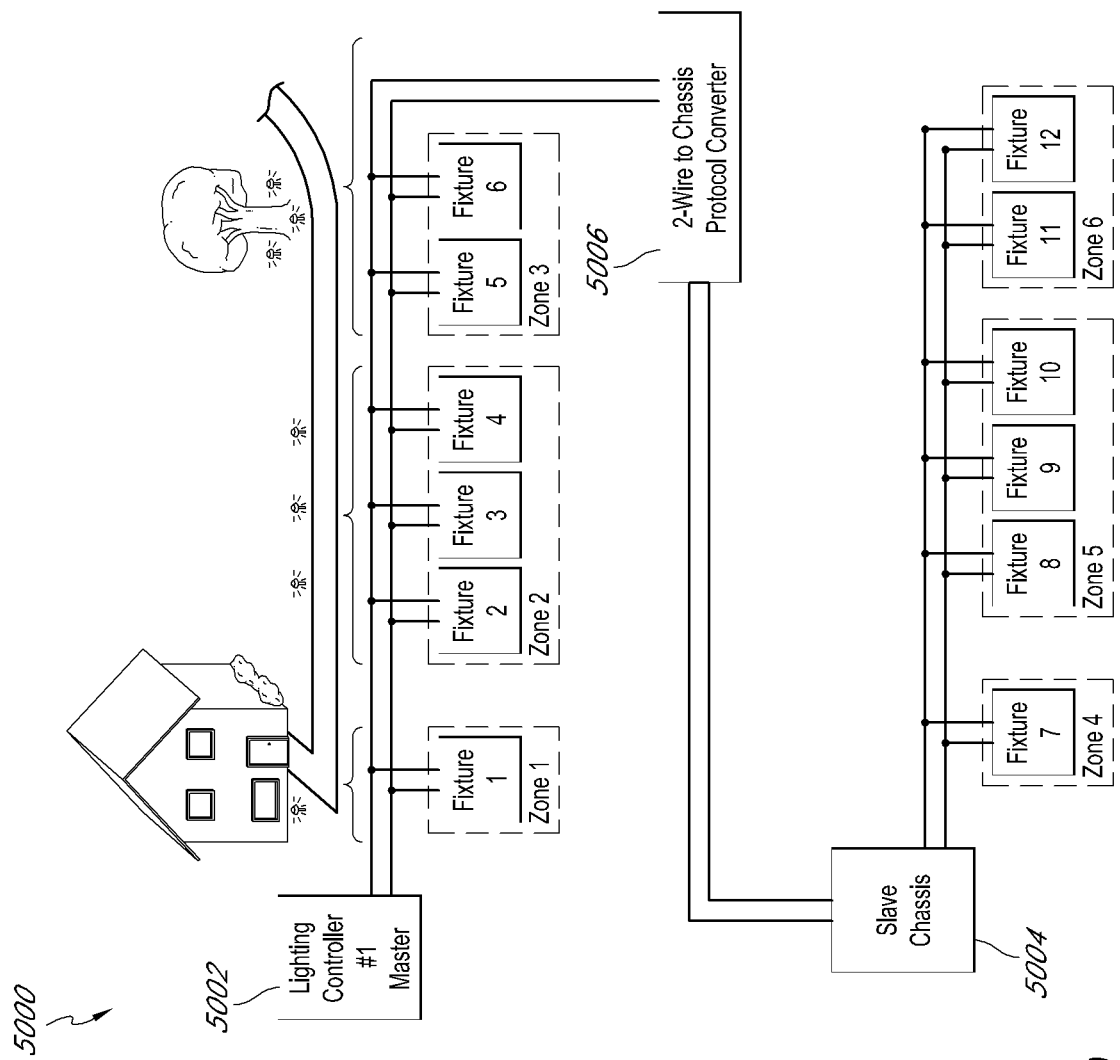
FIG. 50 illustrates an exemplary lighting system with a master/slave configuration, according to other embodiments.

FIG. 50 illustrates an exemplary lighting system 5000 with a master/slave configuration. The lighting system 5000 comprises a master lighting controller 5002, a slave chassis 5004, a two-wire to chassis protocol converter 5006, and a plurality of lighting modules. In an embodiment, the master lighting controller 5002 comprises an operator interface panel 308 while the slave chassis 5004 does not. In this embodiment, the master lighting controller 5002 controls lighting fixtures 1-6 in lighting zones 1-3 through data encoded power signals sent over a two-wire path from the master lighting controller 5002, and the slave chassis 5004 controls lighting fixtures 7-12 in zones 4-6 through data encoded power signals sent over a two-wire path from the slave chassis 5004. The two-wire to chassis protocol converter 5006 receives the commands for all of the lighting fixtures 1-12 in the lighting system 5000 from the master lighting controller 5002 over the master lighting controller's two-wire path and relays the commands to the slave chassis 5004. The protocol converter 5006 permits the user to add one or more slave chassis 5004 to the lighting system 5000 thereby increasing the number of lighting devices in the lighting system 5000 without firmware modification, network communication cables between master and slave controllers, and the like. In an embodiment, all of the lighting modules are programmed from the master lighting controller 5002 comprising the operator interface panel 308.

In the embodiment illustrated in FIG. 50, the lighting modules attached to the slave chassis 5004 comprise different zones than those attached to the master lighting controller 5002. In other embodiments, the slave chassis 5004 can control lighting device belonging to the same zone(s) as those controlled by the master lighting controller 5002. For example, the user may have more lights in a single zone than can be powered by the master lighting controller transformer. The protocol converter 5006 allows additional lights, belonging to the same zone, to be electrically connected to the two-wire path from the slave chassis 5004. All of the lights in the zone could turn on together. In another embodiment, more than one protocol converter 5006 and corresponding slave chassis 5004 can be controlled by one master lighting controller 5002. In a further embodiment, a cascade or serial arrangement can be used such that a second protocol converter 5006 attaches to the slave chassis' output to control another slave chassis 5004. In a further embodiment, multiple protocol converters 5006 and slave chassis 5004 can be chained to the output of the previous slave chassis 5004, while maintaining one point of control at the master lighting controller 5002.

Figure 51:
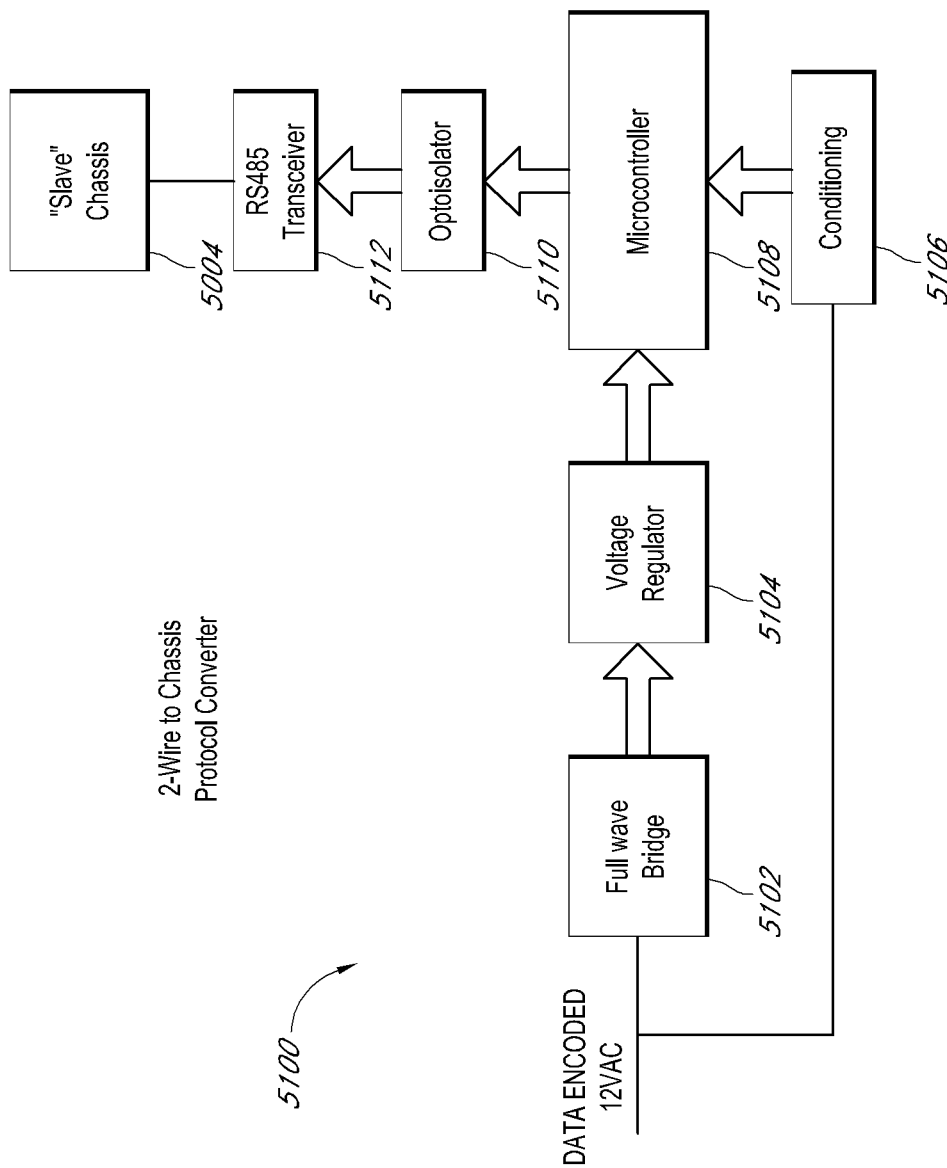
FIG. 51 is a block diagram of an exemplary two-wire to chassis protocol converter, according to certain embodiments.

FIG. 51 is a block diagram of an exemplary two-wire to chassis protocol converter 5100 comprising a full wave rectifier 5102, a voltage regulator 5104, a conditioning circuit 5106, a microcontroller 5108, an optoisolator 5110, and a transceiver 5112. The two-wire to chassis protocol converter 5100 receives the data encoded 12 VAC power signal from the master lighting controller 5002. The full wave rectifier 5102, the voltage regulator 5104, the conditioning circuit 5106, and the microcontroller 5110 are the same as or substantially similar to the circuitry described herein with respect to in FIGS. 61-64 for single and multi-channel lighting modules 6100, 6200, 6300, 6400. In the lighting modules 6100, 6200, 6300, 6400, the microcontroller controls the LED driver, whereas the microcontroller 5108 of the protocol converter 5100 takes each command and "translates" it into a command that the slave chassis 5004 understands, mimicking the operator interface panel 308 that would have been in that chassis. The commands are transmitted by the transceiver 5112 to the slave chassis 5004. In an embodiment, the communication physical layer comprises an RS485 transceiver 5112. In other embodiments other physical layers such as RS232, parallel data, controller area network (CAN) Bus, and the like can be used.

In an embodiment, optical isolation between the microcontroller 5108 and the RS485 transceiver 5112 is provided by the optoisolator 5110 to correct for differential voltage between the master lighting controller 5002 and the slave chassis 5004. If that voltage were to exceed the common mode voltage range of the transceiver 5112, communication could fail. In an embodiment, the RS485 transceiver 5112 is powered from the slave chassis 5004 and the rest of the converter circuitry 5102, 5104, 5106, 5108, is powered from the data encoded two-wire path from the master controller 5002.

Figure 52:
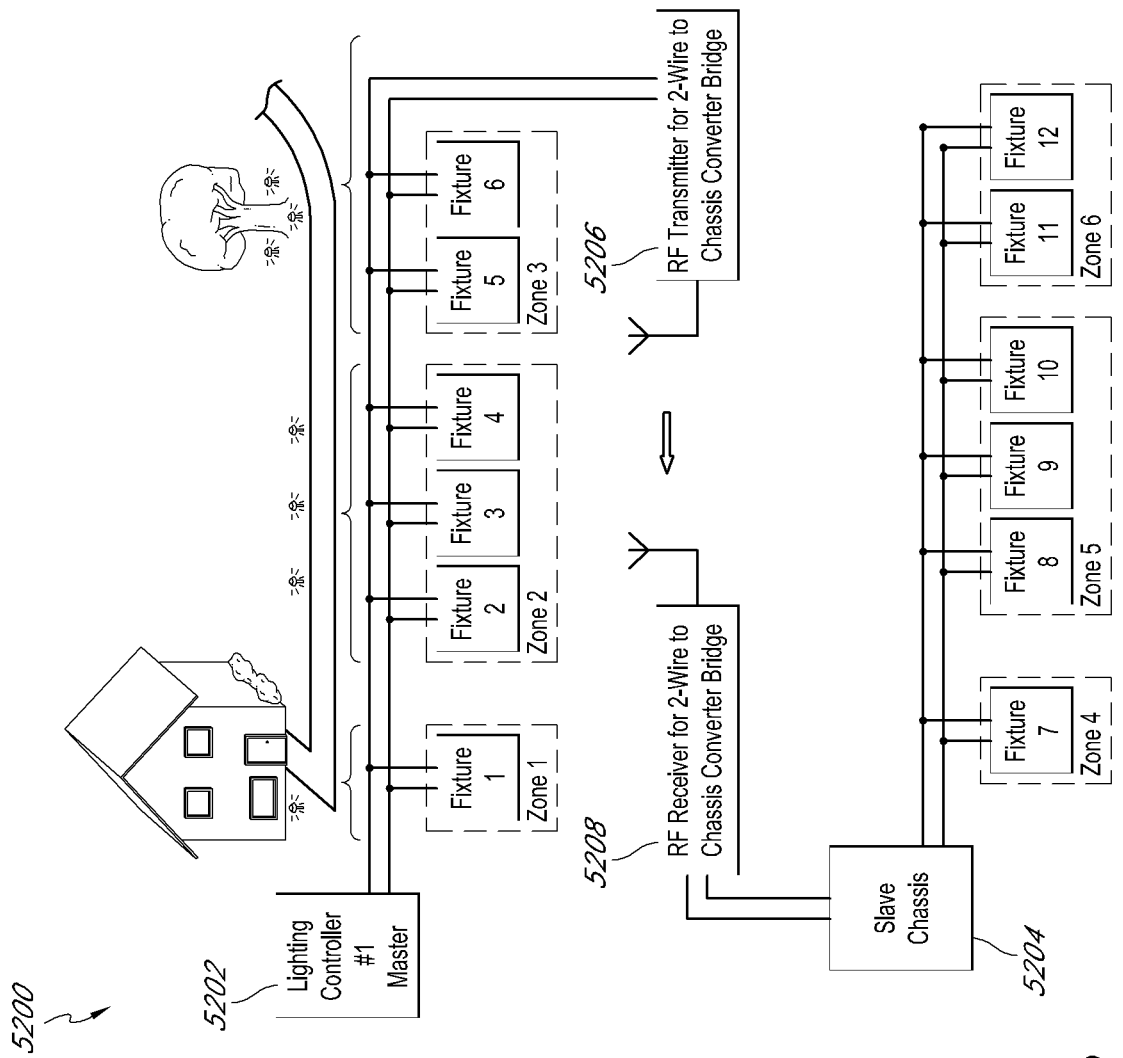
FIG. 52 illustrates an exemplary lighting system with a wireless master/slave configuration, according to certain embodiments.

In another embodiment, the two-wire protocol converter is wireless. FIG. 52 illustrates an exemplary lighting system 5200 with a wireless master/slave configuration. The lighting system 5200 comprises a master lighting controller 5202, a slave chassis 5204, a wireless two-wire to chassis protocol converter comprising a transmitter portion 5206 and a receiver portion 5208, and a plurality of lighting modules. In this embodiment, the master lighting controller 5202 controls lighting fixtures 1-6 in lighting zones 1-3 through data/power signals sent over a two-wire path from the master lighting controller 5202, and the slave chassis 5204 controls lighting fixtures 7-12 in zones 4-6 through data/power signals sent over a two-wire path from the slave chassis 5204. The transmitter portion 5206 of the wireless two-wire to chassis protocol converter receives the commands for all of the lighting fixtures 1-12 in the lighting system 5200 from the master lighting controller 5202 over the master lighting controller's two-wire path The transmitter portion 5206 broadcasts the commands over an RF communication link. The receiver portion 5208 of the wireless two-wire to chassis protocol converter receives the commands over the RF communication link, decodes the commands, and instructs the slave chassis to output the commands on its two-wire path. Advantageously, the wireless protocol converter 5206, 5208 does not need proximity to the slave chassis 5204, as does the wired protocol converter 5006, 5100. In addition, multiple receiver portions 5208 that are within the RF transmission range of the transmitter portion 5206 can receive commands and send the commands to their corresponding slave chassis 5204.

Figure 53:
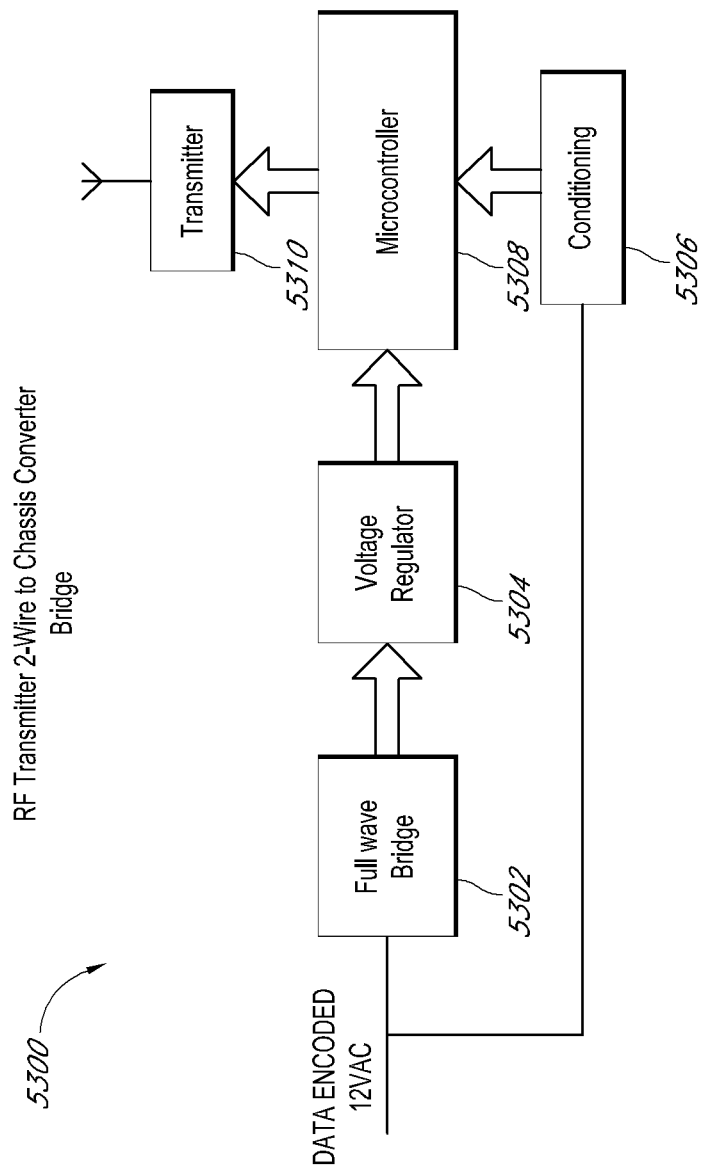
FIG. 53 is a block diagram of an exemplary transmitter for a wireless two-wire chassis protocol converter, according to certain embodiments.

FIG. 53 is a block diagram of an exemplary transmitter portion 5300 for the wireless two-wire chassis protocol converter. The transmitter portion 5300 comprises a full wave rectifier 5302, a voltage regulator 5304, a conditioning circuit 5306, a microcontroller 5308, and a transmitter 5310. The circuitry is similar to wireless line voltage control node transmitter 3300 described herein with respect to FIG. 33, except that the transmitter portion 5300 transmits every command it receives from the master lighting controller 5202.

Figure 54:
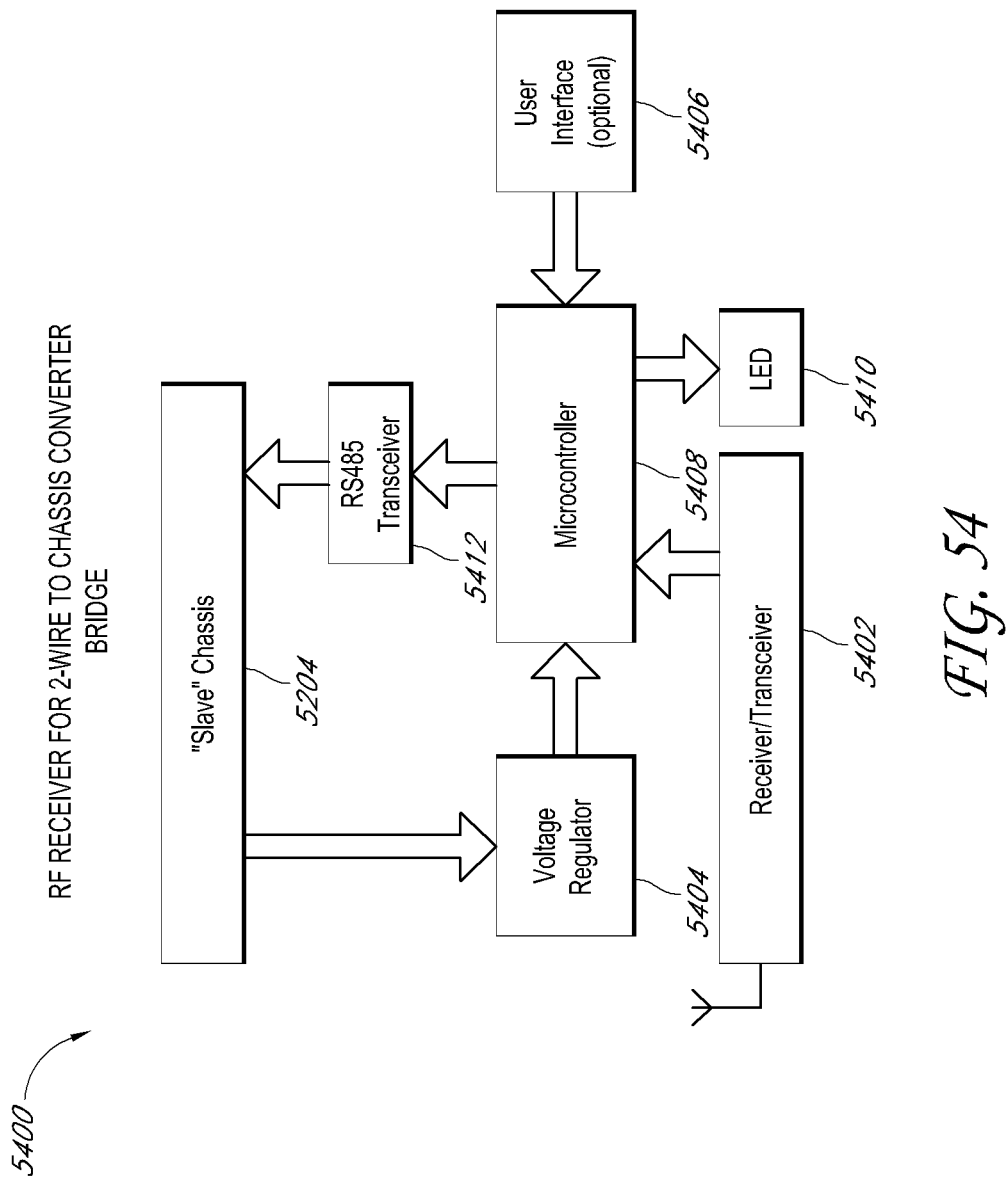
FIG. 54 is a block diagram of an exemplary receiver for a wireless two-wire chassis protocol converter, according to certain embodiments.

FIG. 54 is a block diagram of an exemplary receiver portion 5400 for the wireless two-wire chassis protocol converter. The receiver portion 5400 comprises a receiver/transceiver 5402, a voltage regulator 5404, a microcontroller 5408, and a transceiver 5412. The voltage regulator 5404 receives power from the power source in slave chassis 5204 that would have powered the operator interface panel 308. The receiver/transceiver 5402 receives the commands via the RF link and sends the information to the microcontroller 5408. The microcontroller 5408 instructs the slave chassis 5204 via the transceiver 5412 to output the commands over its two-wire path to the lighting modules. In an embodiment, the communication physical layer comprises an RS485 transceiver 5412. In other embodiments other physical layers such as RS232, parallel data, controller area network (CAN) Bus, and the like can be used.

The receiver portion 5400 further comprises an optional user interface 5406 in case configured to provide manual control at the slave chassis 5204, and an LED 5410 for feedback such as health and power, as described herein.

Similar to the wireless line voltage control node 3200 described herein with respect to FIGS. 34-36, the wireless two-wire chassis protocol converter 5206, 5208 supports a system where a single transmitter portion 5300 can be linked with one or more receiver portions 5400 as are in range. Each receiver portion 5400 is linked to a separate slave chassis 5204, thus making it possible to expand the number of lights under control of the master lighting controller 5402 to very large numbers. Such an embodiment is illustrated in FIG. 55.

Figure 55:
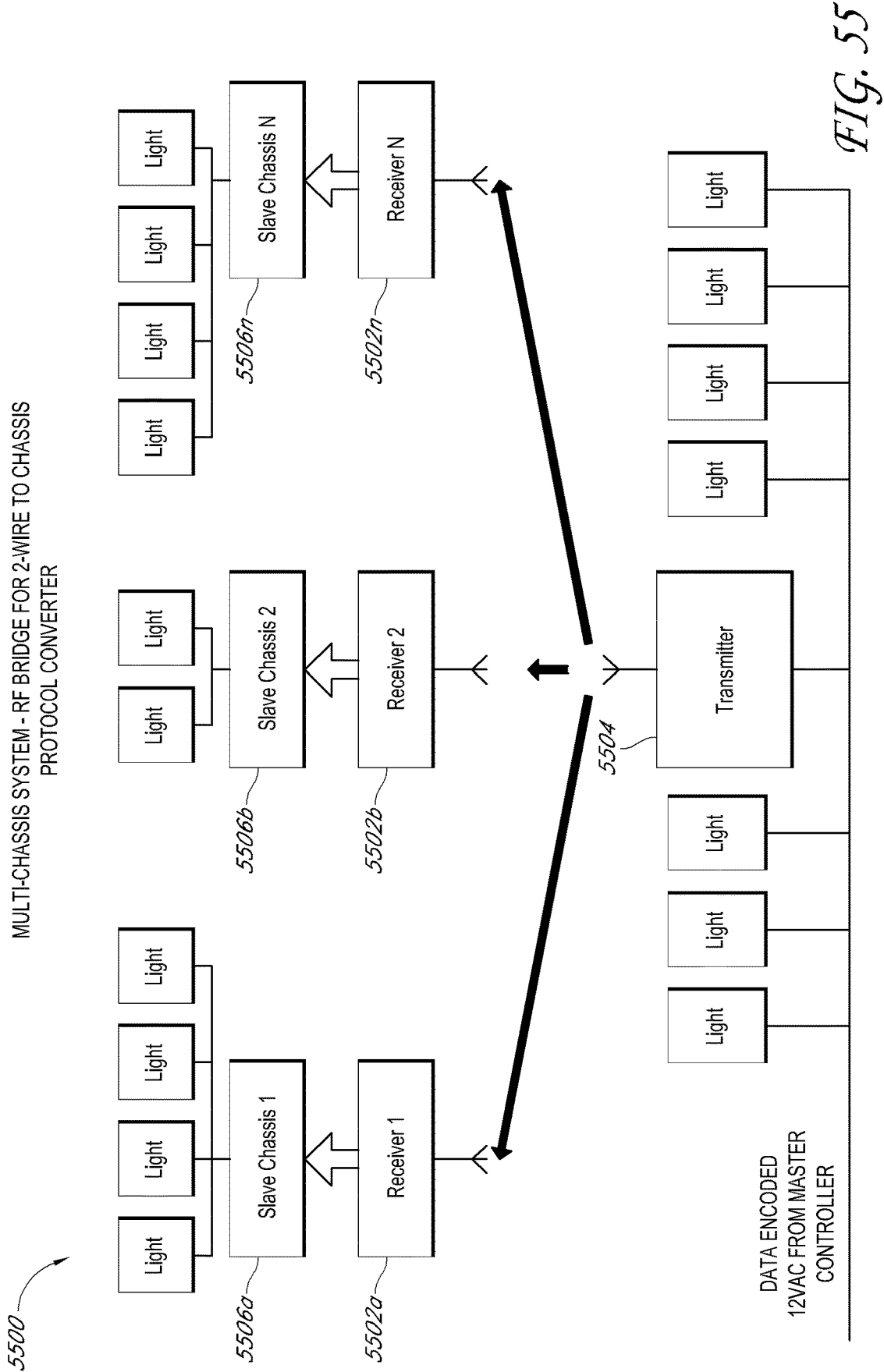
FIG. 55 is a block diagram of an exemplary lighting system for a wireless two-wire chassis protocol converter with multiple slave chassis, according to certain embodiments.

FIG. 55 is a block diagram of an exemplary lighting system 5500 for a wireless two-wire chassis protocol converter comprising a transmitter portion 5504 and one or more receiver portions 5502a, 5502b . . . 5502n. The transmitter portion 5504 electrically couples to the data encoded two-wire signal from the master lighting controller 5202. Each receiver 5502a, 5502b, . . . 5502n electrically couples to a corresponding slave chassis 5506a, 5506b . . . 5506n and each slave chassis 5506a, 5506b, . . . 5506n electrically couples to one or more lighting modules. The transmitter portion 5504 receives commands from the master lighting controller 5202 and broadcasts the commands over an RF link to the plurality of receiver portions 5502. Each receiver portion 5502a, 5502b . . . 5502n instructs its corresponding slave chassis 5506a, 5506b . . . 5506n to output its commands on its two-wire path.

In another embodiment, there can be a one-to-one pairing between transmitter portions 5504 and receiver portions 5502 of the wireless two-wire protocol converter.

As discussed above with respect to the RF communications for the wireless line voltage control node in FIGS. 32-36, there are considerations of frequency of operation, wireless standards, and pairing to avoid crosstalk for the RF communication link.

Figure 56:
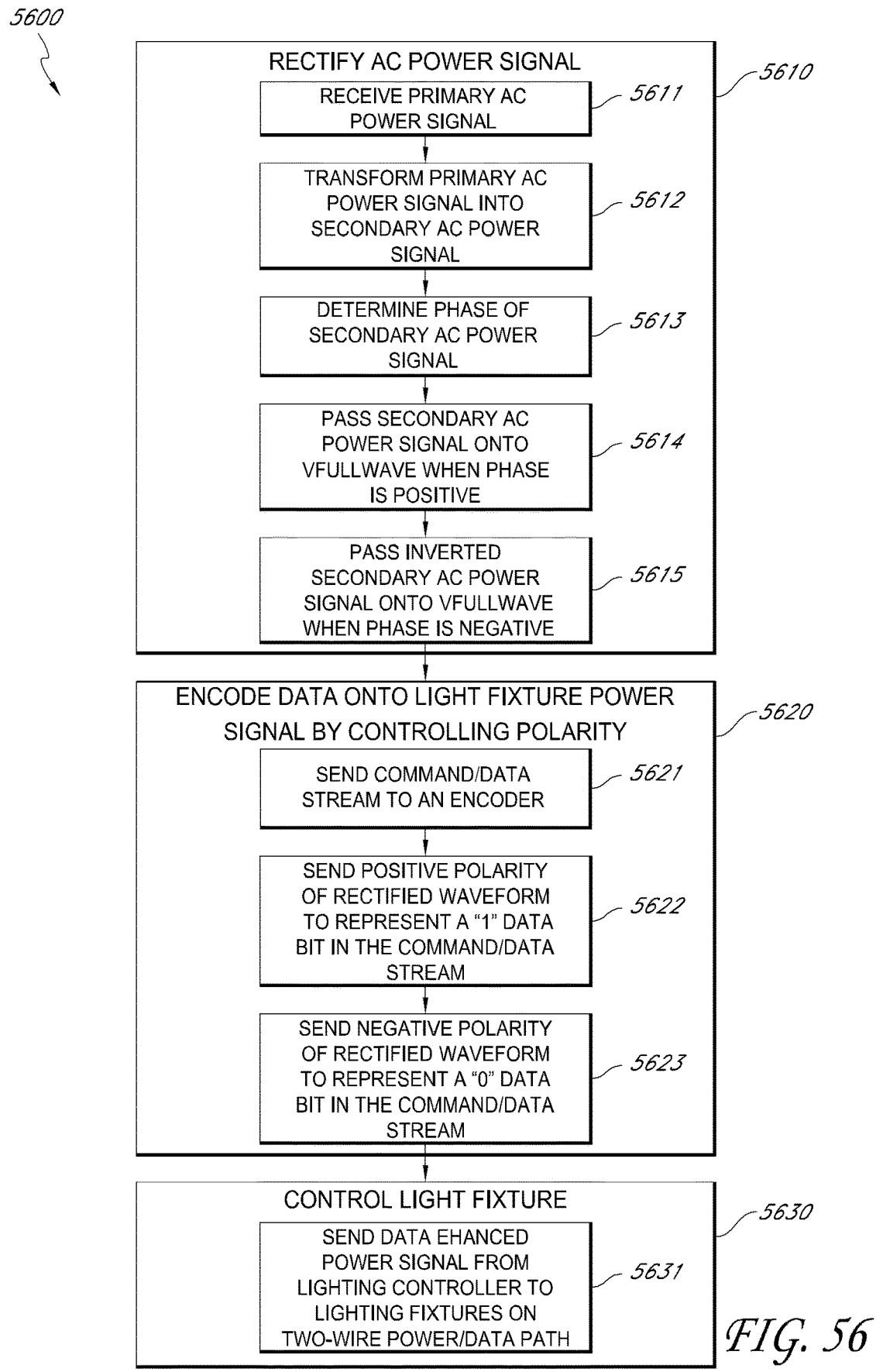
FIG. 56 is a flowchart of an exemplary process for encoding data bits onto a power signal for lighting modules.

FIG. 56 is a flowchart of an exemplary process 5600 for encoding data onto a power signal for lighting modules 304, 4004, 4704, 4904. Beginning at block 5610, the process 5600 rectifies an AC power signal to form a secondary VAC power waveform.

At block 5620, the process 5600 encodes the data onto the rectified power signal by controlling the polarity of the rectified power signal, such that at least a portion of the rectified power waveform with a first polarity represents a 1-data bit 1304, 2604 and at least portion of the rectified power waveform with a second polarity represents a 0-data bit 1304, 2604.

At block 5630, the process 5600 sends the data encoded power waveform through the two-wire path to the lighting modules 304, 4004, 4704, 4904. The addressed lighting modules 304, 4004, 4704, 4904 decode the commands and perform the lighting functions, such as turn ON/OFF, dim/brighten, change color/hue, and the like.

Looking at the process 5600 in more detail, at block 5611 the lighting controller 300, 4002, 4702, 4902 receives the primary AC power signal. At block 5612, the process 5600 transforms the primary AC power signal into a secondary VAC power signal. In an embodiment, the secondary VAC power signal is between approximately 11 VAC and 14 VAC. The process 5600 determines the phase of the secondary AC power signal at block 5613. At blocks 5614 and 56515, the process 5600 sends the secondary AC power waveform onto V-FULLWAVE when the phase is positive and sends the inverted secondary AC power waveform onto V-FULLWAVE when the phase is negative to generate the rectified secondary VAC power waveform.

At block 5621, the process transmits the data stream as well as the phase information, to an encoder/modulator. The data stream comprises addresses, data, and commands. The bridge circuit 900 passes the rectified secondary power waveform onto the two-wire path to the lighting modules 304, 4004, 4704, 4904 when the data bit 1304, 2604 from the data stream has a first state. Further, the bridge circuit inverts the rectified secondary waveform when the data bit 1304, 2604 has a second state. When no data is present, the bridge circuit reconstructs the sine wave of the secondary VAC power waveform from the rectified secondary waveform and sends the reconstructed secondary VAC power waveform.

At block 5631, the process 5600 transmits the data enhanced power signal from the lighting controller 300, 4002, 4702, 4902 to the plurality of lighting fixtures 304, 4004, 4704, 4904 on the two-wire path. The addressed lighting modules 304, 4004, 4704, 4904 receive the data encoded power waveform. An embodiment of a lighting module 304, 4004, 4704, 4904, its functionality, and its operation, is disclosed in FIGS. 13-55 and accompanying disclosure of U.S. application Ser. No. 12/564,840, filed Sep. 22, 2009, entitled "Low Voltage Outdoor Lighting Power Source and Control System", and are incorporated herein by reference. Other embodiments are described below in FIGS. 61-64.

This waveform is first scaled and filtered, and is then passed through a comparator to determine the phase of the incoming signal which is used to decode the data bits 1304, 2604 and perform the requested command. The data encoded power waveform is also rectified and used to power the lighting module. It should be noted that it is possible to store energy in the lighting module such that no power is being supplied at those instances in time when the actual bits of data are received.

Figure 57:
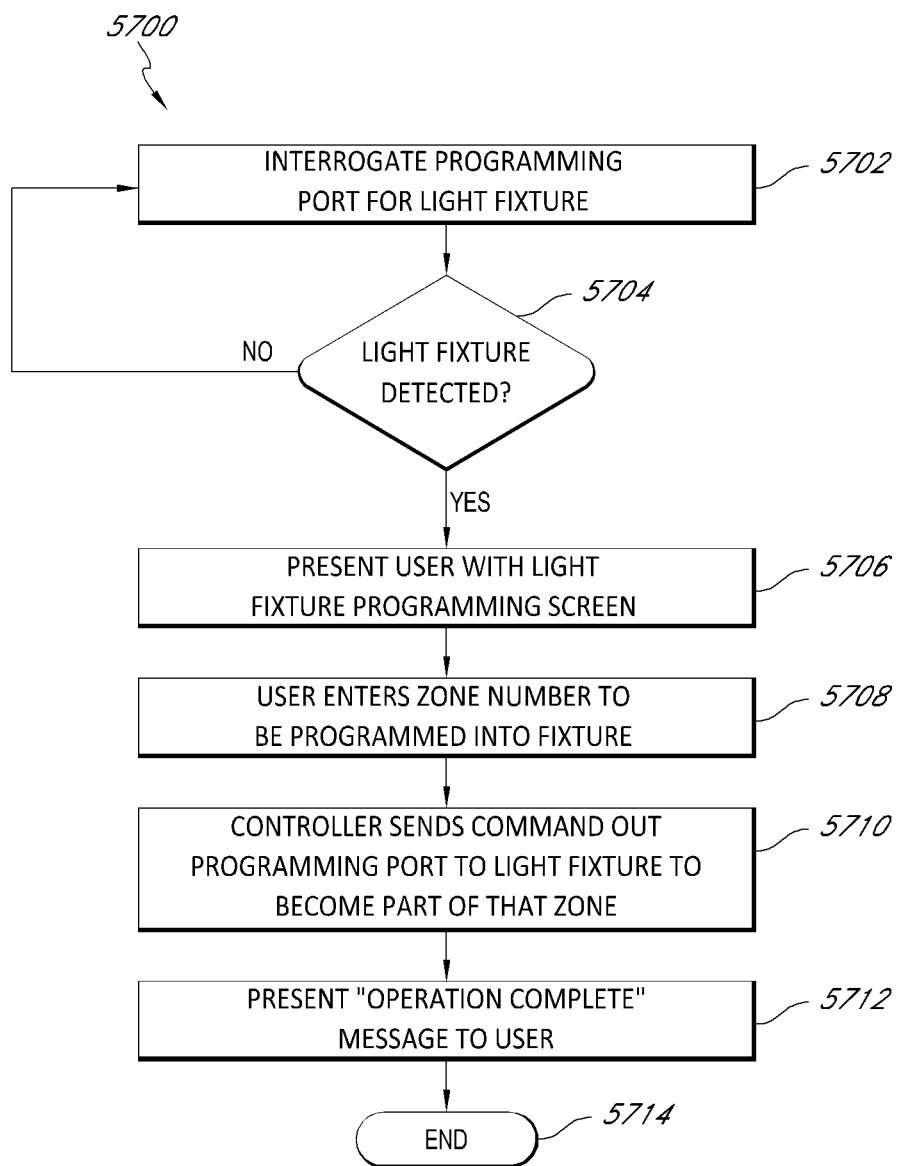
FIG. 57 is a flowchart of an exemplary process for assigning zones to addressable lighting modules in a networked lighting system, according to certain embodiment s.

FIG. 57 is a flowchart of an exemplary process 5700 for assigning zones 106, 206, 4006, 4706, 4906 to addressable lighting modules 104, 204, 4004, 4704, 4904 in the networked lighting system 100, 200, 4000, 4700, 4900, according to an embodiment. In one embodiment, the user assigns the zone numbers into each lighting fixture 300, 4002, 4702, 4902 through the fixture programming port 212, 318, 4912. In one embodiment, the zone numbers comprise 8 bits and there can be up to 256 zones 106, 206, 4006, 4706, 4906. In other embodiments, the zone numbers comprise more or less than 8 bits and there can be more or less than 256 zones 106, 206, 4006, 4706, 4906.

At block 5702 and 5704, the lighting controller periodically queries the programming port attempting to detect a lighting fixture that has been connected. At block 5706, the lighting controller has detected a light fixture on the programming port and has presented the Lighting Fixture Programming screen to the user via the operator interface panel 210, 308, 4910 on the lighting controller 300, 4002, 4702, 4902. Next, at block 5708, the user enters the zone number of the lighting fixture 104, 204, 4004, 4704, 4904 to be added to the entered zone 106, 206, 4006, 4706.

At block 5710, the process 5700 sends a command to assign the lighting fixture 104, 204, 4004, 4704, 4904 to the entered zone 106, 206, 4006, 4706, 4906.

At block 5712, the user is notified that the programming has completed and he removes the fixture from the programming port.

Figure 58:
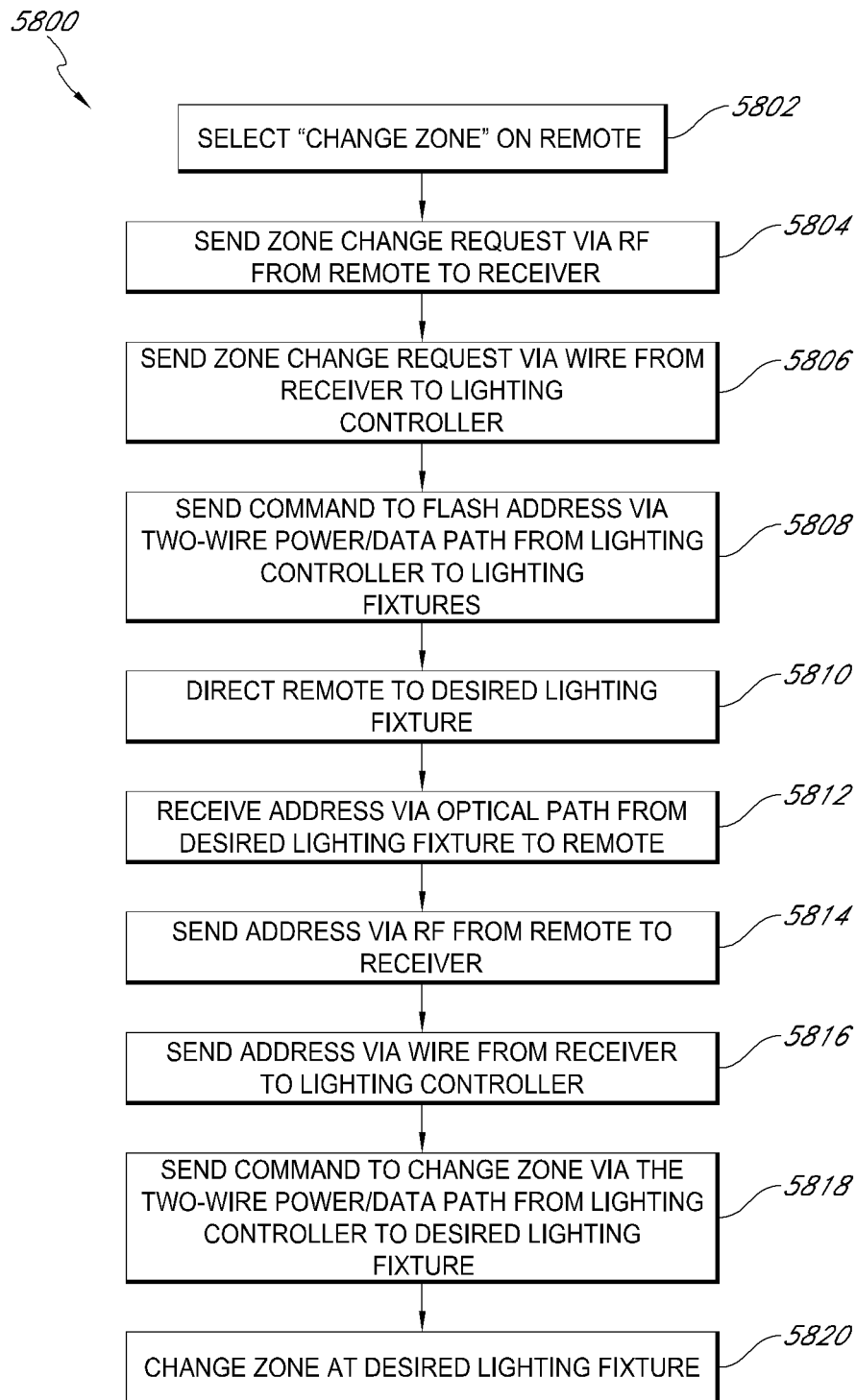
FIG. 58 is a flowchart of an exemplary process for modifying assigned zones in a lighting system using a remote controller, according to certain embodiments.

FIG. 58 is a flowchart of an exemplary process 5800 for modifying assigned zones 4006 in the lighting system 4000 using the remote controller 4008/optical reader 4600, according to an embodiment. At block 5802 and referring to FIGS. 40 and 46, the user selects the change zone selection on the remote device 4008, 4600 and enters the new zone number.

At block 5804, the remote device 4008, 4600 transmits the zone change request to the receiver 4010 via RF. The receiver 4010 sends the zone change request, via wire or other medium, to the lighting controller 4002 at block 5806. At block 5808, the lighting controller 4002 sends a command to the lighting modules 4004 via the two-wire path to begin flashing their addresses. The command is encoded onto the power waveform supplying power to the lighting modules 4004. After receiving the command, each lighting module 4004 flashes its address using an LED on the lighting fixture 4004.

At block 5810, the user directs the remote device 4008, 4600 to the selected lighting fixture 4004. The selected lighting fixture 4004 is the lighting fixture that the user wants to rezone. At block 5812, the remote device 4008, 4600 receives the address of the selected lighting fixture, via the optical path. The remote device 4008, 4600 sends the address of the selected lighting module 4004 to the receiver 4010 via RF at block 5814.

At block 5816, the receiver 4010 sends the selected address to the lighting controller 4002 via a wired path. The lighting controller 4002 receives the selected address and sends a command to the selected lighting fixture 4004 via the two-wire path. The command is encoded onto the power waveform sent via the two-wire path.

At block 5820, the lighting fixture 4004 decodes the command and changes it zone 4006 to the new zone address.

In an embodiment, the lighting fixtures 104, 204, 4004, 4704, 4904 are advantageously constructed with a drive circuit, supervising functions, communication reception, and the like, within the fixture 104, 204, 4004, 4704, 4904 on a single printed circuit board to lessen the need for water tight splices, sealing, and other reliability concerns.

In another embodiment, the command protocol supports queued commands as well as immediate commands. The queued commands allow synchronized changes across multiple lighting groups or zones 106, 206, 4006, 4706, 4906. Several different queued commands could be sent to different lighting zones 106, 206, 4006, 4706, 4906. The lighting module 104, 204, 4004, 4704, 4904 remember the command but do not act on it until an "apply queued" command is received.

In a further embodiment, an accessory device having an optical sensor monitors the lighting fixtures when the fixtures are flashing or strobing their addresses. The accessory device reads the address and displays the address to the user. This is useful because while the fixtures would be marked with their address, the marking could be worn off or not visible after installation.

In a yet further embodiment, the lighting controller takes inventory of the lighting modules attached by sending, either one by one for each of the possible 65,000 unique addresses, or for a particular range of addresses, a command to turn ON lighting modules. Then the lighting controller monitors the current after the command is sent to determine whether a fixture responded to the command. Finally, the controller compiles a list of the fixture addresses detected to be presented to the user.

In another embodiment, the power supply has a detachable front panel with a slot designed to accept the accessory device. When the accessory device is installed, the user detaches the front panel, now powered and in communication with the accessory device, and walks around the yard. The user can perform more complex remote operations using the larger display and operator interface of the front panel. These operations relay back to the power supply via the RF transmitter of the accessory device. In this embodiment, the power supply comprises a second microcontroller to receive the RF commands and act on them.

In another embodiment, the lighting controller comprises two microcontrollers, where a first microcontroller is located in the power supply chassis and a second microcontroller is located in the operator panel. The two microcontrollers communicate via a wired link while the operator panel is installed in the power supply. When the operator panel is removed from the power supply chassis, the two microcontrollers communicate via a wireless link. In one embodiment, the operator panel is battery powered and portable. In another embodiment, a small plug-in power supply powers the operator panel. In this case, the panel could be mounted in a location that is more convenient for the user to access, such as a house's interior wall, for example, rather than the typical and less convenient exterior wall.

For years, landscape lighting systems have consisted of large, bulky and heavy transformers wired to 12 VAC incandescent bulbs. Typically, the transformer also has a timer either built into its enclosure, or next to it. The timer is used to switch power to the transformer ON and OFF to control all of the lights simultaneously. Recently, LEDs have begun to be used in landscape lights, but simply as long-life replacements for the incandescent bulbs that have historically been used.

In contrast, in an embodiment of the present disclosure, a lighting fixture receives the polarity controlled, sinusoidal power signal from the lighting controller 202, 300, 4002, 4702, 4902, 4952, decodes and performs the encoded commands, and uses the signal for power. In another embodiment, historical landscape lights could be fitted with special circuitry to receive this communications signal and use the information to control some aspect of the light.

LED Lighting

In a further embodiment, the light fixture comprises and controls LEDs of white, red, green, and blue color, or any subset. To control individual LED brightness levels, the controller receives a target brightness level. The brightness level is applied to the particular LED after several correction factors. First, the lighting controller applies the temperature correction factor. As the temperature of the printed wiring board of the lighting module increases, the light output of the LED changes. The relative color change depends on the color of the LED. If color mixing is done, an individual temperature correction factor is applied to each color LED or the overall hue will change as temperature changes. Second, the lighting controller applies an aging correction factor. The lighting module determines how many total hours of use of each LED and under the type of driving conditions. As LEDs age, their light output decreases. If color mixing is done, an individual age correction factor is applied to each LED or the overall hue will change as the LEDs age. The third correction factor is a temperature throttling factor that cuts back power to all LEDs when the printed circuit board temperature exceeds a predetermined threshold.

In yet a further embodiment, the lighting fixture uses a pulse width modulation (PWM) signal to dim the LEDs, where the PWM signal is synchronized to the incoming AC power signal. The synchronization is important to prevent the detrimental effect high PWM frequencies have on dimming linearity while maintaining a frequency high enough to avoid the visible flickering of the LEDs due to the PWM.

In addition to color correction for temperature and aging, other embodiments of the lighting module provide color correction based at least in part on input voltage. Different color LEDs have different forward voltage drops, and when driven with buck converters whose input is a full wave rectified waveform, the conduction angle is based at least in part on the forward drop of the LED and the input voltage. Therefore, a given ratio of intensities as determined by the PWM driver among red, green, and blue LEDs is only valid for a specific input voltage. As the input voltage changes, the conduction angle of all the colors change, but in varying amounts, thereby distorting the color ratio and changing the hue. This may occur in lighting module embodiments that drive the buck converter with a full wave rectified waveform, thereby allowing the LEDs to turn on and off at twice the line frequency. Advantageously, this approach does not use filter capacitors to maintain the voltage in between peaks of the incoming rectified signal. Filter capacitors are typically electrolytic capacitors due to high value required, and can exhibit life expectancies shorter than the other components in the system. Some are rated as low as approximately 1000 hours at elevated temperatures, which is usually the case for an LED fixture. At typical LED fixture can function approximately 50,000 hours or more. As a result, lighting fixtures without filter capacitors may be preferable in certain embodiments, which then may subject to distorted color ratios and changing hues based at least in part on the input voltage.

The following example discusses a red, green, blue (RGB) LED fixture comprising three LEDs for each color, red, green, and blue. Other embodiments may comprise different numbers and colors of LEDs. Typical forward voltage drops for a red LED are approximately 2.2 V, for a green LED are approximately 3.5 V, and for a blue LED are approximately 3.2 V. Therefore, the string of three red LEDS will turn on at an input voltage of approximately 6.6 V, the string of three green LEDs will turn on at an input voltage of approximately 10.5 V, and the string of three blue LEDs will turn on at an input voltage of at approximately 9.6 V.

Figure 59:
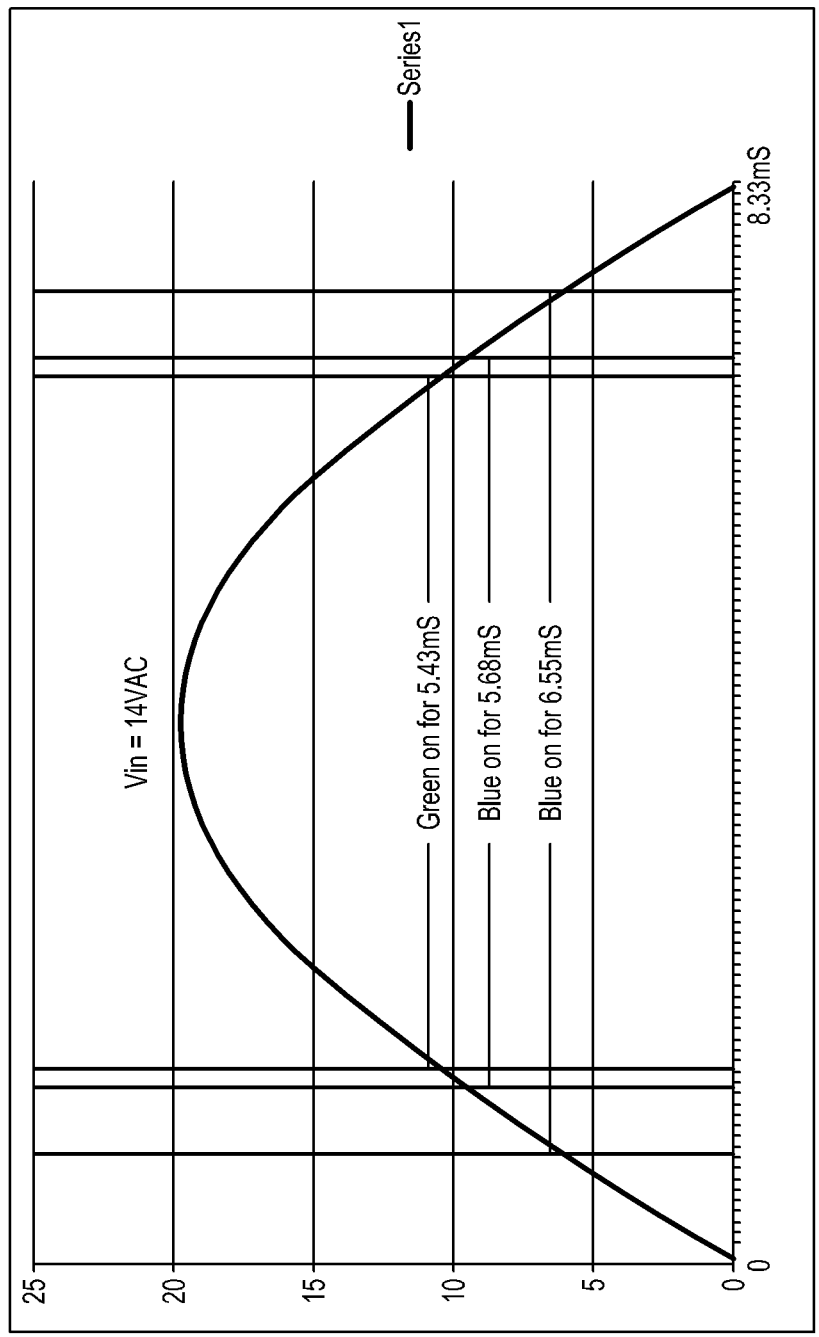
FIG. 59 depicts an exemplary power waveform illustrating ON/OFF voltages for colored LEDs, according to certain embodiments.
Figure 60:
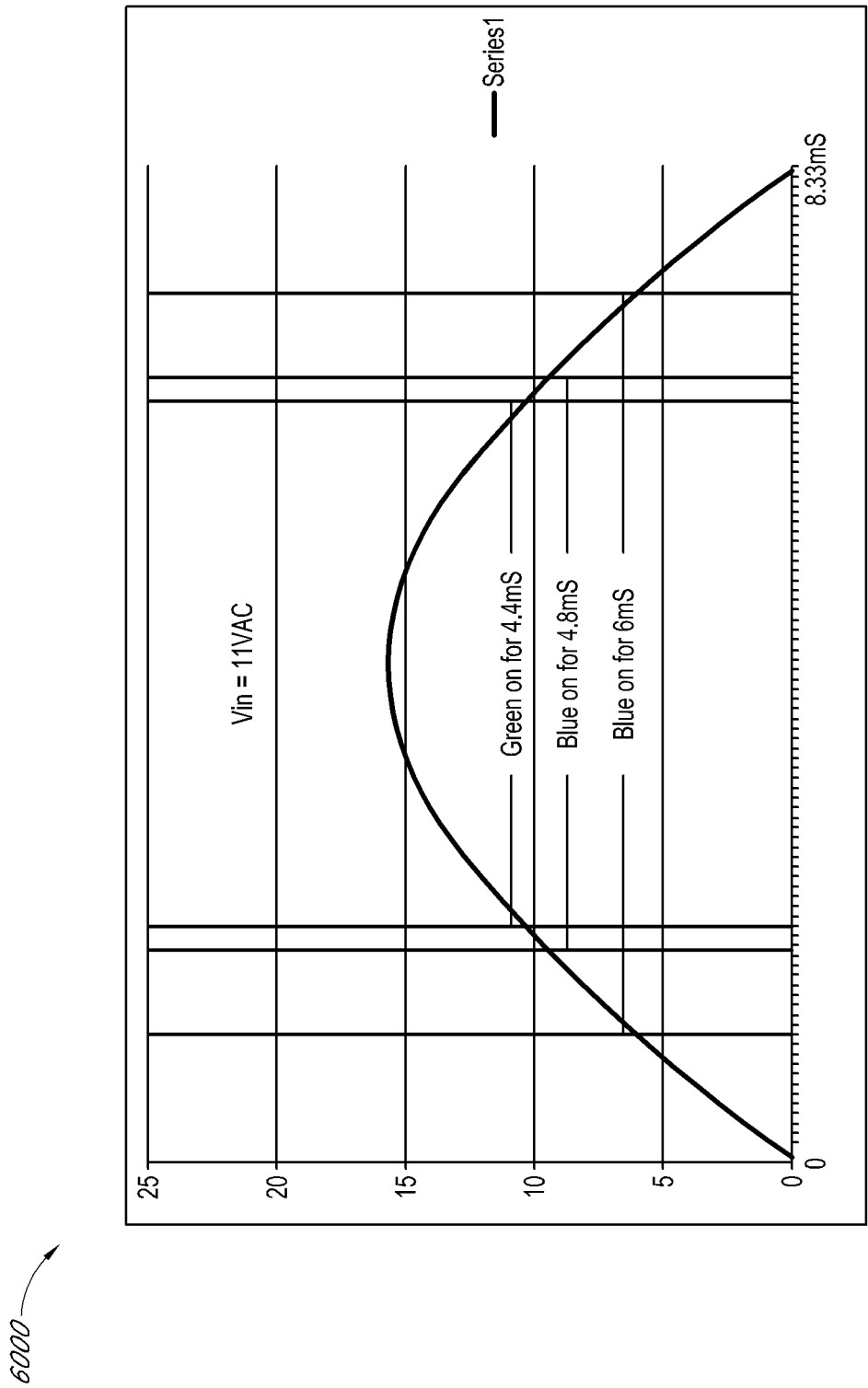
FIG. 60 depicts an exemplary power waveform illustrating ON/OFF voltages for colored LEDs, according to other embodiments.

FIG. 59 depicts a first exemplary power waveform 5900 illustrating ON/OFF voltages for these colored LEDs receiving approximately a rectified 14 VAC, 60 Hz waveform. FIG. 60 depicts a second exemplary power waveform 6000 illustrating ON/OFF voltages for these colored LEDs receiving approximately a rectified 11 VAC, 60 Hz waveform. Table 1 shows the relative ratios of red, green, and blue ON time, normalized for the red LED for the waveforms 5900 (14 VAC), 6000 (11 VAC).

TABLE 1

| Vin | RED (normalized) | GREEN | BLUE |
|---|---|---|---|
| 11 VAC | 1 | 0.73 | 0.80 |
| 14 VAC | 1 | 0.83 | 0.88 |

As indicated in TABLE 1, the ratio of the colors has changed due to the change in the input voltage. In some embodiments, the result of uncorrected color based on input voltage could be one color for lights close to the transformer where the voltage is still relatively high, and a different color further done the run of wire where the voltage has dropped slightly due to the load along the line.

A first embodiment to correct color based at least in part on the input voltage prevents the LEDs from turning on until the instantaneous input voltage of the sine wave input exceeds the largest forward voltage drop of all the LED colors in the lighting fixture. In the above example, that would be the approximately 10.5 V drop of the three green LEDs. Most likely, in this embodiment, there is not a point on the input sine wave where one of the colors is on, but the others are not.

A second embodiment uses an A/D channel of the lighting fixture microcontroller to measure the input voltage, and then adjust the color ratio of all the LEDs to compensate for the color distortion that occurs as the input voltage varies. Input voltage could be scale factor, along with temperature and aging described herein.

Figure 61:
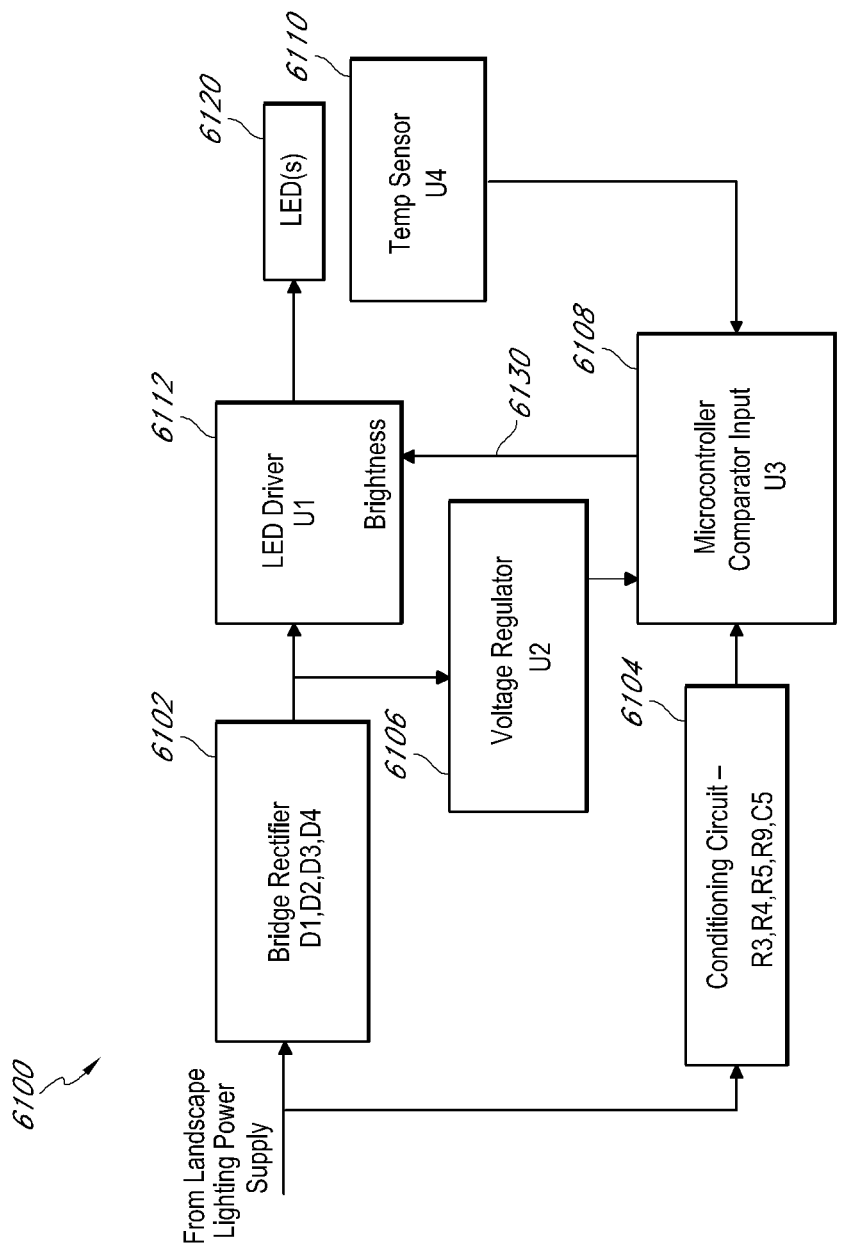
FIG. 61 is a block diagram of an exemplary single channel lighting module, according to certain embodiments.

FIG. 61 is a block diagram of an exemplary single channel lighting module 6100 that can be used with the lighting controller 202, 300, 4002, 4702, 4902, 4952 capable of encoding data on the low voltage power line. The lighting module 6100 comprises a bridge rectifier 6102, a conditioning circuit 6104, a voltage regulator 6106, a microcontroller 6108, a temperature sensor 6110, an LED driver 6112, and one or more lamps 6120. In the illustrated embodiment, the lamps 6120 comprise LEDs 6120. In other embodiments, the lamps 6120 can be other light emitting devices, such as, for example, incandescent bulbs, florescent bulbs, or the like.

The bridge rectifier 6102 receives the encoded power wave forms, LIGHTING CONTROL1 and LIGHTING CONTROL2 from the bridge 900 or the bridge/rectifier 1400. The bridge rectifier 6102 comprises a plurality of diodes, such as, for example, Schottky Rectifiers, part number SBR2A40P1 available from Diodes Inc., or the like. The bridge rectifier 6102 converts an input signal of any polarity into a DC signal to power the other circuits on the lighting board. This DC signal is fed into the LED Driver 6112, which can be a driver integrated circuit, part number AL8805 available from Diodes Inc., or an equivalent. The driver integrated circuit uses an efficient Buck Switching topology to generate a regulated output current, which is used to power the LED(s) 6120. In an embodiment, the LED 6120 can be a high-power LED, such as, for example, a CREE XP-E or an equivalent.

The DC voltage output from the bridge rectifier 6102 is also used to create a regulated logic supply voltage from the voltage regulator 6106. In an embodiment, the voltage regulator 6106 can be a 3-Volt regulator, such as, for example, part number TPS71530 available from Texas Instruments, or the like. The voltage regulator 6106 supplies power to the microcontroller 6108, such as, for example, part number PIC16F1824 available from Microchip Technology, or the like. The microcontroller 6108, and firmware that resides inside it, comprise a receiver for the data being sent from the lighting controller 202, 300, 4002, 4702, 4902, 4952. A conditioning network comprising a plurality of resistor and capacitors couples data from the power supply 302 to the microcontroller's comparator input while simultaneously limiting current into the microcontroller 6108. The output of the comparator (within the microcontroller 6108) is used to determine the nature of the data. The microcontroller 6108 then generates a signal 6130, which is coupled to the LED Driver 6112. This signal 6130 is used to vary the intensity of the light 6120 based on data received from the power supply 302.

In an embodiment, part of the data received is an address that is used to determine if the information being sent is intended for this light 6120, as each light will have a unique address. In other embodiments, it is also possible for certain commands to be intended for lighting "groups". A group may be defined as a certain type of light, for instance, a path light, or a group may be all lights in a certain location. In yet other embodiments, commands may be intended for all lights 6120. Therefore, using this addressing technique, commands may affect an individual light, a group of lights, or all lights. In another embodiment, the power supply 302 communicates an intensity pattern to the light 6120. This could be a pre-orchestrated pattern of varying intensities, for example. In an embodiment, the pattern may be "canned" or preset inside the lighting fixture, or for the details of it to be communicated from the lighting controller 202, 300, 4002, 4702, 4902, 4952. This feature may be useful, for example, for lighting "effects" which may be synchronized to music.

The output of the comparator (within the microcontroller 6108) also contains the phase information for the incoming power signal, LIGHTING CONTROL1, LIGHTING CONTROL2. In an embodiment, this is important because the brightness of the LED 6120 is determined by a pulse width modulation (PWM) waveform from the microcontroller 6108. Unless this PWM waveform is synchronized with the incoming power, visible "flickering" may be seen as these two signals (power and PWM) are "mixed". Therefore, it is important for the microcontroller 6108 to know the phase of the incoming power, and periodically reset a PWM counter in order to synchronize the PWM signal to the power signal.

In another embodiment, the microcontroller 6108 protects the light 6100 from overheating. In general, high-power LEDs 6120 generate heat. In an embodiment, the lighting fixture 6100 comprises the temperature sensor 6110 on the printed circuit board of the lighting fixture 6100. The temperature sensor 6110 can be, for example, part number MCP9700 available from Microchip Technology, or the like. The temperature sensor's output is an analog voltage, which is read by an A/D converter in the microcontroller 6108. The microcontroller 6108 uses this information to "throttle back" the power to the LED 6120 when the temperature rises above threshold temperature. In an embodiment, the threshold temperature is chosen to keep the internal junction temperature of the LED 6120 within its rated specification. The throttling is achieved the same way the intensity variation is achieved, as described above.

Although this embodiment illustrates a single LED, other embodiments of the lighting fixture 6100 drive a plurality of LEDs 6120.

Figure 62:
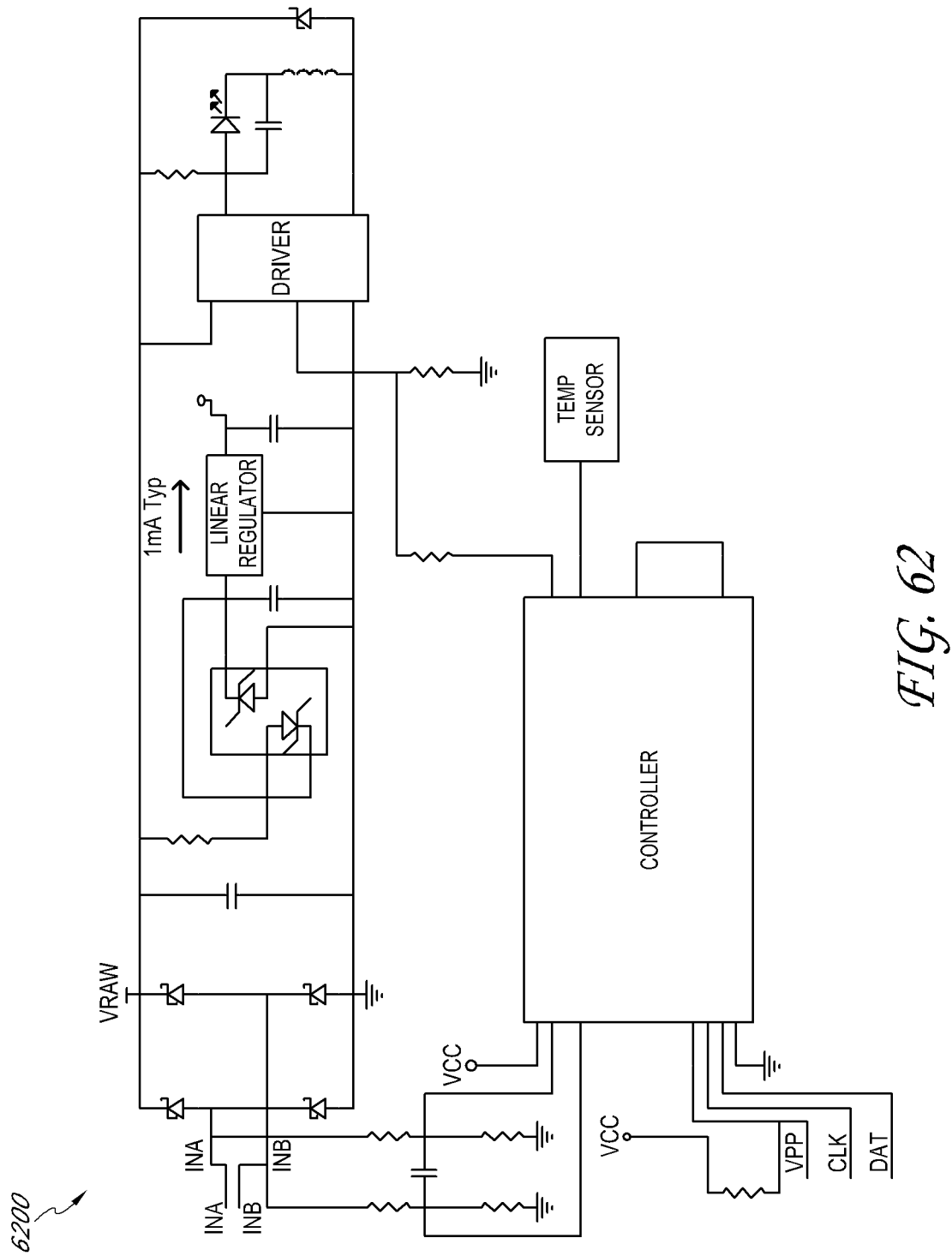
FIG. 62 is an exemplary schematic diagram of a single channel lighting module, according to certain embodiments.

FIG. 62 is an exemplary schematic diagram of a single channel lighting module 6200, according to one embodiment.

Other embodiments of lighting devices, such as lighting device 1804, can be used with the lighting controller 1800 which encodes data on the primary AC power line. The architecture of the lighting module 1804 can be similar to the low voltage version 6100, 6200 disclosed above but using components that are rated at a voltage sufficiently higher than the line voltage. For example, diodes D1, D2, D3, D4 with sufficient ratings are 1N4007 silicon rectifier diodes from Diodes Inc., and the like. In another example, the zener diode clamping circuit (shown in FIG. 62) preceding the linear regulator U2 should be appropriately sized to handle the larger input voltage. In other embodiments, other methods to step down the rectified line voltage to a voltage usable by the microcontroller U3, such as switching converters and the like, can be used. Further, the conditioning circuit R3, R4, R5, R9, C5 should be modified to scale the input voltage for use by the microcontroller U3. An example of the LED Driver U1 that can accept a high input voltage is the AL9910 from Diodes Inc. Because of the high input voltage, this device uses an external MOSFET rather than an integral MOSFET as described in the AL8805 for the low voltage case.

In other embodiments of the line voltage LED fixture, an optional power factor correction IC can be placed between the full wave bridge D1, D2, D3, D4 and the rest of the circuit. A suitable device, for example, is an UCC28810 IC available from Texas Instruments, or the like. Advantageously, these devices drive the power factor of nonlinear loads, such as LED drivers, closer to unity.

In a further embodiment, the line voltage LED fixture 6100, 6200 comprises an LED driver U1 that could be controlled from a microcontroller U3 having an input comprising a scaled and conditioned version of the input voltage. The microcontroller U3 deciphers the encoded data, and affects the LED driver U1 accordingly.

Figure 63:
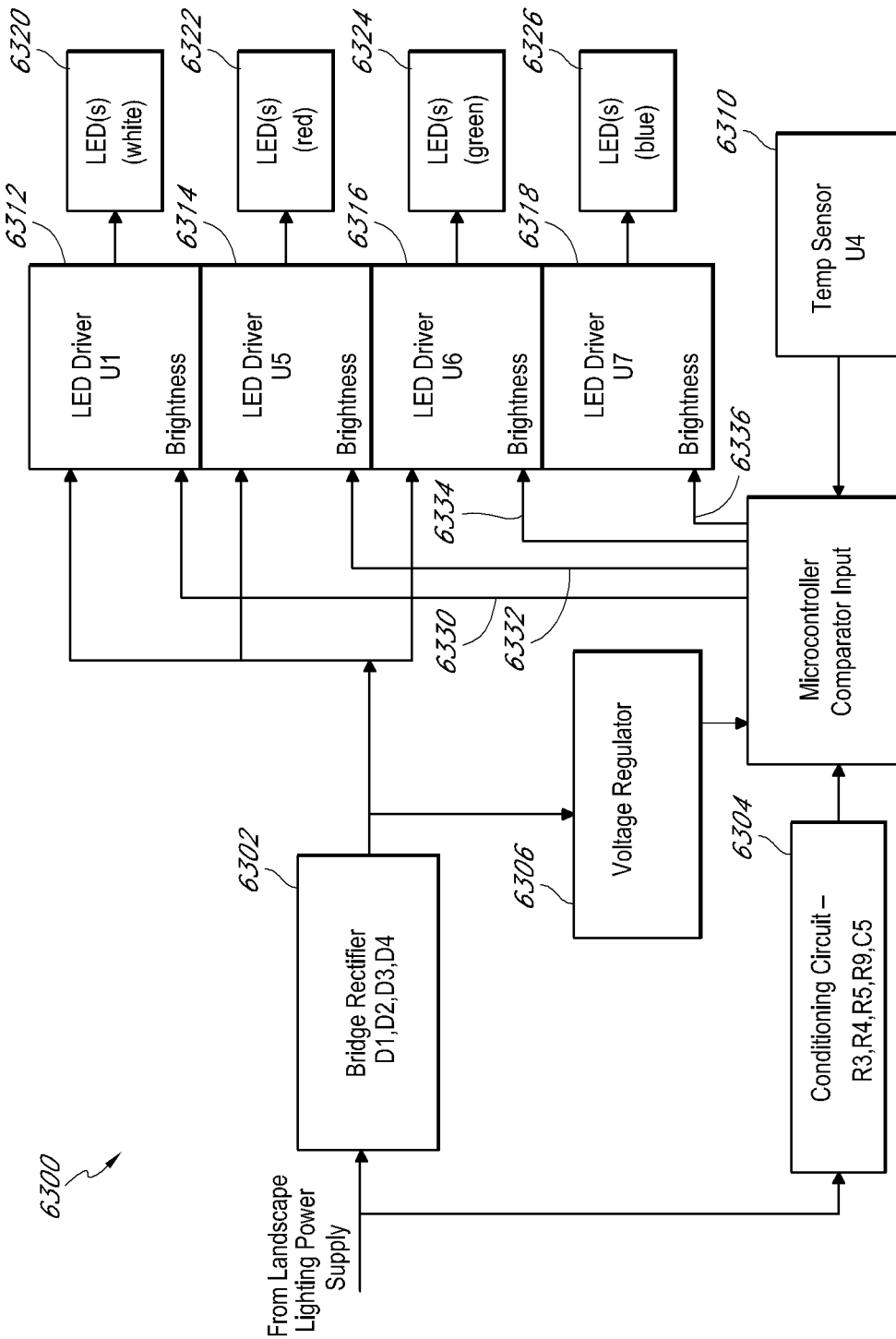
FIG. 63 is a block diagram of an exemplary multichannel lighting module, according to certain embodiments.

FIG. 63 is a block diagram of an exemplary multichannel lighting module 6300, which receives the polarity controlled, sinusoidal power signal from the lighting controller 202, 300, 4002, 4702, 4902, 4952, decodes and performs the encoded commands, and uses the signal for power. The lighting module 6300 comprises a bridge rectifier 6302, a conditioning circuit 6304, a voltage regulator 6306, a microcontroller 6308, a temperature sensor 6310, a plurality of LED drivers 6312, 6314, 6316, 6318, and one or more LEDs 6320, 6322, 6324, 6326. Each LED 6320, 6322, 6324, 6326 may comprise one or more LEDs. The illustrated embodiment is a four channel lighting module 6300, although other embodiments may have more or less than four channels.

The bridge rectifier 6302, the conditioning circuit 6304, and the voltage regulator 6306 are similar in construction and operation to the bridge rectifier 6102, the conditioning circuit 6104, and the voltage regulator 6106 of the single channel lighting fixture 6100, respectively, as described above.

The four channel embodiment 6300 approximately quadruples the LEDs 6120 and LED driver 6112 on the single-channel embodiment 6100 with respect to the LEDs 6320, 6322, 6324, 6326 and the LED drivers 6312, 6314, 6316, 6318 for the four channel lighting fixture 6300. Thus each LED 6320, 6322, 6324, 6326 and each LED driver 6312, 6314, 6316, 6318 is similar in construction and operation to the LED 6120 and LED driver 6112 of the single channel lighting fixture 6100, respectively, as described above. Similarly, the microcontroller 6308 is similar in construction and operation to the microcontroller 6108 of the single channel lighting fixture 6100, as described above, except the microcontroller 6308 controls multiple channels instead of a single channel. In conjunction with the microcontroller 6308, the LED drivers 6312, 6314, 6316, 6318 allow independent brightness control to four separate channels of LEDs. In a similar manner to microcontroller 6108, which generates the signal 6130 to control the intensity of LED 6120, microcontroller 6306 generates signals 6330, 6332, 6334, and 6336 to control the intensities of LEDs 6320, 6322, 6324, and 6326, respectively. Each string of LEDs 6320, 6322, 6324, 6326 may comprise one or more LEDs. In other embodiments, this approach could be used to add more channels, or to change the number of LEDs in each string. In yet other embodiments, each LED 6320, 6322, 6324, 6326 may comprise several LED dies in a single package with a single lens, such as, for example, the CREE MC series of LEDs or the like.

Like the single-channel embodiment 6100, the lighting fixture 6300 uses the microcontroller 6308 to receive information from the lighting controller 202, 300, 4002, 4702, 4902, 4952 and vary the LED intensity based on this information. Since each of the four channels can be independently controlled, the commands to a four-channel lighting fixture 6300 contain intensity level information for each of the four channels.

Advantageously, in the multi-channel embodiment 6300, each channel may comprise a different color LED 6320, 6322, 6324, 6326. For instance, if the first channel comprises one or more white LEDs, the second comprises one or more red LEDs, the third comprises green LEDs and the fourth comprises blue LEDs, then a plurality of lighting colors could be generated by mixing the intensities in the correct ratios. For example, the white channel could create a brighter white light for general lighting needs, or slightly "wash out" the color created by the red, blue, and green LEDs. This allows the user to formulate any color of light desired, and to vary that color, either abruptly, or by a gradual blending technique. Outdoor lights could also be modified to match a particular season or holiday. For instance, red, white, and blue colored lights could be use on the 4th of July; red and green lights could be used around Christmas; and orange lights could be used for Halloween and Thanksgiving.

In another embodiment, the multi-channel lighting fixture 6300 allows the user to adjust the shade of a white light. Perhaps, for example, the user is more of a "purest" and simply prefers white lights. The term "white" encompasses a wide range of shades from the more "blue" cool whites, to the more "yellow" warm whites. White LEDs by their nature are cool white. This is because a white LED is actually a blue LED with phosphor coating that glows white. For most people this is acceptable, but for some, a warmer white may be desired. If one of the three channels were populated with a red or yellow LED, then by varying the intensity of that channel, the user could vary the warmth, or color temperature as it is technically called, of the light. This is also important because different color temperatures are better at illuminating certain subject hues than others.

Control of individual lights or individual channels of LEDs within a single light is advantageous. Even more advantageous is to be able to achieve this control using the same set of wires that deliver power to the light. Lastly, integrating all of the decoder circuitry 6302, 6304, 6306, 6308, the driver circuitry 6312, 6314, 6316, 6318, and the temperature throttling 6310 on a single printed circuit board within the lighting fixture 6300, results in a highly integrated, self-contained intelligent light fixture 6300, which is no harder to install than a tradition landscape light.

Figure 64:
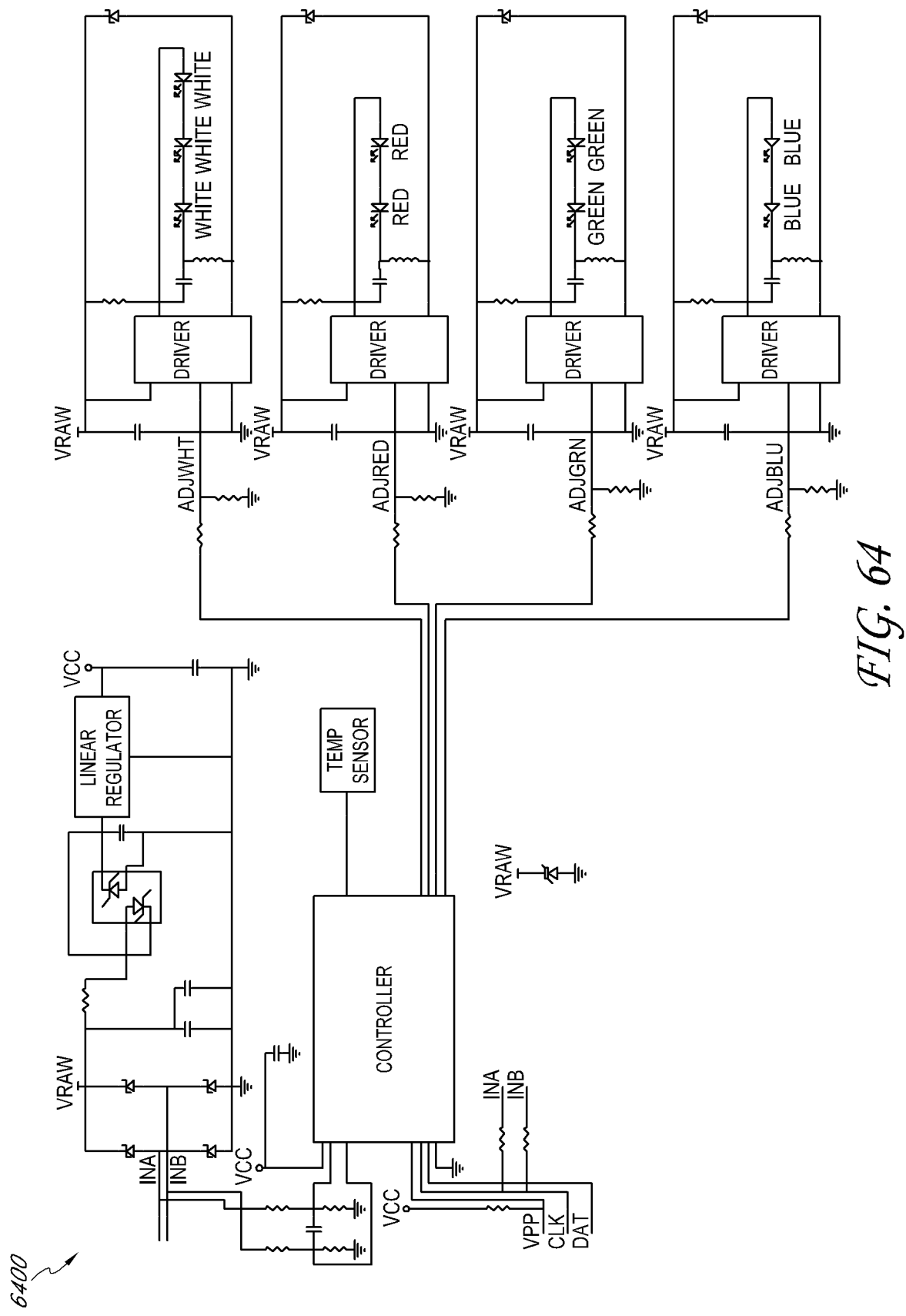
FIG. 64 is an exemplary schematic diagram of a multi-channel lighting module, according to certain embodiments.

FIG. 64 is an exemplary schematic diagram of a multi-channel lighting module 6400, according to one embodiment.

Color and Brightness Control of LED Lighting

LED-based lighting may comprise any of red, green, blue (RGB), red, green blue, white (RGBW), white, amber, cyan, red-orange, and the like, LEDs. A problem in the design of LED-based lighting is the resolution to maintain a specific or selected color while simultaneously dimming the light.

While the LEDs are ON, they produce light that acts as a continuous analog signal. The lighting modules provide the LED drivers with a signal, which is used by the LED drivers to create an LED drive signal to cause the LEDs, when optically mixed, to produce the specific or selected color of light at a specific or selected intensity. In an embodiment, the resolution of the control over the color and brightness of the LED is the smallest amount of change or discrete step in the signal provided to the LED driver that affects a change in the output of the LED. For example, if the intensity can be changed from 50% to 51%, then the resolution or resolution of intensity control is 1%. If the intensity can be changed from 50% to 50.1%, then the resolution or resolution of intensity control is 0.1%. A signal with 0.1% resolution has greater resolution than a signal with 1% resolution. The signal with 0.1% resolution can control the color and intensity of the LED with greater precision than the signal with 1% resolution. In an embodiment, the resolution is the number of output levels a signal can be quantized to. In another embodiment, a signal with greater resolution has greater granularity than a signal with less resolution, where granularity is the relative size, scale, level of detail, or depth of penetration that characterizes an object or activity.

The following example uses RED, GREEN, and BLUE LEDs to illustrate the resolution issue of maintaining a lighting color and dimming the intensity of LED-based lighting. It is well understood that LED-based lighting may also comprise different combinations of colored LEDs.

In an embodiment, a lighting system controls the brightness of individual RED, GREEN, and BLUE LEDs with approximately 1% accuracy in order to mix the LED colors and create various hues. While accuracy of approximately 1% may provide a precise level of control to create specific hues, it is insufficient when both color mixing and overall dimming are simultaneously provided.

For example, color X is defined as RED LED driven at 84% brightness, GREEN LED driven at 27% brightness and BLUE LED driven at 3% brightness, which results in an RGB ratio of 28:9:1. The user is pleased with the hue of color X, but would like to dim the light to, for example, 10% of the overall brightness. Mathematically, to achieve this, the lighting controller would drive the RED LED at 8.4% brightness, drive the GREEN LED at 2.7% brightness, and drive the BLUE LED at 0.3% brightness. However, because the resolution is approximately 1%, rounding occurs. The lighting controller would drive the RED LED at 8% brightness, drive the GREEN LED at 3% brightness, and drive the BLUE LED at 0% brightness.

The desired RGB ratio of 28:9:1 for color X has changed to 8:3:0 due to dimming. The new RGB ratio creates an approximately 10% error in the balance of the RED and GREEN LEDs and eliminates the BLUE LED from the color mix. This example illustrates that the lighting system changes the hue of the LED-based lighting as the user dims the lighting because the RGB ratio changes due to the limited resolution of control.

Color mixing systems, in certain embodiments, use pulse width modulation (PWM) to control the brightness of the individual colors. While many microcontrollers can generate PWM waveforms with resolutions of approximately 0.1% or better, there may be other factors that prevent or inhibit this same level of control at the LED-based lighting output. Drivers or driver circuits that are used to drive the LEDs can prevent or inhibit driving the LEDs with greater resolution.

Linear regulators are a simple way to reduce the voltage of a DC supply but linear regulators waste energy as they operate by dissipating energy as heat. For efficiency reasons, high power LEDs, such as those used for lighting, are driven using switching regulators in certain embodiments.

A buck converter is a voltage step down and current step up switching regulator. When the input voltage is higher than the forward voltage of the string of LEDs, a switching regulator having a buck topology is often used to drive the LEDs. Furthermore, because of their simplicity, hysteretic buck regulators or converters, such as, for example, an AL8807 from Diodes Incorporated, or the like, are commonly used to drive LEDs with a relatively constant current.

These LED drivers comprising hysteretic buck regulators or converters use a high-frequency switched signal to drive a relatively constant current through the LED at frequencies from approximately a few tens of kilohertz up to approximately a megahertz. In a hysteretic converter, the exact frequency of this high frequency signal depends on several factors, such as component values, input and output voltages, and output current, for example. Further, it takes a few cycles of this high-frequency signal to "ramp-up" and for the LED to turn ON. Again, the exact number of cycles to ramp-up and turn ON the LED depends on several factors, such as the component values, the input and output voltages, and the output current, for example.

This high frequency signal which drives the relatively constant current through the LEDs is switched ON and OFF based at least in part on the PWM signal that is input to the LED driver. The PWM signal that is input to the driver is generated by a microcontroller or microprocessor and is used to control the RGB ratios in color mixing for LED-based lighting, as described above.

Because the PWM input signal to the LED driver cannot be narrower than a few cycles of the high frequency signal used to drive the LED (due to the ramp-up and turn ON), the PWM input signal loses resolution through the LED driver.

In other words, the period of the high-frequency waveform that the LED driver is using to drive the LED is the "building block". If 50% brightness is desired, the lighting system may drive the LED with 10 of these periods, then stop driving the LED for the next 10 periods, and so on until the desired brightness changes.

For example, consider a PWM signal with 0.1% resolution controlling a hysteric LED driver operating at approximately 250 kHz so that the waveform the LED driver uses to drive the LED has a period of approximately 4 microseconds. The narrowest pulse that could be sent into the PWM input of the LED driver to achieve accurate control would be about 20 microseconds. This approximately 20 microsecond pulse would correspond to approximately 0.1% of full brightness of the lighting system. A pulse width 1000 times greater (1/0.1%) would correspond to 100% brightness, or 20 milliseconds.

Unfortunately, a signal with an approximately 20 millisecond period corresponds to a 50 Hz signal, which when input into the LED driver may result in visual flicker.

Further, it is common for the hysteretic buck converter to be supplied power directly from a full wave bridge without the use of bulky, unreliable storage capacitors. For instance, in the example of a 12 VAC input power signal and the AL8807 LED driver, the LED driver is turning ON for approximately 4-5 milliseconds then OFF for approximately 3-4 milliseconds for each half-wave of the input power. The LED driver turns ON when the full wave rectified signal goes above approximately 7V, which is the minimum operating voltage of the part. This corresponds to a frequency of approximately 120 Hz for a 60 Hz input signal.

The combination of the 120 Hz incoming power modulation and the 50 Hz PWM control signal modulation would result in cross-modulation components which may cause even more visual flicker.

In summary, the operating frequency of the LED driver limits how narrow the pulses of the PWM signal used at the PWM input of the LED driver can be. Stated another way, the operating frequency of the LED driver places a practical upper limit on the frequency of the PWM signal used at the PWM input of the LED driver.

Additionally, the human eye's ability to perceive flicker along with the incoming power frequency places a practical lower limit on the PWM frequency that can be used. When taken together, these two limits usually result in a resolution much worse than 0.1%. Thus, the full accuracy of the PWM input signal to the LED driver is difficult to realize.

In some instances, increasing the operating frequency of the LED driver permits the upper limit of the frequency of the PWM input signal to be increased. However, this can create additional problems. Electromagnetic emissions are much more of a concern at these higher switching frequencies. Additionally, efficiency usually suffers since the MOSFETs that do the switching spend a greater percentage of time in their linear region.

A control method that increases resolution and operates with LED drivers operating in the hundreds of kilohertz range, such as 100 kHz or 250 kHz, and the like, would be advantageous.

Figure 67:
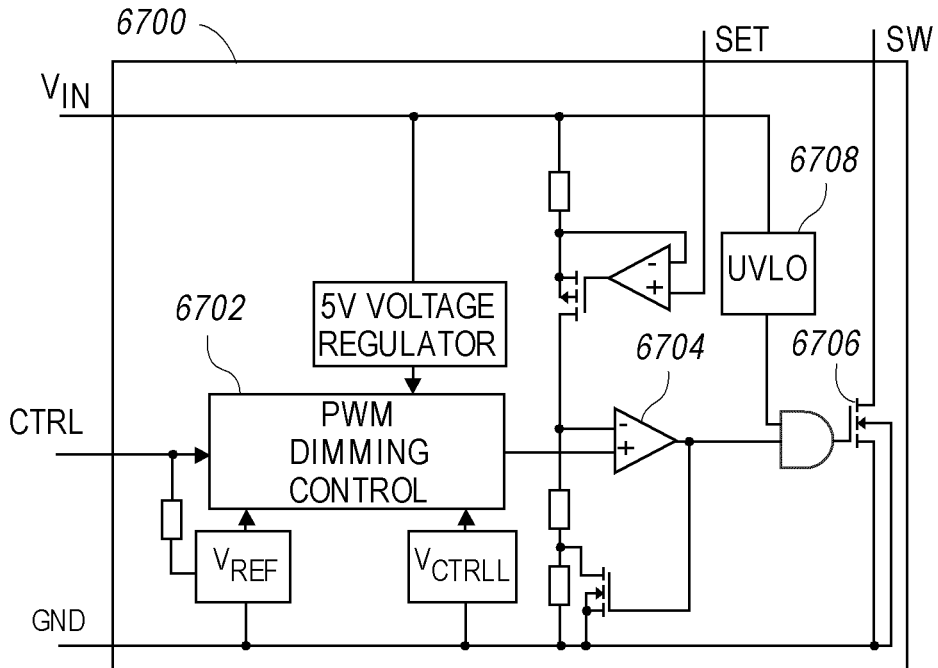
FIG. 67 is a block diagram of an exemplary hysteretic driver, according to certain embodiments.

FIG. 67 is a block diagram of an exemplary hysteretic LED driver 6700 that can be used to drive one or more LEDs electrically coupled between SET and SW. A low value resistor, for instance 0.1 ohms, would typically be connected between the SET pin and the positive power supply voltage. This allows the SET pin to monitor the current through the LED when the FET turns on. SET is therefore used to monitor the LED current and SW provides the high-frequency signal to drive the LEDs. UVLO 6708 controls the minimum operating voltage of the part.

A CTRL input comprises a dimming and ON/OFF control input for the LED driver 6700, and in an embodiment, receives the PWM input signal that operates the LED driver with increased resolution. In an embodiment, PWM control and analog control are used to create the PWM input signal.

In an embodiment, the LED driver 6112 associated with the lighting module 6100, described above with respect to FIG. 61, comprises the hysteretic LED driver 6700, and the signal 6130 from the microcontroller 6108 comprises the PWM input signal. In another embodiment, each of the LED drivers 6312, 6314, 6316, 6318 associated with the lighting module 6300, described above with respect to FIG. 63, comprise the hysteretic LED driver 6700, and the signals 6330, 6332, 6334, 6436 from the microcontroller U3 6308 comprises the PWM input signal.

PWM Control

Referring to FIG. 67, in an embodiment, the PWM input signal electrically couples to the CTRL input where it is fed through a PWM Dimming Control block 6702 into comparator 6704 which controls a MOSFET switch 6706. The duty cycle of the PWM input signal controls the ON/OFF states of the MOSFET switch and thereby the current that the LED is driven with. Moreover, controlling the LED drive current controls the brightness of the LED.

Analog Control

In an embodiment, the PWM Dimming Control block 6702 also receives a control voltage VCTRLL and a reference voltage VREF. In an embodiment where the LED driver comprises an AL8807 from Diodes Incorporated, for example, the control voltage VCTRLL is an approximately 0.45V signal, and the reference voltage VREF is an approximately 2.5V signal. In other embodiments of LED drivers, VREF may be more or less than 2.5V and VCTRLL may be more or less than 0.45V.

For illustration purposes, in the embodiment of FIG. 67, when the CTRL input drops below approximately 0.45V, the comparator 6704 receives approximately 0V, such that the MOSFET switch 6706 does not turn ON, thereby disabling the driver 6700. Voltages on the CTRL input that are between approximately 0.45V and approximately 2.5V are passed through to the comparator 6704. Therefore, by driving a DC voltage into the CTRL input, the brightness of the LED can be controlled because the switching point (hysteresis) of the comparator 6704 can be controlled.

By controlling the voltage level of the PWM input signal, the reference voltage at the output of the PWM DIMMING CONTROL 6702 supplied to the comparator 6704 can be controlled, and in turn, the current supplied by the LED driver 6700 can be controlled, which controls the brightness of the LEDs.

While the topology of FIG. 67 is just one example of a hysteretic driver 6700, hysteretic drivers 6700 typically comprise the comparator 6704 (often called the hysteresis comparator) which controls the MOSFET switch 6706.

In summary, in an embodiment, hysteretic drivers 6700 can be controlled with either an analog signal or a digital (PWM) signal. In the analog approach, the current supplied by the driver 6700 is regulated to less than 100% by applying a lower voltage than the voltage that corresponds to 100% of the comparator reference. In the PWM or digital approach, the comparator reference switches between 2 states: 100% and 0%. The ratio of the time spent in these states determines the average current through the LED. As long as the frequency of the PWM signal is faster than the response of the human eye, the brightness is perceived as the average brightness.

Analog and PWM Control Signals

Embodiments of control signal generators generate a control signal that allows a hysteretic driver to simultaneously operate in both digital (PWM) and analog modes. Advantageously, when each mode alone allows a resolution of approximately 1%, then these two resolutions will compound resulting in a resolution approximately 0.01% (1%× 1%). Furthermore, approximately 1% control is achievable using PWM control at driver frequencies as low as 50 kHz, while still avoiding the flicker described above.

FIGS. 68-72 comprise exemplary control waveforms to illustrate how analog and digital control methods can be used independently and then simultaneously in embodiments of the hysteretic LED driver 6700.

Figure 68:
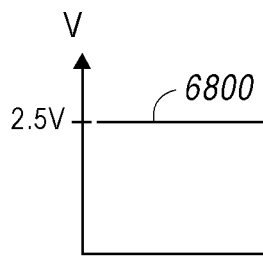
FIG. 68 is an exemplary analog input waveform for a hysteretic LED driver that results in approximately full (100%) brightness of the LED, according to certain embodiments.
Figure 69:
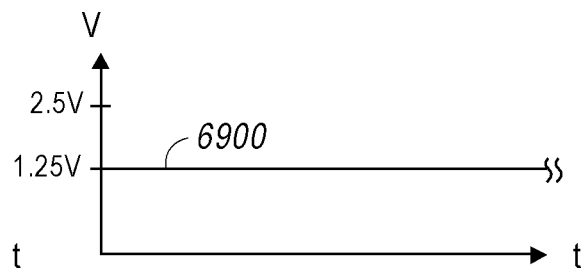
FIG. 69 illustrates an exemplary analog input waveform for a hysteretic LED driver that results in approximately half (50%) brightness of the LED, according to certain embodiments.

Consider an analog controlled system. FIG. 68 is an exemplary analog input waveform 6800 comprising an approximately 2.5V signal that when applied to the CTRL input results in approximately full (100%) brightness of the LED for the analog controlled system. FIG. 69 illustrates an exemplary analog input waveform 6900 that when applied to the CTRL input results in approximately half (50%) brightness of the LED for the analog controlled system. The waveform 6900 has an approximately constant level of approximately 1.25V, which is half of the 100% level of approximately 2.5V of the waveform 6800.

Figure 70:
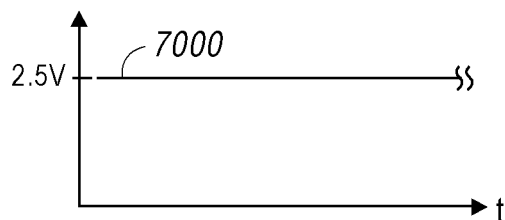
FIG. 70 illustrates an exemplary PWM input waveform for a hysteretic LED driver that results in approximately full (100%) brightness of the LED, according to certain embodiments.
Figure 71:
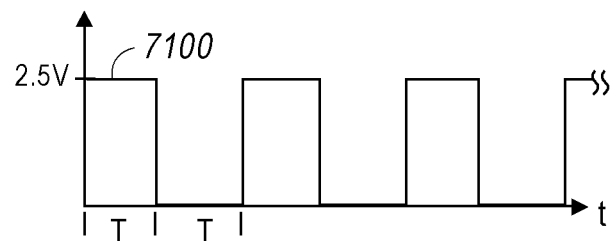
FIG. 71 illustrates an exemplary PWM input waveform for a hysteretic LED driver that results in approximately half (50%) brightness, according to certain embodiments.

Consider a PWM controlled system. FIG. 70 illustrates an exemplary PWM input waveform 7000 that results in approximately full (100%) brightness of the LED for the PMW controlled system. The waveform 7000 comprises an approximately 2.5V signal having a duty cycle of 100%. FIG. 71 illustrates an exemplary PWM input waveform 7100 that results in approximately half (50%) brightness for the PWM controlled system. The waveform 7100 comprises an approximately 2.5V periodic signal having a period of approximately 2T, where the amplitude of the waveform 7100 is approximately 2.5V for the first half of the period and approximately 0V for the second half of the period, or in other words, has a 50% duty cycle. The approximately half (50%) brightness can be achieved since half of the time the driver 6700 is working at approximately 100% brightness, and the other half of the time it is at approximately 0% brightness, which averages out to approximately 50% brightness.

Figure 72:
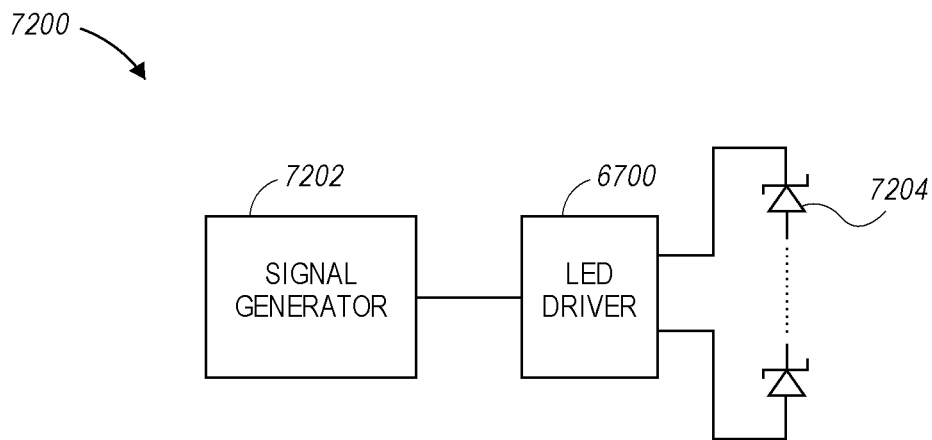
FIG. 72 is a block diagram of an exemplary lighting control system to control color and brightness of LED lighting, according to certain embodiments.

Consider an analog controlled and a PWM controlled or hybrid controlled system. FIG. 72 illustrates a hybrid controlled lighting module 7200 comprising a hybrid signal generator 7202, the hysteretic LED driver 6700, and a string of one or more LEDs 7204. In an embodiment, the LEDs 7204 comprise the LEDs 6120, 6320, 6322, 6324, 6326. The hybrid signal generator 7202 generates a hybrid (analog and PWM) control waveform or signal which is received by the LED driver 6700 and used to control the brightness and color mixing of the LEDs 7204 with resolution provided by both analog and PWM control.

Figure 73:
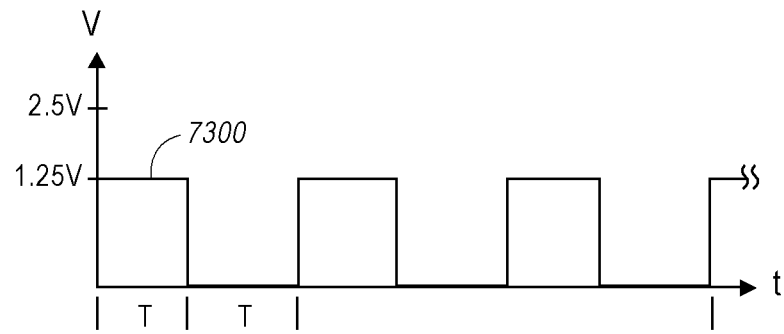
FIG. 73 illustrates an exemplary hybrid control waveform for a hysteretic LED driver that results in approximately quarter (25%) brightness, according to certain embodiments.

FIG. 73 illustrates an exemplary hybrid control waveform 7300 for the hysteretic LED driver 6700 that results in approximately quarter (25%) brightness. The waveform 7300 comprises an approximately 1.25V periodic signal having a period of 2T, where the amplitude of the waveform 7300 is approximately 1.25V for the first half of the period and approximately 0V for the second half of the period (50% duty cycle). The PWM aspect of the waveform 7300 enables the LED driver 6700 for approximately 50% of the time. However, while the LED driver 6700 is ON, analog dimming is employed, as evident from the voltage of the waveform 7300.

In an embodiment where the voltage to drive the LEDs 7204 to 100% brightness is approximately 2.5V, a voltage of approximately 1.25V drives the LEDs 7204 to approximately 50% brightness. When the hybrid signal generator 7202 generates the waveform 7300, the LED driver 6700 drives the LEDs 7204 at approximately 50% of maximum while the LED driver 6700 is ON. The effective brightness is therefore approximately 25% since the LEDs 7204 are being driven at approximately 50% brightness for approximately 50% of the time (0.50×0.50=0.25). This illustrates the compounding effect of approximately simultaneous analog and PWM control of the LED driver 6700.

FIG. 73 illustrates just one example of a hybrid control waveform having simultaneous or approximately simultaneous analog and digital dimming with increased resolution. In other embodiments, the lighting module 7200 can achieve various dimming scenarios that do not alter or substantially alter the RGB ratio of the desired hue by supplying a PWM waveform of varying duty cycle and with varying amplitude.

Novel Control Signal Generators

Digital to Analog Converter Output Modulated by PWM Waveform

Figure 74:
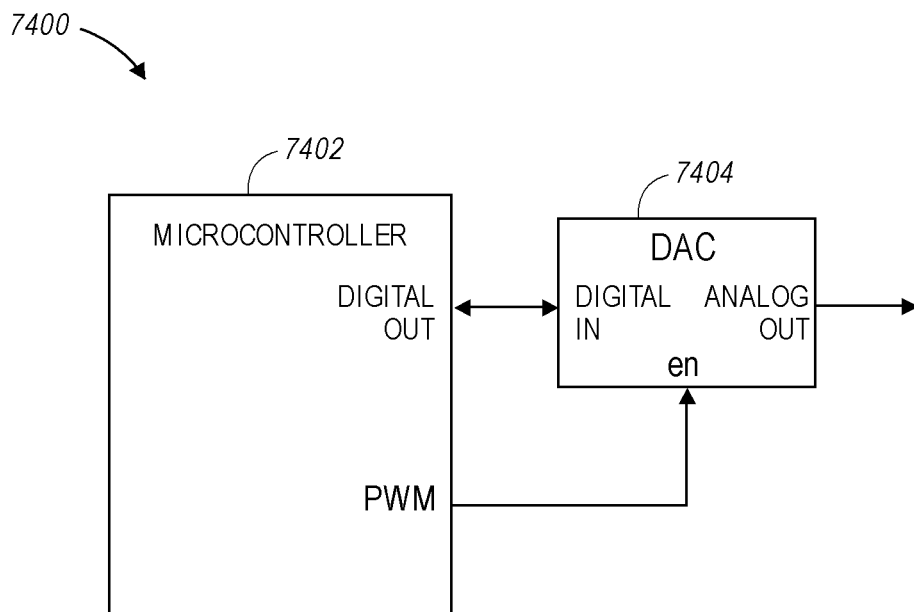
FIG. 74 is a block diagram of an exemplary hybrid control waveform generator, according to certain embodiments.
Figure 75:
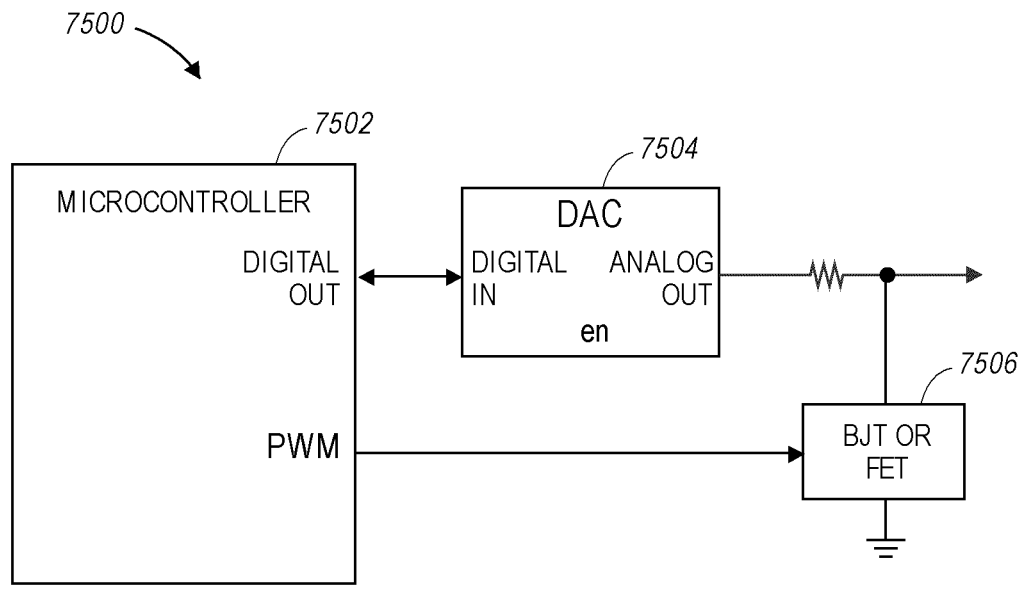
FIG. 75 is a block diagram of an exemplary hybrid control waveform generator, according to certain embodiments.
Figure 76:
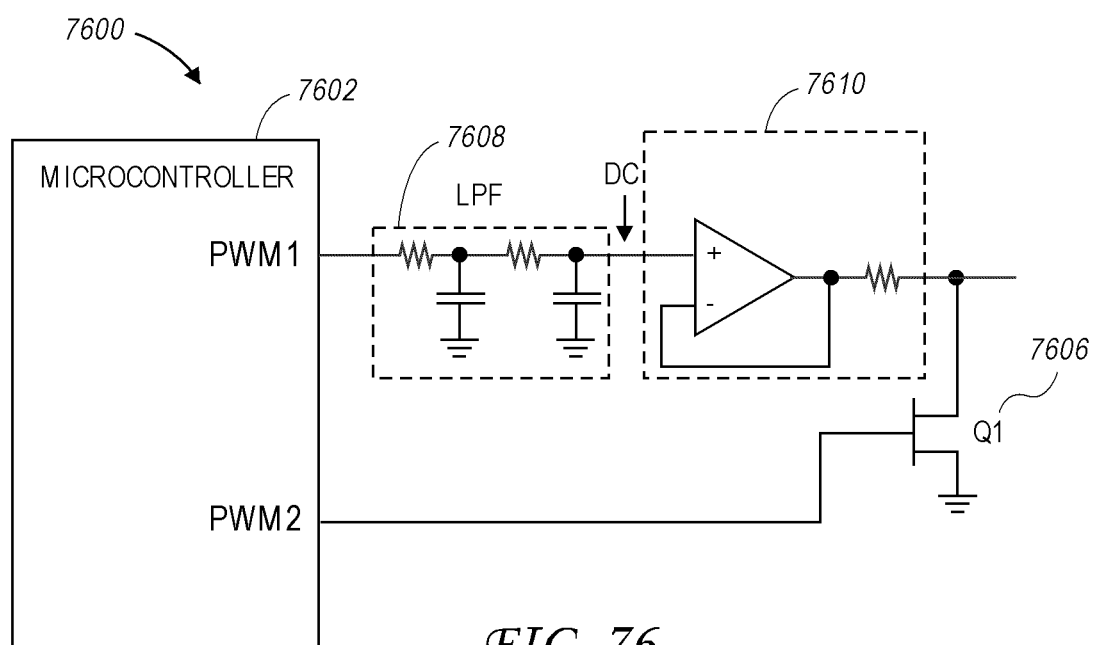
FIG. 76 is a block diagram of an exemplary hybrid control waveform generator, according to certain embodiments.

FIGS. 74-76 illustrate embodiments of the hybrid signal generator 7202 to generate hybrid control waveforms comprising one or more of varying duty cycles and varying amplitudes.

FIG. 74 is a block diagram of an embodiment of a hybrid control signal generator 7400 comprising a microcontroller 7402 and a digital to analog converter (DAC) 7404. The DAC 7404 receives digital data at a digital input and converts the digital data to an analog signal, which is output at an analog output. The DAC 7404 includes an enable input that enables or disables the analog output. The microcontroller 7402 is configured to output digital data at a digital output and a PWM waveform at a PWM output. The digital output of the microcontroller 7402 electrically couples to the digital input of the DAC 7404 and the PWM output of the microcontroller 7402 electrically couples to the enable input of the DAC 7404.

The microcontroller 7402 outputs a digital value which is converted to an analog signal and output by the DAC 7404. The microcontroller 7402 further generates the PWM signal, which, as the enable input to the DAC 7404, controls the analog output of the DAC 7404. When the enable signal is active, the output of the DAC 7404 is approximately the analog signal as set by the microcontroller 7402. When the enable signal is inactive, the output of the DAC 7404 is approximately 0V. The output of the DAC 7404 is modulated by the PWM waveform supplied by the microcontroller 7402. The output of the DAC 7404 is presented to the LED driver 6700.

Thus, the hybrid control signal generator 7400 generates a control waveform comprising a varying duty cycle and varying amplitude where the duty cycle is based at least in part on the PWM waveform from the microcontroller 7402 and the amplitude is based at least in part on the digital data from the microcontroller 7402.

FIG. 75 is a block diagram of an embodiment of a hybrid control signal generator 7500 comprising a microcontroller 7502, a digital to analog converter (DAC) 7504, and a switch 7506. In an embodiment, the switch 7506 comprises a transistor, such as a BJT or a FET. The microcontroller 7502 comprises a digital output and a PWM output and operates similar to the microcontroller 7402 as described above with respect to FIG. 74. DAC 7504 comprises a digital input, an enable input, and an analog output and operates similar to the DAC 7404 as described above with respect to FIG. 74.

The digital output of the microcontroller 7502 electrically couples to the digital input of the DAC 7504. The PWM output of the microcontroller 7502 electrically couples to a gate or a base of the switch 7506 and the analog output of the DAC 7504 electrically couples to a collector or a source of the switch 7506. The enable input is configured such that the DAC 7504 is always enabled, in an embodiment.

The microcontroller 7502 outputs digital data to the digital input of the DAC 7504. The DAC 7504 converts the digital data to an analog signal and outputs the analog signal. The microcontroller 7502 further generates a PWM waveform, which is received at the base or gate of the switch 7506. The analog output of the DAC 7504 is enabled through the enable input, but the analog output of the DAC 7504 is pulled to ground via the collector or source of the switch 7506 when the PWM waveform becomes active.

When the PWM waveform is inactive, the switch 7506 is open, such that the transistor is OFF, and the DAC analog output signal is presented to the LED driver 6700. In an embodiment, the PMW waveform is active when it is a logic high and inactive when it is a logic low. In another embodiment the PMW waveform is active when it is a logic low and inactive when it is a logic high. The output of the DAC 7504 is modulated by the PWM waveform generated by the microcontroller 7502 and the amplitude of the output of the DAC 7504 is controlled by the digital data provided by the microcontroller 7502.

Thus, the hybrid control signal generator 7500 generates a control waveform comprising a varying duty cycle and varying amplitude where the duty cycle is based at least in part on the PWM waveform from the microcontroller 7502 and the amplitude is based at least in part on the digital data from the microcontroller 7502.

In the embodiments illustrated in FIGS. 74 and 75, the DAC 7404, 7504 generates the analog waveform and the PWM signal from the microcontroller 7402, 7502 is used to modulate this analog waveform. In other embodiments, the microcontroller 7402, 7502 comprises the DAC 7404, 7504, the switch 7506 comprises an analog switch, and the like. In an embodiment, the DAC 7404, 7504 comprises, for example, an MCP4728 available from Microchip Technology, or the like. In an embodiment, the microcontroller 7402, 7502 comprises, for example, a PIC16F1847 available from Microchip Technology, or the like. The switch 7506 comprises, for example, a transistor, such as a FET 2N7002 available from Diodes Inc., or the like.

PWM Waveform Modulated BY PWM Waveform

If the microcontroller has multiple PWM channels, a first PWM waveform may be used to create an analog waveform by low-pass filtering (averaging) the first PWM waveform. When the cut-off frequency of the low-pass filter is much less than the PWM frequency of the first PWM waveform, the resulting signal will approximate an analog DC signal. The level of this analog DC signal can be controlled by the duty cycle of the first PWM waveform generated by the microcontroller. Once this analog DC signal is generated, it can be modulated by a second PWM waveform generated by the microcontroller using various methods.

FIG. 76 is a block diagram of an exemplary hybrid control signal generator 7600 comprising a microcontroller 7602, a switch 7606, a low-pass filter 7608, and a buffer circuit 7610. The microcontroller 7602 comprises at least two PMW channels, indicated by a PWM1 output and a PWM2 output and operates similar to the microcontroller 7402, 7502 as described above with respect to FIGS. 74 and 75. In an embodiment, the switch 7606 comprises a transistor, such as a BJT or a FET, an analog switch, and the like.

In an embodiment, the low-pass filter 7608 comprises a 2-stage RC network, as illustrated in FIG. 76. In other embodiments, other low-pass filters can be used, as is known to one of skill from the disclosure herein. In an embodiment, the buffer circuit 7610 comprises an operational amplifier, as illustrated in FIG. 75. In other embodiments, other circuits can be used to buffer or drive the output of the hybrid control signal generator 7600, as is known to one of skill from the disclosure herein.

The PWM1 output of the microcontroller 7602 electrically couples to an input of the low-pass filter 7608 and an output of the low-pass filter 7608 electrically couples to an input of the buffer circuit 7610. An output of the buffer circuit 7610 electrically couples to a source or emitter of the switch 7606 and the PWM2 output of the microcontroller 7602 electrically couples to a gate or base of the switch 7610.

The first PWM waveform from the PWM1 output of the microcontroller 7602 is filtered by the low-pass filter 7608 to approximate an analog signal where the amplitude of the analog signal is responsive to the average of the amplitude of the first PWM waveform. The buffer circuit 7610 buffers the output of the low-pass filter 7608. The output of the buffer circuit 7610 is modulated in response to the second PWM waveform from the PWM2 output of the microcontroller 7602 using the switch 7606. This is described above with respect to the microcontroller 7502 and the switch 7506 of FIG. 75. The output of the buffer circuit 7610 drives the LED driver 6700.

In embodiments where the low-pass filter 7608 comprises a 2-stage RC network, the output of the low-pass filter 7608 is buffered by the buffer circuit 7610 because the 2-stage RC network effectively raises the source impedance of the signal, which lowers its drive capability. In other embodiments, when the input impedance of the LED driver 6700 is high, the buffer circuit 7610 may be eliminated.

In an embodiment, the microcontroller 7602 comprises, for example, a PIC16F1847 available from Microchip Technology, or the like. The switch 7606 comprises, for example, a transistor, such as a FET 2N7002 available from Diodes Inc., or the like.

Digital to Analog Converter Output Controlled by Digital Data

In an embodiment, a digital to analog converter is used to generate the hybrid control signal using digital data from a microcontroller. Advantageously, this solution uses fewer components than the embodiments illustrated in FIGS. 74, 75, and 76.

Figure 77:
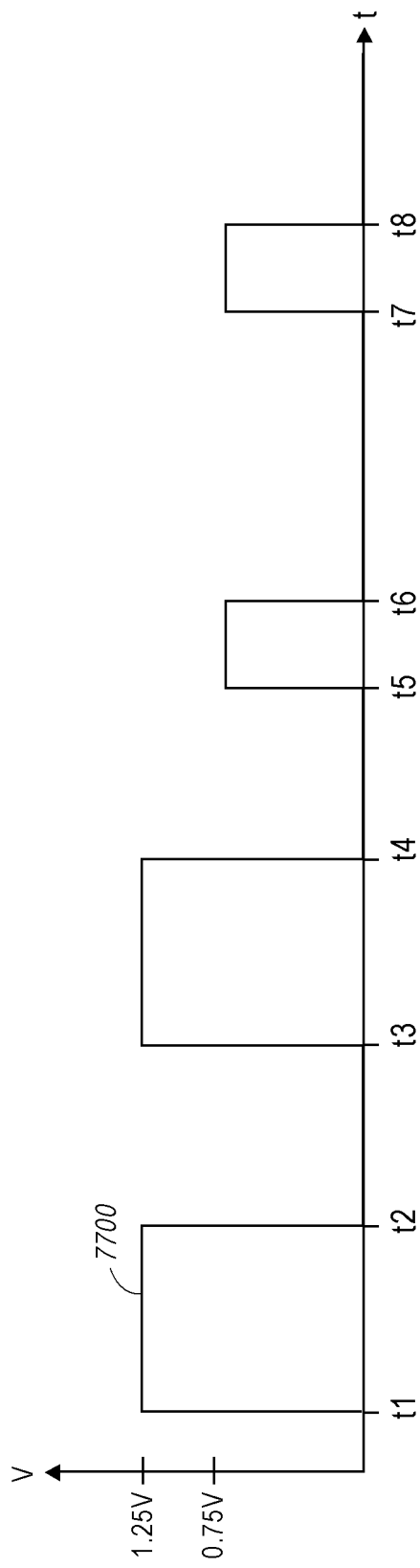
FIG. 77 illustrates an exemplary hybrid control waveform for a hysteretic LED driver, according to certain embodiments.
Figure 78:
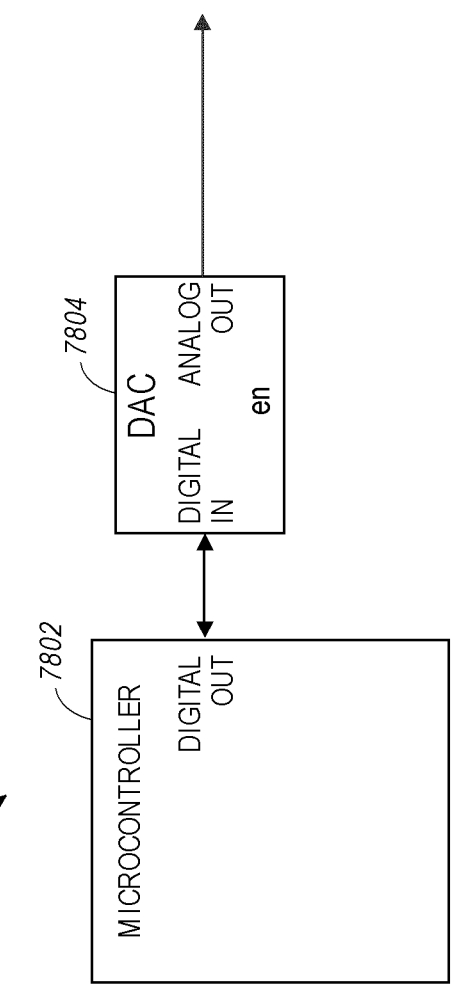
FIG. 78 is a block diagram of an exemplary hybrid control waveform generator, according to certain embodiments.

FIG. 77 illustrates an exemplary hybrid control waveform 7700 for the hysteretic LED driver 6700 where the analog and PWM components of the hybrid control waveform change at t=t5. FIG. 78 is a block diagram of an exemplary hybrid control signal generator 7800 comprising a microcontroller 7802 and a digital to analog converter (DAC) 7804 that can be used to generate the hybrid control signal 7700.

A digital output of the microcontroller 7802 electrically couples to a digital input of the DAC 7804 and the microcontroller 7802 provides digital data to the DAC 7804. The microcontroller 7802 writes or sends new digital values to the DAC 7804 at determined intervals to generate the hybrid control waveform 7700.

For example, to generate the hybrid control waveform 7700, the microcontroller 7802 writes a digital value corresponding to a DAC output of approximately 1.25V at t=t1, and a digital value corresponding to a DAC output of approximately 0V at t=t2. At t=t3, the microcontroller 7802 again writes a digital value corresponding to the DAC output of approximately 1.25V, and at t=t4 the microcontroller 7702 again writes a digital value corresponding to the DAC output of approximately 0V. At this point, the user, through the lighting controller 202, 300, 4002, 4702, 4902, 4952, decides to change the intensity of the light. So at t=t5, the microcontroller 7802 writes a digital value to the DAC 7804 that causes the DAC 7804 to output a signal with a value of approximately 0.75V. Then at t=t6, the microcontroller 7802 writes a digital value corresponding to a DAC output of approximately 0V. This process continues. The output of the DAC 7804 is presented to the LED driver 6700.

The microcontroller 7802 writes the digital data at specific time intervals in order for the desired outcome to occur. In an embodiment, the time intervals between "writes" can vary, which also affects the color and brightness of the LEDs 7204.

In contrast, the microcontrollers 7402, 7502, write the digital data to the corresponding DAC 7404, 7504 and to the PWM controller in the microcontroller 7402, 7502 once. These values do not need to be re-written unless the user, through the lighting controller 202, 300, 4002, 4702, 4902, 4952, changes the color and/or brightness of the LED lighting 7204. And if the color and the brightness changes, in an embodiment, a single pair of writes to affect the changes is needed until there is another change.

Filtered PWM Waveform

In an embodiment, a PWM waveform from a microcontroller is filtered and buffered to provide the hybrid control waveform. The microcontroller provides a new PWM waveform with a different duty cycle to change the hybrid control waveform. Advantageously, this solution uses fewer components than the embodiments illustrated in FIGS. 74, 75, and 76.

Figure 79:
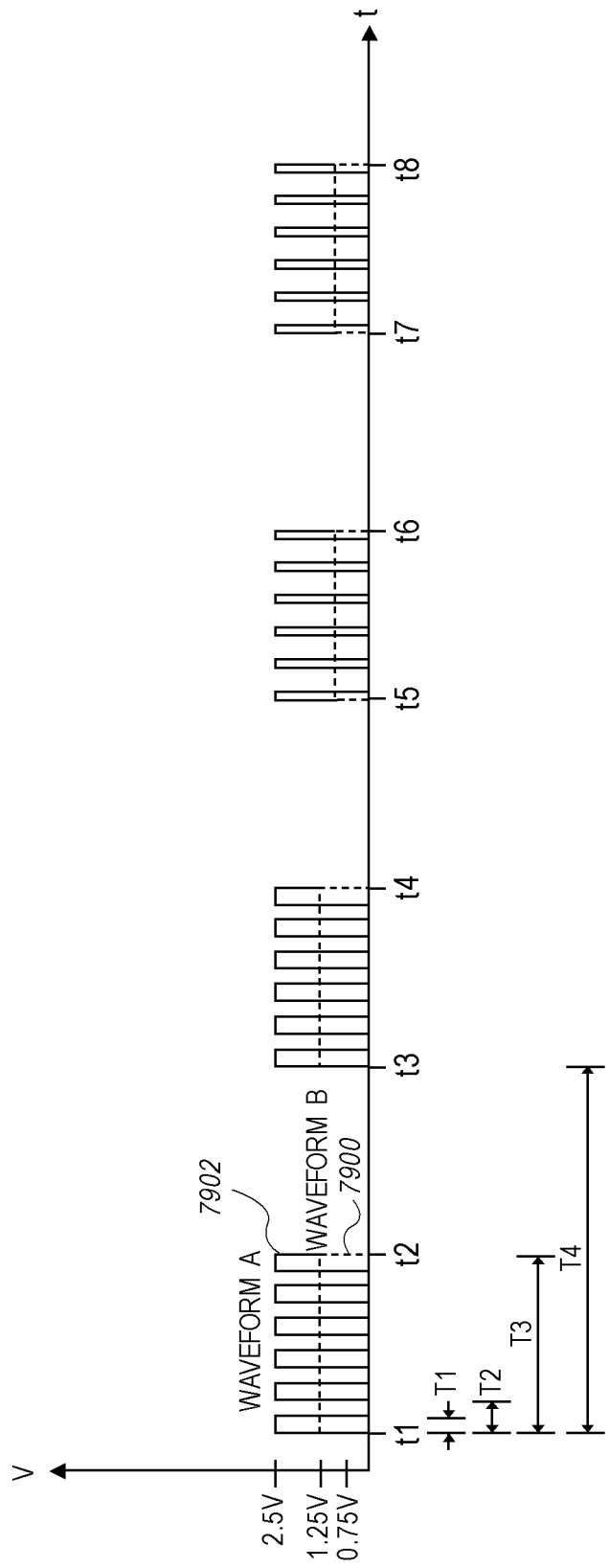
FIG. 79 illustrates an exemplary hybrid control waveform for a hysteretic LED driver, according to certain embodiments.
Figure 80:
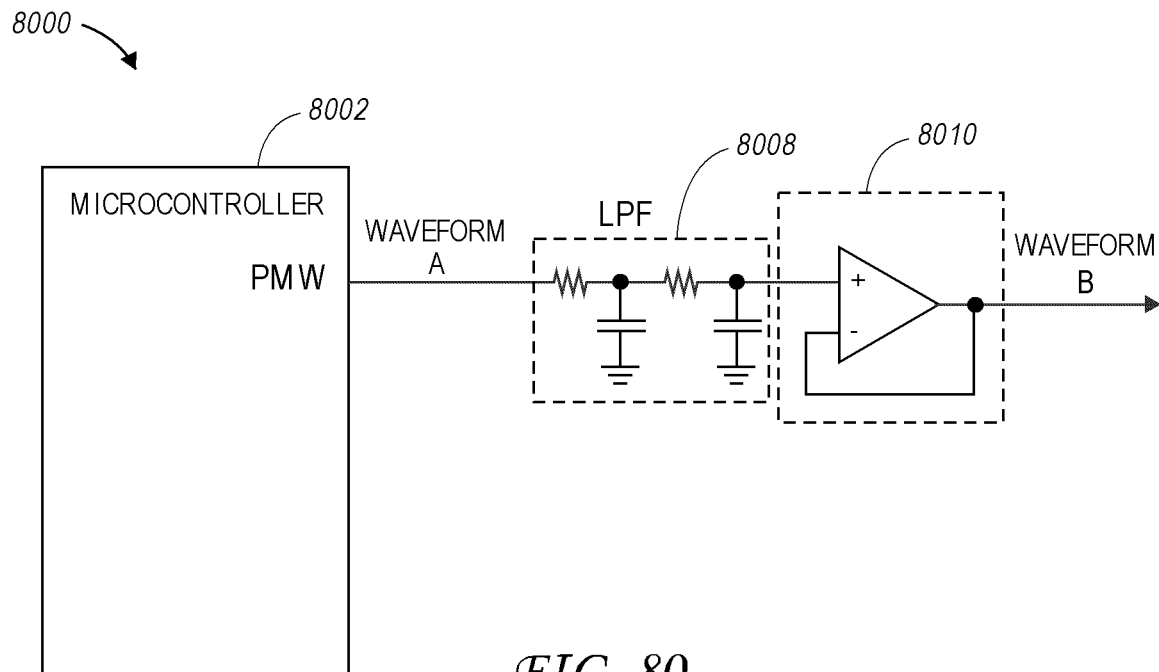
FIG. 80 is a block diagram of an exemplary hybrid control waveform generator, according to certain embodiments.

FIG. 79 illustrates an exemplary PWM waveform 7902 (Waveform A) from a microcontroller that is filtered to provide a hybrid control waveform 7900 (Waveform B). FIG. 80 is a block diagram of an exemplary hybrid control waveform generator 8000 comprising a microcontroller 8002, a low-pass filter 8008, and a buffer circuit 8010 that can be used to generate the hybrid control signal 7900.

A PWM output of the microcontroller 8002 electrically couples to an input of the low-pass filter 8008 and an output of the low-pass filter 8008 electrically couples to an input of the buffer circuit 8010. An output of the buffer circuit 8010 provides the hybrid control waveform 7900 for the LED driver 6700.

In an embodiment, the low-pass filter 8008 comprises a 2-stage RC low-pass filter. In other embodiments, other configuration of low-pass filters 8008 can be used, as is known to one of skill from the disclosure herein. In an embodiment, the buffer circuit 8010 comprises an operational amplifier. In other embodiments, other configurations of buffer circuits 8010 can be used, as is known to one of skill from the disclosure herein.

Waveform A 7902 is an example of the PWM waveform generated by the microcontroller 8002. To generate Waveform A, the microcontroller 8002 writes digital data corresponding to, for example, amplitude, period T2, and duty cycle (T1/T2), to the PWM controller in the microcontroller 8002. Waveform A 7902 is averaged by the low-pass filter 8008 and buffered by buffer circuit 8010 to provide a PWM waveform with varying amplitude as the hybrid control waveform 7900 (Waveform B). During the period in between the pulses, both waveforms 7900, 7902 are at approximately 0V.

To generate the hybrid control signal 7900, for example, at t=t1, the microcontroller 8002 generates the PWM Waveform A 7902 having an amplitude of approximately 2.5V and a duty cycle of approximately 50% which corresponds to a low-pass filter output of approximately 1.25V. At t=t2, the microcontroller 8002 writes new digital data to its PWM peripheral corresponding to a low-pass filter output of approximately 0V. At t=t3, the microcontroller 8002 again writes digital data to its PWM peripheral that causes the microprocessor 8002 to generate the PWM Waveform A 7902 having an amplitude of approximately 2.5V and a duty cycle of approximately 50% and at t=t4, the microcontroller 8002 writes digital data corresponding to a low-pass filter output of approximately 0V.

This process continues until t=t5, where the user, through the lighting controller 202, 300, 4002, 4702, 4902, 4952, decides to change the intensity of the light. At t=t5 the microcontroller 8002 writes digital data with a new duty cycle corresponding to a low-pass filter output of approximately 0.75V. At t=t6, the microcontroller 8002 again writes digital data corresponding to a low-pass filter output of approximately 0V. The times (t=t2, t4, t6) when the PWM output of the microcontroller 7802 is OFF, corresponding to a low-pass filter output of approximately 0V, are chosen to provide the hybrid control signal 7900 with a period of T4 and a duty cycle of T3/T4. The process continues.

FIG. 79 illustrates an exemplary hybrid control waveform 7900 with varying amplitude and an approximately constant period. In other embodiments of the hybrid control signal generator 8000, the microcontroller 8002 can write digital data at differing times to generate the PWM waveform 7902 that when filtered, provides the hybrid control waveform 7900 having varying amplitude and/or varying modulation periods.

Figure 81:
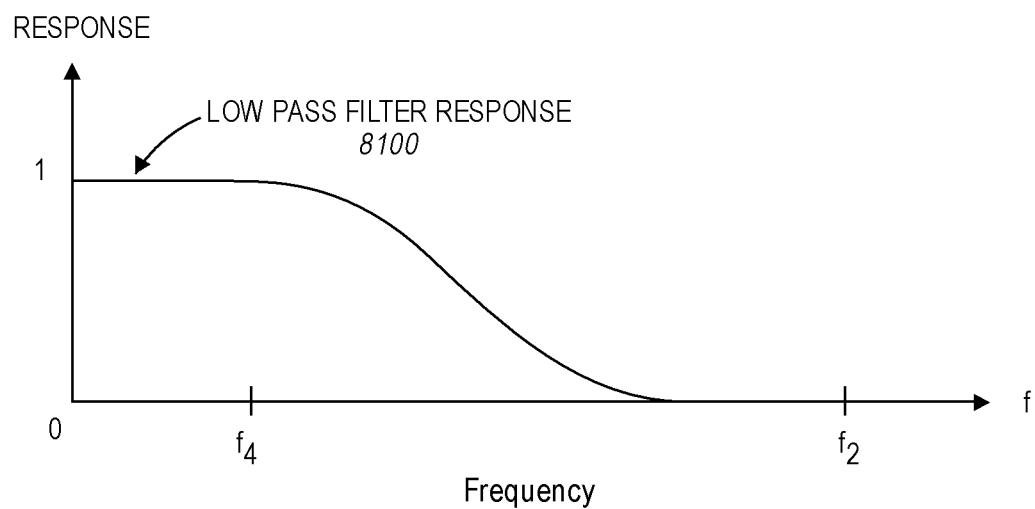
FIG. 81 illustrates a filter response for an exemplary low pass filter for a hybrid control waveform generator, according to certain embodiments.

FIG. 81 illustrates an exemplary filter response 8100 for the low-pass filter 8008. Referring to FIGS. 79 and 80, the PWM output (Waveform A) 7902 has a period of T2, which corresponds to a frequency of f2 and the hybrid control waveform (Waveform B) 7900 has a period of T4 corresponding to a frequency of f4. The values of the components of the low-pass filter 8010 are chosen such that the low-pass filter 8010 readily passes waveforms having the frequency f4, and filters or averages waveforms having the frequency f2.

Embodiments of the lighting systems 100, 200, 1800, 4000, 4300, 4700, 4800, 4900, 5000, 5200 further comprise the hybrid controlled lighting module 7200 to control color and dimming of LED lighting. Embodiments of the lighting controller 202, 300, 4002, 4702, 4902, 4952 further comprise any of the hybrid control signal generators 7400, 7500, 7600, 7800, 8000. Embodiments of the lighting modules 6100, 6200, 6300, 6400 comprise any of the hybrid control signal generators 7400, 7500, 7600, 7800, 8000. Embodiments of the microcontroller 6102, 6302 comprise any of the microcontrollers 7402, 7502, 7602, 7802, 8002.

The embodiments disclosed herein illustrate non-limiting examples of the concept of combining two control signals, each with a limited control resolution, such that the combined control signal has a resulting resolution with a much finer resolution than either of the two control signals alone could achieve.

The examples herein describe the generation and use of a hybrid control signal having an analog component and a digital component in conjunction with a hysteretic buck converter. In other embodiments, the two components of the hybrid control signal could also both be analog, or both be digital. Furthermore, the driver need not be a hysteretic buck topology driver, but may also be buck, boost, buck-boost, single-ended primary-inductor converter (sepic), linear, or various other driver types. Additionally, the two control signals need not be combined prior to presenting them to the converter, but may also be combined by the converter itself. In such a design, the converter comprises more than one dimming input.

Lastly, the concept of dimming a particular hue was used as an example of one of the benefits associated with increased resolution of control. However, even if dimming were not a consideration, the techniques described could be used to give more resolution for hue control, since the ratios of the colors to be mixed can be controlled with greater precision.

Color Wheel Feature

Colored LED-based lighting, such as an RGB lighting fixture, not only has the ability to render nearly any hue of light and/or intensity using, for example, one or more of the hybrid control signals described herein, it also has the ability to change that hue autonomously if desired. In an embodiment, an intelligent RGB lighting fixture receives a command, which comprises a starting hue, an ending hue, and a transition time, where the transition time is the time it takes the lighting fixture to transition from the starting hue to the ending hue. When the lighting fixture receives this command, it outputs the starting hue, and begins transitioning from the starting hue to the ending hue, at a speed that is based at least in part on the transition time.

In another embodiment, the command further comprises cycle information. The cycle information may comprise additional information such as whether after the ending hue is reached, the lighting fixture should transition back to the starting hue, or remain at the ending hue. The lighting fixture may, in a further embodiment, be instructed to start at one hue and continually transition through all possible hues perpetually.

This feature is useful when lighting fountains or water features. For example, a user wants to illuminate a 3-tiered fountain with three separate groups of lights, such that a first group illuminates the lowest tier, a second group illuminates the middle tier, and a third group illuminates the highest tier. He could start each tier at a different hue, and instruct the lighting fixtures to step or cycle though all hues with approximately the same speed. This results in a visually appealing display since each of the three fountain tiers is illuminated with a different color, which is changing. This example shows the importance of specifying a starting hue as well as a transition speed.

In an embodiment, for such a feature to be useful, it is important for lighting fixtures of different groups, or lighting fixtures of the same group to use a time base that is synchronous among the lighting fixtures. When multiple fixtures using the same or approximately the same time base are placed in this "color wheel" mode, they would maintain synchrony with each other. In an embodiment, accurate crystals or oscillators can be used in each lighting fixture to minimize variations in each lighting fixture's time base. Unfortunately, accurate crystals or oscillators can be expensive. In another embodiment, without using expensive highly accurate crystals in each lighting fixture, the incoming AC power is used as a time base. Because the lighting fixtures receive power from a common source of power, using the timing information from the common power source is a simple, inexpensive method to maintain the lighting fixtures in sync with one another. In an embodiment, the timing information of the common power source comprises the frequency of the power source.

In an embodiment, the zero-crossing of the incoming power generates an interrupt to the microcontroller in the lighting fixture. For example, a zero-crossing detector could be used to generate the interrupt. Depending at least in part on the transition speed that of the lighting fixture received in the command, the microcontroller may take one "step" toward the next color or hue every interrupt, or every second interrupt, or every third interrupt, etc. For example, a counter could be used to count the interrupts generated by the zero-crossing detector. When the number of received interrupts correlates with to the transition speed, the microcontroller generates control signals to control the LEDs in the lighting fixture to produce the next color.

In an embodiment, a LED-based lighting fixture is configured to receive a command comprising a starting hue, an optional ending hue, and a transition speed. In another embodiment, the LED-based lighting fixture is configured to use timing information from the power signal as a time base for color transitions defined by the starting hue, the optional ending hue, and the transition speed.

Chassis

Embodiments of the lighting systems 100, 200, 1800, 4000, 4300, 4700, 4800, 4900, 5000, 5200 further comprise a frame that would mount inside the home or anywhere an aesthetic installation was desired. In one embodiment, the frame holds the operator interface panel 308 and could further comprise one or more of the following:

An extension of the RS485 connection from the chassis 302 to the frame, where the frame has wiring channels for the cable, thus providing a very clean installation;

An integrated "nest" for the WI-FI antenna so that it would not be seen;

Work with the wireless operator interface panel extender described herein by invisibly housing the RF transceiver and providing power to the operator interface panel 308; and Power the operator interface panel 308 such that the frame could also recharge an integrated battery. This would allow users to have the wall mounted option, be able to remove the operator panel 308, which is now powered by the battery and in communication with the chassis via the radio, and walk around to adjust their lighting, seeing the affects in real time.

Figure 65:
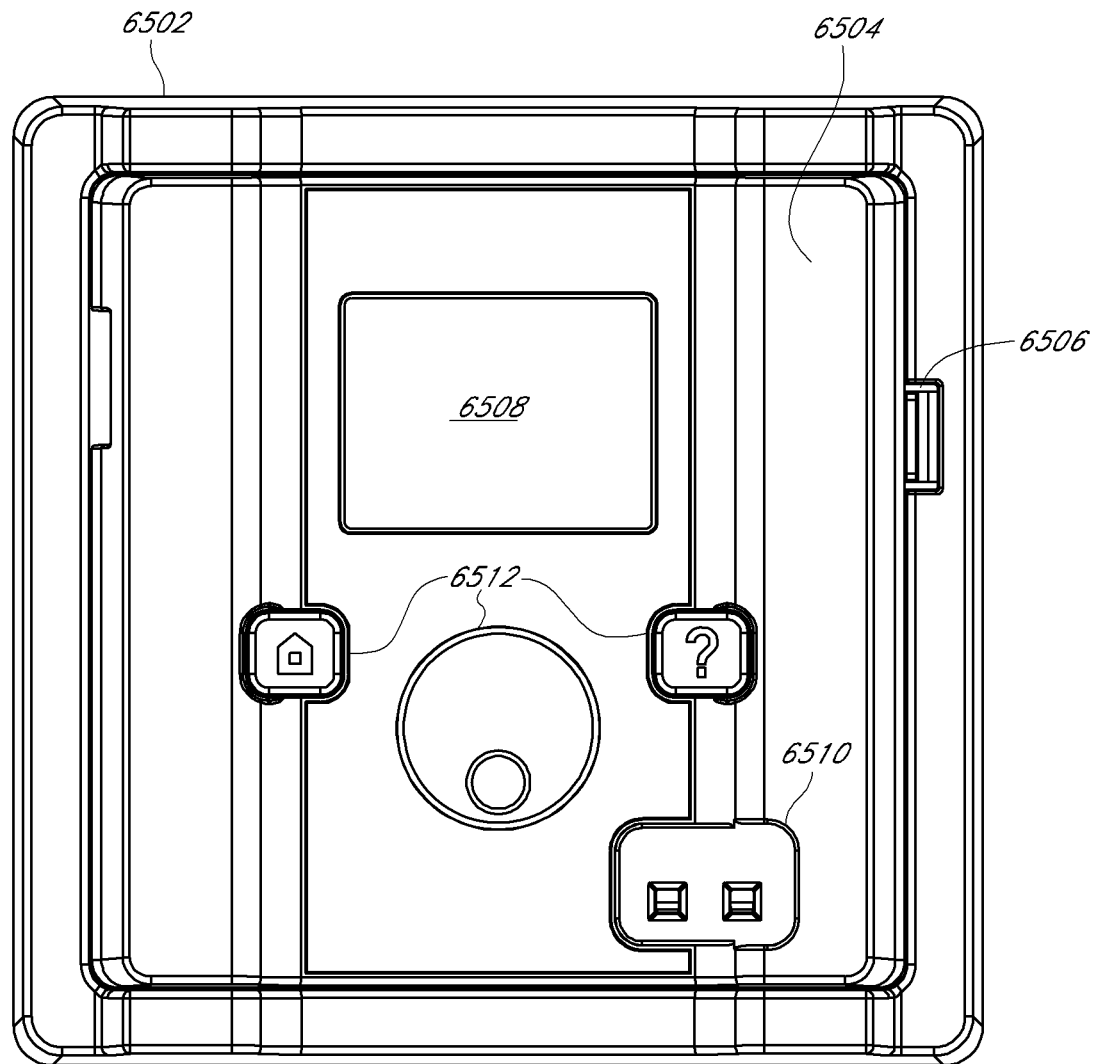
FIG. 65 is a front view of an exemplary lighting controller chassis, according to certain embodiments.

FIG. 65 is a front view of an exemplary lighting controller comprising a frame 6502 and an operator interface panel 6504 which comprises a display 6508, fixture programming ports 6510, and user interface devices 6512, such as button, switch, knobs, and the like. In the illustrated embodiment, latch 6506 is configured to releasably hold the operator interface panel 6504 in the frame 6502.

Figure 66:
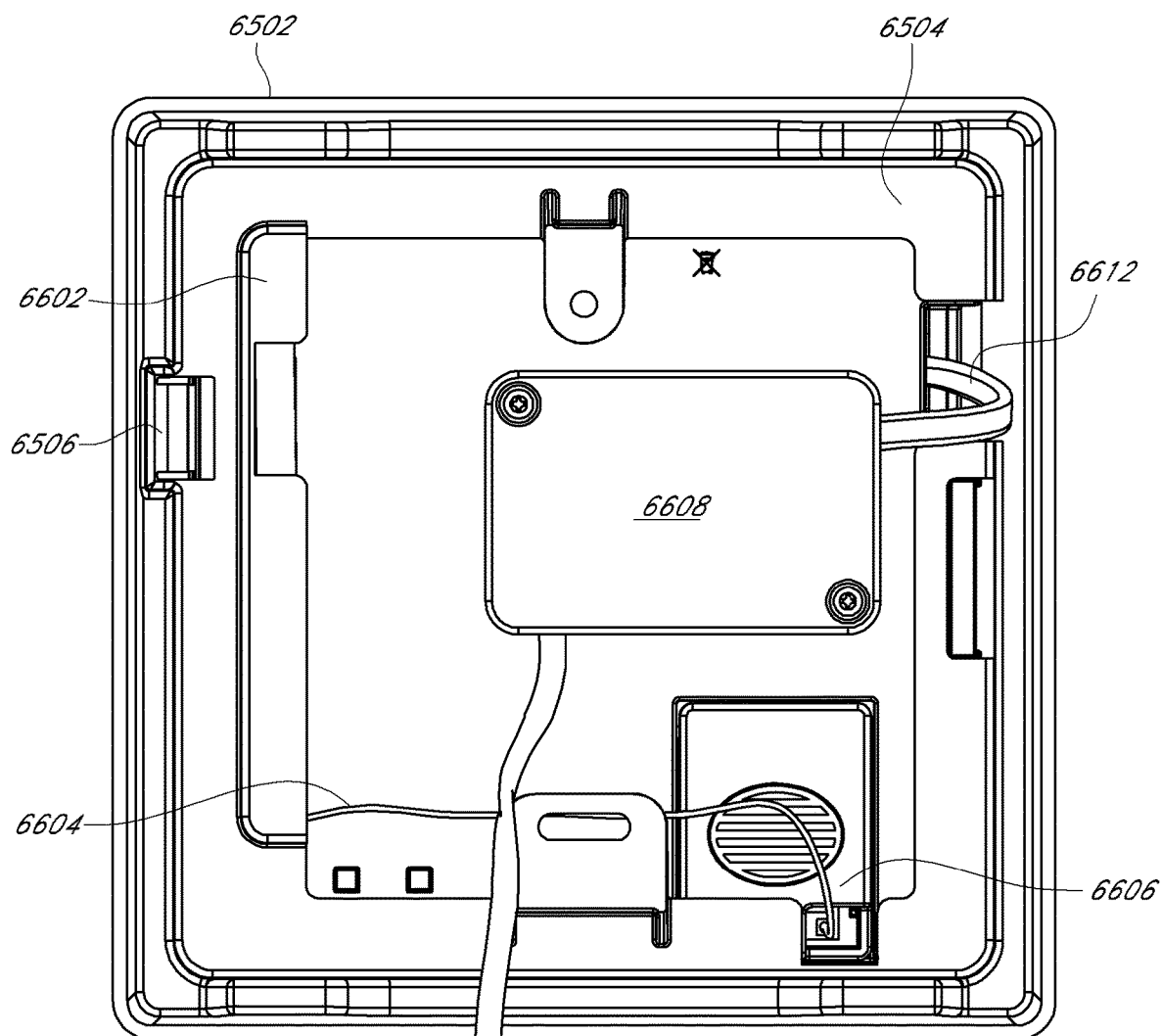
FIG. 66 is a back view of an exemplary lighting controller chassis, according to certain embodiments.
Figure 66:
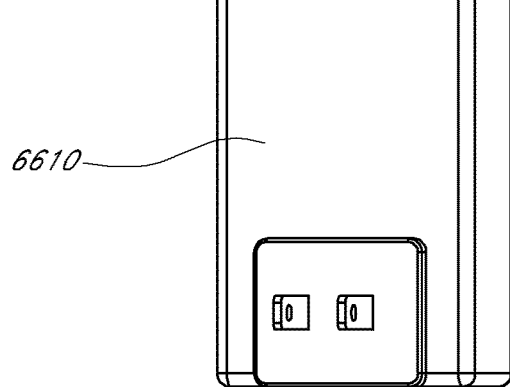

FIG. 66 is a back view of an exemplary lighting controller comprising the frame 6502, the operator interface panel 6504 and the latch 6506. The illustrated lighting controller further comprises a WIFI module 6606 electrically coupled to an antenna 6602 through antenna wire 6604, and an operator interface panel extender 6608 detachable affixed to the lighting controller. The operator interface panel extender 6608 supplies power to the power supply of the operator interface panel 6504 through a cable, such as a 6-conductor flat modular cable, when the operator interface panel extender 6608 is affixed to the operator interface panel 6504. Referring to FIG. 43, the operator interface panel extender 6608 comprises the panel RF transceiver 4304, the battery/adapter 4306, and the antenna 4312. For remote operation, the operator interface panel extender 6608 wirelessly communicates with the chassis/power supply 302 via the chassis RF transceiver 4302 and antenna 4310.

An adapter 6610 configured as a wall plug-in module, provides power to the power operator interface panel extender 6608. The operator interface panel extender 6608 may optionally comprises a battery and a battery charger, which provide power to the extender 6608 and operator panel 6504, allowing the panel 6504 and extender 6608 to be removed from the frame 6502 and operated while moving about the property.

Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding whether these features, elements, and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A lighting control system configured to power and modify a behavior of a plurality of lighting modules, each lighting module including one or more LED lights and being serially addressable over a two-wire communication network, the lighting control system comprising:

a module that receives, via the Internet, user input regarding the behavior of the one or more LED lights of the plurality of lighting modules and converts the received user input into a baseband format;

a master lighting controller comprising:

an interface panel that receives the baseband formatted user input and generates, with a microprocessor, first command and address data that is responsive to the user input and having a first protocol;

a panel radio frequency transceiver that receives the first command and address data and encodes the first command and address data onto a radio frequency signal for transmission over a radio frequency communication link;

a chassis radio frequency transceiver that receives the radio frequency signal from the radio frequency communication link and decodes the radio frequency signal to provide second command and address data that is responsive to the user input; and a first power supply that receives the second command and address data and encodes the second command and address data having the first protocol onto a first power waveform according to a second protocol to generate a first data encoded power signal that includes the encoded second command and address data having the second protocol for transmission over a first two-wire communication network to power and control a first portion of the plurality of lighting modules according to the user input;

each lighting module of the first portion comprising a microcontroller to decode the encoded second command and address data from the first data encoded power signal into a format usable to control the one or more LED lights;

a protocol converter separate from the plurality of lighting modules and the master lighting controller, the protocol converter operably coupled to the first two-wire communication network to receive the first data encoded power signal, the protocol converter comprising processing circuitry to convert the first data encoded power signal having the second protocol to the command and address data having the first protocol and a transceiver to transmit the command and address data having the first protocol over a communication path; and a slave lighting controller separate from the protocol converter, the plurality of lighting modules, and the master lighting controller, wherein the protocol converter and the slave lighting controller are operably coupled to the communication path to receive the command and address data having the first protocol and encode the command and address data having the first protocol onto a power waveform according to the second protocol to generate a second data encoded power signal that includes the command and address data having the second protocol for transmission over a second two-wire communication network to power and control a second portion of the plurality of lighting modules according to the user input;

each lighting module of the second portion comprising a microcontroller to decode the command and address data having the second protocol from the second data encoded power signal into the format usable to control the one or more LED lights, wherein the second protocol utilized by the master lighting controller is the same as the second protocol utilized by the slave lighting controller.

2. The lighting control system of claim 1 wherein the first and second command and address data include zone commands to control one or more lighting zones, one or more lighting modules of the plurality of lighting modules are assigned to a first lighting zone, and each of the one or more lighting modules assigned to the first lighting zone are responsive to zone commands that control the first lighting zone.

3. The lighting control system of claim 1 wherein the second portion of the plurality of lighting modules decode the encoded second command and address data to cause lighting modules of the plurality of lighting modules that are assigned to the user-selected lighting zone to illuminate in response to user-selected color and user-selected brightness.

4. The lighting control system of claim 1 further comprising the plurality of lighting modules, the one or more LED lights of the plurality of lighting modules responsive to the decoded command and address data to implement color and intensity according to the user input for assigned lighting zones.

5. The lighting control system of claim 1 wherein lighting modules of the plurality of lighting modules are grouped to form one or more lighting zones and lighting modules of a same lighting zone include a common address.

6. The lighting control system of claim 1 wherein the first data encoded power signal is shaped similar to a sinusoidal waveform when the first data encoded power signal represents a data bit.

7. The lighting controller system of claim 1, wherein the power supply is configured to receive source power and modify an input voltage of the source power to produce the first power waveform.

8. The lighting controller system of claim 1 wherein the first data encoded power signal is responsive to a polarity of the first power waveform and the second command and address data.

9. The lighting controller system of claim 1 wherein the user input is received wirelessly from a wireless device associated with a user.

10. The lighting controller system of claim 1, wherein the interface panel and the panel radio frequency transceiver are located remotely from the chassis radio frequency transceiver and the power supply.

11. A method to relay information from a master lighting controller to one or more LED lights, the method comprising:
   receiving-user input to control a behavior of a plurality of lighting modules and converting the received user input into a baseband format;
   with a master lighting controller that comprises an interface panel, a panel radio frequency transceiver, a chassis radio frequency transceiver, and a first power supply,
      receiving, with the interface panel, the baseband formatted user input;
      providing, by the interface panel, first command and address data that is responsive to the user input and having a first protocol;
      encoding, with the panel radio frequency transceiver, the first command and address data onto a radio frequency signal for transmission over a radio frequency communication link;
      receiving, with the chassis radio frequency transceiver, the radio frequency signal from the radio frequency communication link;
      decoding, with the chassis radio frequency transceiver, the radio frequency signal to provide second command and address data that is responsive to the user input; and
      encoding, with the first power supply, the second command and address data having the second protocol onto a first power waveform according to the second protocol to form the first data encoded power signal that includes the encoded second command and address data having the second protocol for transmission over a first two-wire communication network to power and control a first portion of the plurality of lighting modules according to the user input;
   with a protocol converter operably coupled to the first two-wire communication network, separate from the plurality of lighting modules and the master lighting controller, and comprising processing circuitry and a transceiver,
      receiving the first data encoded power signal;
      converting, with the processing circuitry, the first data encoded power signal having the second protocol to the command and address data having the first protocol; and
      transmitting, with the transceiver, the command and address data having the first protocol over a communication path; and
   with a slave lighting controller separate from the protocol converter, the plurality of lighting modules, and the master lighting controller, wherein the protocol converter and the slave lighting controller are operably coupled to the communication path,
      receiving the command and address data having the first protocol; and
      encoding the command and address data having the first protocol onto a power waveform according to the second protocol to generate a second data encoded power signal that includes the command and address data having the second protocol for transmission over a second two-wire communication network to power and control a second portion of the plurality of lighting modules according to the user input, wherein the second protocol utilized by the master lighting controller is the same as the second protocol utilized by the slave lighting controller.

12. The method of claim 11 wherein the first and second command and address data include zone commands to control one or more lighting zones, one or more lighting modules of the plurality of lighting modules are assigned to a first lighting zone, and each of the one or more lighting modules assigned to the first lighting zone are responsive to zone commands that control the first lighting zone.

13. The method of claim 11 wherein the plurality of lighting modules decode the encoded second command and address data to cause lighting modules of the plurality of lighting modules that are assigned to a user-selected lighting zone to illuminate in response to user-selected color and user-selected brightness.

14. The method of claim 11 wherein lighting modules of the plurality of lighting modules are grouped to form one or more lighting zones and lighting modules of a same lighting zone include a common address.

* * * * *